US010696591B2

(12) United States Patent
Li et al.

(10) Patent No.: US 10,696,591 B2
(45) Date of Patent: Jun. 30, 2020

(54) SELF-HEALING COMPOSITE OF THERMOSET POLYMER AND PROGRAMMED SUPER CONTRACTION FIBERS

(71) Applicants: Guoqiang Li, Baton Rouge, LA (US); Harper Meng, Baton Rouge, LA (US)

(72) Inventors: Guoqiang Li, Baton Rouge, LA (US); Harper Meng, Baton Rouge, LA (US)

(73) Assignee: Board of Supervisors of Louisiana State University and Agricultural and Mechanical College, Baton Rouge, LA (US)

( * ) Notice: Subject to any disclaimer, the term of this patent is extended or adjusted under 35 U.S.C. 154(b) by 0 days.

(21) Appl. No.: 16/353,087

(22) Filed: Mar. 14, 2019

(65) Prior Publication Data
US 2019/0210922 A1   Jul. 11, 2019

Related U.S. Application Data

(62) Division of application No. 15/213,926, filed on Jul. 19, 2016, now Pat. No. 10,239,788, which is a
(Continued)

(51) Int. Cl.
*C04B 26/16*   (2006.01)
*C04B 26/04*   (2006.01)
(Continued)

(52) U.S. Cl.
CPC ............. *C04B 26/16* (2013.01); *B29C 73/18* (2013.01); *C04B 20/1037* (2013.01);
(Continued)

(58) Field of Classification Search
CPC ..... C04B 26/16; C04B 20/1037; C04B 26/04; C04B 26/26; C04B 28/02; B29C 73/18;
(Continued)

(56) References Cited

U.S. PATENT DOCUMENTS 6,340,522 B1   1/2002  Burke
9,428,647 B2 * 8/2016  Li ........................... C08L 75/04

FOREIGN PATENT DOCUMENTS

JP          2004331491          11/2004

OTHER PUBLICATIONS

Araújo, M. et al., Cross-Linkable Polyethers as Healing/Sealing Agents for Self-Healing of Cementitious Materials Materials and Design, vol. 98, pp. 215-222 (2016).
(Continued)

*Primary Examiner* — John E Uselding
(74) *Attorney, Agent, or Firm* — John H. Runnels

(57) ABSTRACT

A composition comprising thermoset polymer, shape memory polymer to facilitate macro scale damage closure, and a component for molecular scale healing has the ability to repair structural defects by a bio-mimetic, close-then-heal process. The shape memory polymer serves to bring surfaces of a structural defect into proximity, after which the healing component moves into the defect and provides molecular scale healing. The component for molecular scale healing can be a thermoplastic, such as fibers, particles or spheres, which are heated to or above the thermoplastic's melting point, and then the composition is cooled below that melting temperature. The compositions can not only close macroscopic defects, but they can also do so repeatedly even if damage recurs in a previously healed/repaired area.

1 Claim, 64 Drawing Sheets

Related U.S. Application Data division of application No. 14/248,711, filed on Apr. 9, 2014, now Pat. No. 9,428,647.

(60) Provisional application No. 61/810,015, filed on Apr. 9, 2013.

(51) Int. Cl.

| | | |
|---|---|---|
| *C08G 18/32* | (2006.01) | |
| *B29C 73/18* | (2006.01) | |
| *C04B 26/26* | (2006.01) | |
| *C04B 28/02* | (2006.01) | |
| *C04B 20/10* | (2006.01) | |
| *C08G 18/66* | (2006.01) | |
| *C08G 18/76* | (2006.01) | |
| *C08G 18/42* | (2006.01) | |
| *C08L 75/04* | (2006.01) | |
| *C08G 18/10* | (2006.01) | |
| *D01F 6/70* | (2006.01) | |
| *C04B 111/00* | (2006.01) | |
| *C04B 111/72* | (2006.01) | |
| *C04B 103/00* | (2006.01) | |
| *C08G 101/00* | (2006.01) | |
| *D01D 5/12* | (2006.01) | |

(52) U.S. Cl.
CPC .............. *C04B 26/04* (2013.01); *C04B 26/26* (2013.01); *C04B 28/02* (2013.01); *C08G 18/10* (2013.01); *C08G 18/3206* (2013.01); *C08G 18/4238* (2013.01); *C08G 18/664* (2013.01); *C08G 18/7671* (2013.01); *C08L 75/04* (2013.01); *C04B 2103/0065* (2013.01); *C04B 2111/00612* (2013.01); *C04B 2111/72* (2013.01); *C08G 2101/0025* (2013.01); *C08G 2280/00* (2013.01); *C08G 2350/00* (2013.01); *D01D 5/12* (2013.01); *D01F 6/70* (2013.01)

(58) Field of Classification Search
CPC ............ C08G 18/4238; C08G 18/3206; C08G 18/10; C08G 18/664; C08G 18/7671; C08L 75/04; D01F 6/70
See application file for complete search history.

(56) References Cited

OTHER PUBLICATIONS

Choi, H. et al., "Effective Crack Control of Concrete by Self-Healing of Cementitious Composites Using Synthetic Fiber," Materials, vol. 9, No. 248 (2016).

De Muynck, W. et al., "Microbial Carbonite Precipitation in Construction Materials: A Review," Ecological Engineering, vol. 36, pp. 118-136 (2010).

Extance, Andy, "Spider Threads' Bring Great Self-Healing Power," Chemistry World, Royal Society of Chemistry 2012 Registered Charity No. 207890b.

Jonkers, H. et al., "Application of Bacteria as Self-Healing Agent for the Development of Sustainable Concrete," Ecological Engineering, vol. 36, pp. 230-235 (2010).

Kirkby, E. et al., "Performance of Self-Healing Epoxy with Microencapsulated Healing Agent and Shape Memory Alloy Wires," Polymer, vol. 50, pp. 5533-5538 (2009).

Kirkby, E. et al., "Embedded Shape-Memory Alloy Wires for Improved Performance of Self-Healing Polymers," Advanced Functional Materials, vol. 18, pp. 2253-2260 (2008).

Li, G. et al., "Healable Thermoset Polymer Composite Embedded with Stimuli-responsive Fibers," Journal of the Royal Society Interface, vol. 9, No. 77, pp. 3279-3287 (2012).

Li, G. et al., "A Viscoplastic Theory of Shape Memory Polymer Fibers With Application to Self-Healing Materials," Proceedings of the Royal Society A—Mathematical Physical and Engineering Sciences, vol. 468, pp. 2319-2346 (2012).

Li, G. et al., "Effect of Strain Hardening of Shape Memory Polymer Fibers on Healing Efficiency of Thermosetting Polymer Composites," Polymer, vol. 54, pp. 920-928 (2013).

Li, G. et al., "A Self-Healing Particulate Composite Reinforced With Strain Hardened Short Shape Memory Polymer Fibers," Polymer, vol. 54, pp. 5075-5086 (2013).

Li, G. et al., "Cyclic Viscoplastic-Viscodamage Analysis of Shape Memory Polymers Fibres with Application to Self-Healing Smart Materials," Journal of Applied Mechanics, vol. 80, p. 011014 (2013).

Neuser, S. et al., "Improving Solvent-Based Self-Healing Materials Through Shape Memory Alloys," Polymer, vol. 53, pp. 370-378 (2012).

Reinhardt, H-W. et al., "Permeability and Self-Healing of Cracked Concrete as a Function of Temperature and Crack Width," Cement and Concrete Research, vol. 33, pp. 981-985 (2003).

Shojaei, A. et al., "Cyclic Viscoplastic-Viscodamage Analysis of Shape Memory Polymers Fibers with Application to Self-Healing Smart Materials," Journal of Applied Mechanics, vol. 80, pp. 011014-1-011014-15 (2013).

Shojaei, A. et al., "Viscoplasticity Analysis of Semicrystalline Polymers: A Multiscale Approach within Micromechanics Framework," International Journal of Plasticity, vol. 42, pp. 31-49 (2013).

Thibeaux, Cassie, "LSU Engineering Professor Collaborates to Produce Smart, Healable Composites with Spider Silk-Inspired Polymer Threads," LSU Gold. Louisiana State University, Nov. 12, 2012. Web.

Van Tittelboom, K. et al., "Self-Healing Efficiency of Cementitious Materials Containing Tubular Capsules Filled with Healing Agent," Cement & Concrete Composites, vol. 33, pp. 497-505 (2011).

Van Tittelboom, K. et al., "Comparison of Different Approaches for Self-Healing Concrete in a Large-Scale Lab Test," Construction and Building Materials, vol. 107, pp. 125-137 (2016).

Wang, C. et al., "Repeated Instant Self-Healing Shape Memory Composites," Journal of Materials Engineering and Performance, vol. 21, No. 12, pp. 2663-2669 (2012).

Wang, C. et al., "Rubber-Like Shape Memory Polymeric Materials with Repeatable Thermal-Assisted Healing Function," Smart Materials and Structures, vol. 21, 115010 (8 pp.) (2012).

Wang, J. et al., "Use of Silica Gel or Polyurethane Immobilized Bacteria for Self-Healing Concrete," Construction and Building Materials, vol. 26, pp. 532-540 (2012).

Wu, M. et al., "A Review: Self-Healing in Cementitious Materials and Engineered Cementitious Composite as a Self-Healing Material," Construction and Building Materials, vol. 28, pp. 571-583 (2012).

Wu, X. et al., "Two-Step Shape Recovery in Heating Responsive Shape Memory Polytetraflouroethylene and it's Thermally Assisted Self-Healing," Smart Materials and Structures, vol. 22, 125023 (12 pp.) (2013).

Yang, Y. et al., "Autogenous Healing of Engineered Cementitious Composites Under Wet-Dry Cycles," Cement and Concrete Research, vol. 39, pp. 382-390 (2009).

Yang, Q. et al., "Spider-Silk-Like Shape Memory Polymer Fiber for Vibration Damping," Smart Materials and Structures, vol. 23, pp. 105032 (14 pp.) (2014).

Zhang, P. et al., "Structural Relaxation Behavior of Strain Hardened Shape Memory Polymer Fibers for Self-Healing Applications," Journal of Polymer Science Part B: Polymer Physics, vol. 51, pp. 966-977 (2013).

\* cited by examiner

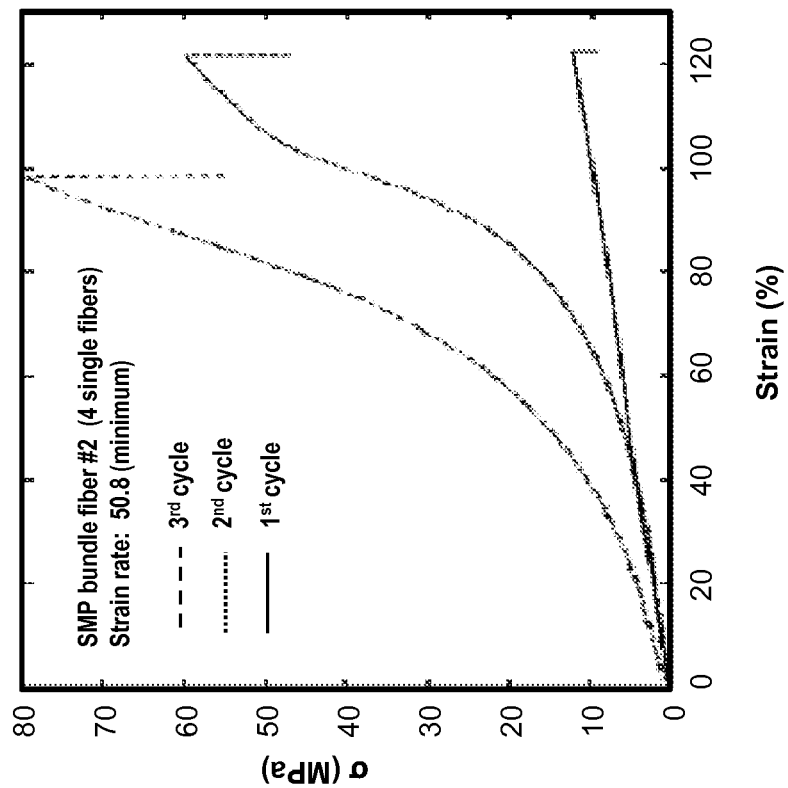
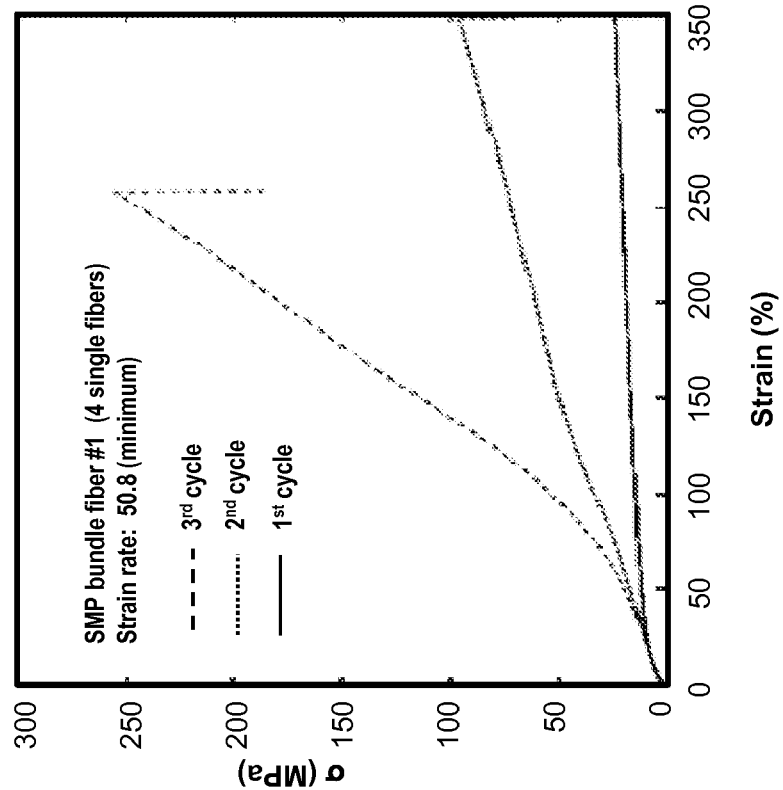
Fig. 2A
Fig. 2B

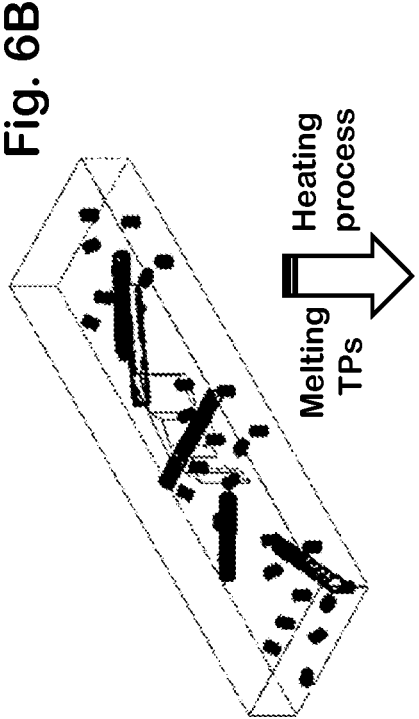
Fig. 6A
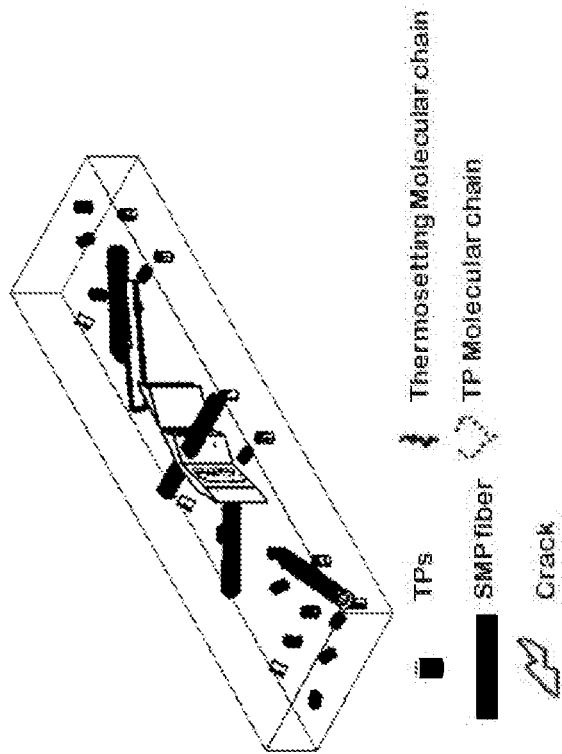
Fig. 6B
Fig. 6C
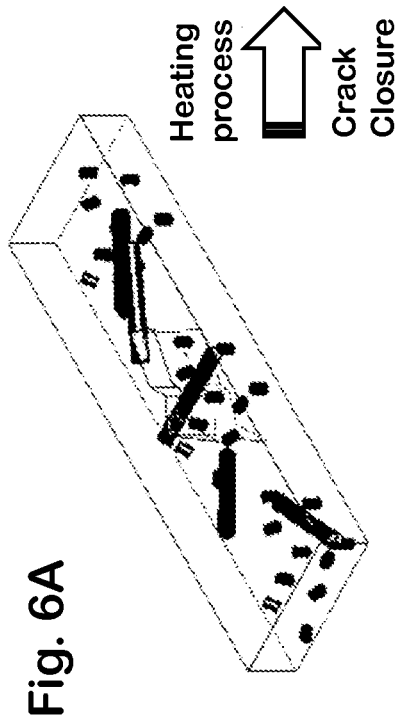
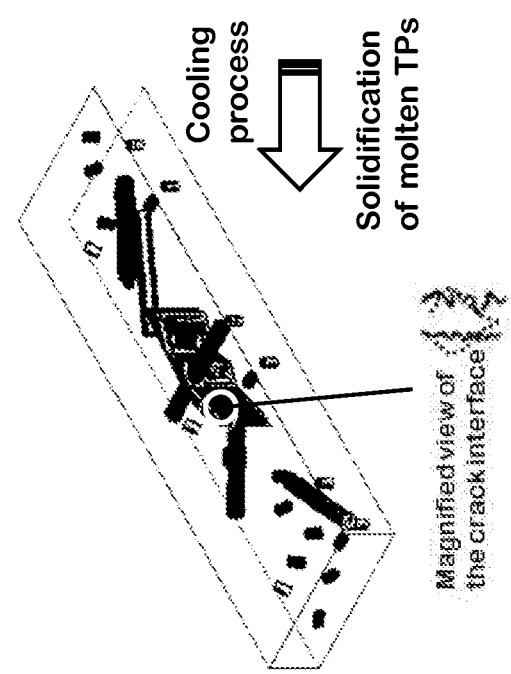
Fig. 6D

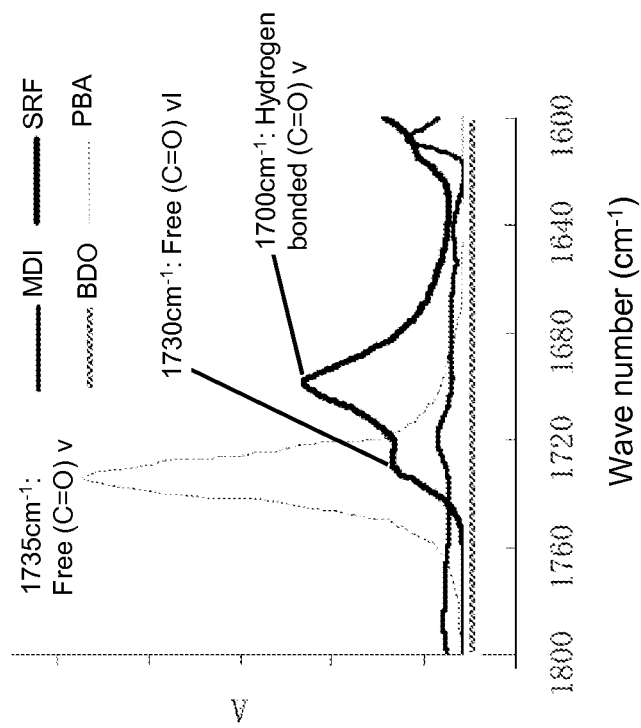
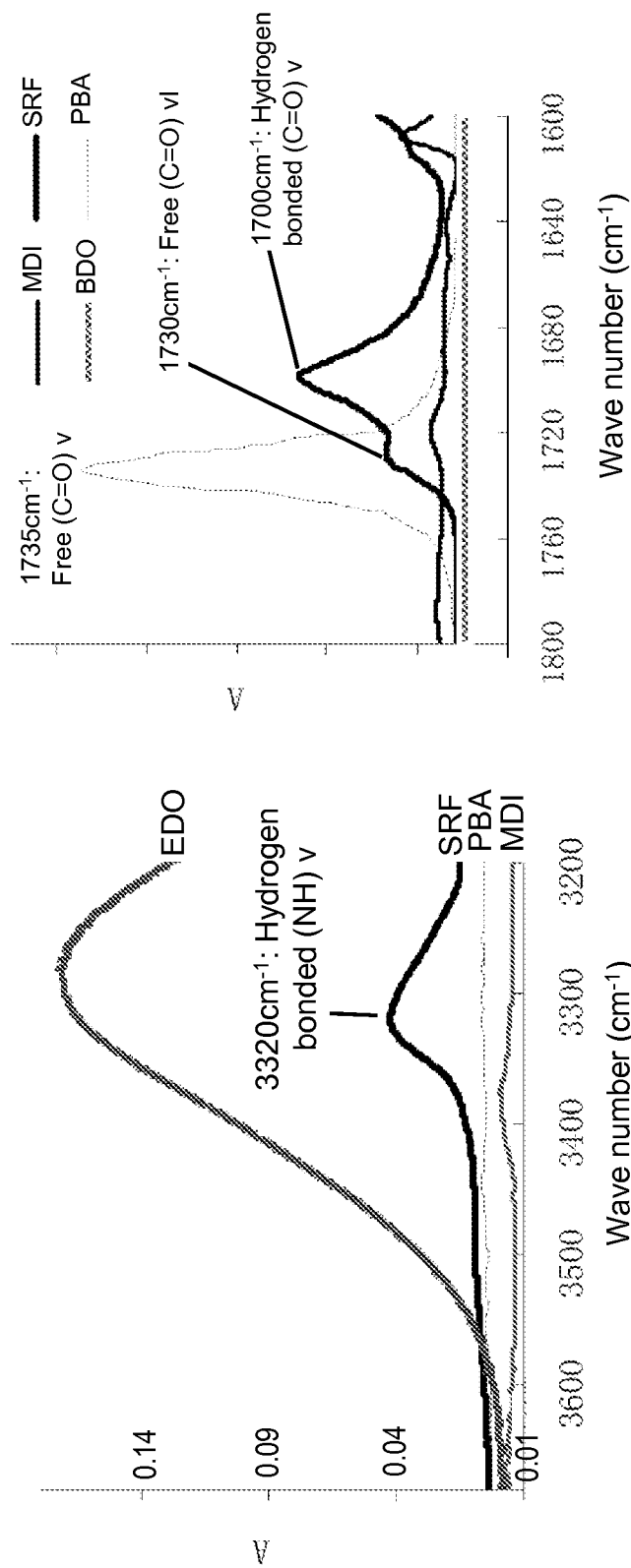
Fig. 10B
Fig. 10A

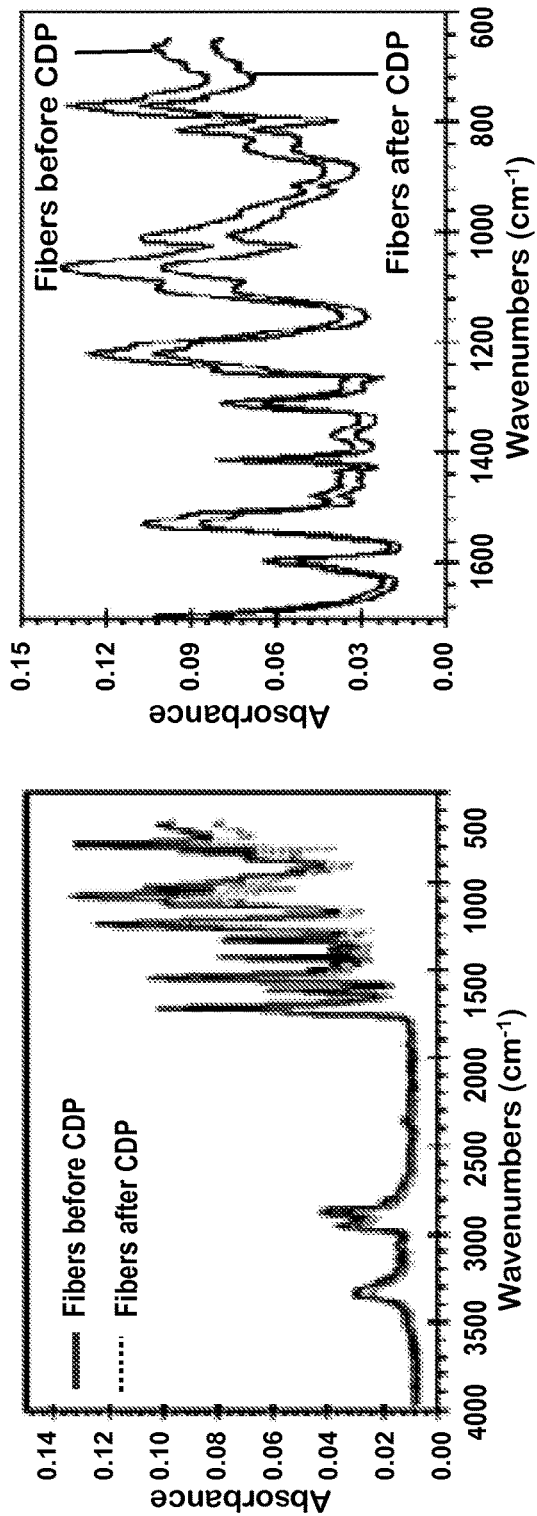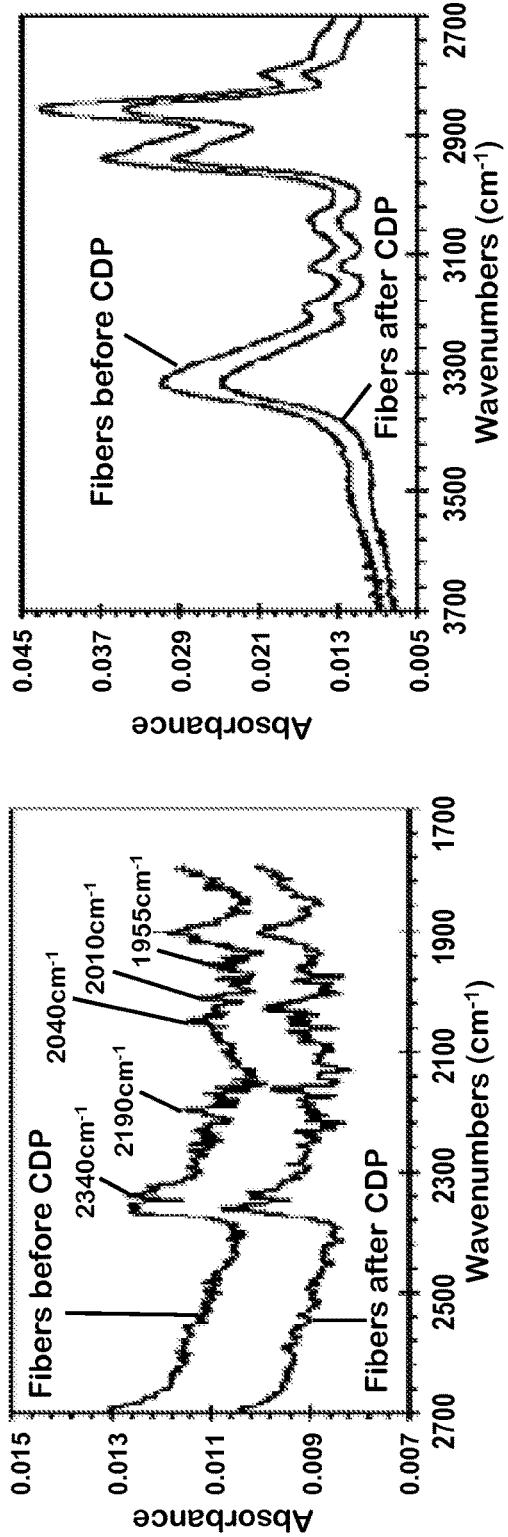
Fig. 28A
Fig. 28B
Fig. 28C
Fig. 28D

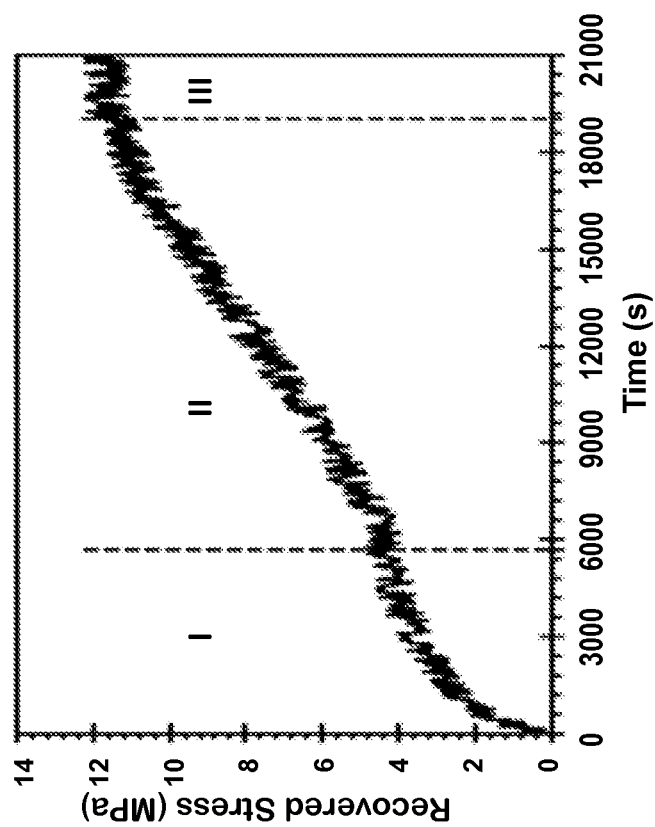
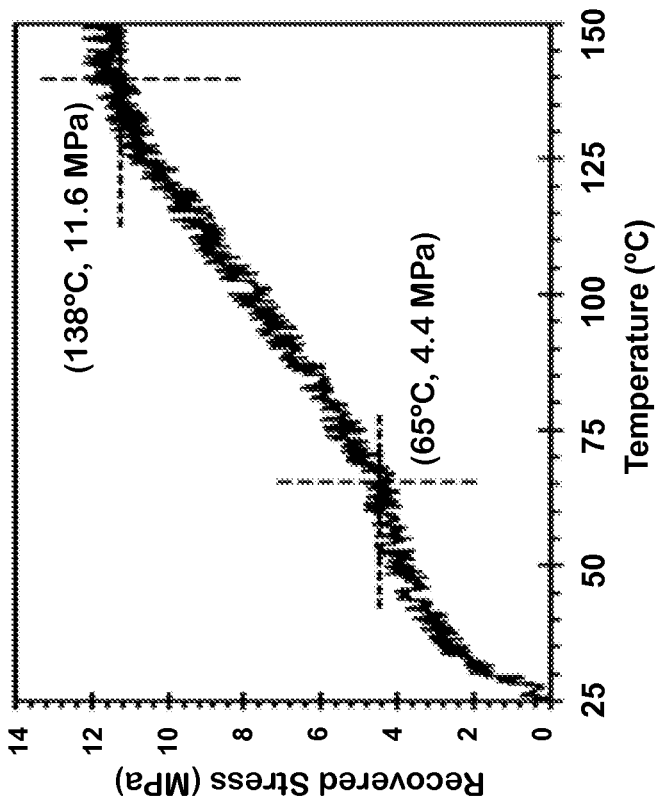
Fig. 29A
Fig. 29B

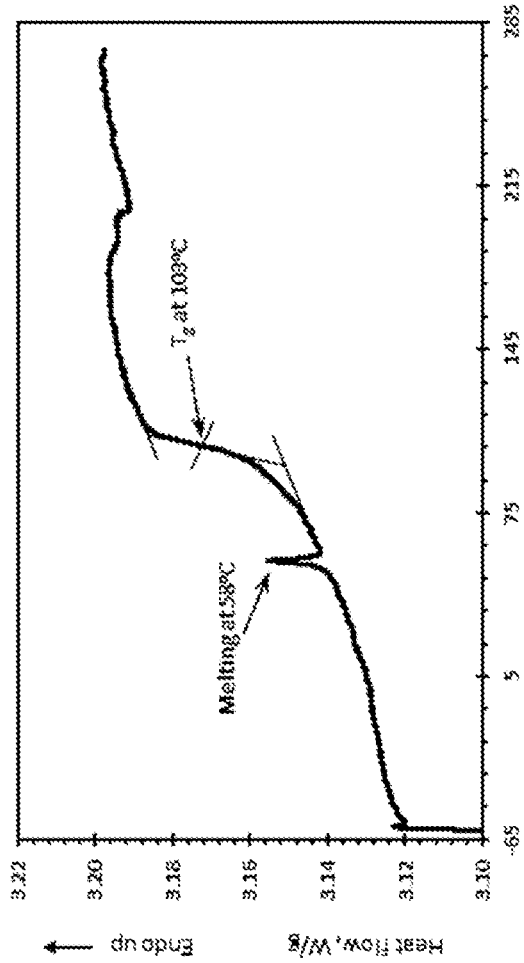
Fig. 39A
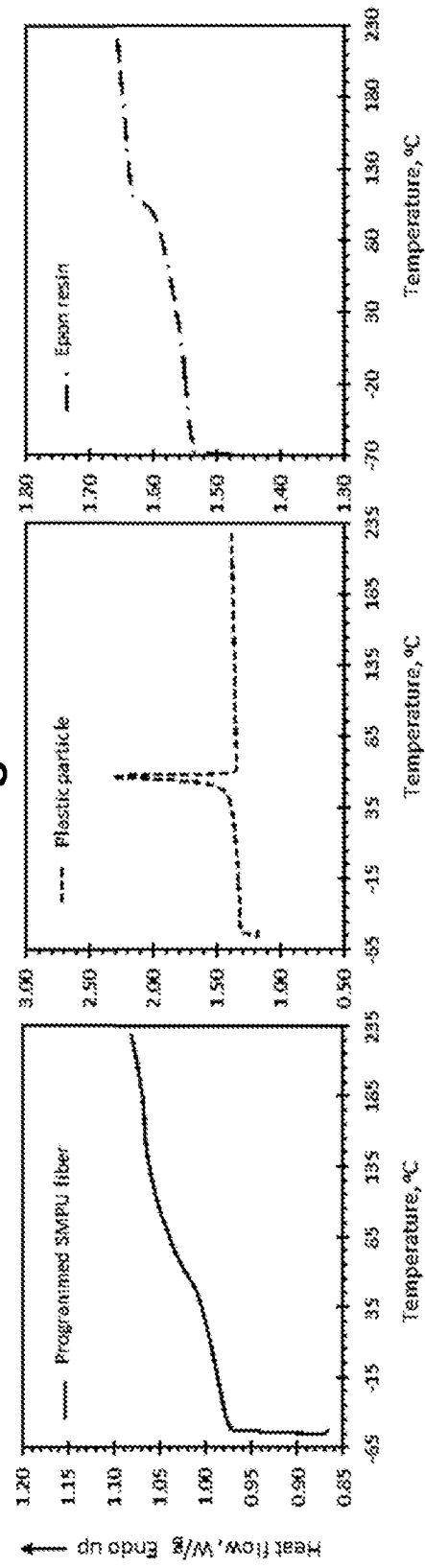
Fig. 39B
Fig. 39C
Fig. 39D

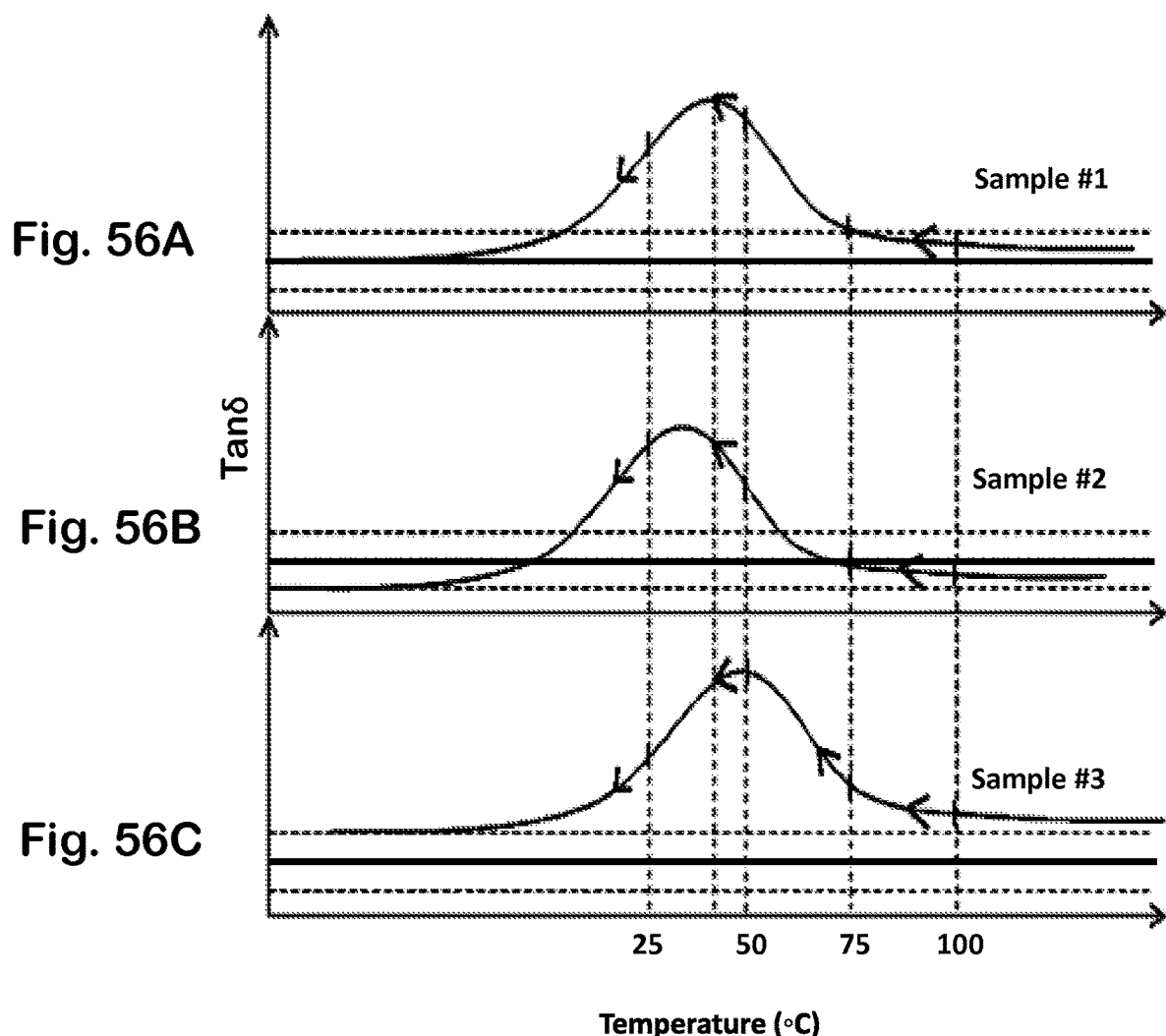

SELF-HEALING COMPOSITE OF THERMOSET POLYMER AND PROGRAMMED SUPER CONTRACTION FIBERS

CROSS-REFERENCE TO RELATED APPLICATIONS

This application is a divisional of U. S. Nonprovisional application Ser. No. 15/213,926, filed Jul. 19, 2016, now U.S. Pat. No. 10,239,788; which is a divisional of U. S. Nonprovisional application Ser. No. 14/248,711, filed 9 Apr. 2014, now U.S. Pat. No. 9,428,647; which claims priority from U. S. Provisional Application Ser. No. 61/810,015, filed 9 Apr. 2013, entitled "Self-Healing Composite of Thermoset Polymer and Programmed Super-Contraction Fibers". This application is related to U. S. Provisional Application Ser. No. 61/483,196, filed 6 May 2011 which is entitled "Biomimetic Self-Healing Composite"; application U. S. Ser. No. 13/464,461, filed 4 May 2012, entitled "Compression Programming of Shape Memory Polymers Below the Glass Transition Temperature"; U. S. Ser. No. 13/464,062, filed 4 May 2012, entitled "Thermosetting Shape Memory Polymers with Ability to Perform Repeated Molecular Scale Healing"; U. S. Provisional Ser. No. 61/723,844, filed 8 Nov. 2012; PCT application number PCT/US2013/068895, filed 7 Nov. 2013 entitled "Sandwich Panel with a ductile Hybrid Core Comprising Tubular Reinforcements"; and to U. S. Provisional Application Ser. No. 61/897,437, filed 30 Oct. 2013 which is entitled "Liquid Sealant with Thermally Adaptive Properties". The contents of each of the foregoing are fully incorporated by reference herein.

All documents, including patents or published applications, whether cited or referenced for relatedness in this application are fully incorporated by reference herein.

STATEMENT REGARDING FEDERALLY SPONSORED RESEARCH OR DEVELOPMENT

This invention was made with government support under grant number CMMI 0900064 awarded by the National Science Foundation, grant number NNX11AM17A awarded by NASA, and grant number CMMI 1333997 awarded by the National Science Foundation. The Government has certain rights in the invention.

BACKGROUND OF THE INVENTION

Field of the Invention

This invention relates to polymeric materials, more particularly it relates to compositions with three aspects: thermoset polymer, shape memory polymer (SMP) capable of shrinking at temperatures above the SMP's glass transition temperature, and thermoplastic polymer or other means for healing at a molecular level; which compositions generally have repeatable, self-healing properties without the need for external shape confinement.

Description of Related Art

Polymers are large molecules (macromolecules) composed of repeating structural units. These sub-units are typically connected by covalent chemical bonds. The term polymer encompasses a large class of compounds comprising both natural and synthetic materials with a wide variety of properties. Because of the extraordinary range of properties of polymeric materials, they play essential and ubiquitous roles in everyday life. These roles range from familiar synthetic plastics and elastomers to natural biopolymers such as nucleic acids and proteins that are essential for life.

A plastic material is any of a wide range of synthetic or semi-synthetic organic solids that are moldable. Plastics are typically organic polymers of high molecular mass, but they often contain other substances. There are two types of plastics: thermoplastic polymers and thermosetting polymers.

Thermoplastics are the plastics that do not undergo chemical change in their composition when heated and can be molded again and again. Examples include polyethylene, polypropylene, polystyrene, polyvinyl chloride, and polytetrafluoroethylene (PTFE). Common thermoplastics range from 20,000 to 500,000 amu.

In contrast, thermosets are assumed to have large molecular weight. These chains are made up of many repeating molecular units, known as repeat units, derived from monomers; each polymer chain will have several thousand repeating units. Thermosets can take shape once; after they have solidified, they stay solid. In the thermosetting process, a chemical reaction occurs that is irreversible. According to an IUPAC-recommended definition, a thermosetting polymer is a prepolymer in a soft solid or viscous state that changes irreversibly into an infusible, insoluble polymer network by curing. The cure may be done through heat (generally above 200° C. (392° F.)), through a chemical reaction (two-part epoxy, for example), or irradiation such as electron beam processing. A cured thermosetting polymer is often called a thermoset.

Thermoset materials are usually liquid or malleable prior to curing and designed to be molded into their final form, or used as adhesives. Others are solids like that of the molding compound used in semiconductors and integrated circuits (IC). In contrast to thermoplastic polymers, once hardened a thermoset resin cannot be reheated and melted back to a liquid form.

The curing process transforms the thermosetting resin into a plastic or rubber by a cross-linking process. Energy and/or catalysts are added that cause the molecular chains to react at chemically active sites (unsaturated or epoxy sites, for example), linking into a rigid, 3-D structure. The cross-linking process forms a molecule with a larger molecular weight, resulting in a material with a heightened melting point. During the curing reaction, the molecular weight has increased to a point so that the melting point is higher than the surrounding ambient temperature, the material forms into a solid material.

However, uncontrolled heating of the material results in reaching the decomposition temperature before the melting point is obtained. Thermosets never melt! Therefore, a thermoset material cannot be melted and re-shaped after it is cured. A consequence of this is that thermosets generally cannot be recycled, except as filler material.

Thermoset materials are generally stronger than thermoplastic materials due to their three dimensional network of bonds (cross-linking). Thermosets are also better suited to high-temperature applications (up to their decomposition temperature). However, they are more brittle. Because of their brittleness, thermoset is vulnerable to high strain rate loading such as impact damage. Since a lot of lightweight structures use fiber reinforced thermoset polymer composites, impact damage, if not healed properly and timely, may lead to catastrophic structural failure.

A thermoplastic material, also known as a thermosoftening plastic, is a polymer that turns to a viscous liquid when heated and freezes to a rigid state when cooled sufficiently. Most thermoplastics are high-molecular-weight polymers whose chains associate through weak Van der Waals forces (polyethylene); stronger dipole-dipole interactions and hydrogen bonding (nylon); or even stacking of aromatic rings (polystyrene). As noted herein, thermoplastic polymers differ from thermosetting polymers (e.g. phenolics, epoxies) in that they can be remelted and remolded.

Thermoplastics can go through melting/freezing cycles repeatedly and the fact that they can be reshaped upon reheating gives them their name. However, this very characteristic of reshapability also limits the applicability of thermoplastics for many industrial applications, because a thermoplastic material will begin to change shape upon being heated above its $T_g$ and $T_m$.

Initiation of cracks and other types of damage on a microscopic level has been shown to change thermal, electrical, and acoustical properties, and eventually lead to whole scale failure of the material. From a macromolecular perspective, stress induced damage at the molecular level leads to larger scale damage called microcracks. A microcrack is formed where neighboring polymer chains have been damaged in close proximity, ultimately leading to the weakening of the polymer as a whole. In view of the diverse use of polymers in industry, it is self-evident that failure of safety-critical polymer components such as brittle thermoset polymers is a serious problem; failure of these materials can lead to serious even catastrophic accidents.

For thermoset polymers that have developed cracks, unfortunately there are only two fundamental choices, attempt to repair the crack or entirely remove and replace the component that contains the damaged material. Usually, cracks are mended by hand, which is difficult because cracks are often hard to detect. A polymeric material that can intrinsically correct damage caused by normal usage could lower production costs through longer part lifetime, reduction of inefficiency over time caused by degradation of the part, as well as prevent costs incurred by material failure.

In an attempt to heal damage, restore mechanical properties and extend the service life of polymers, the concept of crack healing in polymeric materials has been widely investigated [Jud K, Kausch H H. *Polymer Bulletin* 1979; 1:697-707; Keller M W, White S R, Sottos N R. *Polymer* 2008; 49: 3136-3145; Prager S, Tirrell M. *J Chem Phys* 1981; 75:5194-8; De Gennes P G. *J Chem Phys* 1971; 55:572-9; Doi M, Edwards S F. *J Chem Soc: Faradays Trans* 2 1978; 74:1789-1801; Kim Y H, Wool R P. *Macromolecules* 1983; 16:1115-1120; Kausch H H, Jud K. *Rubber Process Appl* 1982; 2:265-268; Wool P R, O'Connor K M. *Polym Eng Sci* 1981; 21:970-977; McGarel O J, Wool R P. *J Polym Sci Part B—Polym Phys* 1987; 25: 2541-2560; Yang F, Pitchumani R. *Macromolecules* 2002; 35:3213-3224; Chung C M, Roh Y S, Cho S Y, Kim J G. *Chem Mater* 2004; 16:3982-3984; Yuan Y C, Rong M Z, Zhang M Q, Yang G C. *Polymer* 2009; 50:5771-5781; Takeda K, Tanahashi M, Unno H. *Sci Tech Adv Mater* 2003; 4:435-444; Kalista S J, Ward T C. *J R Soc Interface* 2007; 4:405-411; Chipara M, Wooley K. *Mater Res Soc Symp* 2005; 851:127-132].

In thermoplastic polymers, the most widely studied and reported mechanism for self healing is the molecular interdiffusion mechanism. It has been reported [Jud K, Kausch H H. *Polymer Bulletin* 1979; 1:697-707] that when two pieces of the same polymer are brought into contact at a temperature above its glass transition temperature ($T_g$), the interface gradually disappears and the mechanical strength at the polymer-polymer interface increases as the crack heals due to molecular diffusion across the interface. To better explain the process of crack healing by this mechanism, various models have been proposed [Keller M W, White S R, Sottos N R. *Polymer* 2008; 49: 3136-3145; Prager S, Tirrell M. *J Chem Phys* 1981; 75:5194-8; De Gennes P G. *J Chem Phys* 1971; 55:572-9; Wool R P, O'Connor K M. *J Appl Phys* 1981; 52:5953-5963]. In particular, Wool and O'Connor [Wool R P, O'Connor K M. *J Appl Phys* 1981; 52:5953-5963] suggested a five-stage model to explain the crack healing process in terms of surface rearrangement, surface approaching, wetting, diffusion and randomization. Kim and Wool [Kim Y H, Wool R P. *Macromolecules* 1983; 16:1115-1120] also presented a microscopic theory for the diffusion and randomization stages. In another study [Kausch H H, Jud K. *Rubber Process Appl* 1982; 2:265-268], it was observed that the development of the mechanical strength during the crack healing process of polymers is related to interdiffusion of the molecular chains and subsequent formation of molecular entanglements. Other reported healing mechanisms in thermoplastic polymers include photo induced healing, recombination of chain ends, self healing via reversible bond formation, and with nanoparticles [Wu D Y, Meure S, Solomon D. *Prog Polym Sci* 2008; 33:479-522].

In thermoset polymers, self-healing mechanisms by the incorporation of external healing agents such as liquid healing agent (monomer) encased in hollow fibers [Kirkby E L, Michaud V J, Manson J A E, Sottos N R, White S R. Polymer 2009; 50: 5533-5538; Blaiszik B J, Caruso M M, Mcllroy D A, Moore J S, White S R, Sottos N R. Polymer 2009; 50: 990-997], micro-capsules [Brown E N, White S R, Sottos N R. Compos Sci Technol 2005; 65:2474-2480; Brown E N, White S R, Sottos N R. J Mater Sci 2006; 41:6266-6273], and solid healing agent (thermoplastic particles) dispersed in the thermoset matrix [Wu D Y, Meure S, Solomon D. Prog Polym Sci 2008; 33:479-522; Zako M, Takano N. J Intell Mater Syst Struct 1999; 10:836-841], have; been proposed and tested. However, the different physical and behavioral characteristics of thermoset SMPs relative to standard thermosets make the applicability or suitability of a component on one type of the thermosets of uncertain relevance to the any. For example, with regular thermosets suitability of an additional component depends on the chemical compatibility, viscosity of the molten thermoplastic, and the concentration gradient, whereas for thermoset SMPs, suitability of an additional component also depends on the diffusion under the recovery force.

Self-healing of polymer components has been a much-explored but essentially unmet need. Some polymers by themselves possess the self-healing capability such as thermally reversible crosslinked polymers [Chen X, Wudl F, Mal A K, Shen H, Nutt S R. Macromolecules 2003; 36:1802-1807] and ionomers [Varley R J, Shen S, van der Zwaag S. Polymer 2010; 51: 679-686]. Although these systems are very successful in healing micro-length scale damage, they face tremendous challenge when they are used to repair large, macroscopic, structural-length scale damage, which are visible by the naked eye [Li G and Nettles D. Polymer 2010; 51:755-762; Li G and Uppu N. Comp Sci Tech 2010; 70: 1419-1427; Nji J and Li G. Smart Mater Struct 2010; 19: paper No. 035007]. Prior to the present invention, the state-of-the-art for self-repair of thermosetting polymers and their composites includes: (1) use of hollow fibers/microcapsules to release polymeric resin when ruptured, and heal the crack through in-situ polymerization triggered by the catalyst contained in the polymer matrix; (2) use of thermoplastic particles to flow into the crack when heated up and glue the crack when cooled down; and (3) use of thermo-reversible covalent bonds via the retro Diels-Alder (DA) reaction. Despite the significant advancements made using a bio-mimetic approach, there is still a long way to go before even the simplest biological healing mechanism can be replicated within these synthetic materials. One immediate difference between biological and these synthetic healing mechanisms is that biological systems involve multiple-step healing solutions. For example, mammalian healing processes rely on fast forming patches to seal and protect damaged skin before the slow regeneration of the final repair tissue.

Several self-healing schemes have been reported in the literature primarily for healing microcracks, including incorporation of external healing agents such as liquid healing agent in microcapsules, hollow fibers, and microvascular networks, and solid healing agent such as embedded thermoplastic particles. Some polymers by themselves possess self-healing capabilities, including ionomers, which consist of over 15% of ionic groups, and a highly cross-linked polymer, which is synthesized via the Diels-Alder (DA) cycloaddition of furan and maleimide moieties, and the thermal reversibility of the chemical bonds is accomplished via the retro-DA reaction. A combination of microcapsule and shape memory alloy (SMA) wire has also been studied. Because damage is usually in structural-length scale, the challenge is how to heal macrocracks. However, the existing systems are unable to very effectively heal macroscopic damage. For instance, in order to heal macrocracks, a large amount of healing agent is needed. However, incorporation of a large amount of healing agent will significantly alter the physical/mechanical properties of the host structure. Also, large capsules/thick hollow fibers themselves may become potential defects when the encased healing agent is released. Therefore, the grand challenge facing the self-healing community is how to heal structural-length scale damage such as impact damage autonomously, repeatedly, efficiently, timely, and at the molecular-length scale.

One further problem with the existing self-healing systems is the presence of voids after the healing process. For example, a polymeric material will contain microcapsules of monomer throughout, and similarly an initiator/catalyst would be uniformly present throughout the material. When a crack occurs, the monomer-bearing capsules at the site of the crack would rupture, disgorge monomer and polymerization would result because of the presence of the initiator. Prior to polymerization, the capillary forces at the crack face would encourage even flow of monomer, resulting in an evenly-healed crack. However, after the crack has healed the material now has voids where the monomer capsules used to be. These voids can have an adverse effect upon the material's mechanical properties. Moreover, this self-healing process is available for only one time in the area of the healed crack.

Recently, shape memory polymer (SMP) has emerged as new type of smart material. Various types of applications have been studied, particularly in lightweight structure applications. Tey et. al [Tey S J, Huang W M and Sokolwski W M 2001. Influence of long term storage in cold hibernation on strain recovery and recovery stress of polyurethane shape memory polymer foam. Smart Materials and Structures, 10(2): 321-25] studied the shape memory functionality of a polyurethane (PU) based SMP foam by performing the conventional thermomechanical programming cycle and recommended those PU based foams be used in foldable space vehicles and quick molding devices. On the other hand, Huang et. al [Huang W M, Lee C W and Teo H P 2006. Thermomechanical behavior of a polyurethane shape memory polymer foam. Journal of Intelligent Material Systems and Structure, 17: 753-60] studied the influence of cold hibernation on the shape memory properties of PU based SMP foams. They concluded that the cold hibernation process did not affect the shape memory properties in spite of keeping them in a compacted state for a prolonged period.

In the context of thermoset SMPs, the different physical and behavioral characteristics of thermoset SMPs relative to standard thermosets make the applicability or suitability of a component of one type of the thermosets of uncertain relevance to the any. For example, with regular thermosets suitability of an additional component depends on the chemical compatibility, viscosity of the molten thermoplastic, and the concentration gradient, whereas for thermoset SMPs, suitability of an additional component also depends on the ability for diffusion under the recovery force.

Previously, it was shown that the stress-controlled programming and confined shape recovery of a SMP based syntactic foam was able to close impact damage repeatedly, efficiently, and almost autonomously (the only human intervention was by heating) [Li G and John M. Composites Science and Technology 2008; 68: 3337-3343]. In this previous study two key aspects were found with compression programmed shape memory effect to self-close an area of damage: 1) reduction of structure volume during programming and 2) the external confinement of the structure during shape recovery.

These two aspects were found to be important in order to repair damage created in the programmed structure that had a reduced volume due to its shape memory functionality. In order to achieve repair, expansion in volume must be resisted by external confinement, whereupon the material will be pushed towards internal open space such as crack, achieving the self-closing purposes. In these earlier schemes, therefore, compression programming was required.

It is noted that, while it seems that tension programming can also repair internal cracks during free shape recovery (the specimen becomes shorter and thus closes the crack), the free recovery changes the geometry of the structure or compromises the dimensional stability as the structure recovers to its original shape. If confined recovery is used after tension programming (i.e., if the dimensional stability is maintained), the internal crack cannot be closed because the material is not allowed to be pushed towards the internal open space (i.e., the crack). Therefore, compression programming is a better choice, as tension programming may not work. Although tension programming "drawing" of SMPs was also known, tension programming was at odds with the earlier SMP-based healing approaches because any shrinkage of SMP material would exacerbate wounds/damage rather than serving to close any defect, particularly where there was external confinement. It was noted that the repeatability in self-closing (up to 7 cycles) comes from the fact that each round of confined shape recovery served dual purposes: one to self-close internal cracks and the other to complete a new round of compression programming. [Li G and John M. Composites Science and Technology 2008; 68: 3337-3343]

This combination of closing and reprogramming in Li and John is achieved because the confined shape recovery came about by heating the foam above the $T_g$, applying a certain compressive stress to the foam due to confinement, and cooling down below $T_g$ while maintaining the prestrain, which is typical for strain-controlled programming. In other words, strain-controlled compression programming was coupled with confined shape recovery. Therefore, although it may seem as if only one programming was conducted at the very beginning of the repeated impact/closing cycles, each shape recovery actually had one prior programming to supply the energy. The only difference was that the subsequent programmings were automatically performed by being coupled with each confined shape recovery. Therefore, in this disclosure of confined shape recovery, one "nominal" programming led to several cycles of shape recovery. [Li G and John M. Composites Science and Technology 2008; 68: 3337-3343] Of note, the method of Li and John although referred to as "healing" was, as discussed in greater detail below, only a closing of the polymer defect; no molecular scale healing was achieved. The approach of Li and John had disadvantages, it lacked the ability to regain a substantial amount of the original integrity as the two sides of a crack were brought back into contact with each other, but were not reconnected in a "healing" manner one to the other. Although applying external confinement can be a challenge, it may be coupled with architectural design of the composite structures such as 3-D woven fabric reinforced composites [Nji J and Li G. Smart Mater Struct 2010; 19: paper No. 035007] or grid stiffened composites [M. John and G. Li. Self-Healing of Sandwich Structures with Grid Stiffened Shape Memory Polymer Syntactic Foam Core. Smart Materials and Structures, Vol. 19, No. 7, paper number 075013 (12 pages), (July, 2010)], where the important external confinement inherently is applied by the structural cells. However, the unmet need and ongoing challenge is that most of the polymer composite structures used today are conventional thermosetting polymers, which do not have shape memory capability. Therefore, prior to the present invention a challenge has been how to imbue such "non-smart" load-bearing polymers with self-healing capability. Moreover, such existing thermoset composites generally do not utilize particular structural elements that imbue them with "external confinement" properties.

Thus, not merely the healing of polymers, but the ability to self-heal structural damage has been a tremendous interest in the scientific community. With polymer repair, an unmet need exists to effectively repair the internal damage autonomously, repeatedly, efficiently, and at molecular-length scale, such as is possible with biological repair processes. Thus, prior to the disclosure of the present invention, a need in the art has existed for a self-closing mechanism that not only closes macroscopic defects, but which also allows for molecular-scale healing of defects without the need for external shape confinement; in particular there is a need for such healing that can be performed on a repeated basis at or near the site of prior damage.

Fiber reinforced polymer (FRP) composite materials have been widely used in various engineering sectors and commercial goods. These include, communication devices, energy storage and transportation, and in commercial goods such as bicycles, sport equipment, etc. These uses derive primarily due to their high specific strength/stiffness and corrosion resistance of such composites.

For example, fiber reinforced polymer (FRP) composite materials have been widely used, including in communication devices (satellites, gyroscopes, etc), energy storage and transportation (such as pipelines, pressure vessels, offshore oil drilling platforms,); and in transportation vehicles (such as aircraft, boats, ships, trains, automobiles, bicycles, etc.); infrastructure (such as in bridges/overpasses in deck panels, concrete bridge columns, girders, and as repair panels); buildings (e.g., cladding for roofs and walls, decks and railings, air flow duct work and ventilation equipment, water handling systems, subterranean uses, seawalls); harbor equipment (e.g., pilings, piers, seawalls and floats); military equipment (such as tanks, military vehicles, armor, etc.); and commercial goods such as safety helmets (sports and transportation), etc. These uses come about primarily due to the high specific strength/stiffness and corrosion resistance of composites.

In addition, ropes and cables made of metal or synthetic fibers have been used as safety ropes (e.g., for mountain climbing, high risk construction, high risk repairs, window washing); such cables are also used as support in in cable-stayed bridges. Unfortunately, the current ropes/cables made of polymeric fibers are poor at damping vibration; furthermore, steel wires are used in cable stayed bridge are very heavy.

Although FRPs are typically lighter than metals, owing to the lightweight they are very easily excited (e.g., are subject to vibrations). Without sufficient damping this leads to resonance and structural failure at loads well below ideal design levels. Vibration-induced structural failure is not uncommon. For example, collapse of buildings and bridges during earthquake or hurricane is typical examples of vibration-induced catastrophic structural failure.

For the majority of structural polymers such as epoxy, they are very brittle with very low damping properties. Viscoelastic materials have been widely used for vibration damping. Although adding viscoelastic materials such as rubber particles may improve damping, unfortunately a consequence is that the viscoelastic particles serve as stress concentration centers and result in reduced structural strength and impaired usefulness. Active materials such as shape memory alloy (SMA) have also been used to control vibration. Although SMA is very effective in damping vibration, it is generally both heavy and expensive, and its stiffness does not match that of polymer matrix, and they tend not to be compatible with polymers, limiting SMA application in vibration control.

Moreover, there has been concern over the use and safety of composite structures, such as laminated or sandwich composites, if they become damaged, e.g., if subjected to impact forces. The root cause for these types of damage is the brittleness of polymer matrix and synthetic fibers such as glass fiber or carbon fiber. Even a low velocity impact on laminated or sandwich composites can cause various types of damage such as delamination, face sheet/core debonding, fiber breakage, matrix cracking, and fiber-matrix interfacial debonding. These types of damage are very dangerous because they often cannot be detected visually and may lead to structural failure at loads well below original design levels. Low velocity impact is not uncommon. For example, a drop of a tool during routine maintenance or inspection characterizes a low velocity impact event.

Generally, in fiber reinforced polymer composites, fiber is responsible for carrying the applied load, while polymer matrix is responsible for bonding fiber together, transferring load to the fiber, and protecting the fiber from damage. Consequently, in traditional fiber reinforced polymer composites if fiber is fractured, the load carrying capacity of the composite will be significantly reduced or lost. Unfortunately, fiber fracture is a common failure mode in fiber reinforced polymer composite materials when they are subjected to impact.

Previously, several ways have been explored to enhance the impact tolerance of composites, such as grid stiffened composites and 3-D woven fabric reinforced composites. However, the fundamental reason for fiber fracture has not been overcome and remains an unmet need: the reason is that almost all synthetic fibers such as glass fiber and carbon fiber have high strength but low toughness. As a result, these fibers are good in carrying static load, but inferior in impact tolerance as they can decompensate or rupture when impacted.

BRIEF SUMMARY OF THE INVENTION

Disclosed herein is a polymeric composition which can achieve a two-step healing process which mimics the biological healing process of human skin, e.g., an initial closing of a wound by bleeding and clotting (or by suturing) after which a step of healing where new tissue cells gradually grow and heal a wound. This healing approach is referred to as a close-then-heal (CTH) process; in such a two-step process (closing and healing) in accordance with the invention, the shape recovery ability of pre-embedded shape memory polymer fibers ("SMPFs" or "SMP fibers") is used to narrow and/or close the macroscopic crack (Step 1), and then pre-embedded molten thermoplastic particles are used to heal on a molecular scale (Step 2). In accordance with the present invention the SMPF in a composition were subject to tension programming, and in certain embodiments the tension programming was by cold drawing.

Disclosed herein is a SMP fiber based self-healing system whereby shrinkage of tension-programmed SMP fibers can close damage such as cracks (or substantially narrow cracks or other damage, e.g., macroscopic closure) in a conventional thermosetting polymer matrix and then embedded thermoplastic particles melt for molecular scale healing. In preferred embodiments: (1) strain hardening/programming of SMP fibers by cold-drawing programming is used; (2) programming is to a level such that there is sufficient recovery force in the SMP fibers to close cracks in conventional thermosetting polymer matrix; (3) certain chemical compatibility between the SMP fibers and conventional thermosetting polymer matrix and between thermoplastic particles and conventional thermosetting polymer matrix; in essence this compatibility is that these materials do not repel one another and that they are able to be in close physical proximity one with the other.

Embodiments of methods and compositions in accordance with the invention rely upon a characteristic of shape memory polymers in which their length is initially increased through tension programming or training, e.g., either the more traditional heat-based or cold drawing. Following programming, when subsequently stimulated by heating above its glass transition temperature, the programmed SMP fiber remembers its original shape and shortens when heated, bringing the fractured polymer matrix to closure. Additional heating to a level above the melting point of the thermoplastic particles allows the molten thermoplastic molecules to be sucked by capillary forces into the now narrowed/closed defect; these molten molecules are also driven into the fractured conventional thermosetting polymer matrix by concentration gradient diffusion and the shape memory-based recovery force. Upon cooling, the thermoplastic hardens thereby "gluing" the crack at a molecular scale (step 2, the healing step). This sequence completes one autonomous and molecular damage-healing cycle.

Moreover, because the tension programming of SMPs allows for substantial stretching of the material, relatively large damage areas or wound can be repaired; moreover where the damage is not so large and there is residual energy retained in the tension-programmed material multiple rounds of injury then healing can occur, Together with the fact that the thermoplastic particles can also be repeatedly melted and hardened, the damage-then-healing cycle is repeatable. In addition, because the amount of thermoplastic particles used is very small (e.g., 3%), and each particle just spreads in the vicinity during melting and healing, there is no cavity/void left behind as those did by microcapsules or hollow fiber schemes.

Therefore, structural-length scale damage was shown to be healed repeatedly (both macroscopically and molecularly) by a small amount of SMP fibers and thermoplastic particles in a thermoset composition. Of note, the present invention is not based on new polymerization, such as occurs when monomers are released from fractured or melted containers within a matrix. It is a physical process.

In a two-step close-then-heal (CTH) process of the invention, a shape memory polymer that possesses the ability to impose a shape recovery force by shrinking is a key aspect. In certain embodiments, programming or training to increase the length of the shape memory polymer (SMP) fiber is used. Such programming may occur by the traditional method of tension programming upon use of applied thermal energy or isothermal programming which takes place without the need to raise the SMP's temperature above its $T_g$. In the literature, programming a shape for SMPs required an initial heating above the glass transition temperature (Tg), applying prestress or prestrain, subsequent cooling below Tg while holding the stress or strain constant, and removal of the applied load. This process is a very time-consuming, low-efficiency, and cost-ineffective process.

In certain embodiments the invention comprises a composition which comprises a thermoset material, a shape memory polymer capable of shrinking upon exposure to additional energy, and, means for self healing dispersed throughout said composition. The self-healing may be termed autologous or integral self-healing ability, in that such healing is obtainable without additional materials, and only thermal energy need be added to accomplish the healing. It is to be understood that the energy supplied need not be thermal energy, so long as a change elicited by such energy is a thermal one, e.g. without limitation, microwave or sonic energy may be used. The means for self-healing can comprise thermoplastic polymer; in addition to thermoplastic particles, milled thermoplastic fibers can also be used; such thermoplastic fibers may serve two purposes (1) further reinforcing the composition and (2) provide molecular healing per CTH process. Preferably, the melting temperature of the thermoplastic polymer is lower than the decomposition temperature of the thermoset matrix. The shape memory polymer can be programmed to a certain length such that, when it shrinks upon heating, it is able to close a wide-opened crack. The tension programming can be by either cold drawing at a temperature below the glass transition temperature of the SMP fiber, or programmed at a temperature above the glass transition temperature of the shape memory polymer fiber. The shape memory polymer can be, e.g., a polyurethane. In certain embodiments, the thermoplastic polymer is less than 40%, 25% or less, 20% or less, 15% or less, 10% or less, 9% or less, 8% or less, 7% or less, 6% or less, 5% or less, 4% or less, 3% or less, or, 2% or less of the volume of the composition. In certain embodiments, the fiber volume fraction is determined in accordance with the Examples herein, e.g., in accordance with Li et al "Effect of Strain Hardening of Shape Memory Polymer Fibers on Healing Efficiency of Thermosetting Polymer Composites" Polymer 54 (2013) 920-928.

In certain embodiments, a method for closing and healing a damage/defect//crack/wound in a composite of the invention, comprises use of a composite comprising a shape memory polymer capable of shrinking and thereby imposing a shape recovery force, said method comprising steps of:

a) heating an area comprising the damage or wound to a temperature above the glass transition temperature of the shape memory polymer (SMP) fiber, whereby the SMP fiber contracts and achieves some closure of the wound;

b) heating an area comprising the damage/wound to a temperature above the melting temperature of the thermoplastic material, and further increasing to the "bonding temperature" (approximately 10-20° C. higher than the melting temperature), whereby molten thermoplastic material flows into the narrowed wound and the thermoplastic molecules diffuse into the fractured conventional thermoset polymer matrix and establish molecular entanglement; and, c) cooling the structure below the melting temperature of the thermoplastic, whereby the thermoplastic hardens and heals the wound at a molecular scale. The heating steps can take place concurrently. Preferably heating is held below the decomposition temperature of the thermoset matrix. The heating may be above the bonding temperature of the thermoplastic material.

In Example 5, shape-memory polyurethane (SMPU) fibers (also referred to herein as SMP fibers) were strain hardened by cold-drawing programming (CDP) process. Structural relaxation, which determines shape memory capability of the SMP fibers, is quantified by conformational entropy change. Based on the entanglement tube theory and reptation theory, the entropic force is derived as a "bridge" to link the stress relaxation and structural relaxation, whereby structural relaxation can be evaluated by stress relaxation. It was found that the cold-drawn programmed SMPU fibers would still have good crack-closing capability after 13 years of hibernation in polymer matrix composite.

In Example 6 a particulate composite dispersed with thermoplastic particles and strain hardened short shape memory polymer fibers was prepared and evaluated for its ability to repeatedly heal wide-opened cracks per the two-step close-then-heal (CTH) self-healing scheme. In addition, a two-step fiber coating approach was used to enhance the shape fixity and workability of the cold-drawn programmed short polyurethane fibers. The relationship between recovery-stress and recovery-strain was experimentally determined by partially constrained shape recovery test. Notched beam specimens were prepared and fracture-healing was conducted up to five cycles. It is found that the composite was able to heal the wide-opened crack repeatedly with considerable healing efficiency. It is also found that the healing efficiency increased as the fiber length increased, but in a reducing rate of increase. The recovery stress-recovery strain of the strain hardened shape memory polymer fiber behaves nonlinearly. The coated fiber is more effective than the uncoated fiber in closing wide-opened cracks when the recovery strain is within a certain range.

As shown herein, see e.g., Examples 3 and 7, the mechanical and dynamic properties of shape memory polyurethane fiber (SMPU) are reported and compared to those of spider dragline silk. Although the polymeric fiber has a lower strength compared to spider dragline silks (0.2-0.3 GPa versus 1.1 GPa), it possesses much higher toughness (276-289 $MJ/m^3$ versus 160 $MJ/m^3$), due to its excellent extensibility. Dynamic mechanical tests revealed that SMPU fiber has a high damping capacity (tan $\delta$=0.10-0.35) which is comparable to or even higher than that of spider silks (tan $\delta$=0.15). In addition, it is shown that different programming methods change the properties of the fiber in different ways and in certain embodiments cold-drawing programming is appealing in structural applications. These results showed that the SMPU fiber has similar vibration damping and mechanical properties as spider silk, and is used to great advantage in many lightweight engineering structures.

In accordance with the present invention (see e.g., Example 7), vibration is controlled by the use of high-toughness SMP fiber. The composition of such SMP fiber mimics the microstructure of spider silk, and thus shares many of the physical properties of spider silk. For example, spider silks possess remarkable mechanical properties such as high strength and toughness. For instance a falling spider hanging with a single silk can stop immediately and exactly where it wants, indicative of superior damping capabilities of spider silk. Spider silks are made of two-phase semi-crystalline proteins with hydrogen bonded crystalline molecules as hard phase and amorphous molecules as soft phase. In accordance with the present invention, a semi-crystalline polyurethane fiber uses polyols as the soft segment, and diisocyantes and small molecular extenders as the hard segment. Consistent with the similar molecular structure to spider silk, spun SMP fiber has remarkable strength, stiffness, and damping properties after programming. The programming is preferably cold-drawing programming although other programming approaches such as hot programming can also be used.

In accordance with the present invention, SMP-based "spider silk like" fibers of the invention are used as filaments, fibers, ropes, cables, etc. for vibration damping; in such embodiments the SMP need not be part of a composite but can be embodied as filaments, twine, yarn, cable or woven as fabric. Accordingly, with embodiments of the invention used for vibration damping, the SMP fibers can be fabricated without a surrounding thermoset or other matrix such as generally used in composites. Advantageously however, when these SMPs are used in polymer matrix-containing composites, such composites also have enhanced vibration damping characteristics (vibration damping fiber-reinforced polymers (FRPs.))

When embodied as composites, embodiments of the present invention are used in lightweight structures such as satellites, transportation vehicles, gyroscope, pipes, pressure vessels and commercial goods such as bike, bed, etc. Additionally, compositions of the invention are used in structural materials such as beams, panels, reinforcements in buildings, structures (e.g., bridge or overpasses) or in concrete. When S M P fiber is added to art-accepted concrete, it also provides healing and damping capability to concrete, which is a cement based composite.

When compositions of the invention are used (composites, or structures composed solely or largely of SMP) they provide improved performance and survival during disasters (such as war, terrorism, earthquakes and hurricanes). Also, SMP fibers of the invention can be woven, braided, or knitted into textiles such as cables as safety belts or ropes for construction workers or persons engaged in activities that involve a high risk of falling (construction/repair of tall structures—skyscrapers, water towers etc., tall building window washers, acrobats) and as cables in cable stayed bridges.

The spider-silk like fibers, after cold-drawing programming, are lightweight, inexpensive, tough, strong, and are compatible with polymer matrices, in contrast to the situation when heavy and stiff SMAs are used. Therefore, the present invention provides an appealing and useful option for vibration control in high tech structures and a wide spectrum of commercial and military goods. SMP-based spider silk-like fibers, with their light weight and vibration damping, can be used instead of or to replace such existing metal wires or polymeric fibers.

In related aspects of the present invention, the combination of strength and toughness in SMPs, obtained through controlled drawing programming, preferably cold drawing programming is utilized. Accordingly, SMP fiber reinforced polymer composites of the invention have desired structural strength along with excellent impact tolerance.

In accordance with the present invention, shape memory polymer fiber (SMP fiber) replaces conventional synthetic fibers in certain composites. In certain embodiments, as set forth herein (see e.g., Examples 3 and 5) it was found that, after cold-drawing programming, SMP fibers have mechanical strength and stiffness similar to other high performance polymeric fibers such as polyethylene or polypropylene fibers, due to the special "spider silk-like" molecular structure of SMP fibers, (See. e.g., FIG. 8). Spider silks possess remarkable mechanical properties such as high strength and toughness. This is why a spider net, although very delicate in appearance, can catch flying prey (which occurrence constitutes an impact), and also as nests (which indicates high strength). SMP fibers have extreme toughness, similar to or better than spider silks. Therefore, SMP fibers in accordance with the invention are used in composites that are then used to fabricate load-bearing structures or structures subject to impact or where toughness is called for. In accordance with the invention, SMP fibers, due to their superior toughness when used in SMP fiber reinforced polymer composites provide composites with superior energy absorbing capability.

Thus compositions of the invention are used to great advantage and utility e.g., laminated composites, sandwich composites, grid stiffened composites, 3-D woven fabric reinforced composites, or structures composed essentially only of SMP-based composites.

Furthermore, in certain embodiments of the invention, SMP fiber-reinforced polymer composites can close macroscopic cracks through constrained shape recovery. Accordingly, set forth herein is new generation of polymer composite structures with superior impact tolerance and self-healing capability and such composites are of great utility in both civilian and military applications. The present invention is used in any structures where lightweight is important, such as satellites, transportation vehicles, piping, pressure vessels, and commercial goods such as bicycles, mattresses, protective helmets and equipment, etc. The invention is also used in materials such as reinforced concrete, buildings, or bridges to facilitate structural integrity and survival after natural disasters, blasts, and impact events.

Products produced by methods and with compositions of the invention can be used to protect civilian structures, as well as to protect law enforcement and military equipment and personnel from impact damage or injury. The invention can also be used to help seal defects/cracks/wounds in any structures such as aircraft, ship, auto, train, piping, pressure vessel that is constructed with a composition in accordance with the invention. The invention also is used for materials such as self-healing cement concrete and asphalt concrete for construction. By embedding the SMP fibers in conventional thermosetting polymers, the polymers will not only gain the self-healing capability, they also see significantly enhanced impact tolerance and vibration damping. There new properties can further enhance the service life of structures, and extend the application of lightweight polymer composite materials to other areas such as wind turbine blades, satellites, communication devices, and commercial goods such as beds, helmets, bikes, motor vehicles, etc.; see, e.g., the superior impact tolerance and vibration damping prop (See e.g., Example 3 and Example 7).

Definitions

Programming a SMP by compression or "compression programming" is to apply a pushing force to the SMP, which leads to compressive stress and strain and shortening or other diminution of the specimen. During the load holding time period, if the stress maintains constant, it is called stress controlled programming; if the strain maintains constant, it is called strain controlled programming.

"Decomposition Temperature ($T_D$)": As used herein the decomposition temperature can be defined as a temperature at which chemical bonds are broken or violent oxidation occurs whereupon a material catches fire.

"Fixed strain" is the difference between the prestrain and the springback. At the end of programming, there is a rebound or springback when the load is removed.

"Glass transition temperature ($T_g$)": describes the temperature at which amorphous polymers undergo a transition from a rubbery, viscous amorphous liquid ($T>T_g$), to a brittle, glassy amorphous solid ($T<T_g$). This liquid-to-glass transition (or glass transition for short) is a reversible transition. The glass transition temperature $T_g$ is generally lower than the melting temperature, $T_m$, of the crystalline state of the material, if one exists. Supercooling a viscous liquid into the glass state is called vitrification. Despite the massive change in the physical properties of a material through its glass transition, the transition is not itself a phase transition; rather it is a phenomenon extending over a range of temperatures and is defined by one of several conventions. Several definitions of $T_g$ are endorsed as accepted scientific standards. Nevertheless, all definitions are arbitrary, and they often yield different numeric results: at best, the defined values of $T_g$ for a given substance typically agree within a few Kelvin.

"Healing Temperature ($T_H$)": The healing temperature can be defined functionally as a preferred temperature above the melting temperature where the thermoplastic molecules further overcome intermolecular barriers and are able to gain mobility and to more effectively diffuse. This is sometimes also referred to as the "bonding temperature $T_b$".

"Means for molecular scale healing": As used herein a means for molecular scale healing can be a thermoplastic. In certain embodiments the thermoplastic is particulate. In certain embodiments the thermoplastic is in fibrous form. In certain embodiments, a means for molecular scale healing is not a thermoplastic, yet in such situations the healing means preferably comprises the relevant physical properties, such as glass transition or melting disclosed herein with regard to suitable thermoplastic materials. In other embodiments the means for molecular scale healing can be one known to those of skill in the art; e.g., although it may be less preferred it may include those which lack the ability to heal more than once.

"Melting point ($T_m$)": The term melting point, when applied to polymers, is not used to suggest a solid-liquid phase transition but a transition from a solid crystalline (or semi-crystalline) phase to a still solid amorphous phase. The phenomenon is more properly called the crystalline melting temperature. Among synthetic polymers, generally crystalline melting is only discussed with regards to thermoplastics, as thermosetting polymers generally decompose at high temperatures rather than melt. Consequently, thermosets generally do not melt and thus have no $T_m$.

A "plastic" material is any of a wide range of synthetic or semi-synthetic organic solids that are moldable. Plastics are typically organic polymers of high molecular mass, but they often contain other substances. There are two types of plastics: thermoplastic polymers and thermosetting polymers.

"Prestrain" is the maximum strain applied during programming.

"Programming", also called "training," is a process of mechanically deforming SMP from its permanent shape to a temporary shape. Currently, two types of programming are used. One is to deform the SMP at a temperature above its transition temperature, hold the stress or strain constant while cooling down to below the transition temperature, and remove the load. Another is to deform isothermally at the temperature below the transition temperature, also called cold programming, to the designed strain level, hold the strain for a period of time, and remove the load. Programming can be by compression of SMP or by pulling of SMP.

Programming a SMP by pulling, i. e., "pulling programming" is to apply a pulling force to the specimen, which leads to tensile stress and strain and lengthening of the specimen. Pulling programming is also called "tension programming", "drawing programming", or "stretching programming".

"Relaxation time" is the time elapsed during stress relaxation process.

"Shape fixity" is similar to strain fixity, suggesting that a temporary shape is fixed.

"Shape fixity ratio" is the ratio of the strain after programming over the prestrain.

"Shape memory effect" is where a material after it has been deformed plastically can return to its original shape when subjected to external stimuli.

"SMP" refers to shape memory polymer

"Strain-controlled programming" is a programming process wherein the strain, once it is applied to the material to the designed level, remains constant until the applied force is removed at the end of the programming process.

"Strain recovery" is the amount of strain that is recovered during shape recovery process.

"Stress-controlled programming" is a programming process wherein the stress, once it is applied to the material to the designed level, remains constant until it is removed at the end of the programming process.

"Stress relaxation" is a phenomenon that, once a material is deformed to a certain deformation, the stress continuously reduces while maintaining the strain constant.

"Shape memory polymer": As used herein, a shape memory polymer is chemically or physically cross-linked polymer with a suitable cross-link density, or proper number of segments in between two crosslinking points, that permits the material to have shape memory characteristics. If the cross-link density is too high, the polymer becomes a regular thermoset polymer; if the cross-link density is too low, it becomes an elastomer or rubber. Therefore, a shape memory polymer depends on both composition and morphology. A stable polymer network and a reversible switching transition of the polymer are the two prerequisites for the shape memory effect (SME). The stable network of SMPs determines the original shape, which can be formed by molecule entanglement, crystalline phase, chemical cross-linking, or interpenetrated network. The reversible switching transition is responsible for fixing the temporary "memorized" shape, which can be crystallization/melting transition, vitrification/ glass transition, liquid crystal anisotropic/isotropic transition, reversible molecule cross-linking, and supramolecular association/disassociation. When a shape memory polymer is deformed, it first responds elastically by chemical bond "stretching" (i.e., the chemical bond returns to its equilibrium position when the load is removed); further loading overcomes the intermolecular segmental rotation resistance, leading to "yielding" and plastic deformation. Usually, following the yielding, the polymer responds first by strain softening (similar to dynamic frictional force being smaller than the maximum static friction force), and then strain hardening occurs which is due to network stretching resistance. Finally, the network is fractured and the material fails. For regular thermoset polymer, yielding does not lead to shape memory. The reason is that the number of segments in between the crosslinking points is too small and the energy stored in the amorphous segments is too small. Therefore, shape memory is negligible. Also, for regular thermoset, programming at temperature above Tg does not lead to shape memory. The reason is again due to the fact that not much energy is stored in the amorphous segments and shape recovery can be neglected. For example, rubber only responds to load elastically, and therefore, it does not possess the shape memory effect. When a SMP is programmed at temperature above Tg, the intermolecular rotation resistance is very small so that only a small stress is needed to program. However, the load must be maintained all the way to the temperature below Tg. Otherwise, removal of the load will lead to immediate rebound because the material is rubbery at temperature above Tg.

"Super contraction" is used here to describe the large amount of shortening of tension programmed SMP fibers upon heating to above the SMP's shape recovery temperature, e.g., glass transition temperature. Because the SMP fibers can be pulled to several hundred percent of its original length during programming, the shorting or contraction or shrinkage is also several hundred percent upon shape recovery.

"Thermoplastic polymers" are the plastics that do not undergo irreversible chemical change in their composition when heated and can be molded again and again when heated. Examples include polyethylene, polypropylene, polystyrene, polyvinyl chloride, and polytetrafluoroethylene (PTFE). Common thermoplastics range from 20,000 to 500,000 amu.

"Thermosetting polymers" can take shape once; after they have solidified, they stay solid. In the thermosetting process, a chemical reaction occurs that is irreversible. According to an IUPAC-recommended definition, a thermosetting polymer is a prepolymer in a soft solid or viscous state that changes irreversibly into an infusible, insoluble polymer network by curing. The cure may be done through heat (generally above 200° C. (392° F.)), through a chemical reaction (two-part epoxy, for example), or irradiation such as electron beam processing. Thermosetting polymers are usually liquid or malleable prior to curing and designed to be molded into their final form, or used as adhesives. Others are solids like that of the molding compound used in semiconductors and integrated circuits (IC). In contrast to thermoplastic polymers, once cured/hardened a thermoset cannot be reheated and melted back to a liquid form. "Thermoset" is best defined as a cured thermosetting polymer, although thermoset and thermosetting polymer are sometimes used interchangeably.

"Yield strain" is the strain corresponding to yielding. In the stress-strain curve, the change of slope signals the start of yielding.

BRIEF DESCRIPTION OF THE SEVERAL VIEWS OF THE DRAWINGS

FIG. 2A: Cyclic loading tests for a SMP fiber #1.

FIG. 2B: Cyclic loading tests for a SMP fiber #2.

Figure 3B:
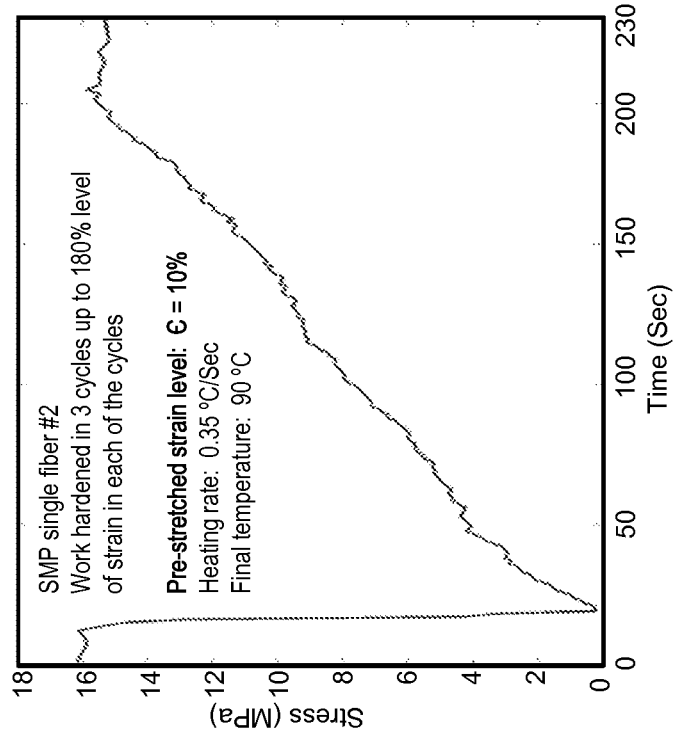
Figure 3A:
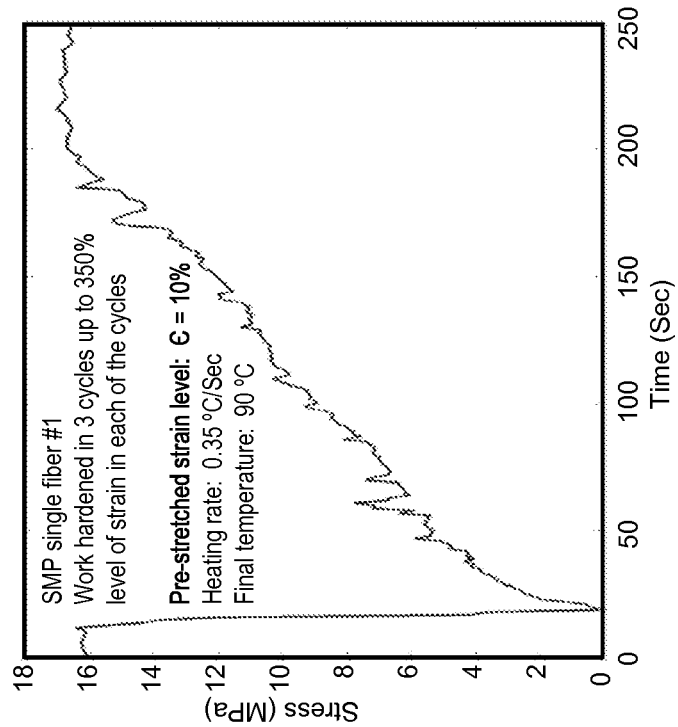

Stress recovery test results with heating rate of 0.35° C./Sec up to 90° C. and a pre-stretched strain level of 10%:

FIG. 3A SMP fiber #1 after 3 strain controlled cyclic loads each of them up to 350% of the strain level with 50.8 mm/min strain rate. FIG. 3B SMP fiber #2 after 3 strain controlled cyclic loads each of them up to 180% of the strain level with 50.8 mm/min strain rate.

Figure 4A:
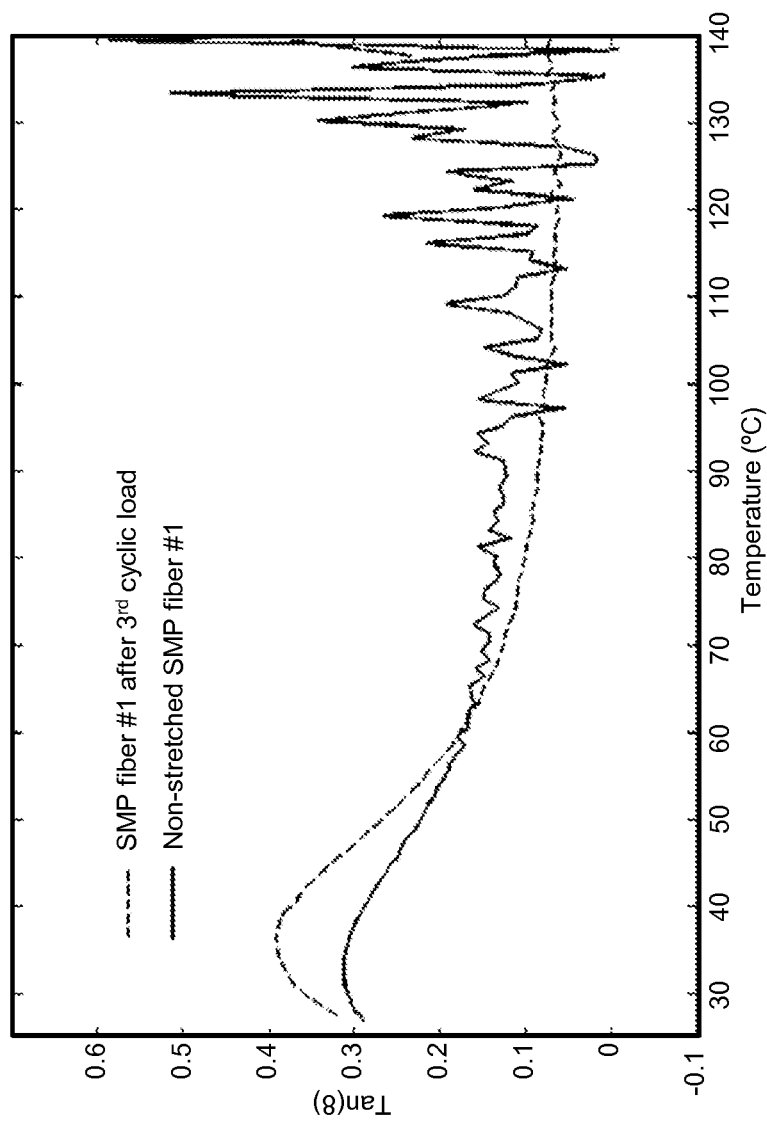
Figure 4B:
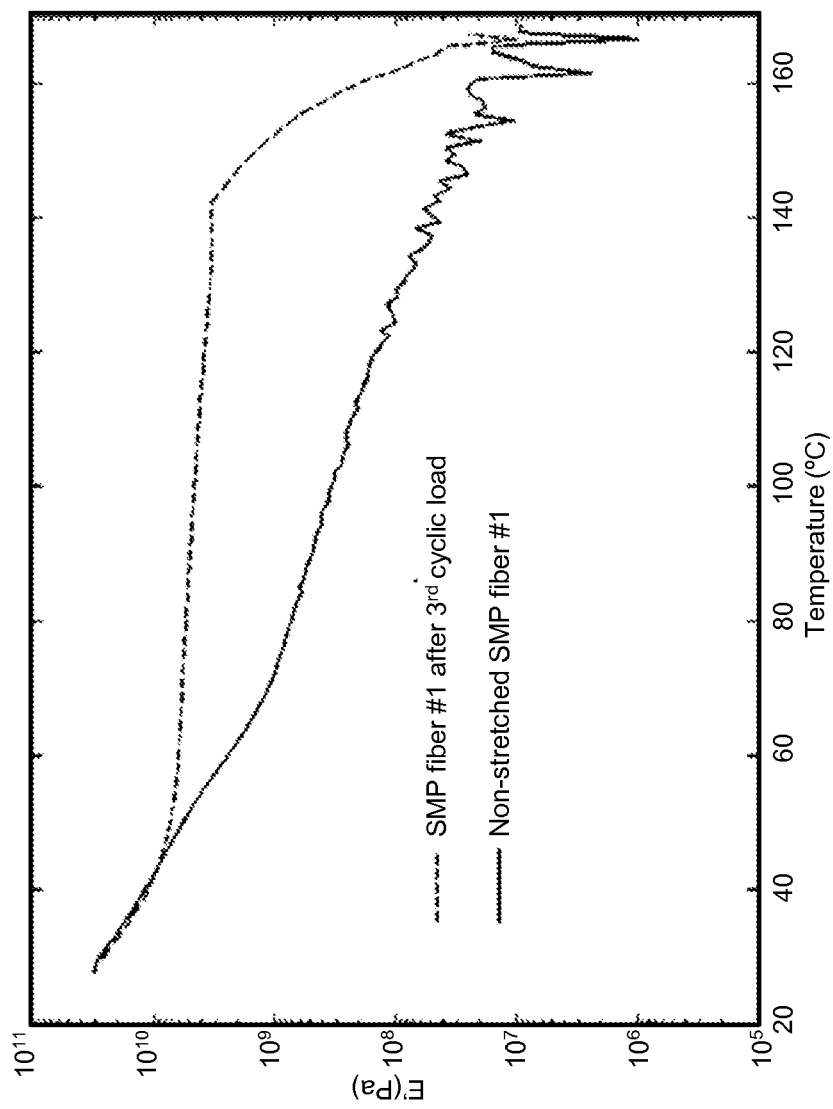

DMA test results: FIG. 4A phase angle Tan δ and FIG. 4B storage modulus E'.

Figure 5:
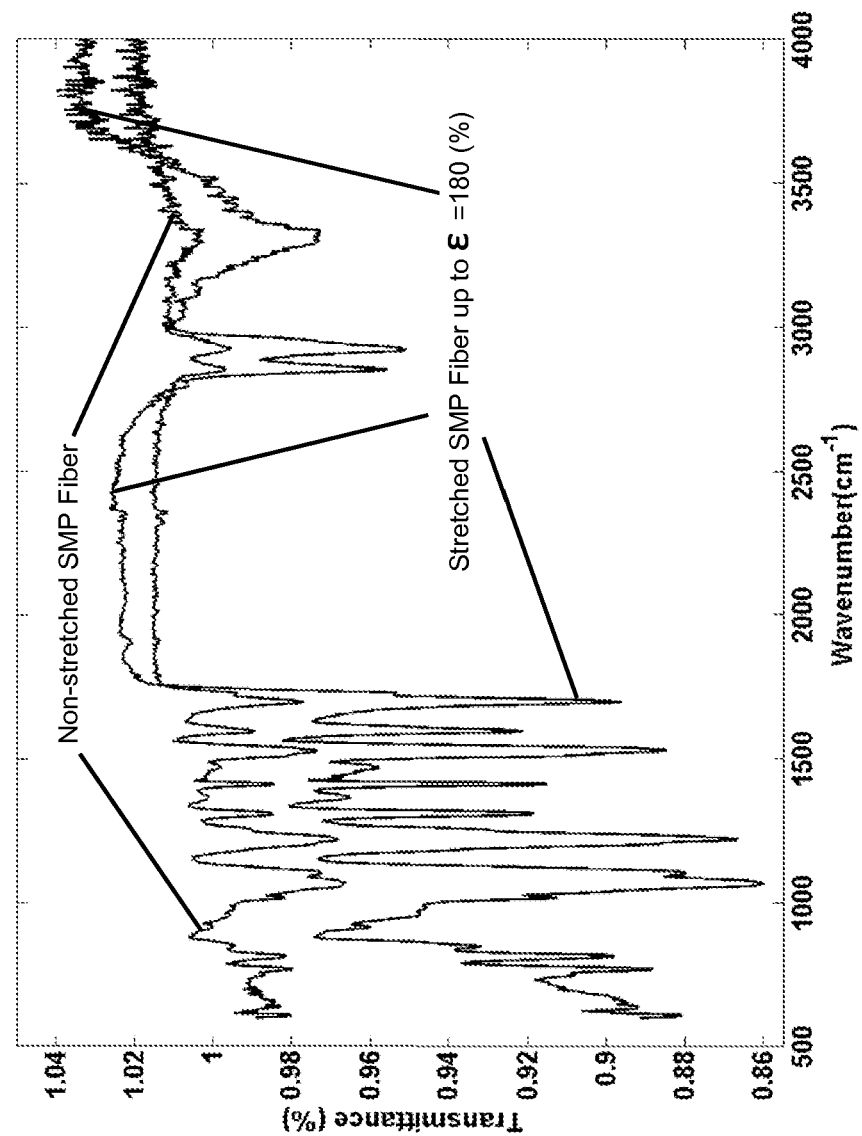

FIG. 5: FTIR test results for the SMP fiber #2.

Schematic representation of the bio-mimetic self-healing material system: FIG. 6A damaged configuration with a macroscale crack; FIG. 6B closed crack configuration due to the stress recovery process of SMP fibers; FIG. 6C diffusion of the molten Thermoplastic Particles (TPs) into the cracked matrix; and, FIG. 6D healed configuration with magnified view of the crack interface which shows molecular entanglement of the solidified TPs and thermosetting polymer molecular chains.

Figure 7A:
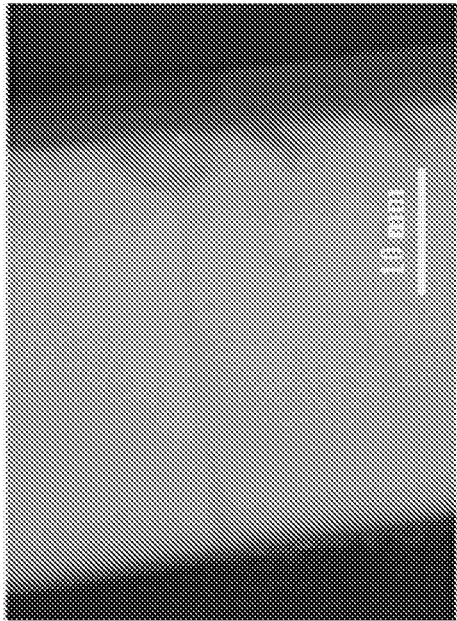
Figure 7B:
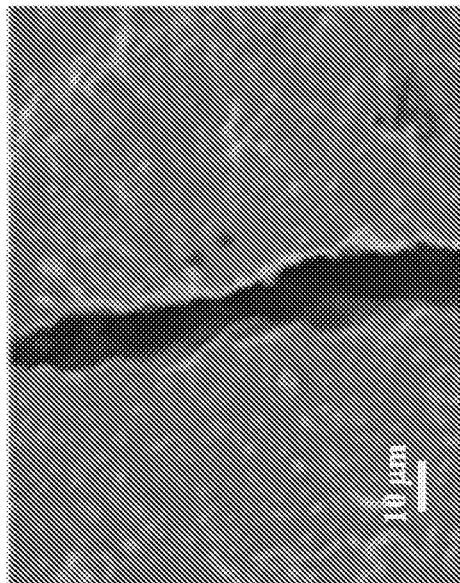
Figure 7C:
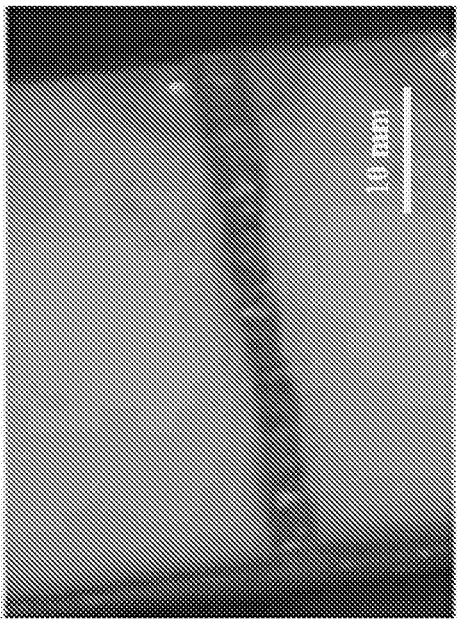
Figure 7D:
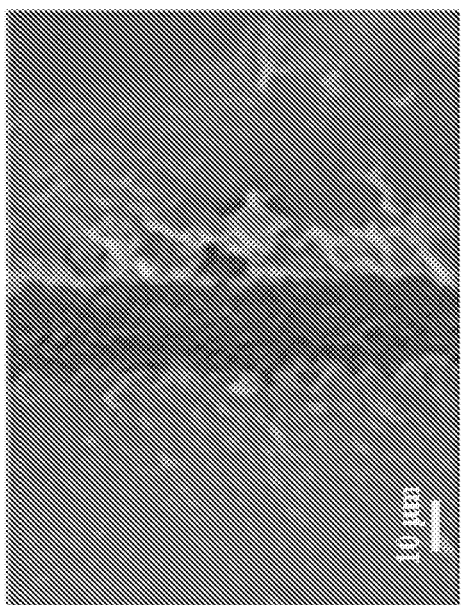

Experimental demonstration of the macrocrack closure and molecular level of healing for a polymer matrix composite which is reinforced by the continuous SMP fibers: FIG. 7A is an optical microscopy (OM) image of a macroscale crack. FIG. 7B is an OM image of the sealed macrocrack. FIG. 7C is an SEM image of the sealed macrocrack interface. FIG. 7D is an SEM image of the macrocrack interface after melting the TPs.

Figure 8B:
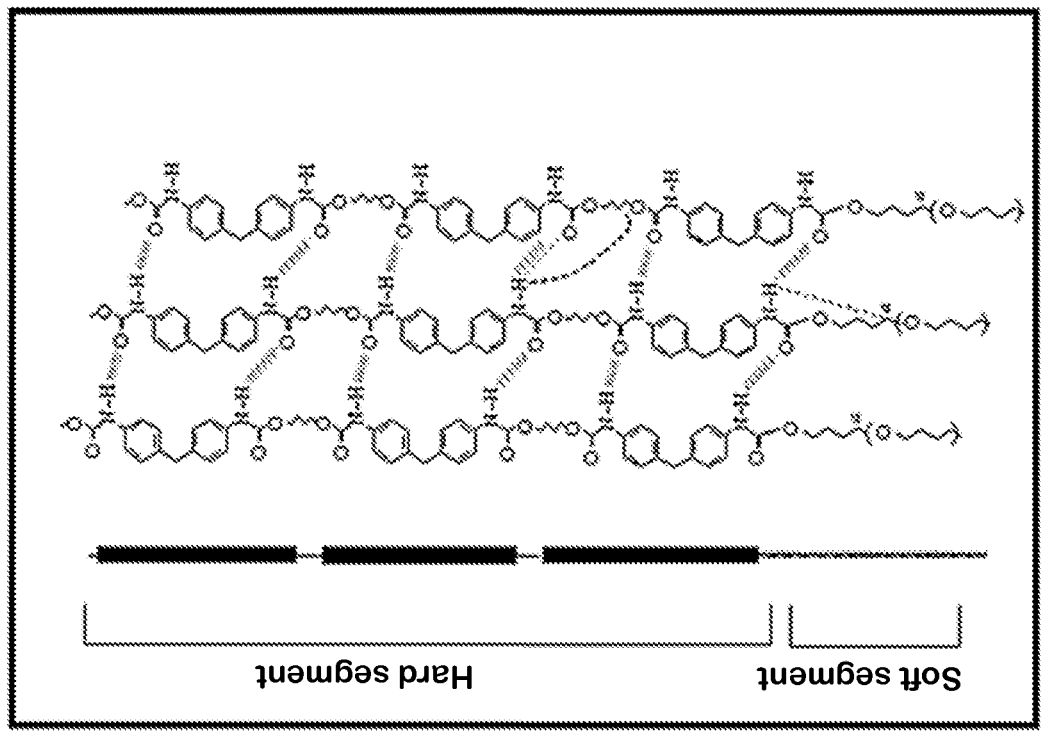
Figure 8A:
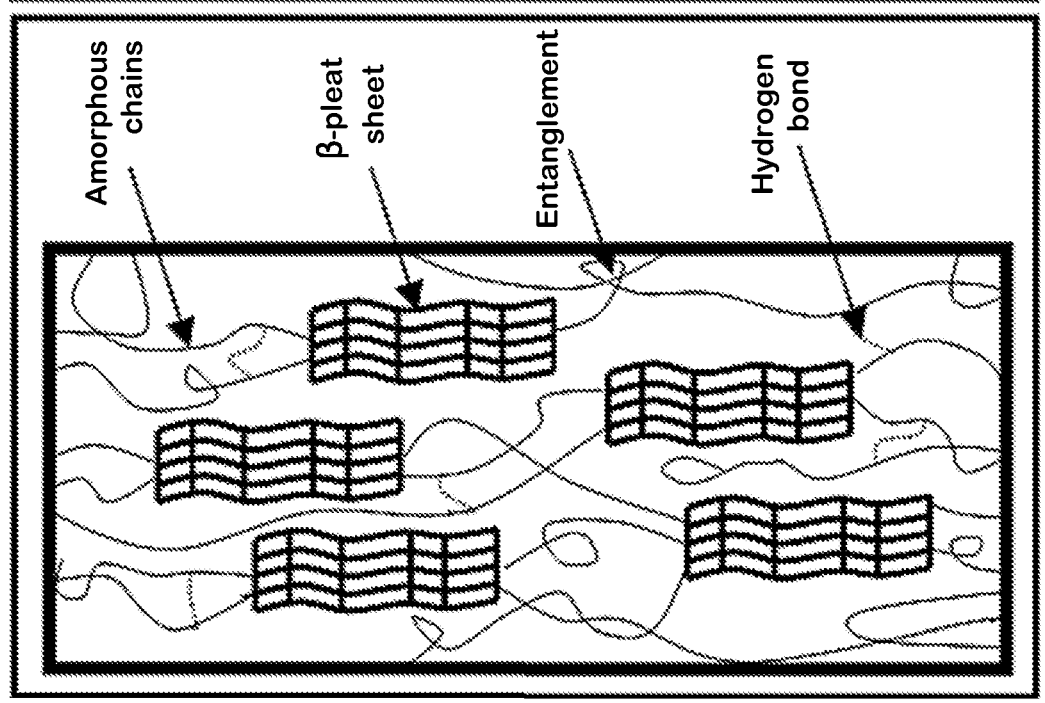

FIG. 8A is an illustration of the microstructure of spider silk. FIG. 8B is a schematic molecular structure of SMPU fiber. Structural similarity between stimuli-responsive fiber (SRF, a synonym for SMP fiber) and natural spider silks in aggregate structure. Aggregate phase structure of SMP fiber and spider silk. The soft segments and hard segments form the amorphous soft phase and crystalline hard phase, respectively. Abundant hydrogen bonding forms between amino group and carbonyl group in the crystalline hard phase. The amorphous phase and crystalline phase are partially oriented.

Figure 9:
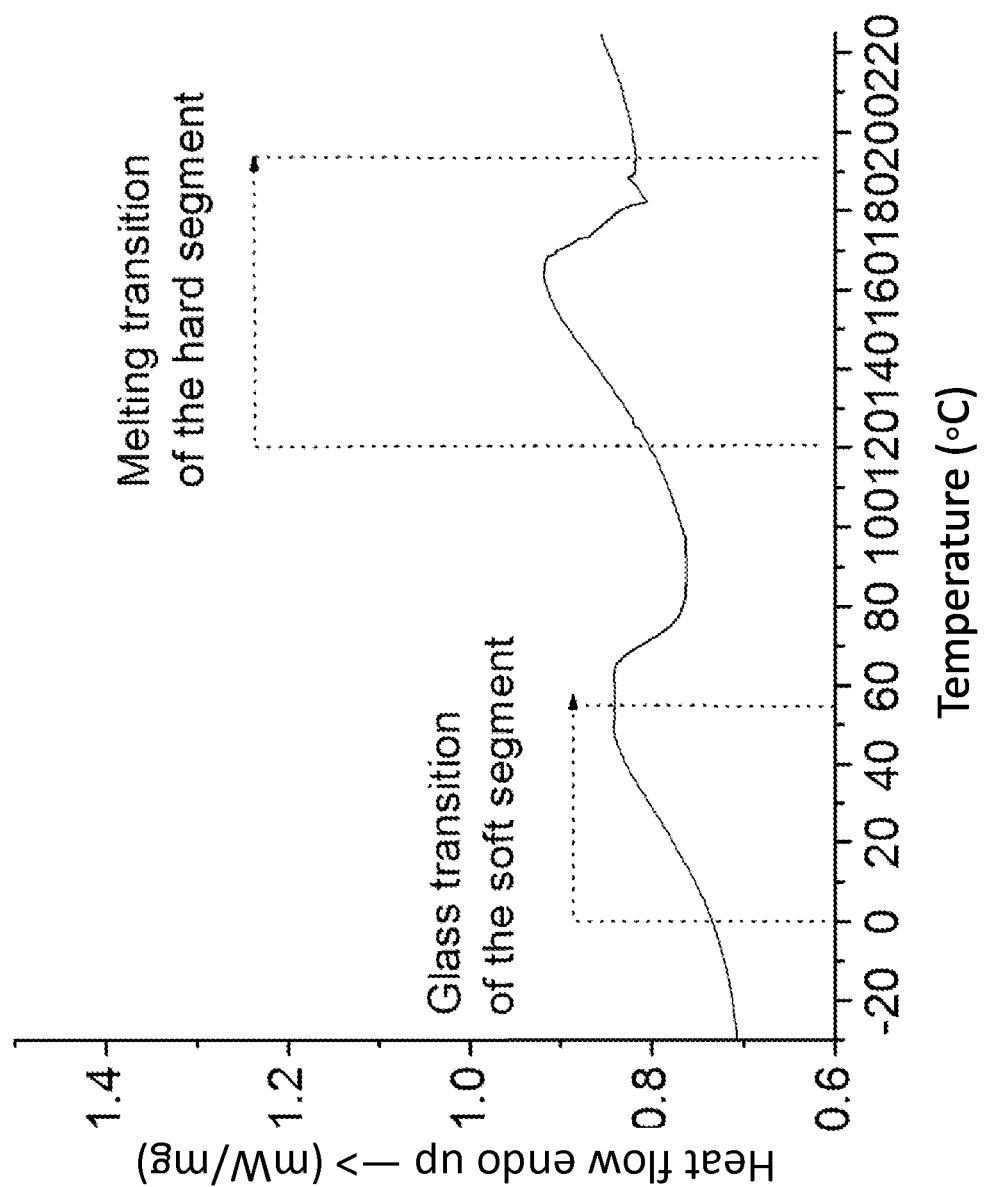

FIG. 9: DSC profile of the SMP fiber. The SMP fiber has an amorphous soft phase and a crystalline hard phase. The broad glass transition of the soft phase locates around ambient temperature in the range of 0-50° C., and melting transition of the crystalline hard phase locates at around 120190° C.

The FTIR spectrum of the SMP fiber and the raw chemicals in the ranges of: FIG. 10A 4000-3200 $cm^1$ and FIG. 10B 1800-1600 $cm^1$.

Figure 11:
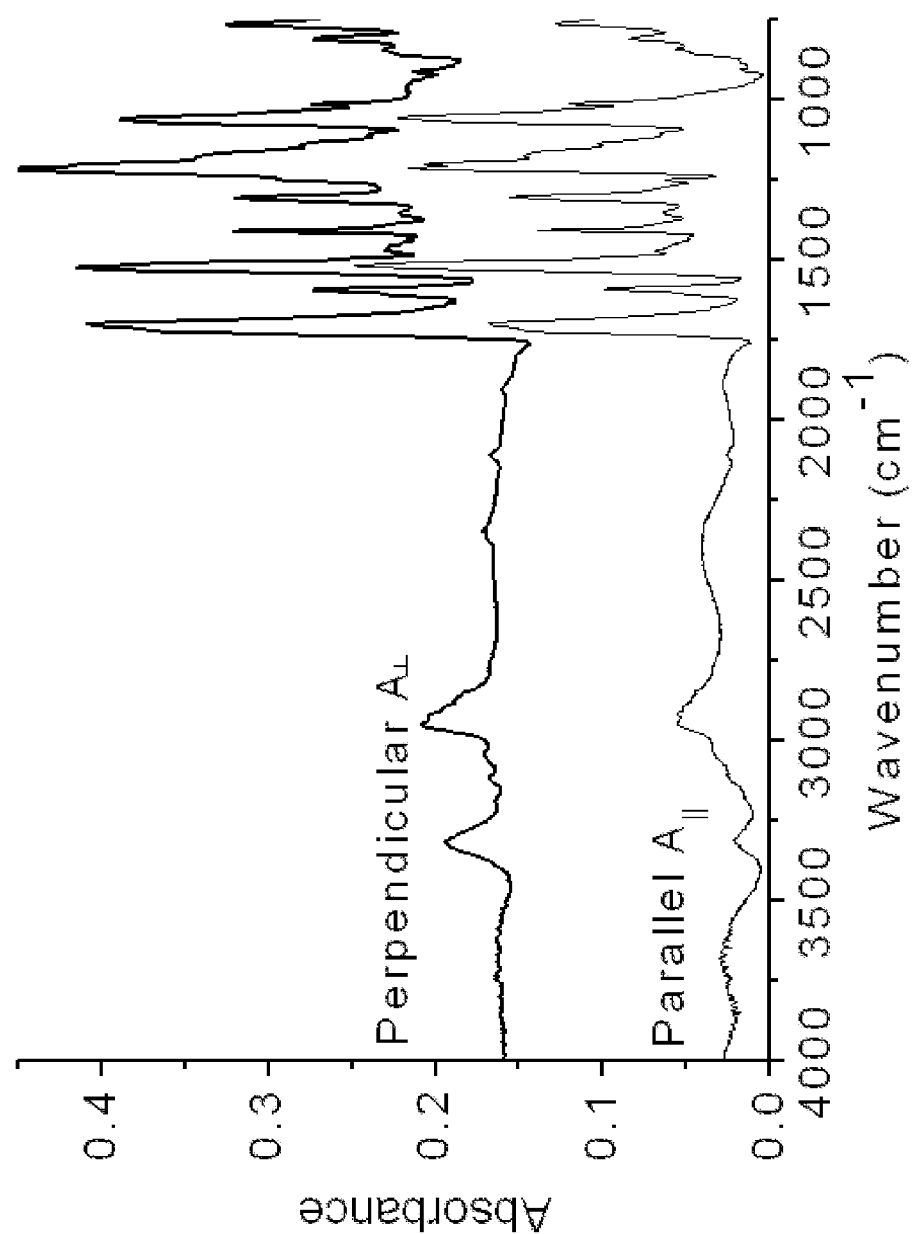

FIG. 11: Infrared spectra of the SMP fiber with the polarizer parallel and perpendicular to the fiber direction. The significant differences between AI and AII suggest the orientation of the molecules in the SMP fiber. The soft segment orientation function was calculated to be 0.19; and the hard segment orientation function was calculated to be 0.56.

Figure 12A:
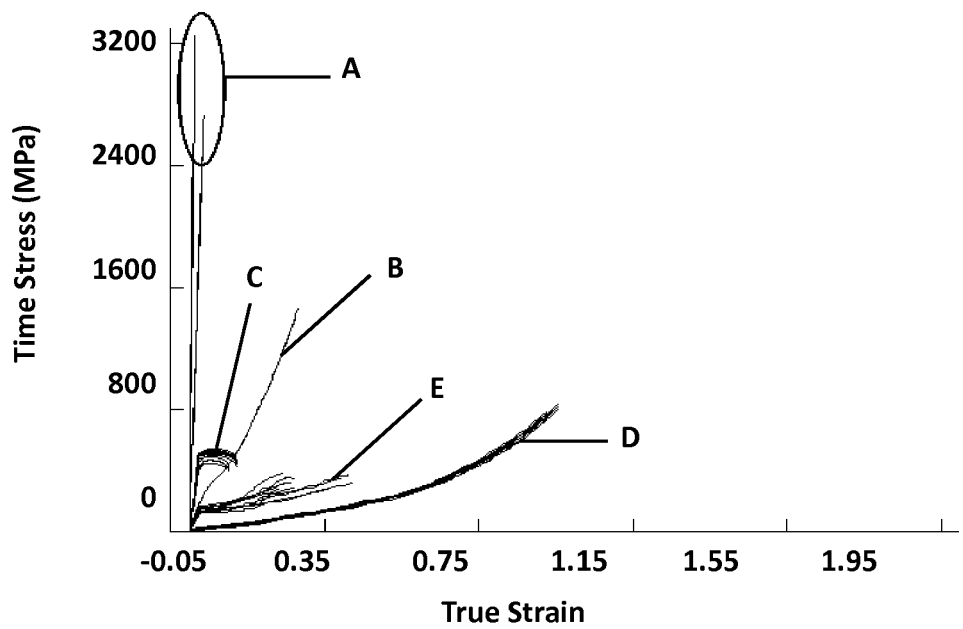
Figure 12B:
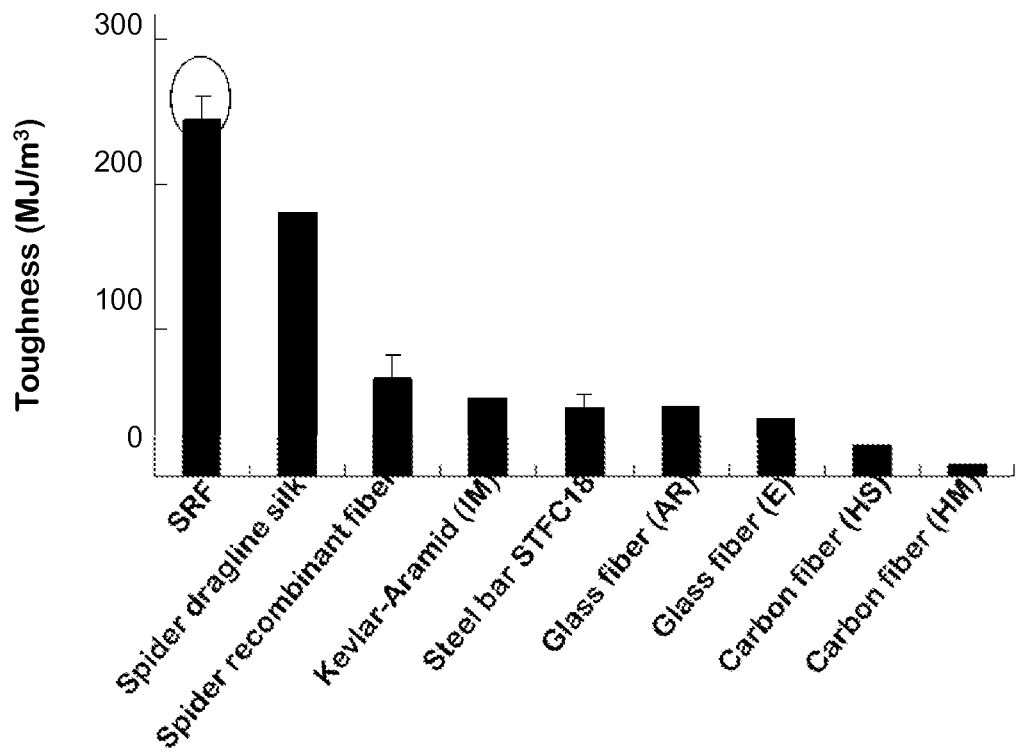

FIG. 12A: Stress-strain curves of the SMP fiber/SRF (designated D) compared with spider (Araneus major ampullate silk) dragline silk (designated B), spider recombinant dragline silk (collectively designated E), other high performance fibers (collectively designated A), and steel bar (STFC18) (designated C). (The curves and data are intended to indicate relative magnitudes rather than exact values). The mechanical strength of the SMP fiber is approaching though is still lower than that of spider dragline silk. Both the tensile strength of the spider dragline silk and SMP fiber is much higher than that of steel bar. FIG. 12B: The toughness values of the SMP fiber in comparison with spider dragline silks, Kevlar fiber, spider recombinant dragline silk, and other high performance fibers.

Figure 13:
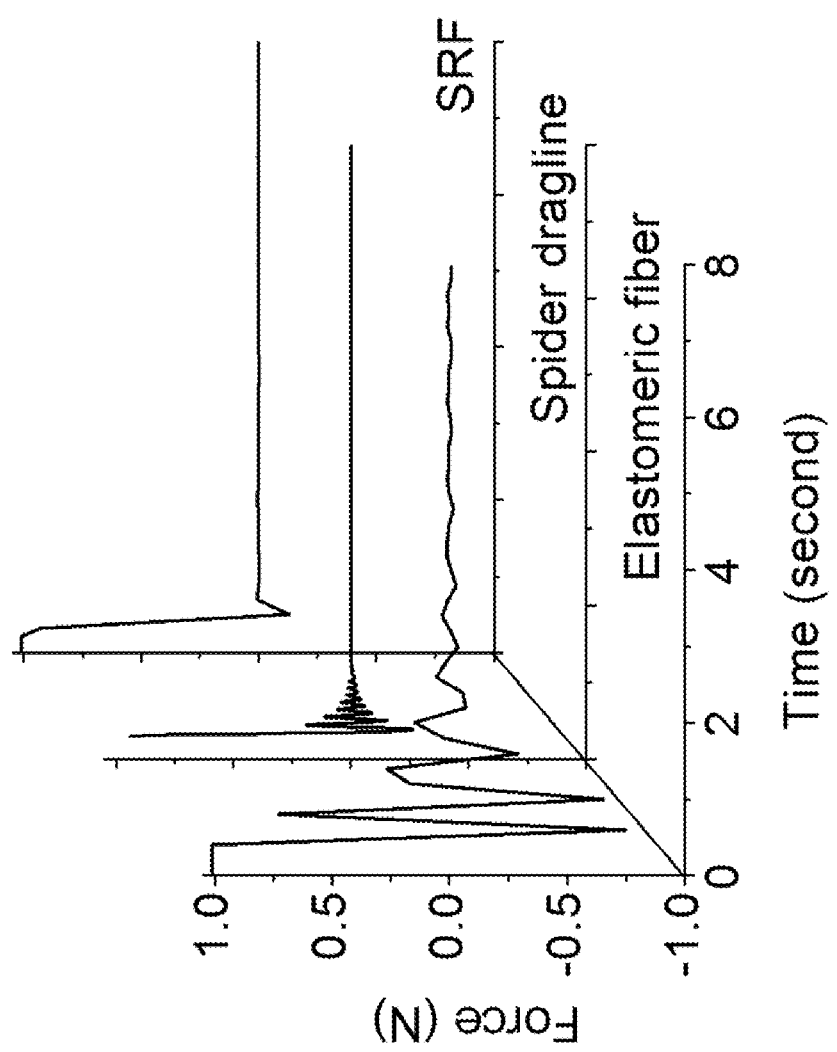

FIG. 13: Comparison of the damping properties of the SMP fiber, spider dragline silk, and elastic fiber. Similar to dragline silk, the SMP fiber has outstanding damping properties. The dragline silk and SMP fiber can become stabilized in a much shorter time. The decay speed of the SMP fiber is even higher than that of dragline silk. This suggests that the SMP fiber through molecular friction can effectively transform the impact energy into heat thereby dissipating the energy. Just like the dragline silk acts as a safety line, the SMP fiber can also stop the twisting and swinging of an object hung at the end as a result of the good damping properties.

Figure 14A:
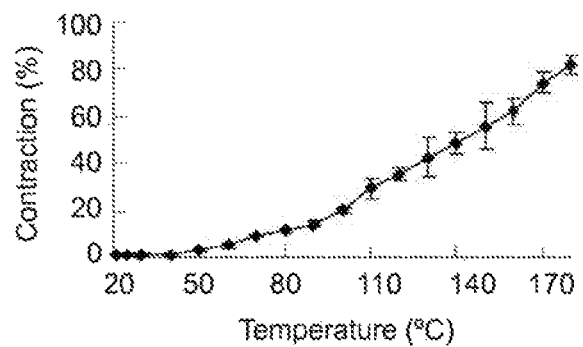
Figure 14B:
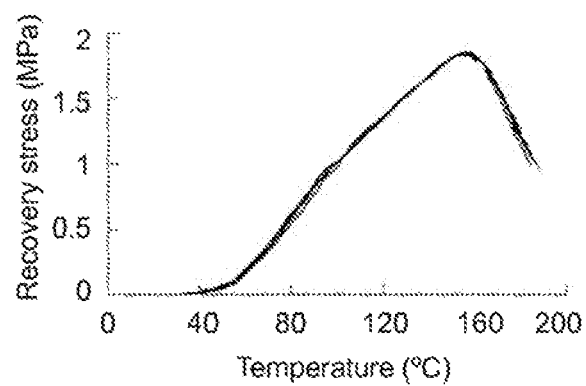
Figure 14C:
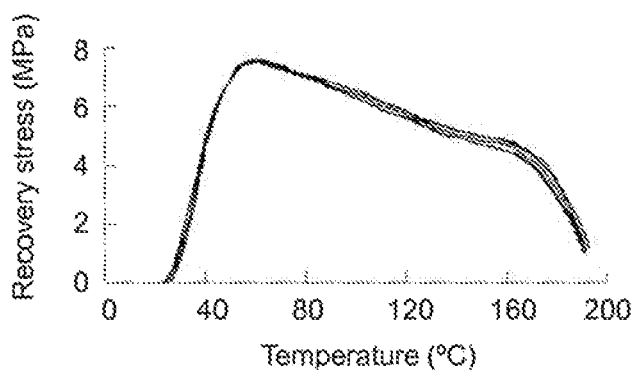

FIG. 14A: Supercontraction ratio of the SMP fiber at different temperatures. FIG. 14B: Restrained contraction stress of the as-spun SMP fiber. FIG. 14C: Restrained contraction stress of the SMP fiber after one-time 100% pre-strain cold-drawing programming.

Figure 15:
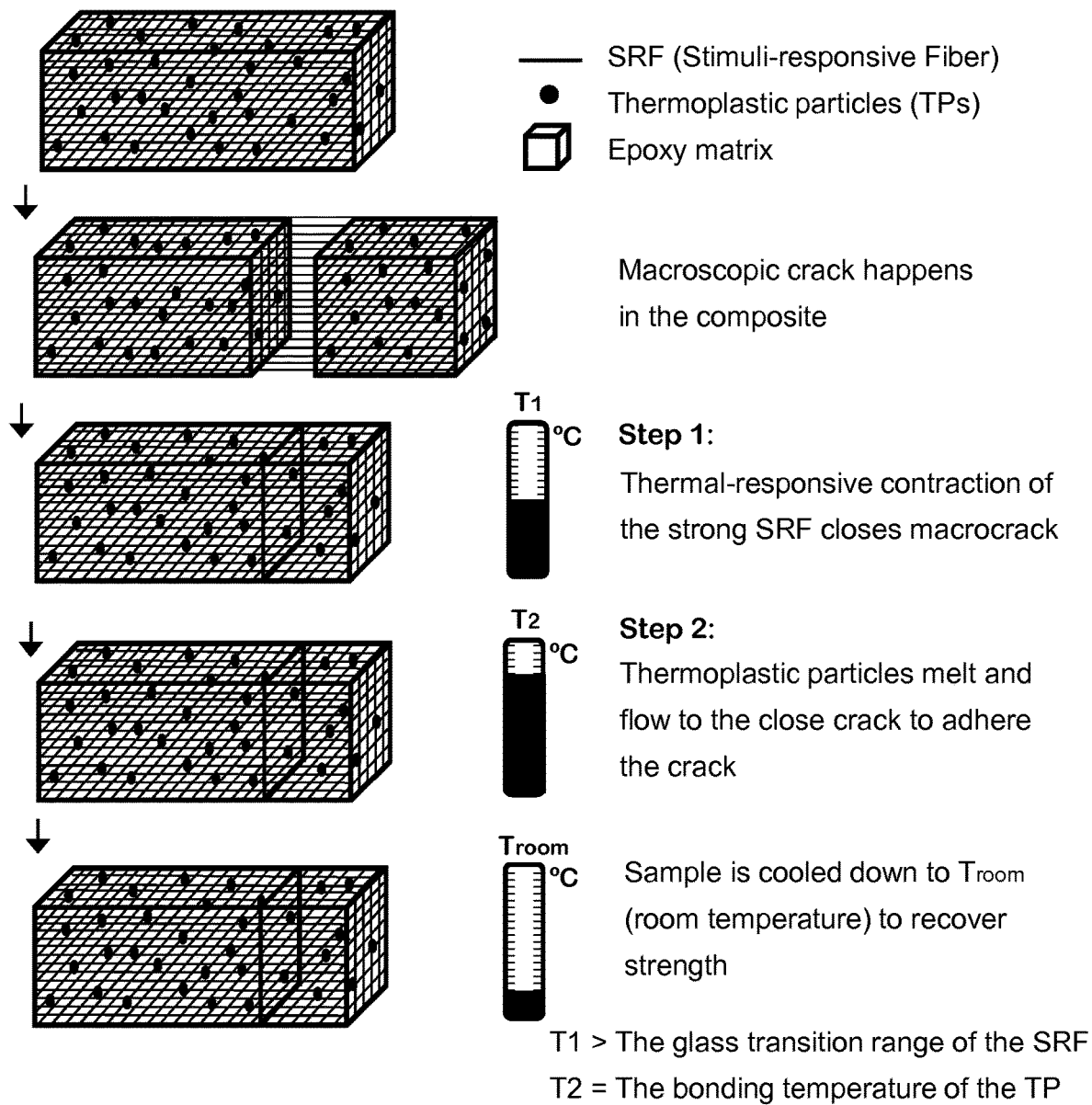

FIG. 15: Schematic diagram of the two-step self-healing process of macroscopic damages in the composites. In the first-step, heating the composite to a temperature (T1) above the glass transition temperature of the SMP fiber triggers the supercontraction of the SMP fiber to close the macro-crack (about 3 mm in width). In the second-step, at the bonding temperature (T2), the TPs melt and diffuse into the cracked matrix and bridge the crack plane.

Figure 16A:
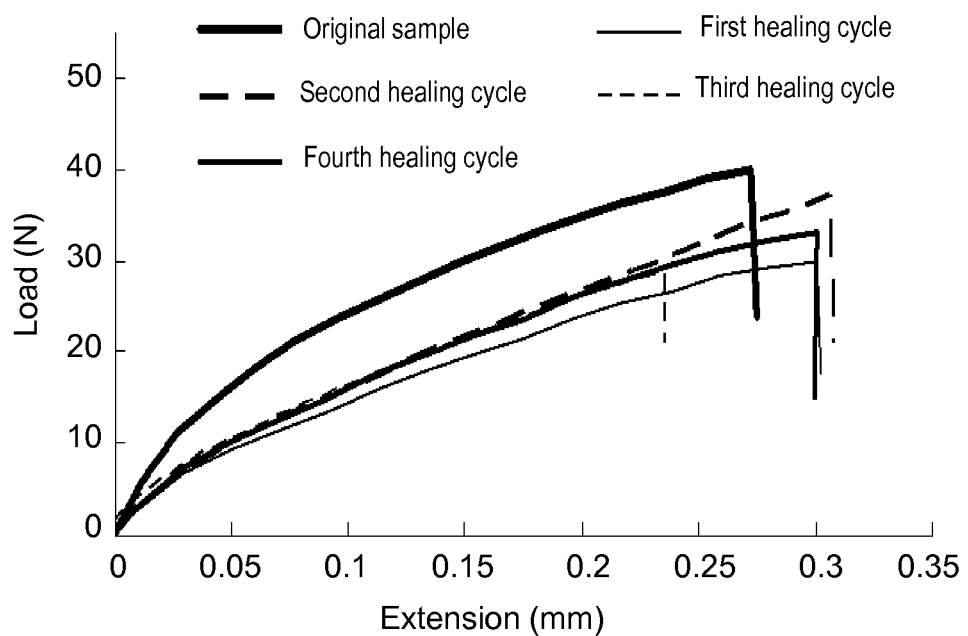
Figure 16B:
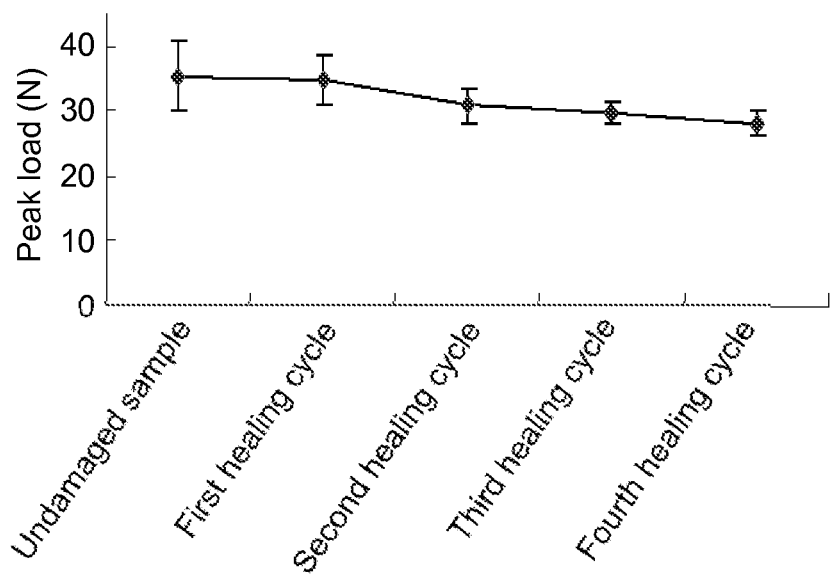

FIG. 16A: Typical load-displacement curves of the original and healed tapered double cantilever beam (TDCB) samples (after the two-step healing): FIG. 16B: Maximum loading of the original and healed TDCB samples after different fracture/healing cycles.

Figure 17A:
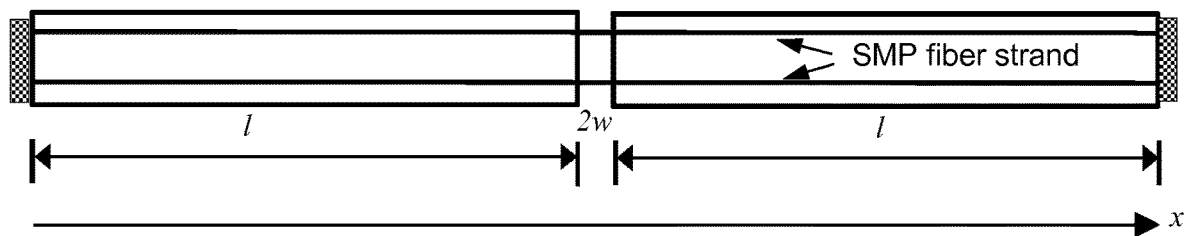
Figure 17B:
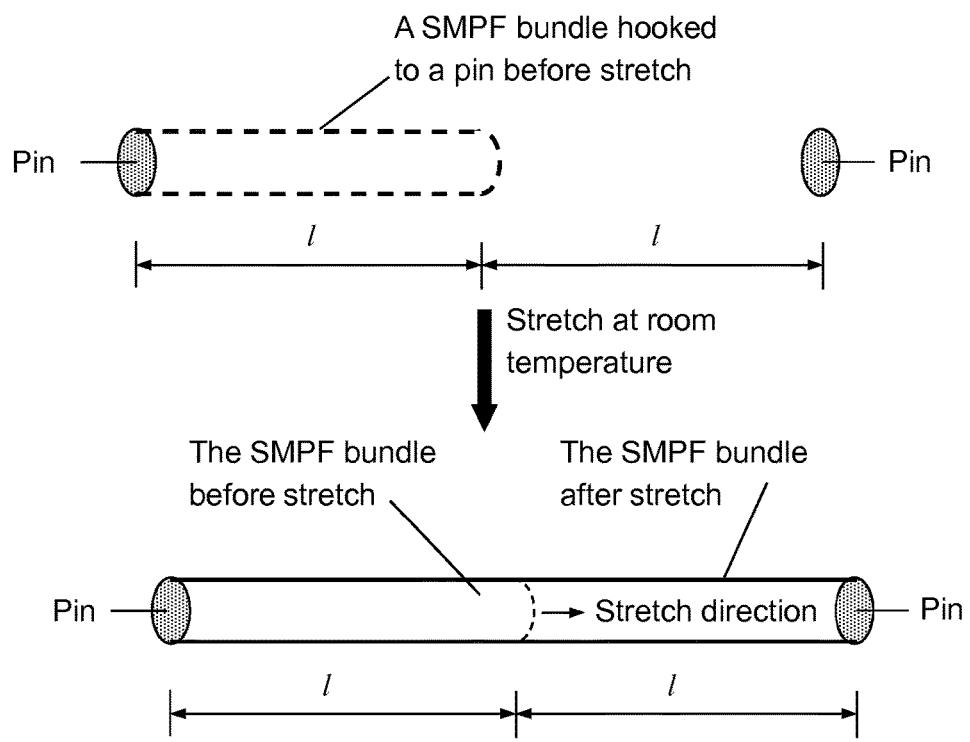

FIG. 17A: Schematic of a beam specimen with artificial pre-crack during shape recovery (healing) process (the SMPFs are perpendicular to and bridge over the pre-crack). FIG. 17B: Schematic of a SMPF bundle being stretched to 100% pre-strain.

Figure 18:
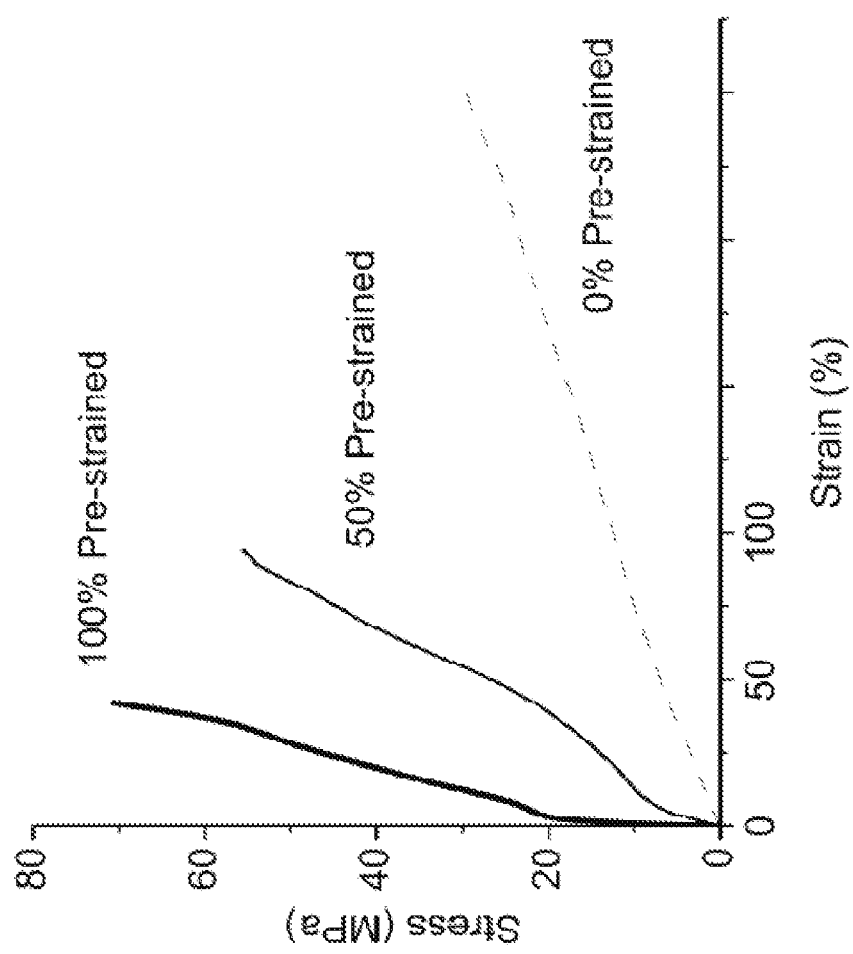

FIG. 18: Tensile test results of SMPFs with various pre-tensions. (0% prestrain, dashed line; 50% prestrain, thin solid line; 100% prestrain, thick solid line)

Figure 19:
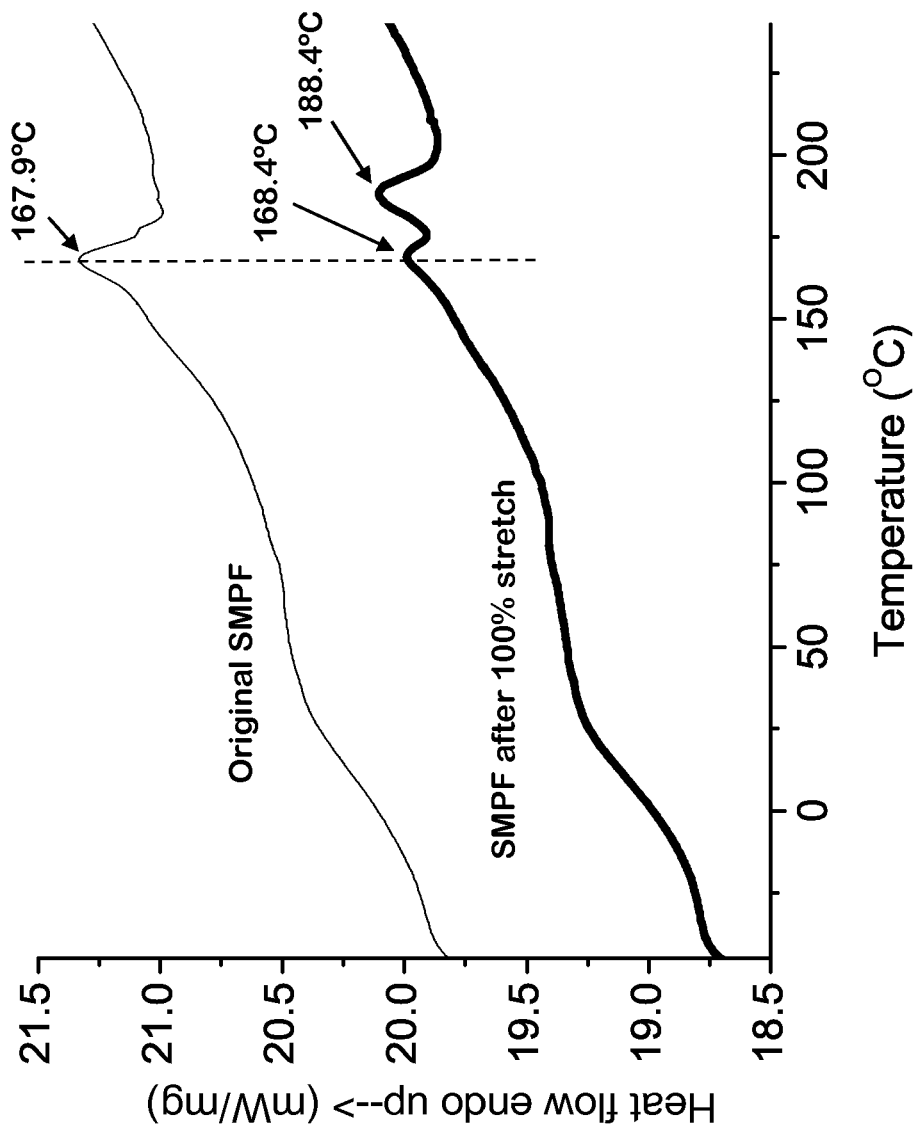

FIG. 19: DSC results of the original SMPF and the SMPF after 100% cold-drawing. (original SMPF, thin line; SMPF after 100% stretch, thick line)

Figure 20:
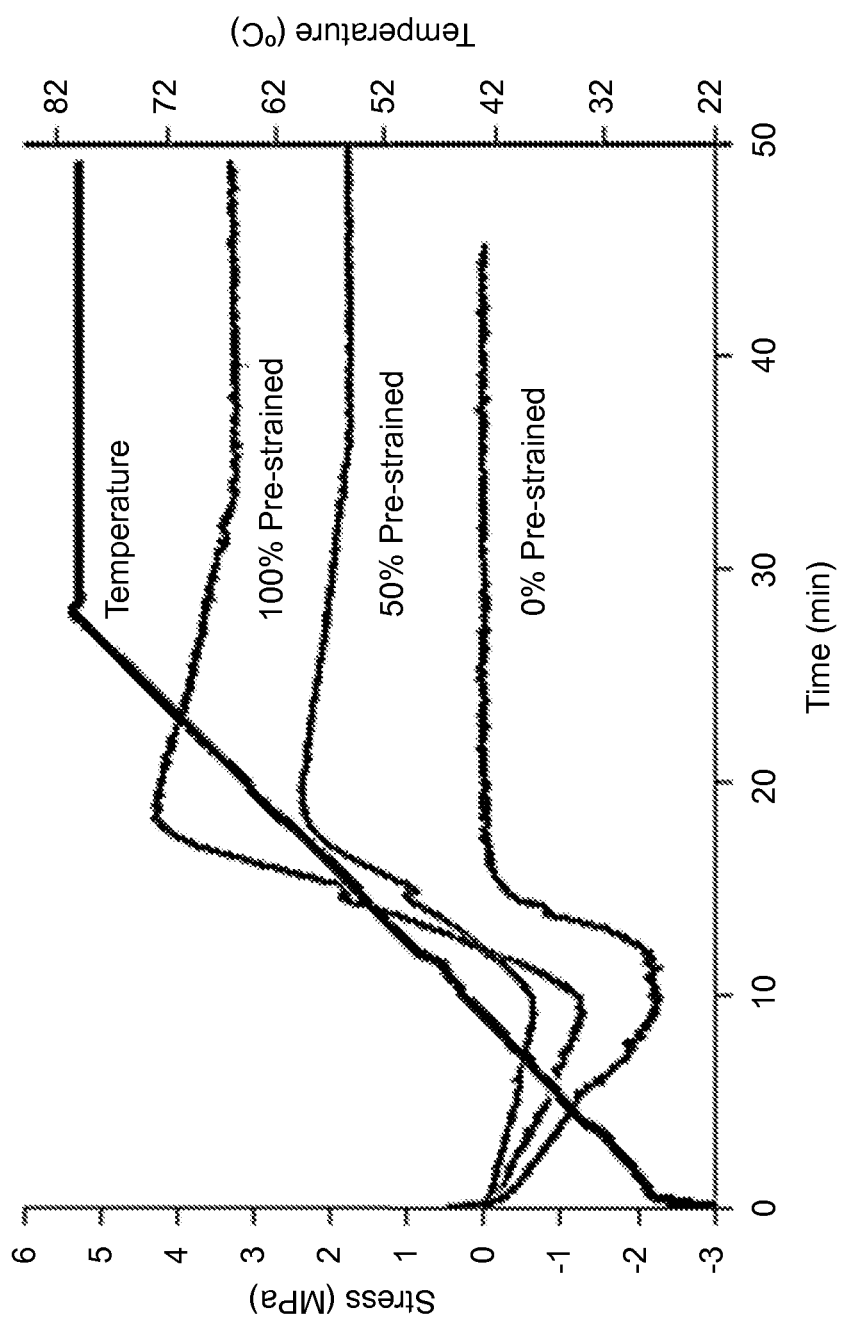

FIG. 20: Recovery stress and corresponding temperature, each relative to time, during the first healing test for pre-cracked beam specimens embedded with SMPFs having various pre-tensions.

Figure 21:
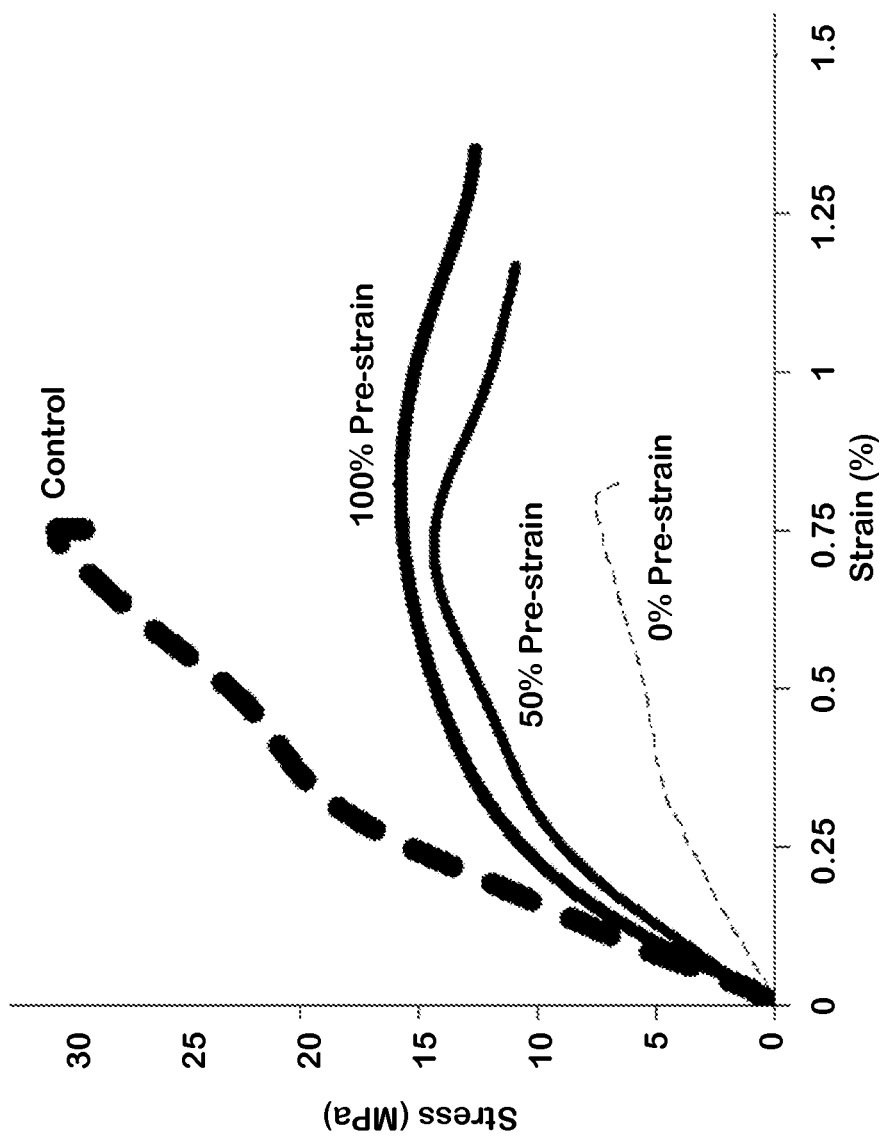

FIG. 21: First tensile fracture test after the first healing of pre-cracked specimens at differing prestrain (0% prestrain; 50% prestrain; 100% prestrain).

Figure 22A:
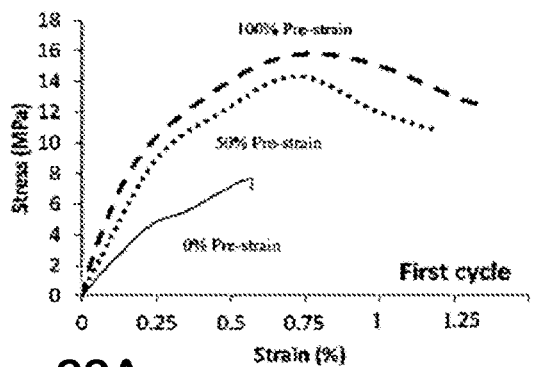
Figure 22B:
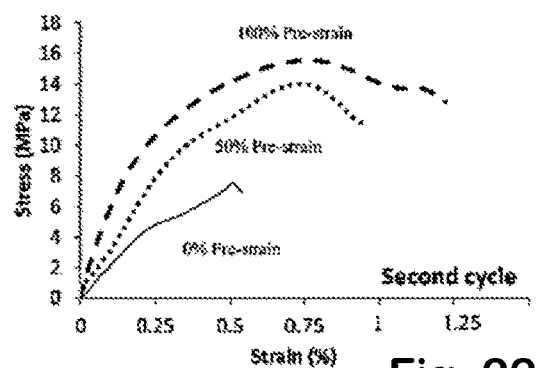
Figure 22C:
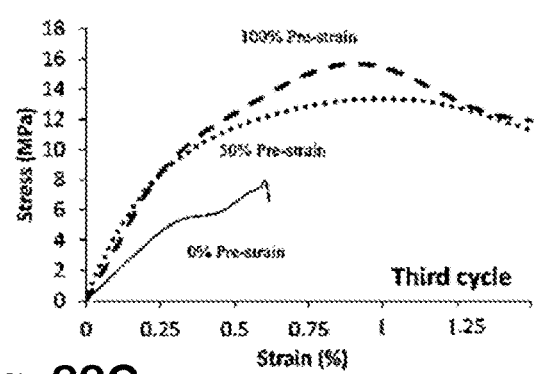
Figure 22D:
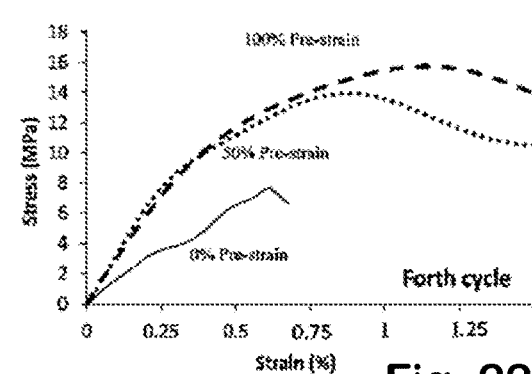
Figure 22E:
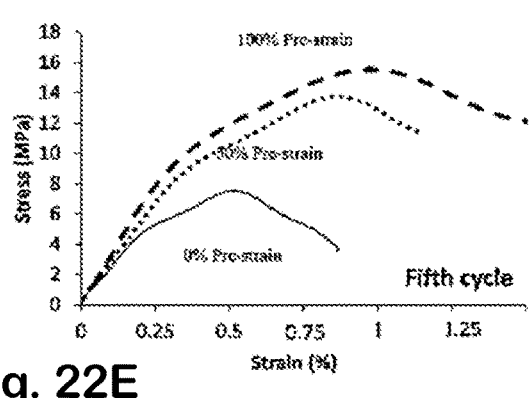
Figure 22F:
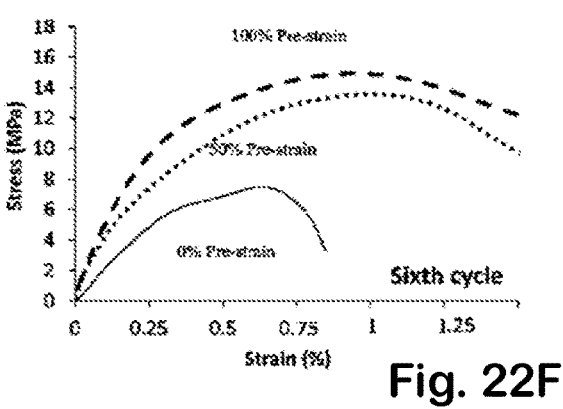
Figure 22G:
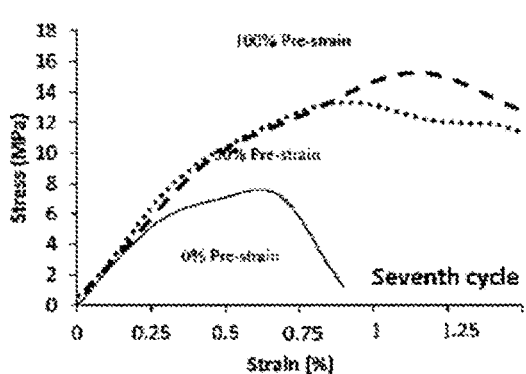

Tensile fracture test after each healing cycle, for cycles 1 through 7: Healing cycle 1, FIG. 22A; healing cycle 2, FIG. 22B; healing cycle 3, FIG. 22C; healing cycle 4, FIG. 22D; healing cycle 5, FIG. 22E; healing cycle 6, FIG. 22F; healing cycle 7, FIG. 22G.

Figure 23:
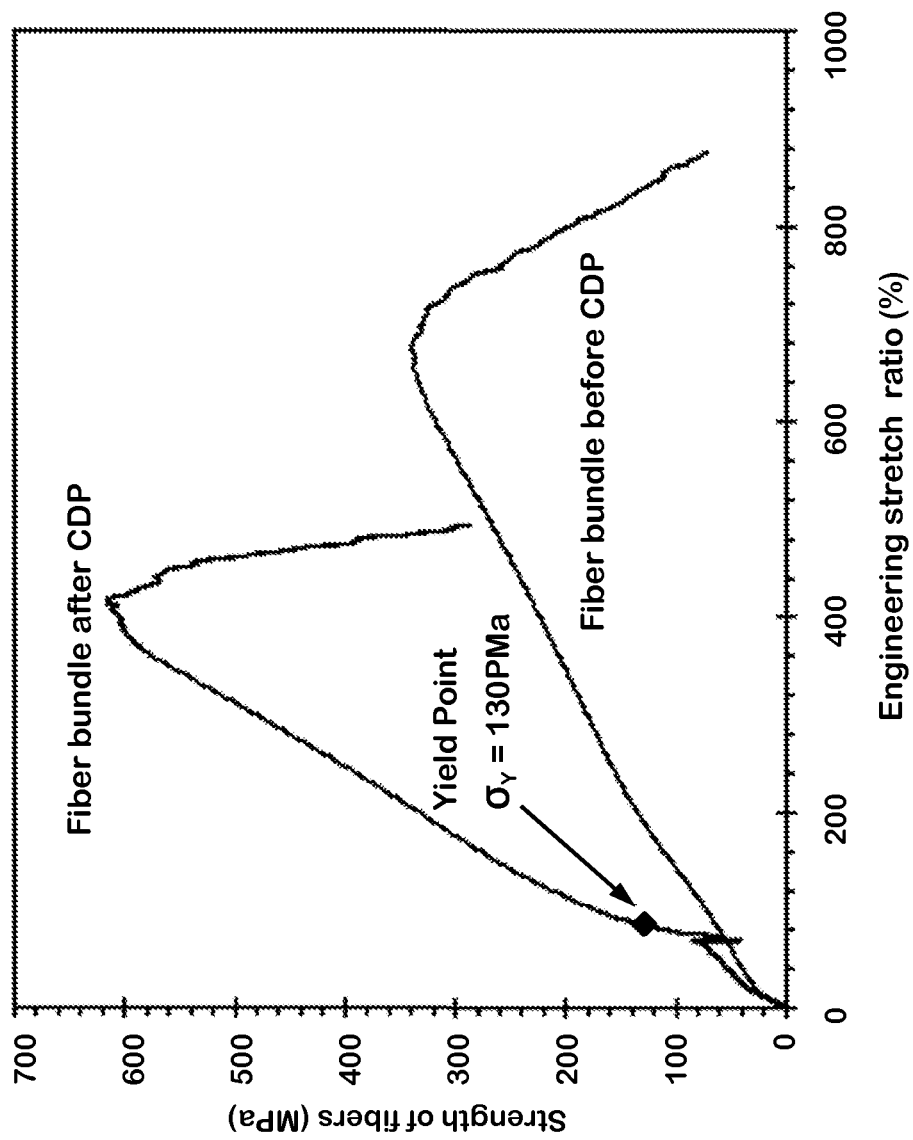

FIG. 23: Typical engineering stress-engineering stretch ratio plots for un-cold-drawn fibers and cold-drawn fibers.

Figure 24:
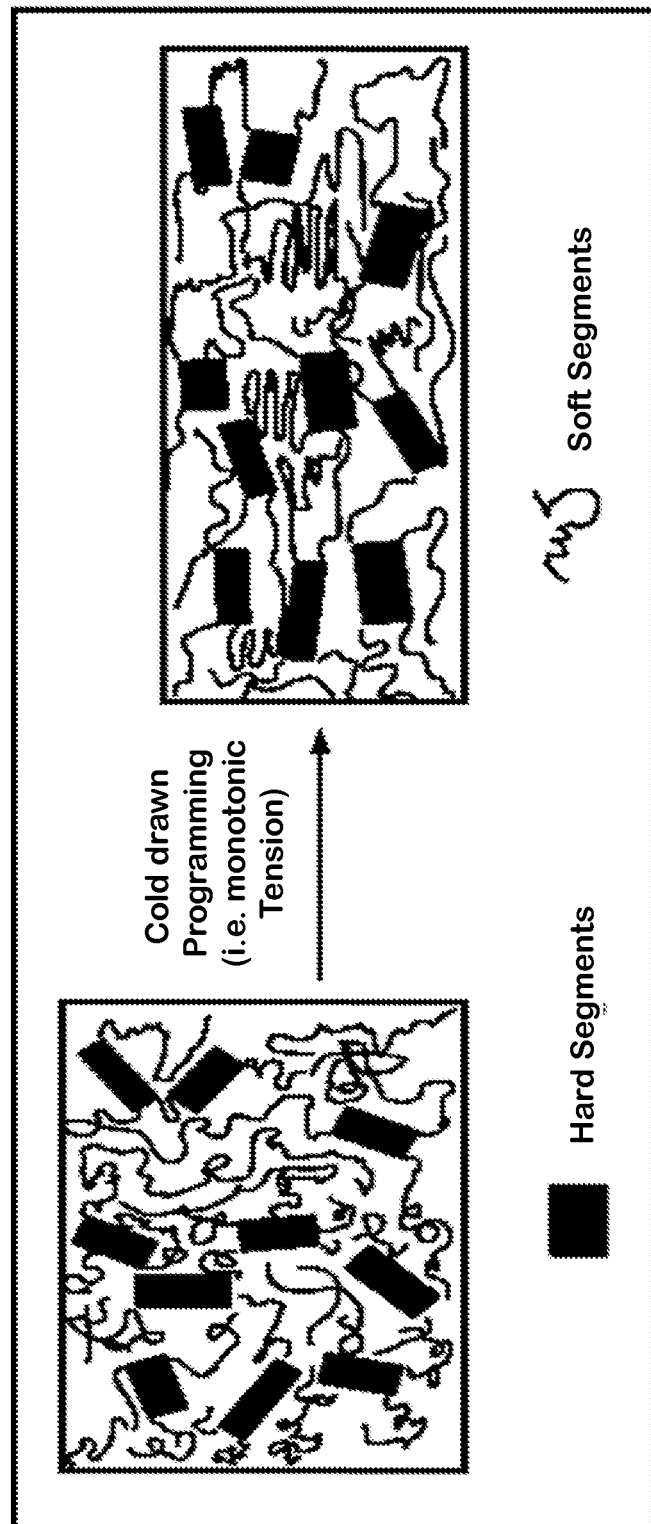

FIG. 24: Schematic representations of segments alignment and reorientation for SMPU fibers under monotonic tension.

Figure 25:
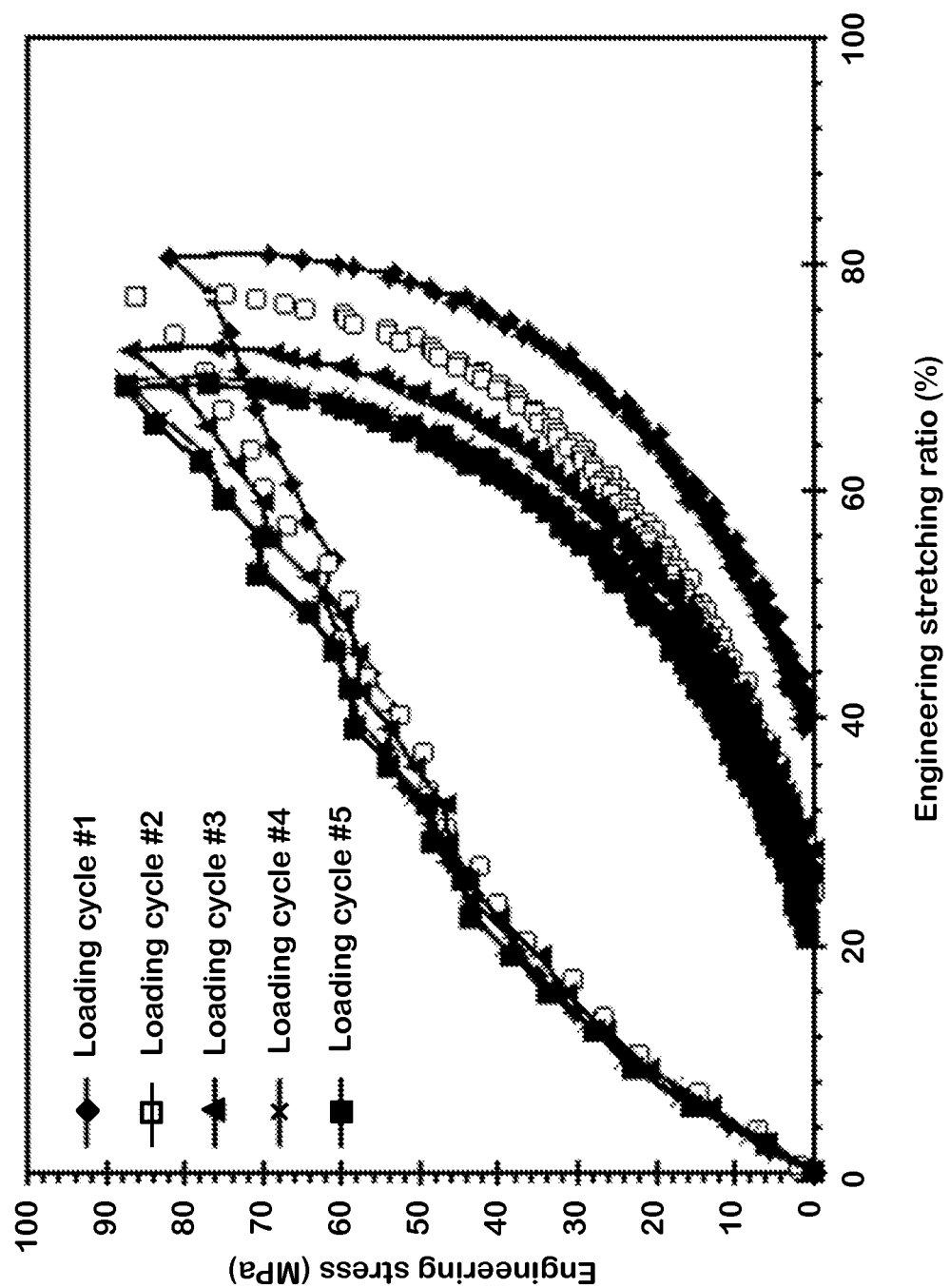

FIG. 25: Stress-strain plots for each loading cycle on SMPU fibers during the CDP process.

Figure 26:
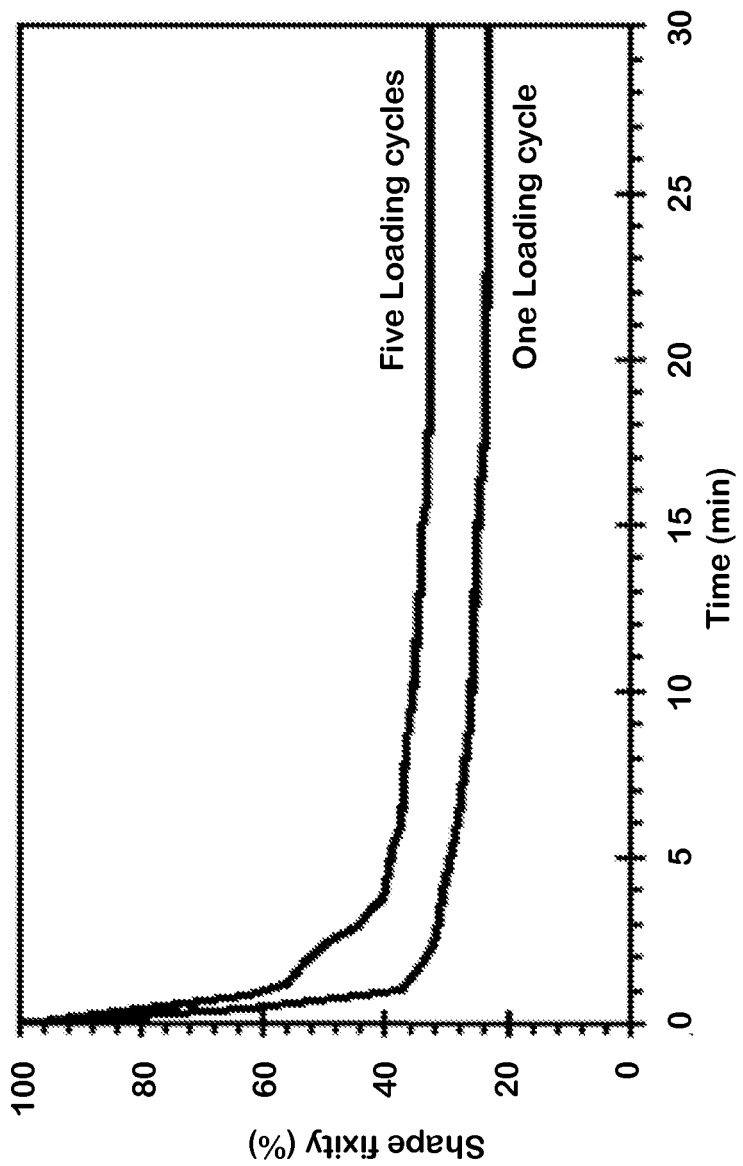

FIG. 26: Shape fixity for programmed SMPU fibers after one loading cycle and five loading cycles.

Figure 27:
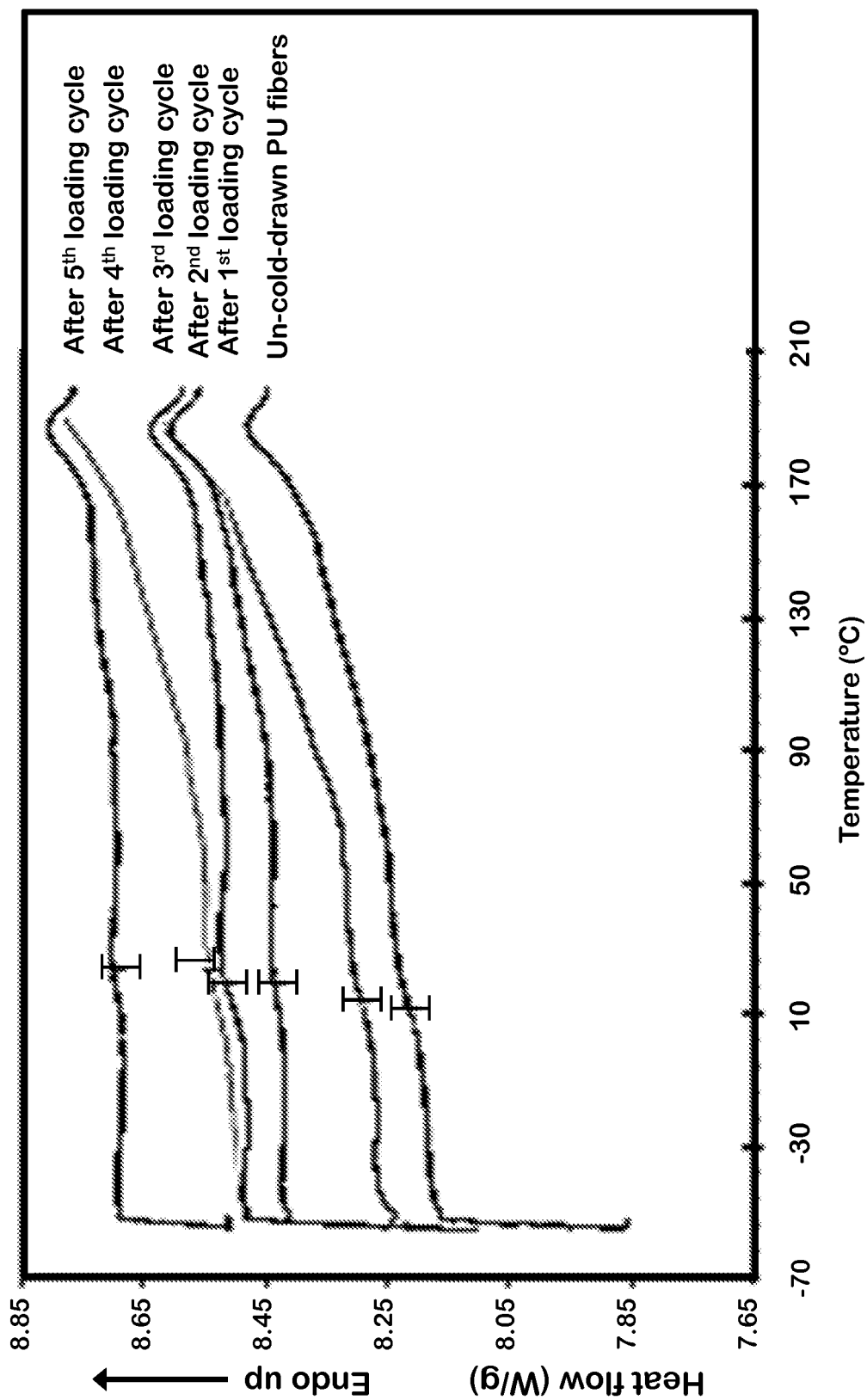

FIG. 27: DSC test results of SMPU fibers with varying cold-drawing cycles, with data curves, e.g. at 10° C., curves from lowest to highest: non-cold drawn SMPU fibers, $1S^r$ drawing cycle, rd drawing cycle, 3' drawing cycle, $4^{th}$ drawing cycle, $^{Stn}$ drawing cycle.

FT-IR results for both non-programmed and programmed SMPU fibers: FIG. 28A presents the infrared spectrum for the non-programmed and programmed fibers recorded from 600 $cm^{o1}$ to 4000 $cm^1$. To better visualize the data, the results shown in FIG. 28A is divided into three groups with data shown in FIGS. 28B-D: FIG. 28B FT-IR from 600 $cm^{o1}$ to 1700 $cm^{o1}$; FIG. 28C FT-IR from 1700 $cm^{o1}$ to 2700 $cm^{o1}$; FIG. 28D FT-IR from 2700 $cm^{o1}$ to 4000 $cm^{o1}$.

Schematic representation of stress recovery behavior for programmed SMPU fibers: FIG. 29A stress versus temperature; FIG. 29B) stress versus time including three stages (i.e., I, II, and III).

Figure 30:
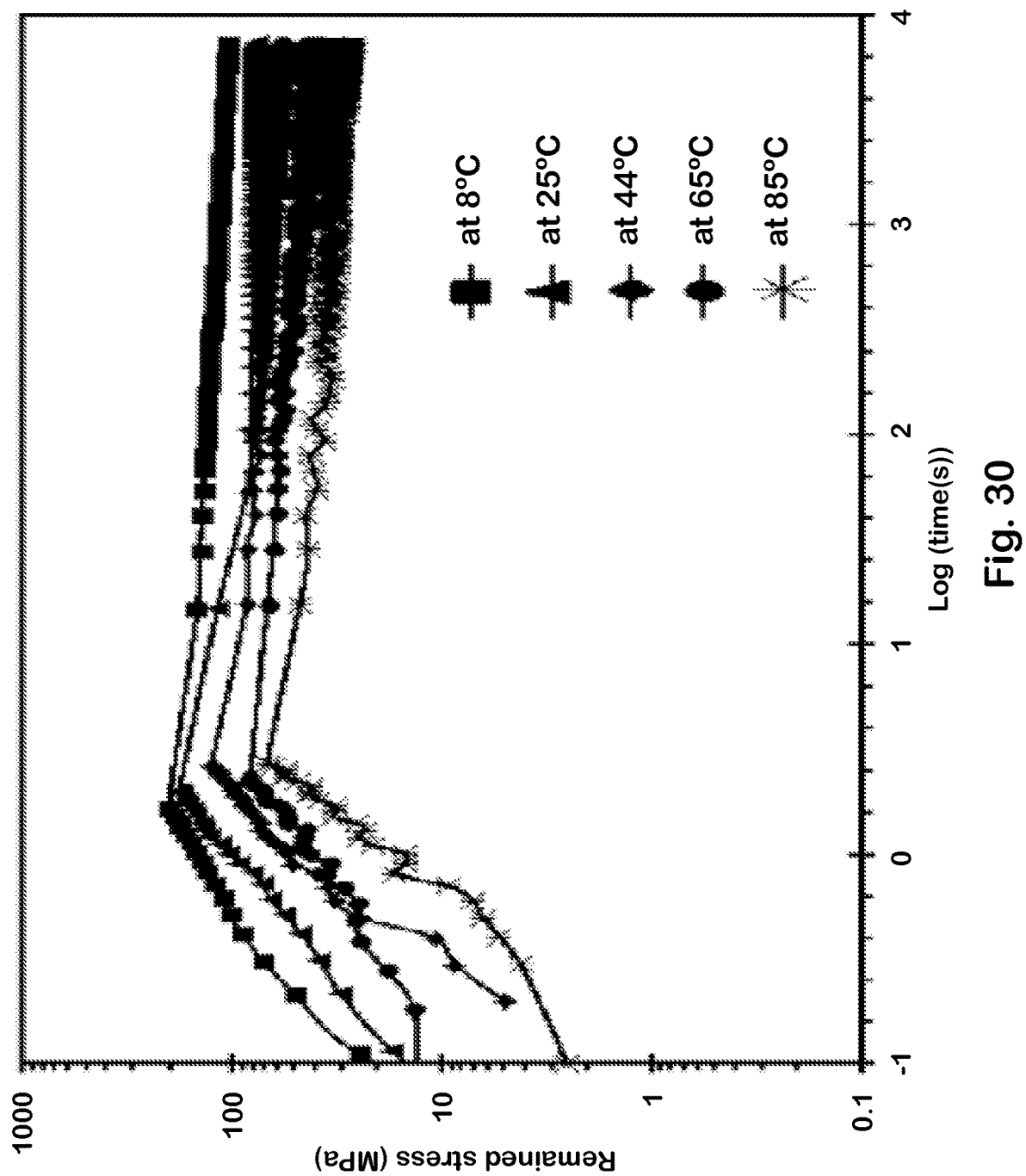

FIG. 30: Test results of stress relaxation behaviors of programmed fibers at various temperatures.

Figure 31:
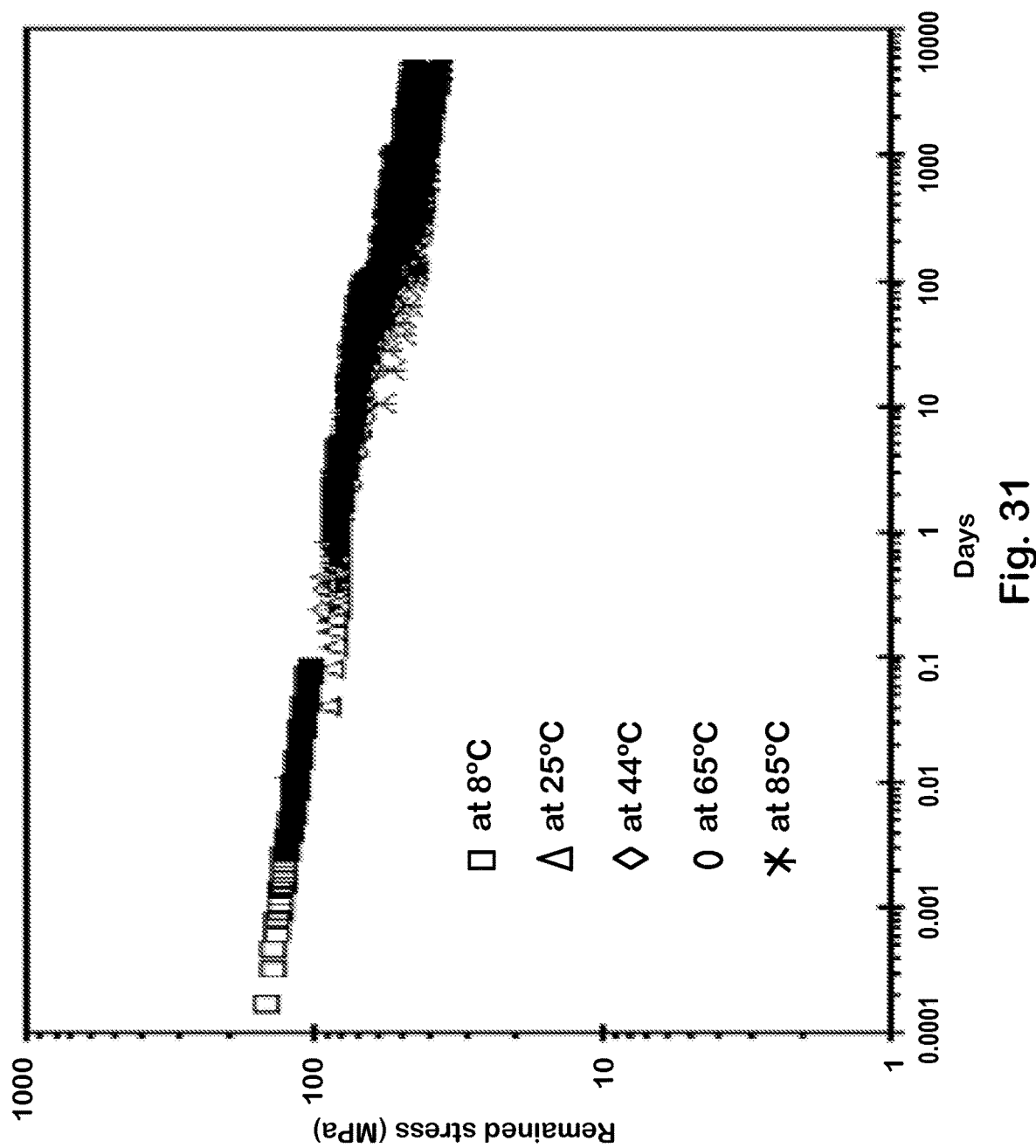

FIG. 31: The stress relaxation behavior at various temperatures was generated; master curves after being shifted along vertical and horizontal axis at the reference temperature (i.e., 8° C.). The master curves are shown somewhat superimposed. The figure shows that the stress could be relaxed over a long-term scale in thousands of days (i.e., 4800 days, which is over 13 years).

Figure 32:
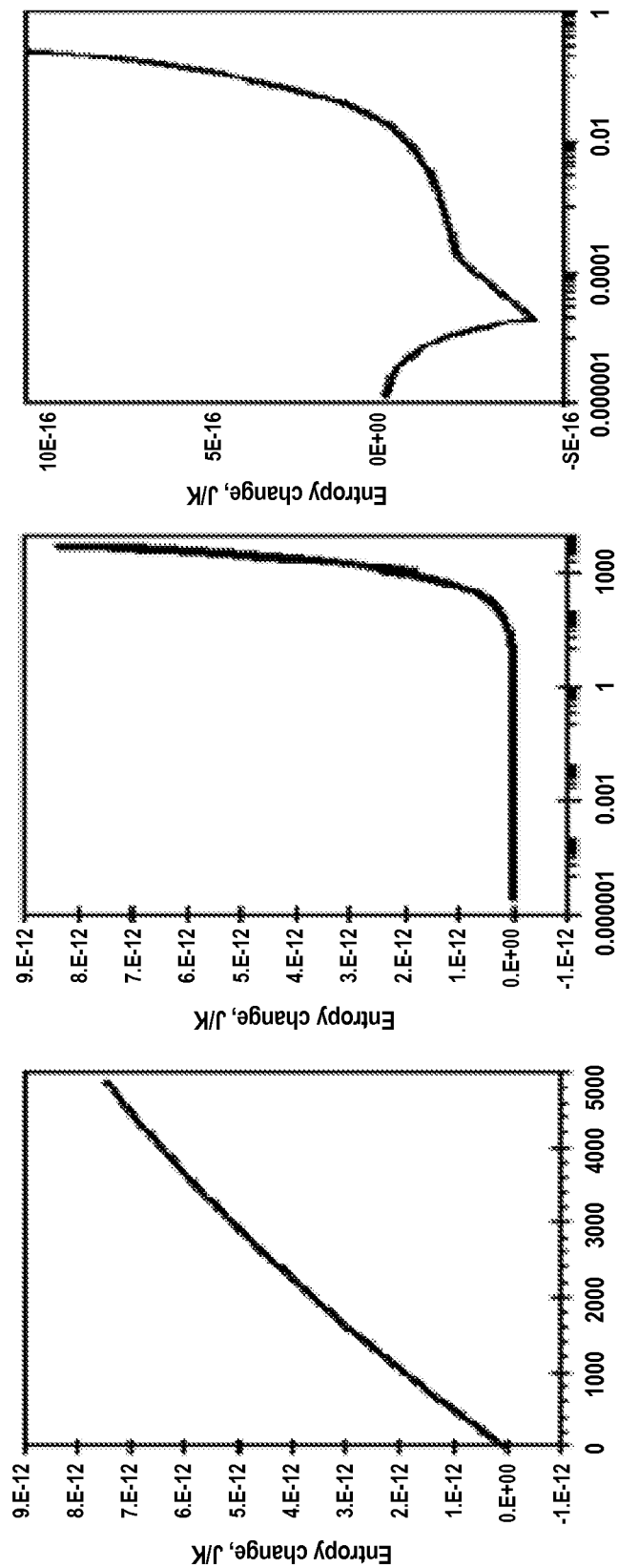

Conformational entropy change at 25° C. along with stress relaxation in a time-scale of days: FIG. 32A entropy change in a normal time scale; FIG. 32B entropy change in a log time scale for long term; FIG. 32C entropy change in a log time scale within one day.

Figure 33:
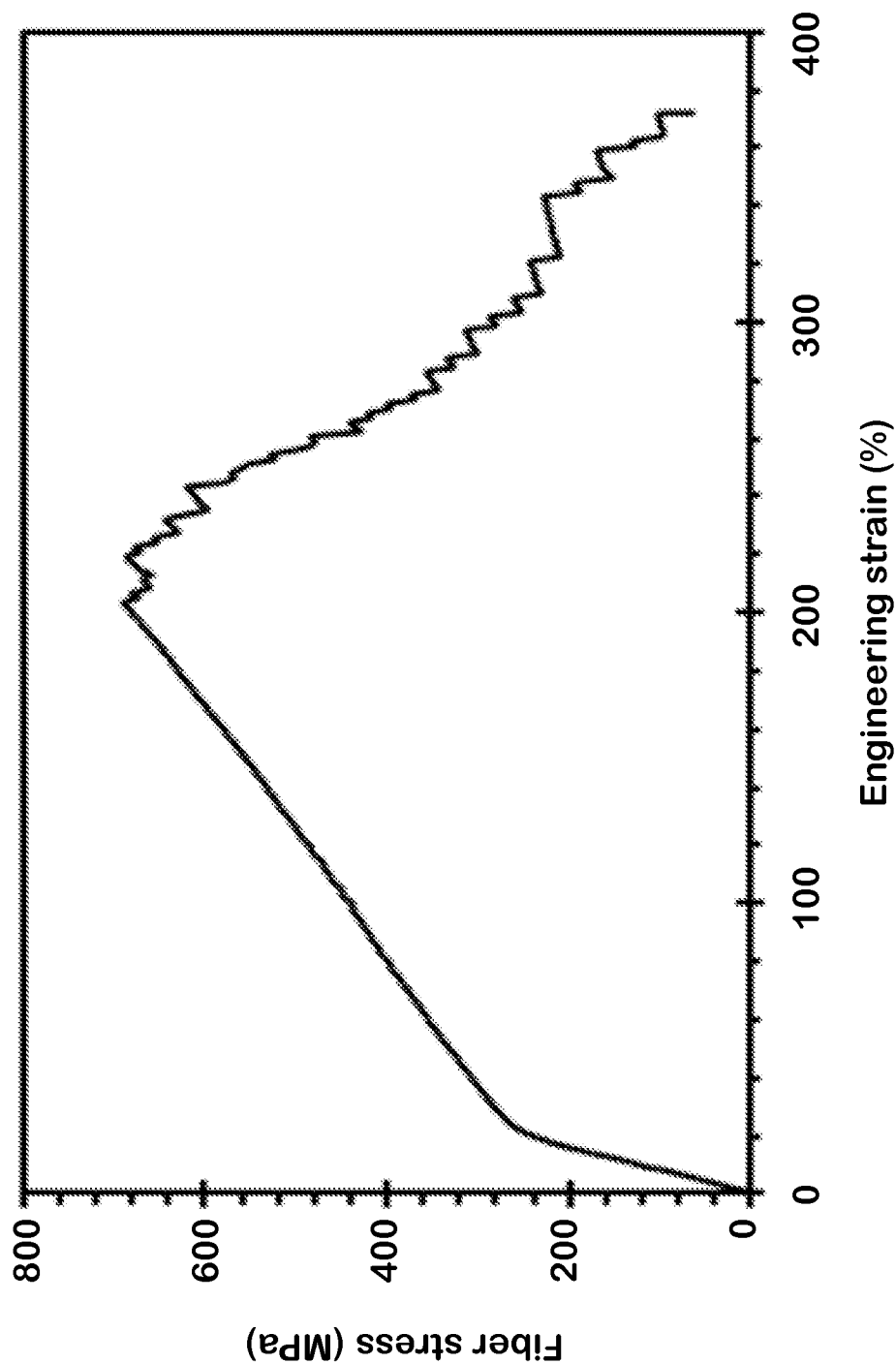

FIG. 33: The room temperature stress-strain behavior of the SMPU fiber after programming by pre-stretch ratio of 100%.

Figure 34:
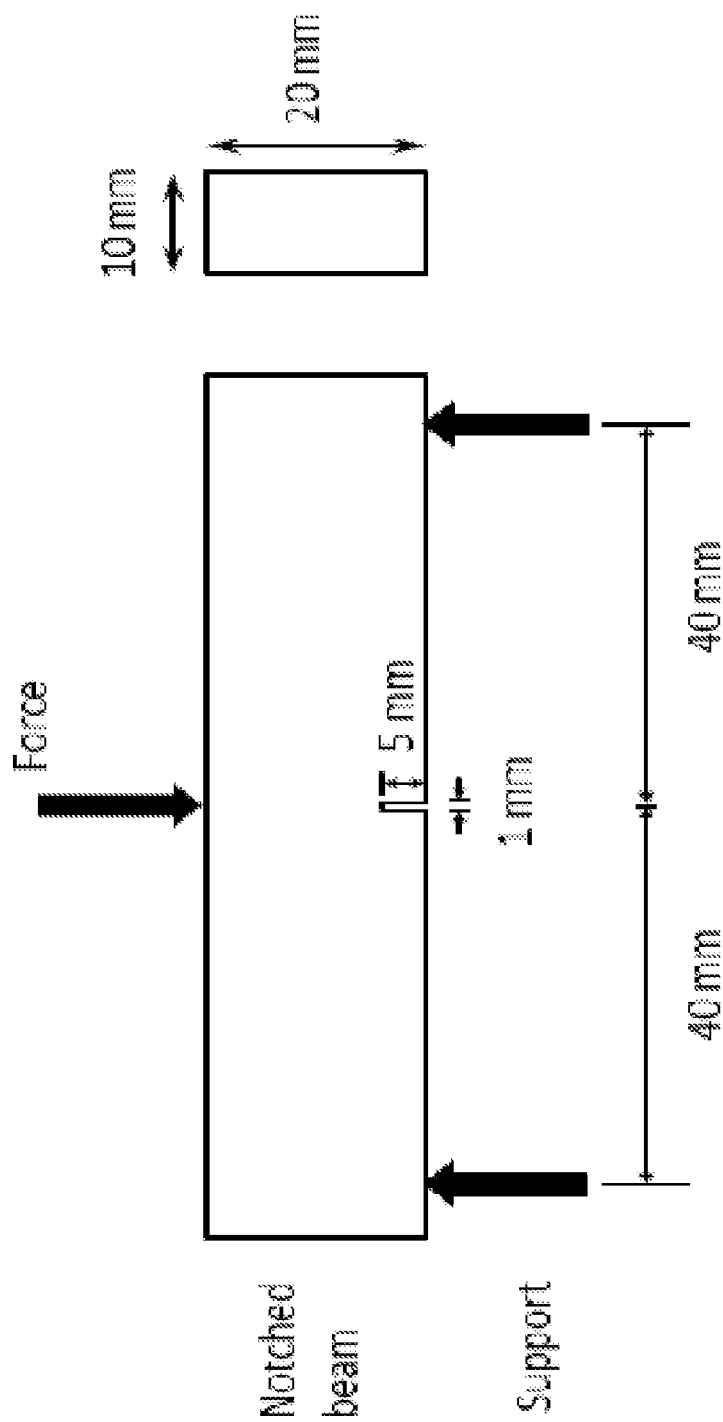

FIG. 34: Schematic explanation of the specimen and three-point bending test set-up.

Figure 35:
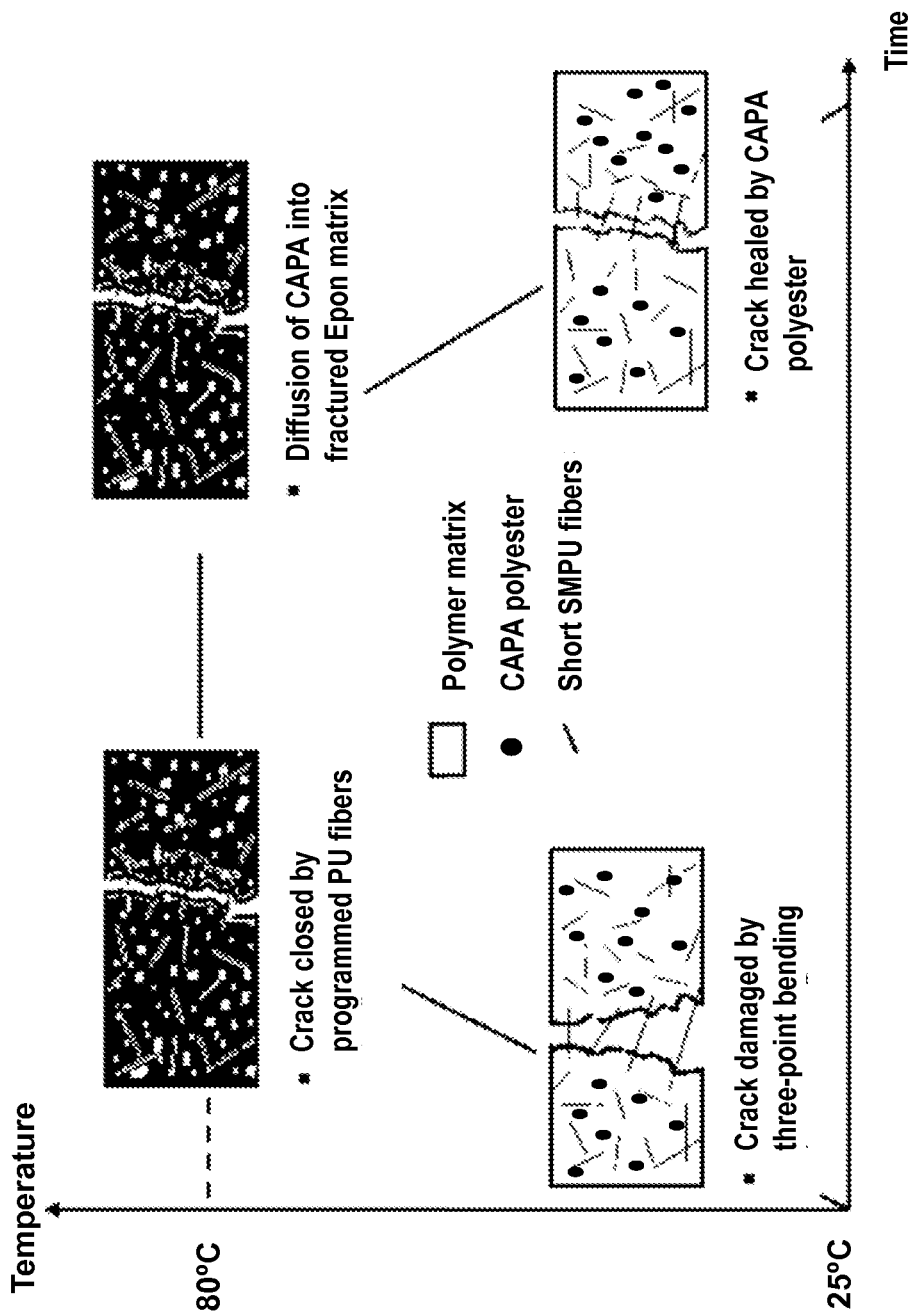

FIG. 35: Schematic of the two-step healing process (i.e., close-then-heal (CTH)) on a fractured short-SMPU-fiber-reinforced beam specimen.

Figure 36:
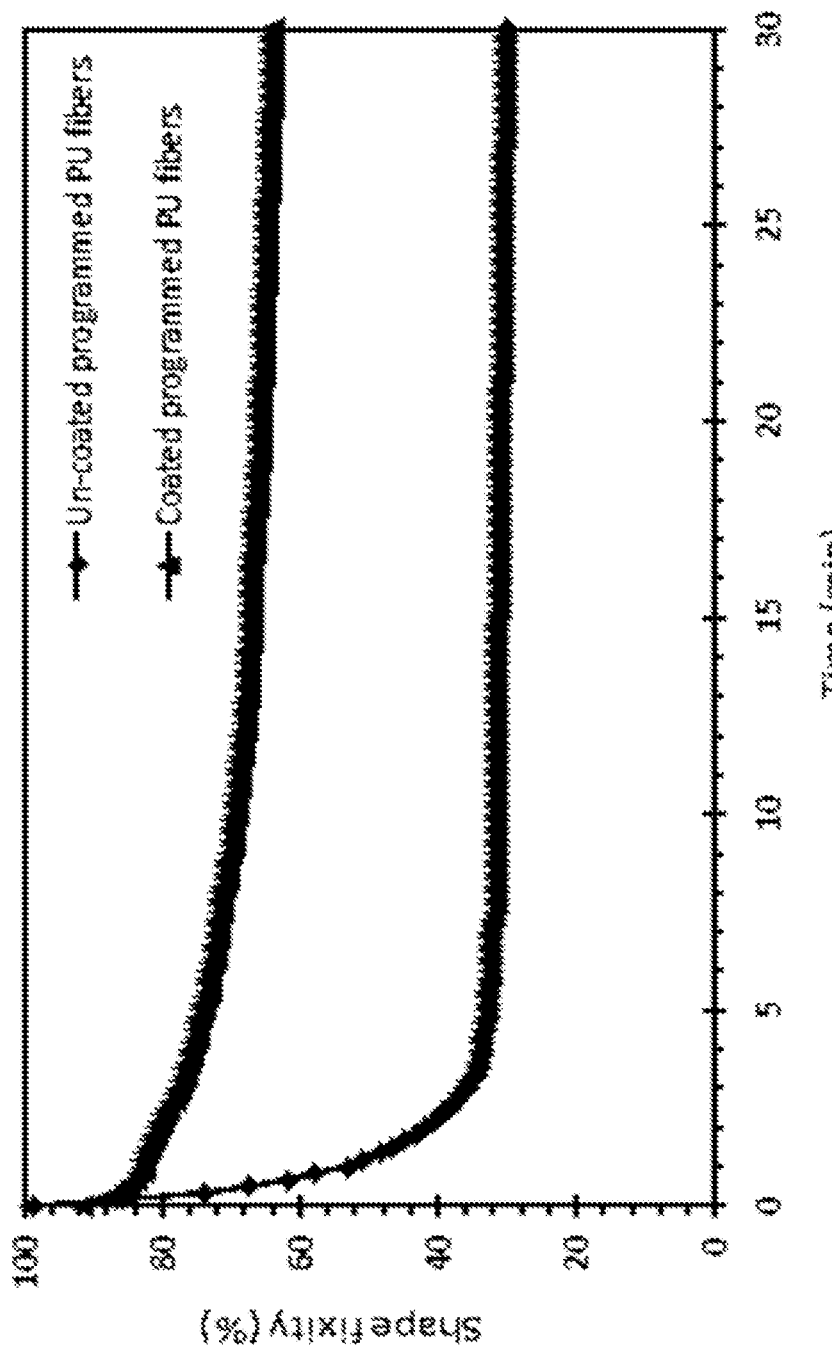

FIG. 36: Shape fixity for uncoated and coated programmed SMPU fibers at room temperature (about 21° C.).

Figure 37:
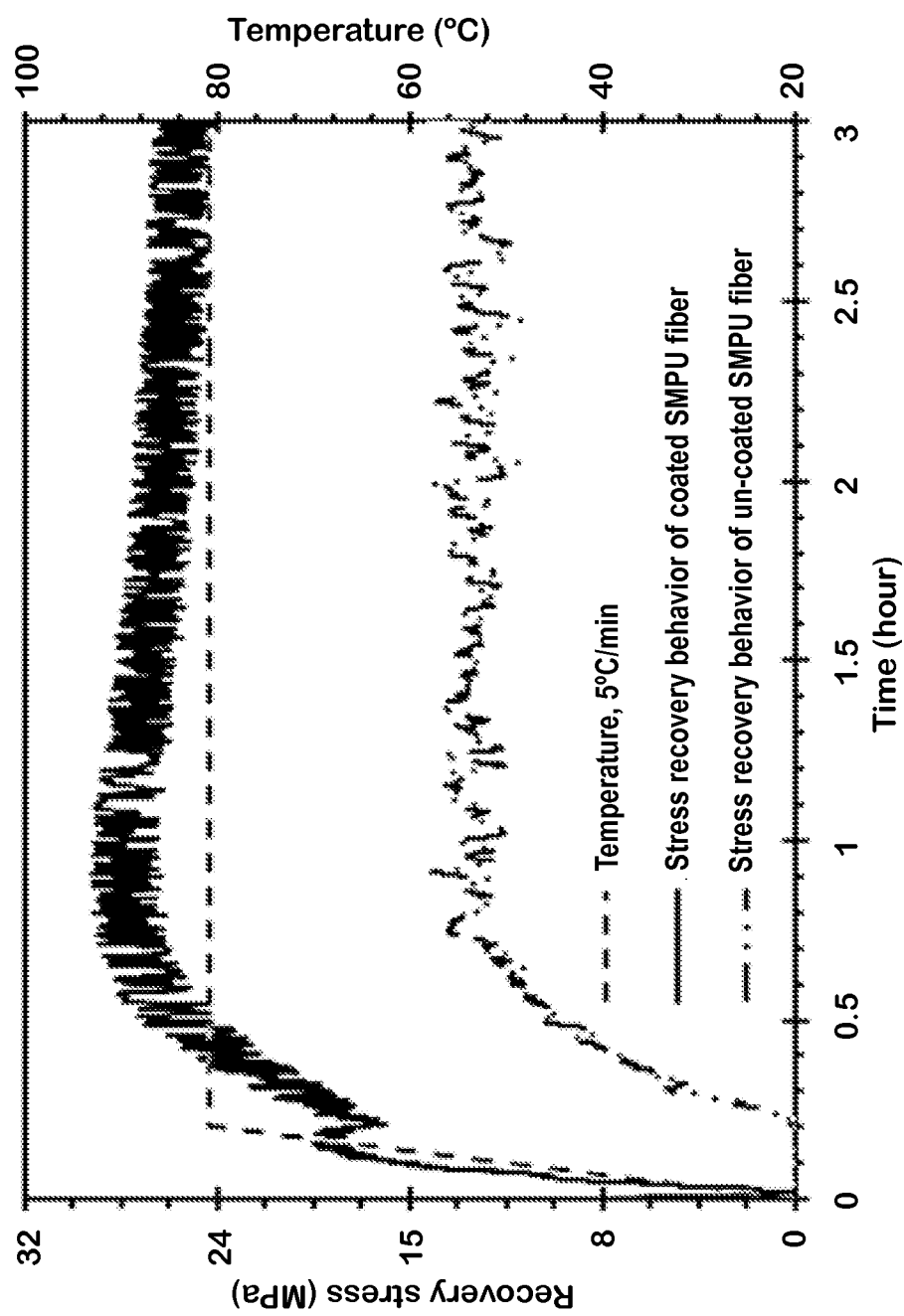

FIG. 37: Stress recovery behavior of coated programmed SMPU fiber under temperatures from room temperature (about 21° C.) to 80° C.

Figure 38:
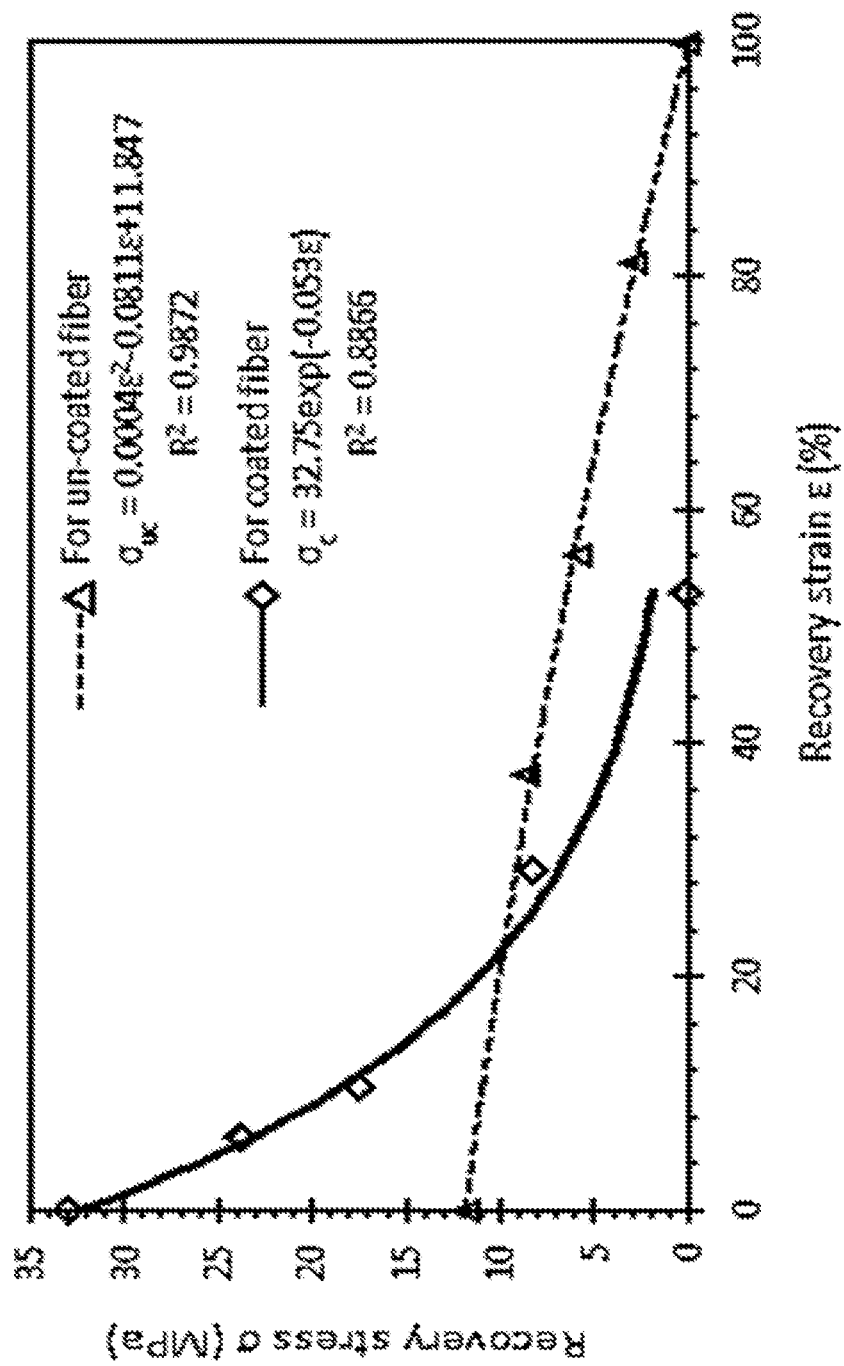

FIG. 38: Recovery stress—recovery strain behavior of the coated and uncoated SMPU fibers recovered at 80° C. with varying level of constraints.

Thermal properties from DSC results: FIG. 39A programmed short SMPU-fiber reinforced composite; FIG. 39B coated programmed SMPU fiber only; FIG. 39C plastic particle only; FIG. 39D Epon matrix only.

Figure 40:
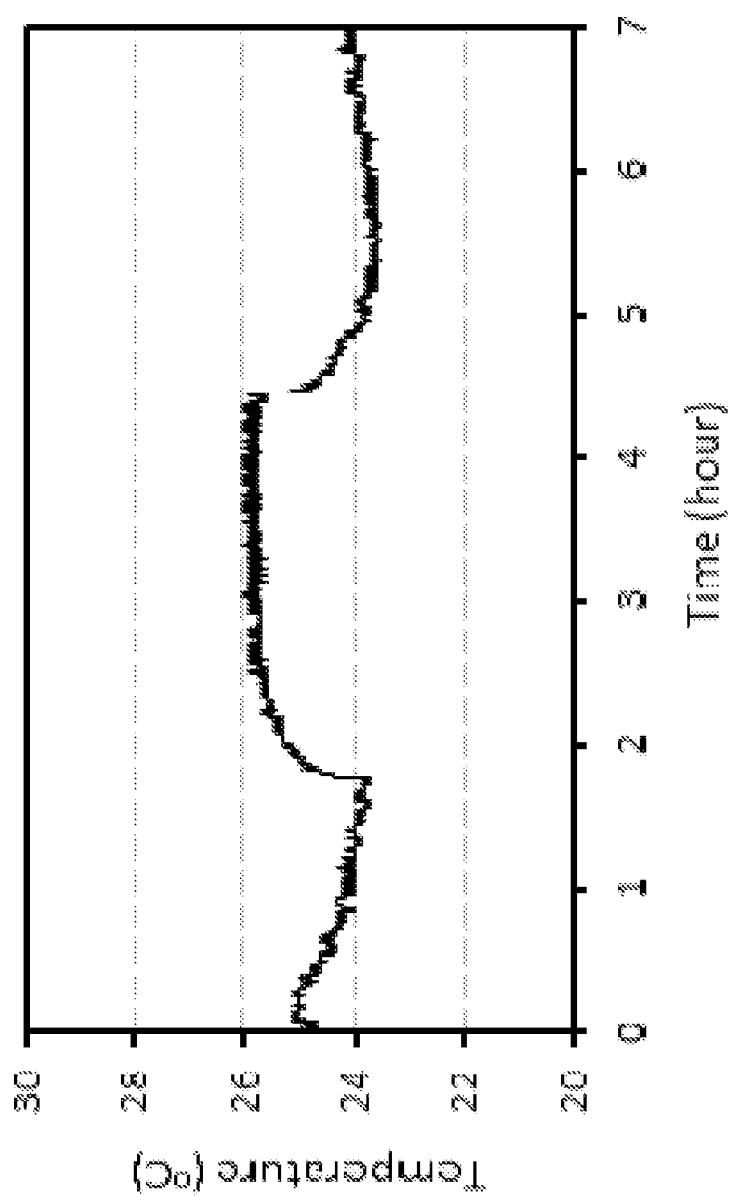

FIG. 40: Heat released during the process of the curing of Epon resin with Diethylenetriamine.

Figure 41:
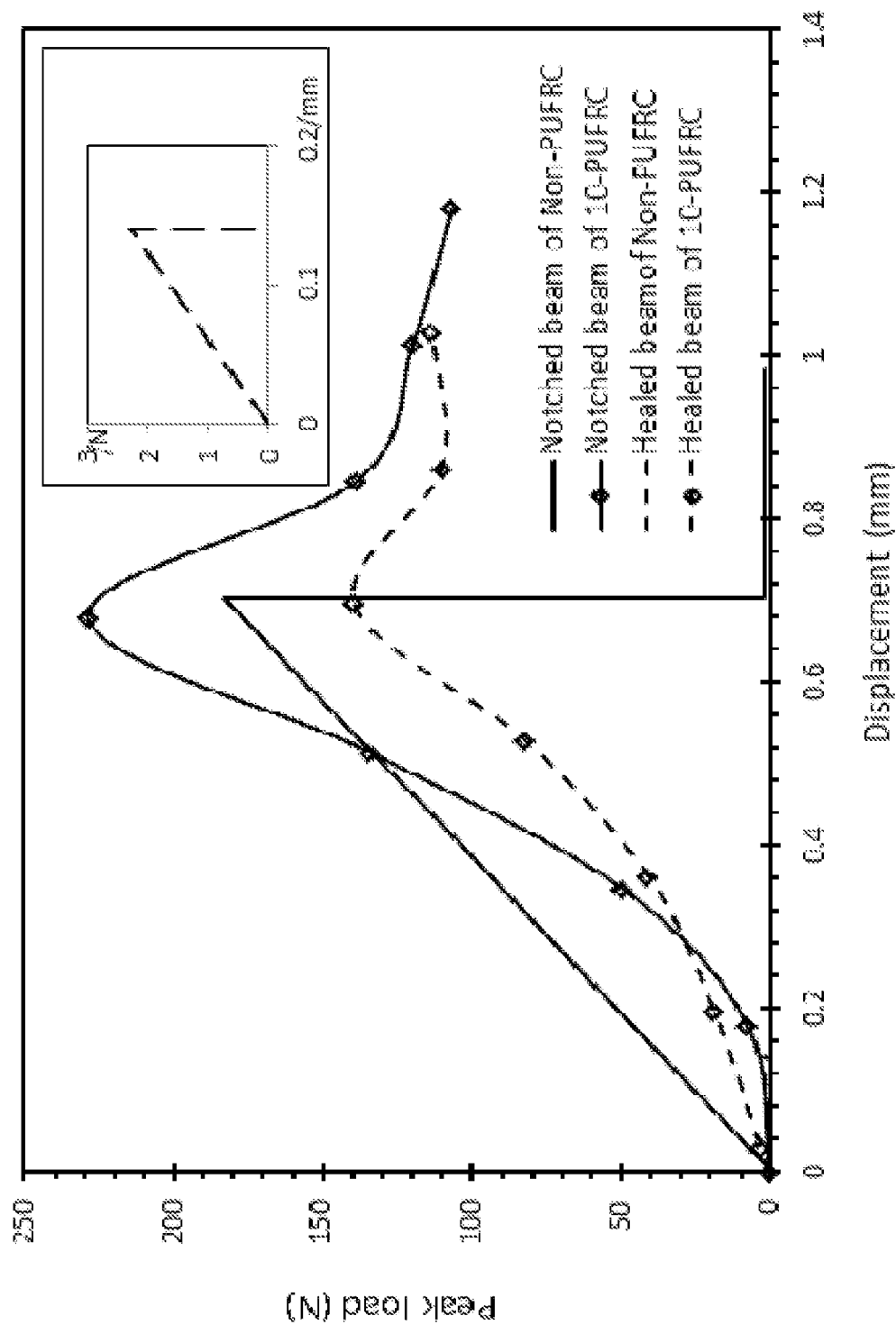

FIG. 41: Typical load-deflection curves of notched and healed (after first CTH program) specimens.

Figure 42A:
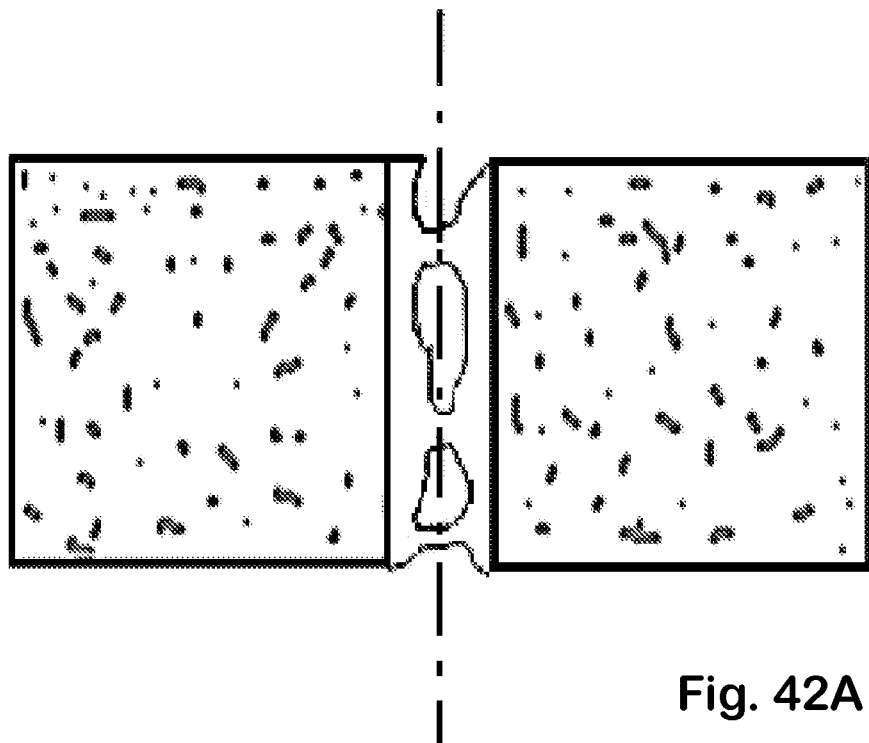

Healed crack interfaces for beams: FIG. 42A without SMPU fiber reinforcement and FIG. 42B with SMPU fiber reinforcement (F(x) is the recovered force exerted by the programmed short SMPU fiber reinforcement).

Figure 43:
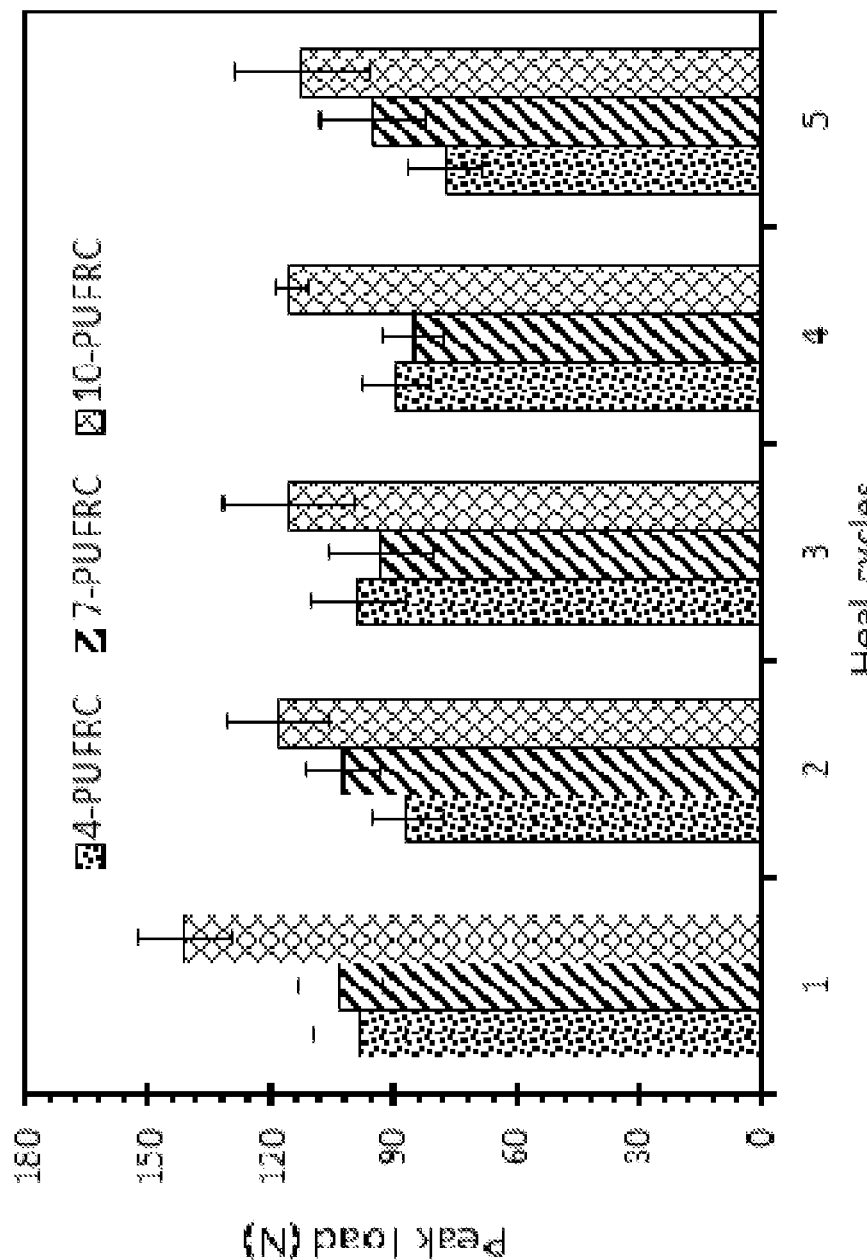

FIG. 43: Peak bending load with healing cycles for short programmed SMPU fiber reinforced composite beam with different fiber length. (4-PUFRC=stippled, -PUFRC=diagonal lines, 10-PUFRC=diamond shapes)

Figure 44A:
Figure 44B:
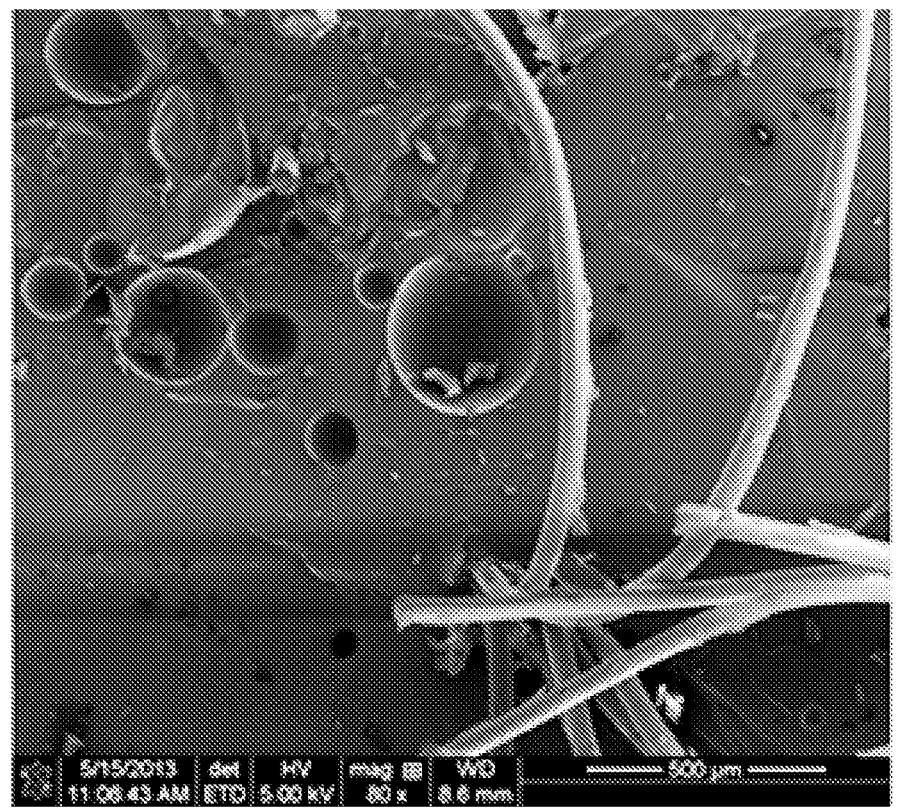
Figure 44C:
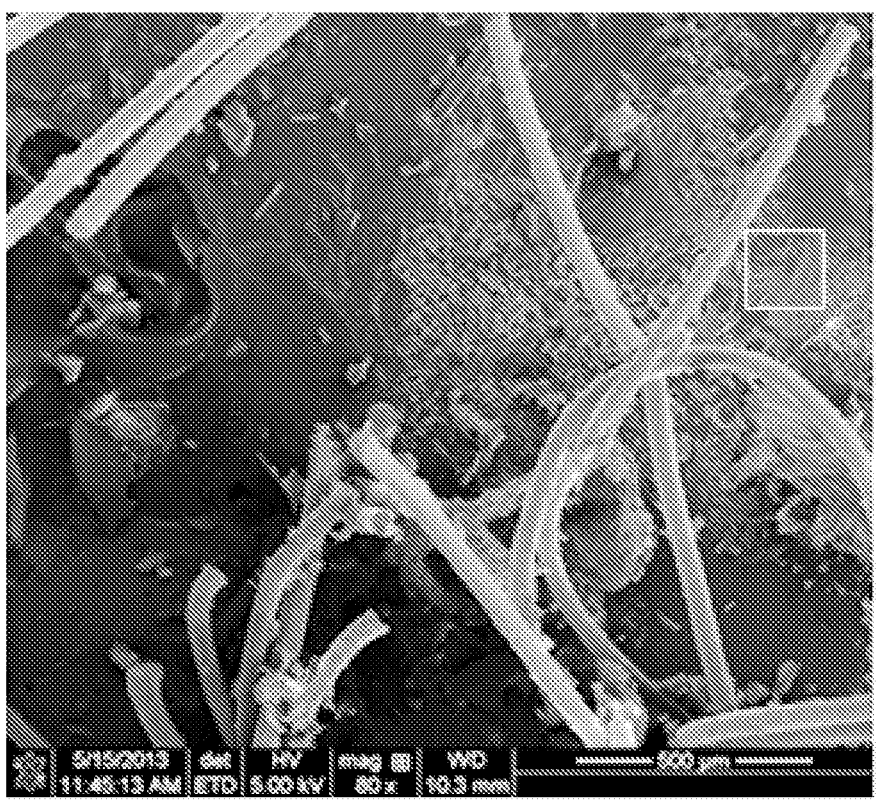
Figure 44D:
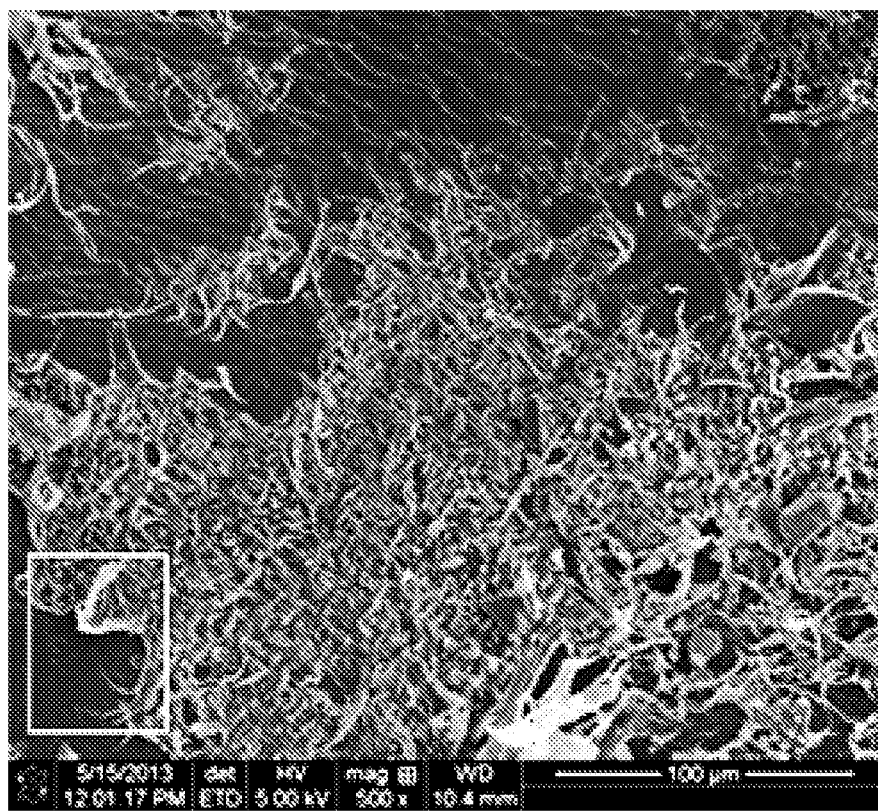
Figure 44E:
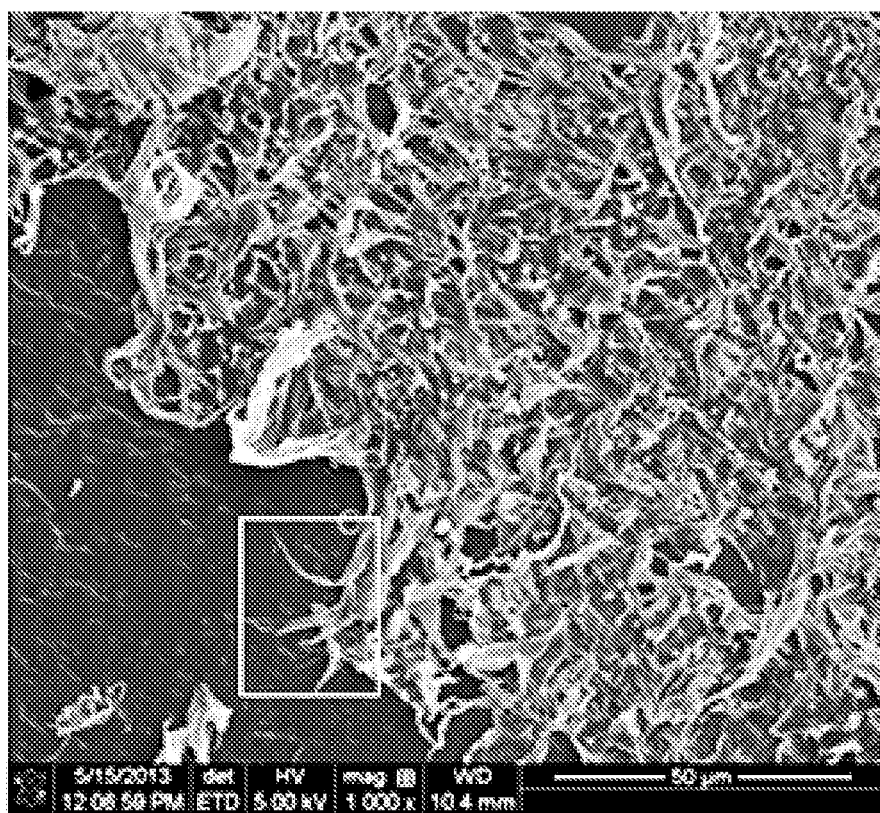
Figure 44F:
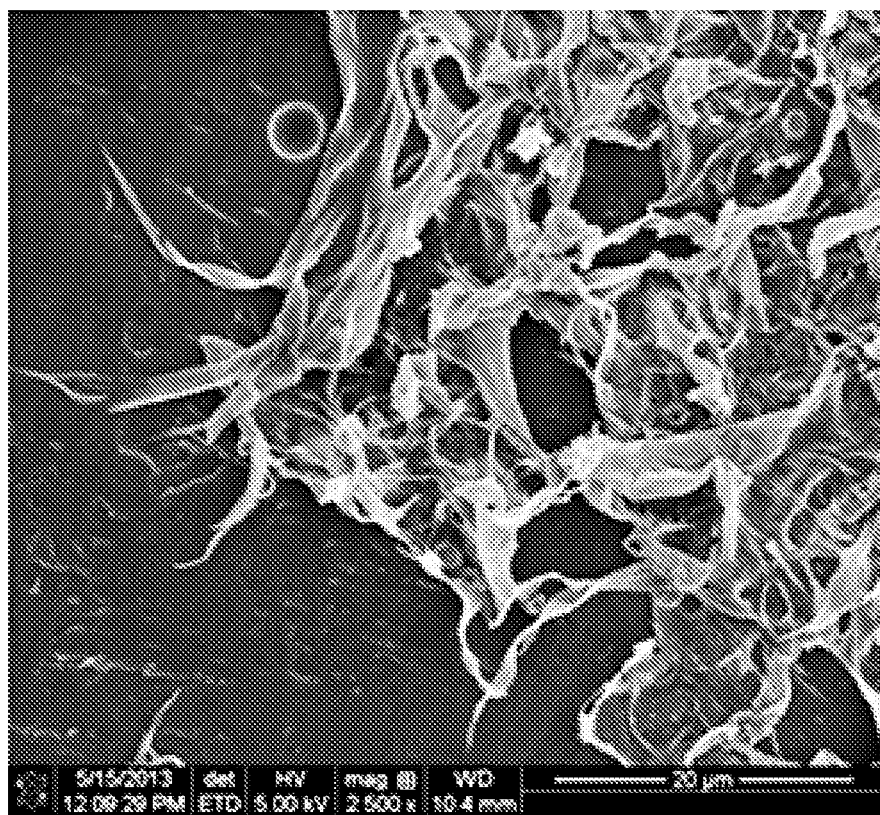

The SEM fractography for three-point bending damaged beam after first fracture: FIG. 44A and FIG. 44B and after fifth fracture FIGS. 44C-F.

Figure 45:
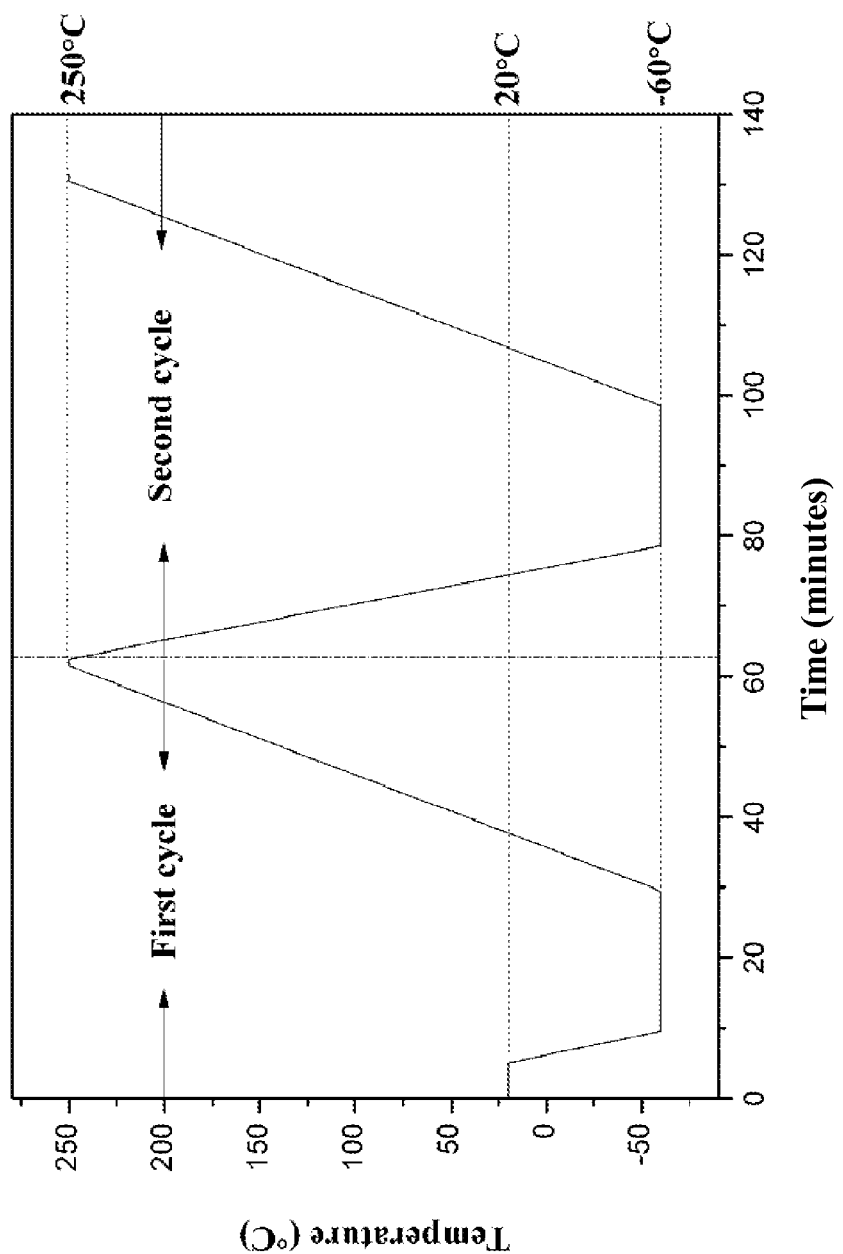

FIG. 45: Thermal protocol used for the DSC experiments.

Figure 46:
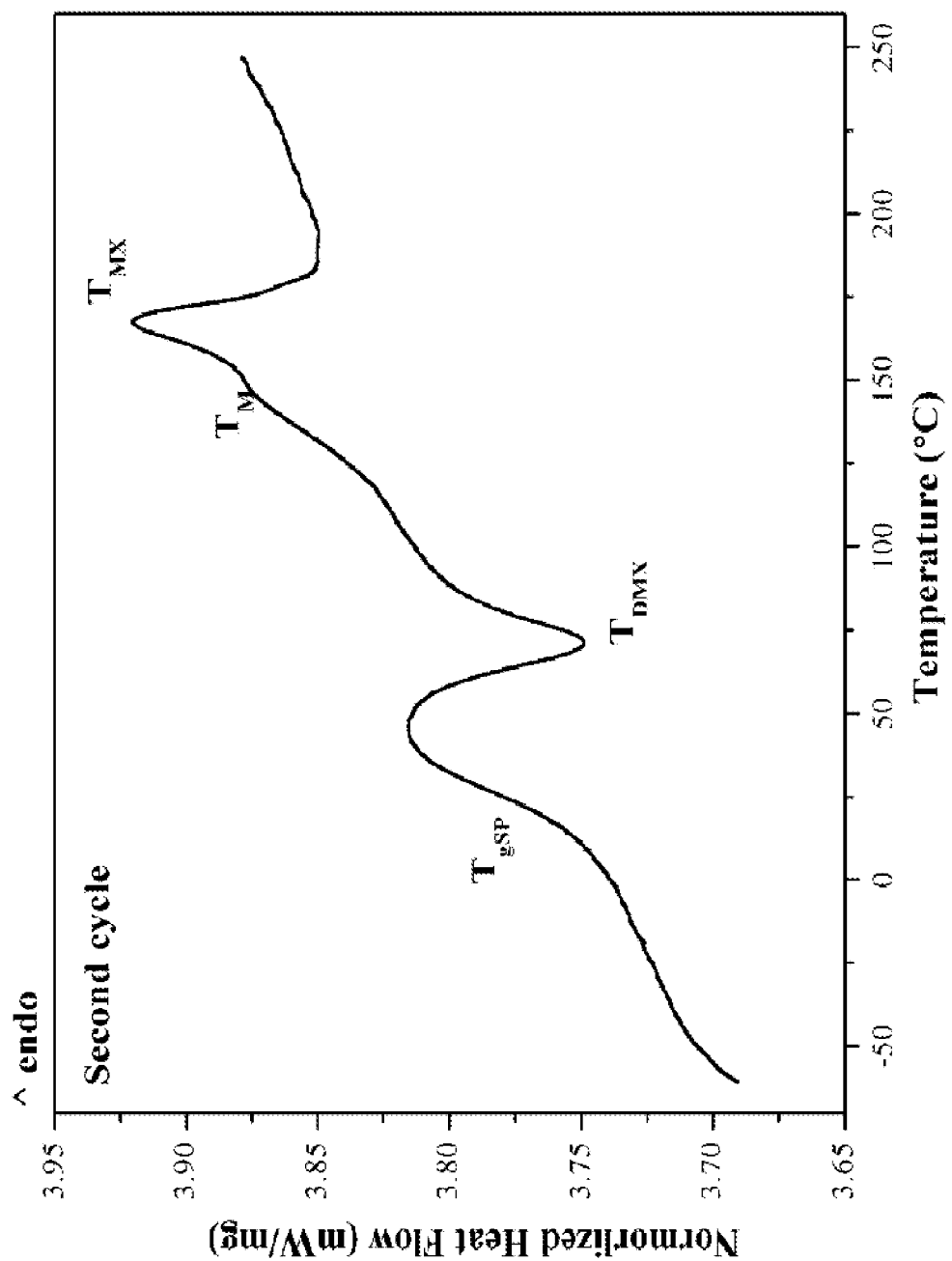

FIG. 46: Second cycle DSC curve.

Figure 47A:
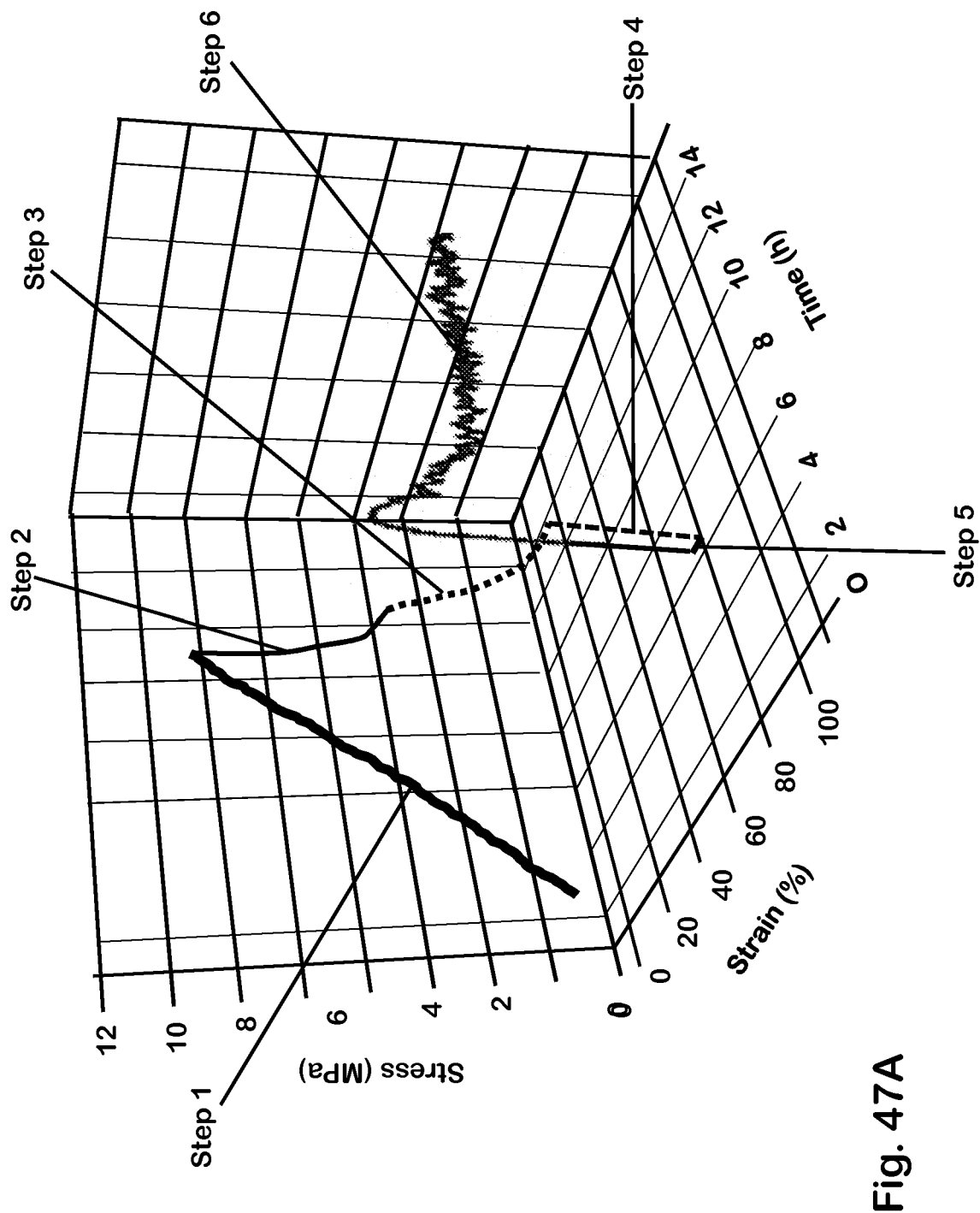
Figure 47B:
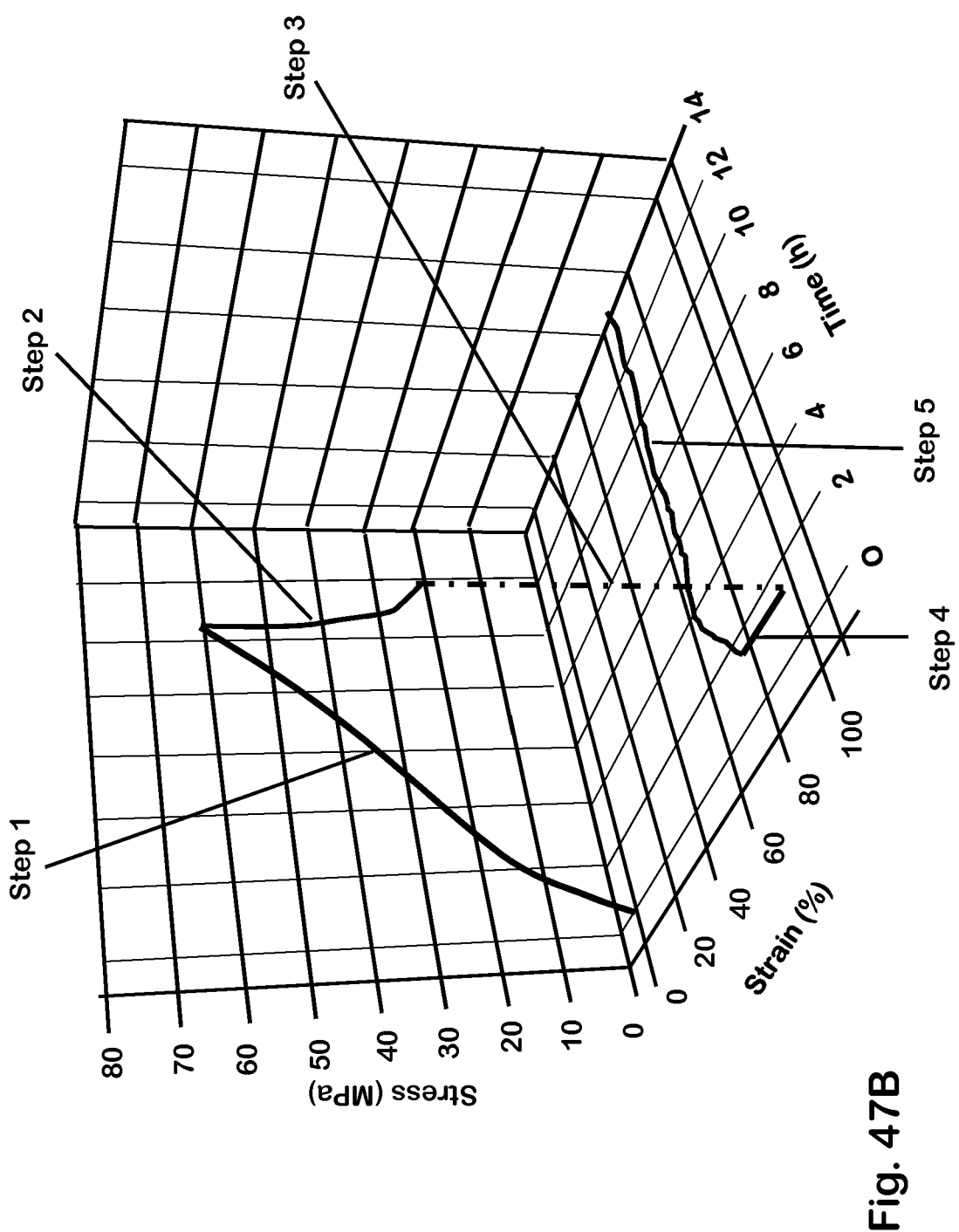

Stress-Strain-Time 3-D plots for the programming-recovery cycle: FIG. 47A: Sample #2. Steps 1-5 complete programming and Step 6 completes fully constrained stress recovery. Step 1: Stretch the fiber bundle to 100% at a rate of 2 mm/min at 100° C.; Step 2: Hold the fiber bundle for 1 hour at 100° C. while maintain the 100% strain; Step 3: Cool the fiber to room temperature while holding the strain constant; Step 4: Unload the fiber bundle from fixtures; Step 5: Relax the fiber in stress free condition until the shape is stabilized; Step 6: Recover the fiber at 150° C. in fully constrained condition. FIG. 47B: Sample #3. Steps 1-4 complete programming and the Step 5 completes fully constrained stress recovery. Step 1: Stretch the fiber bundle to 100% at a rate of 2 mm/min at room temperature; Step 2: Hold the fiber bundle for 1 hour while maintain the 100% strain; Step 3: Release the fiber bundle from fixtures; Step 4: Relax the fiber in stress free condition until the shape is stabilized; Step 5: Recover the fiber at 150° C. in fully constrained condition.

Figure 48:
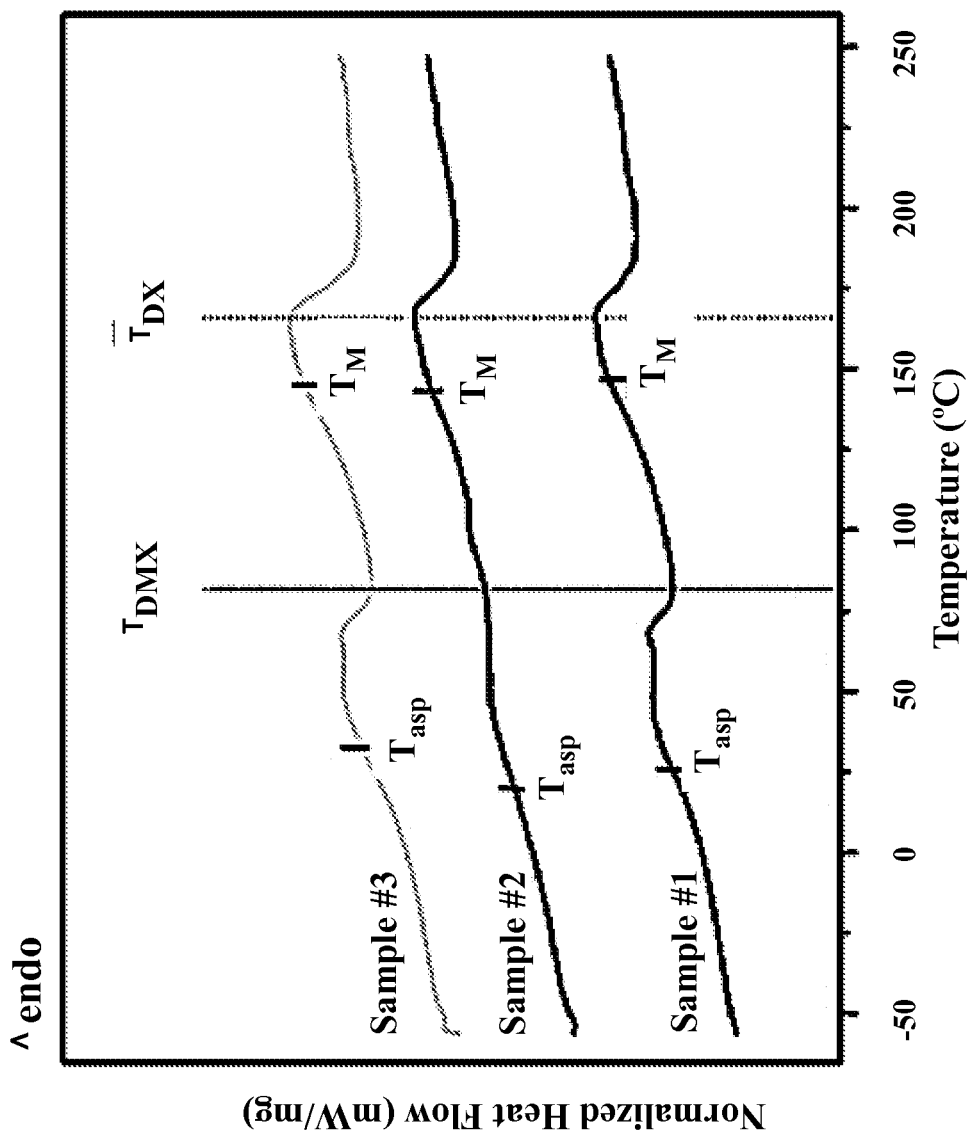

FIG. 48: First cycle DSC curves of Sample #1, Sample #2 and Sample #3.

Figure 49A:
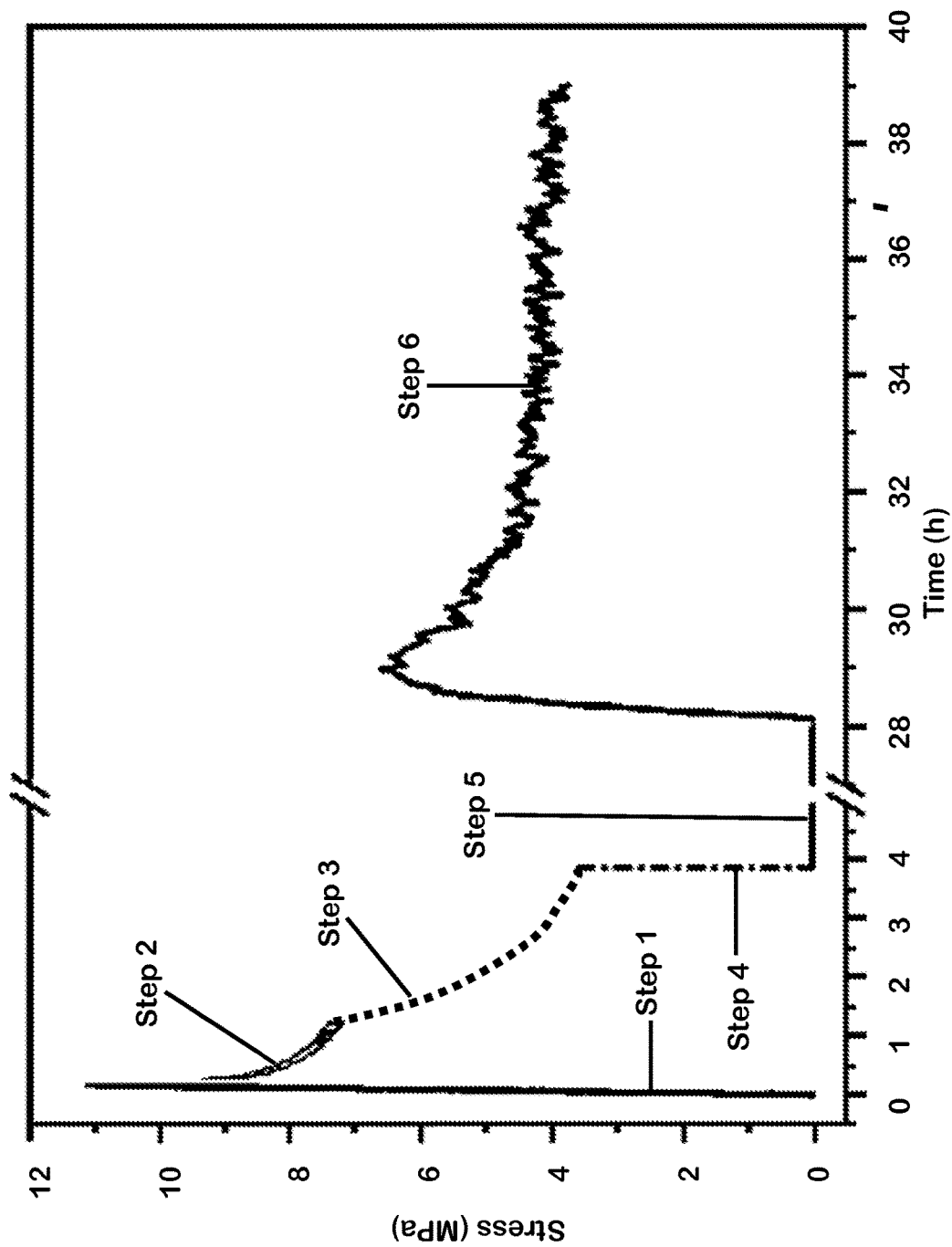
Figure 49B:
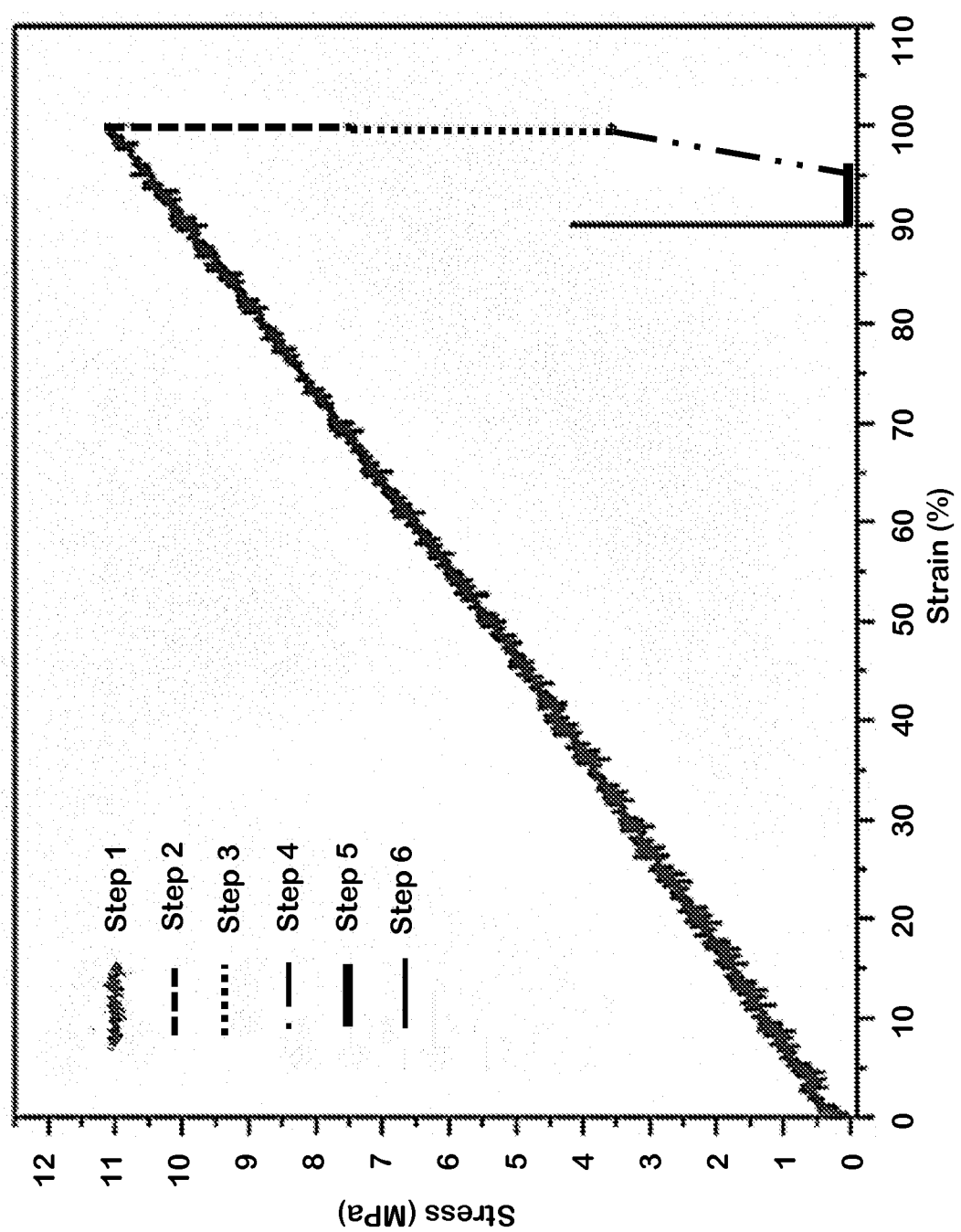

2-D plots for the programming-recovery cycle of Sample #2: FIG. 49A Stress-Time 2-D plot. FIG. 49B Stress-Strain 2-D plot. Step 1: Stretch the fiber bundle to 100% at a rate of 2 mm/min at 100° C.; Step 2: Hold the fiber bundle for 1 hour at 100° C. while maintain the 100% strain; Step 3: Cool the fiber to room temperature slowly while holding the strain constant; Step 4: Unload the fiber bundle from fixtures; Step 5: Relax the fiber in stress free condition for 24 hours; Step 6: Recover the fiber at 150° C. in fully constrained condition.

Figure 50A:
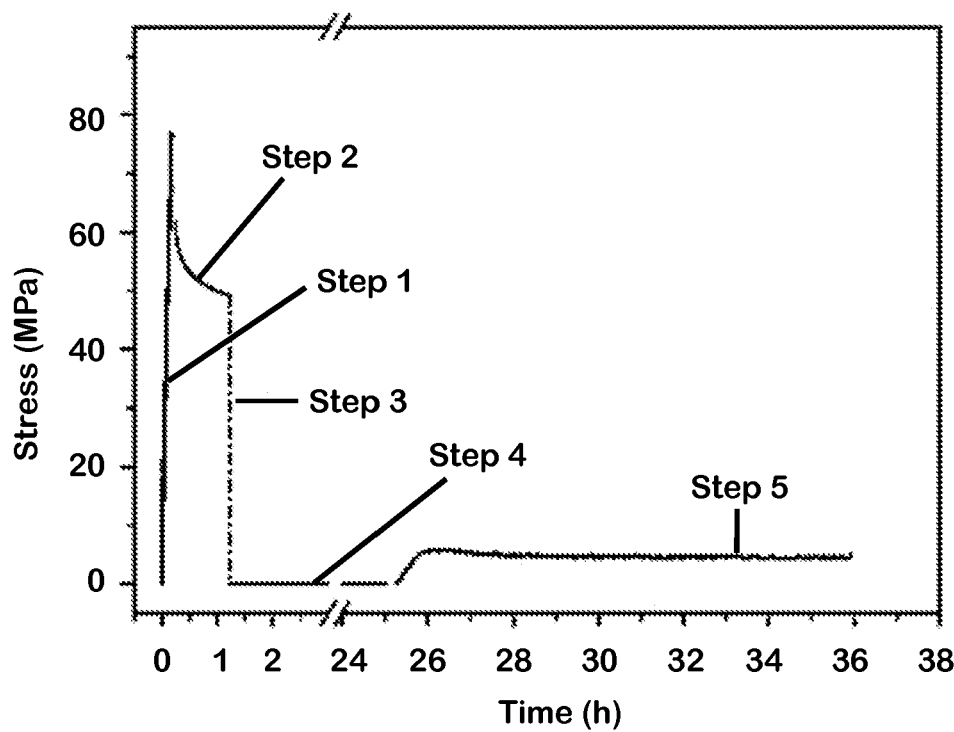
Figure 50B:
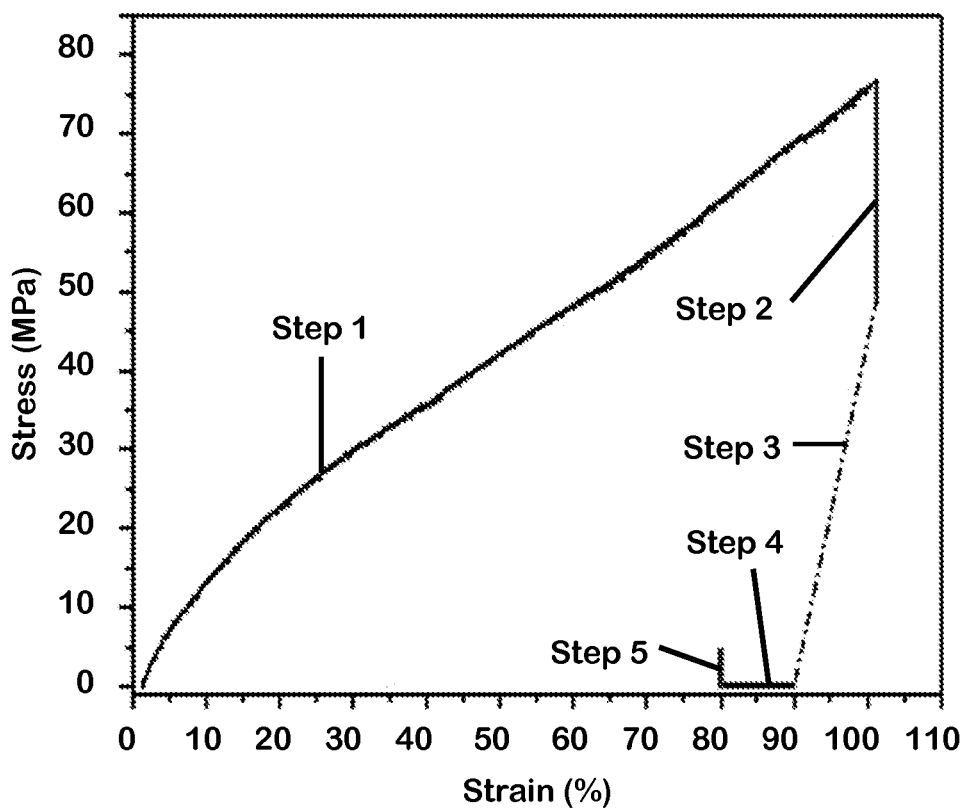

2-D plots for the programming-recovery cycle of Sample #3: FIG. 50A Stress-Time 2-D plot. FIG. 50B Stress-Strain 2-D plot. Step 1: Stretch the fiber bundle to 100% at a rate of 2 mm/min at room temperature; Step 2: Hold the fiber bundle for 1 hour while maintain the 100% strain; Step 3: Release the fiber bundle from fixtures; Step 4: Relax the fiber in stress free condition for 24 hours; Step 5: Recover the fiber at 150° C. in fully constrained condition.

Figure 51:
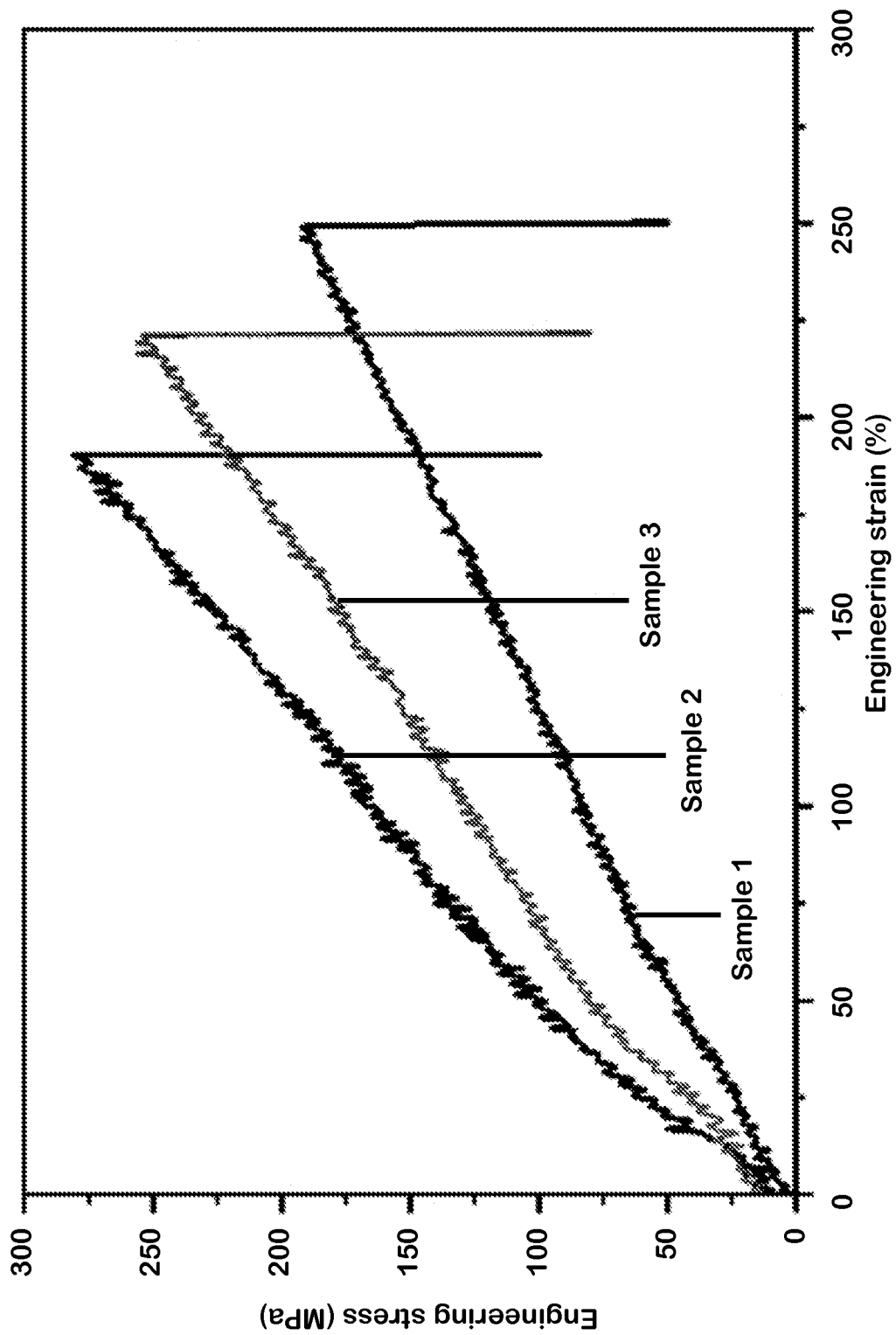

FIG. 51: Uniaxial tensile tests of three different samples (Sample #1, Sample #2 and Sample #3).

Figure 52A:
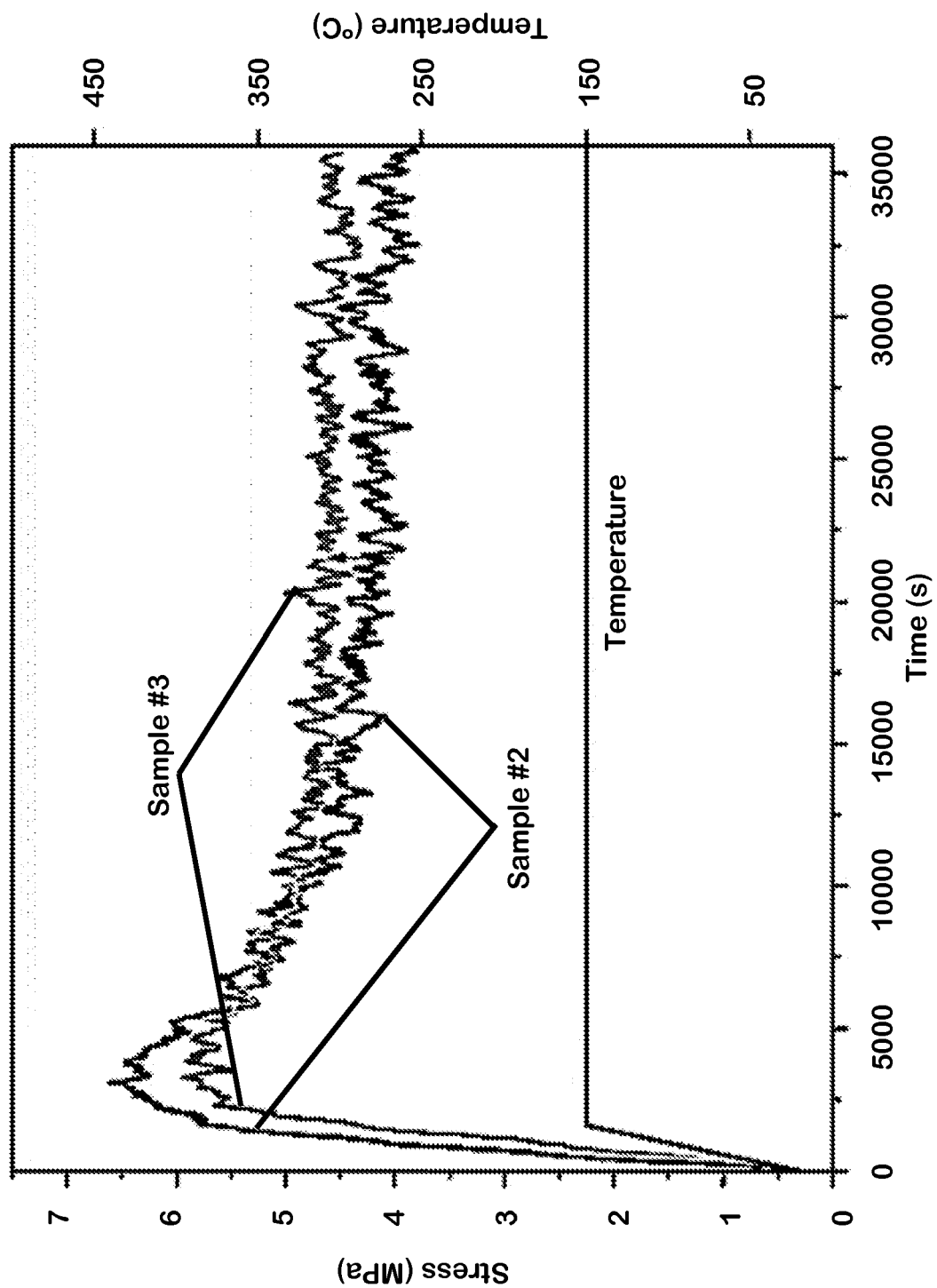
Figure 52B:
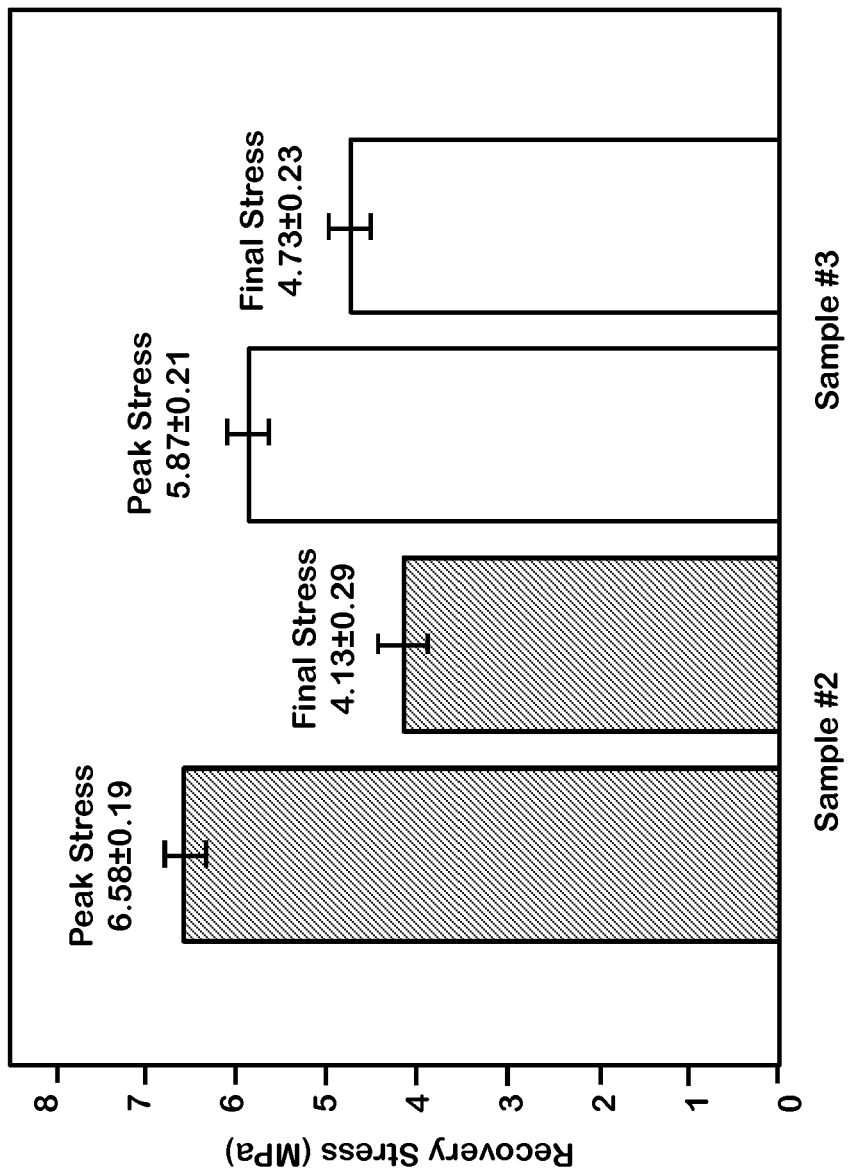

FIG. 52A: Typical stress recovery test results of Sample #2 and Sample #3. FIG. 52B Peak and Final recovery stresses for both Sample #2 and Sample #3.

Figure 53A:
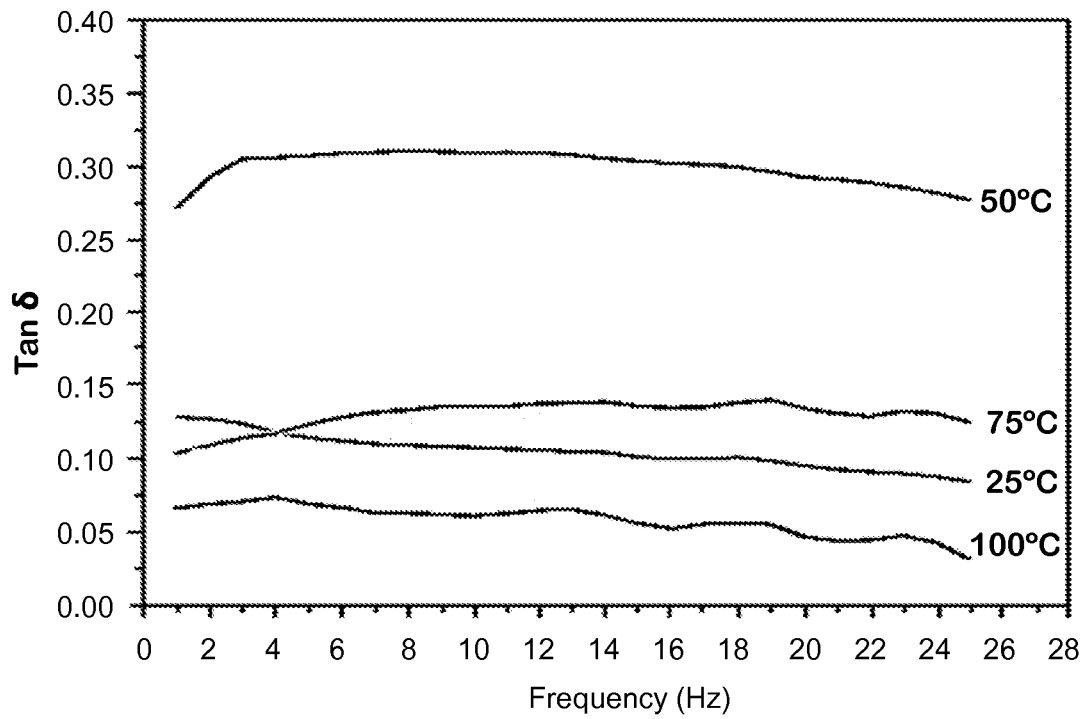
Figure 53B:
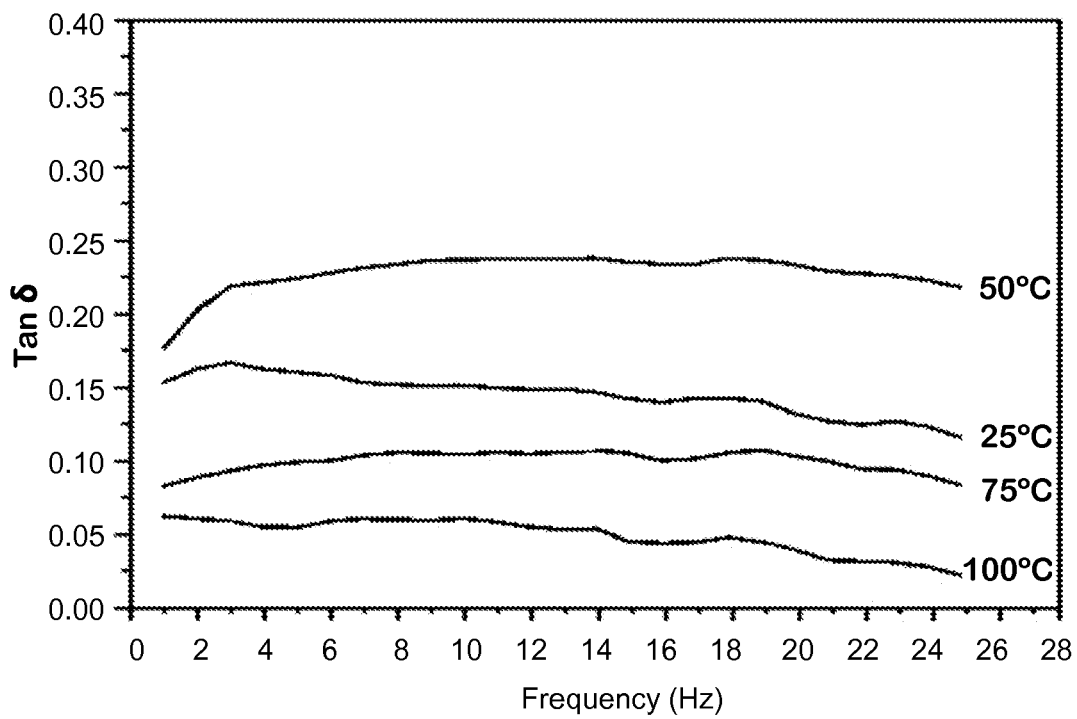
Figure 53C:
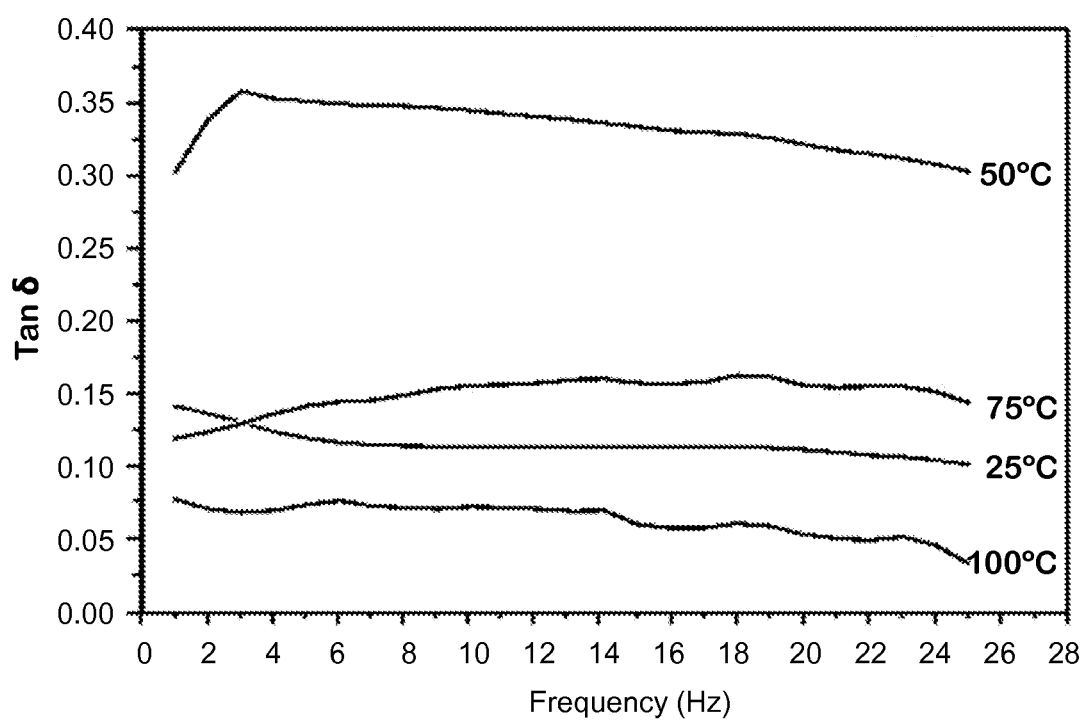

Dynamic frequency sweep test results of the three samples at various temperatures: FIG. 53A Sample #1; FIG. 53B Sample #2; FIG. 53C Sample #3.

Figure 54A:
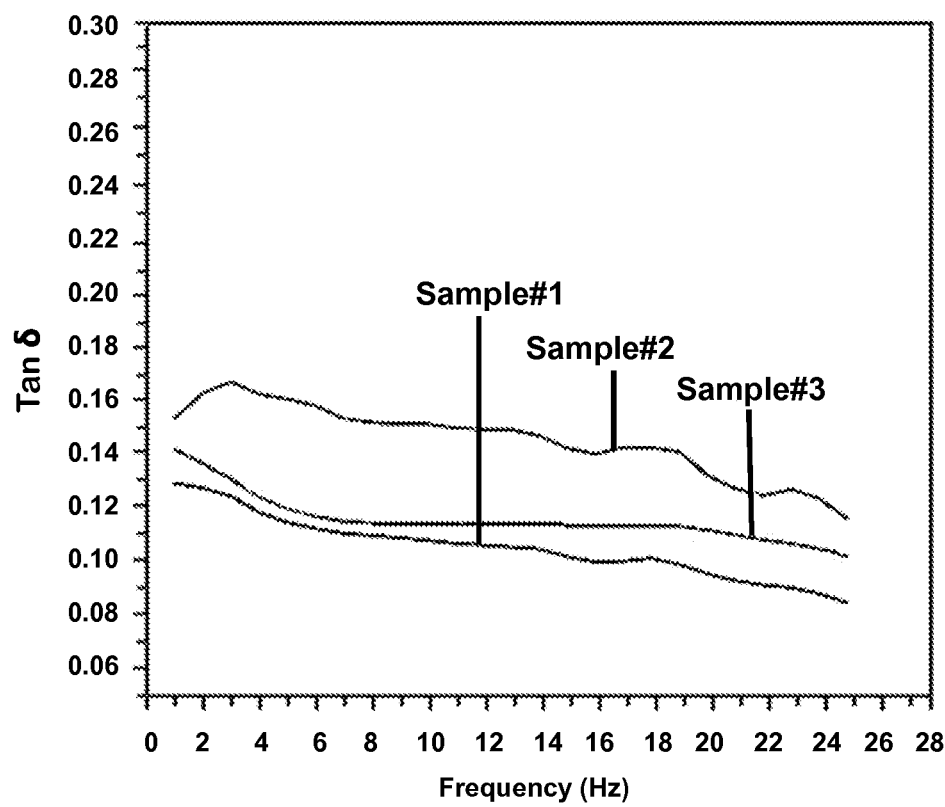
Figure 54B:
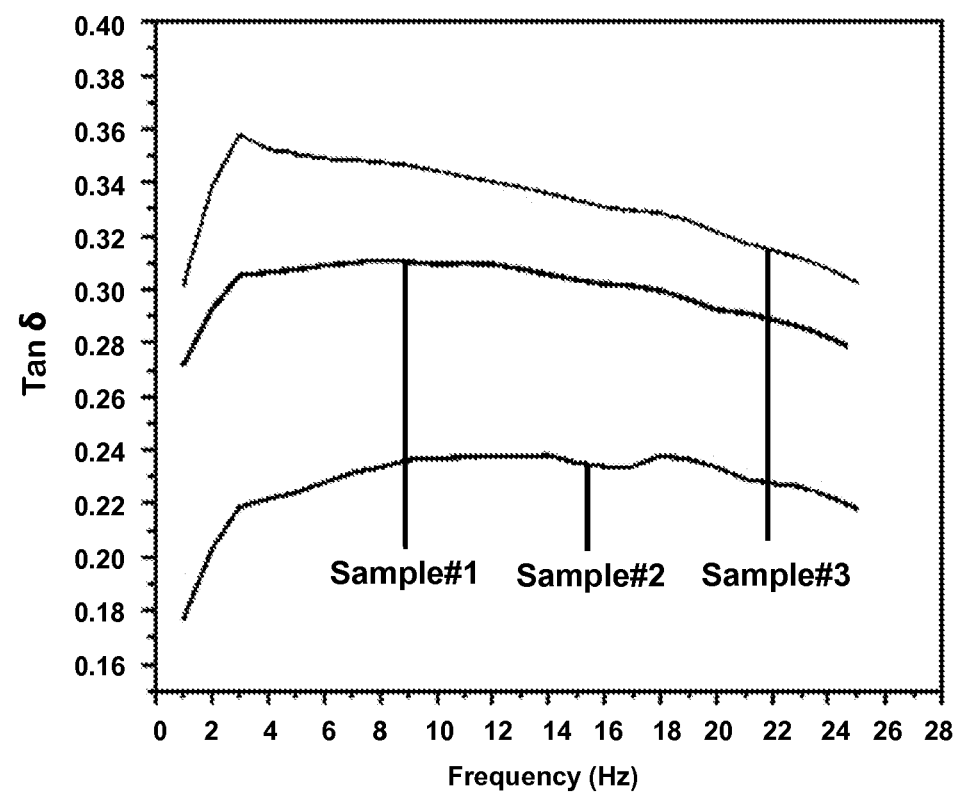
Figure 54C:
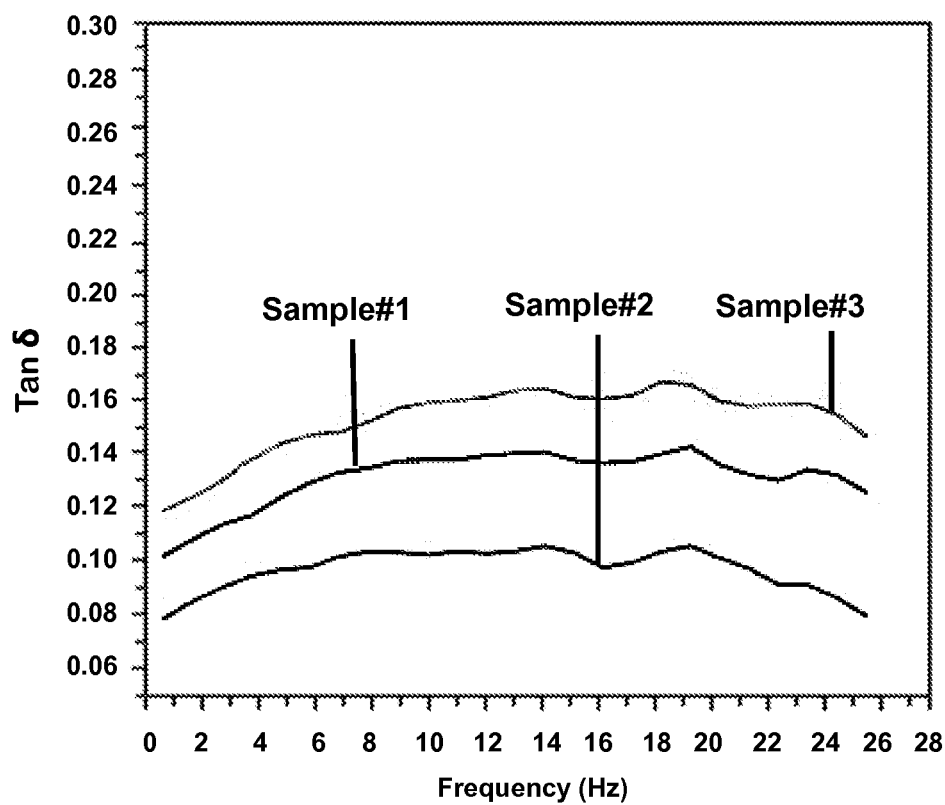
Figure 54D:
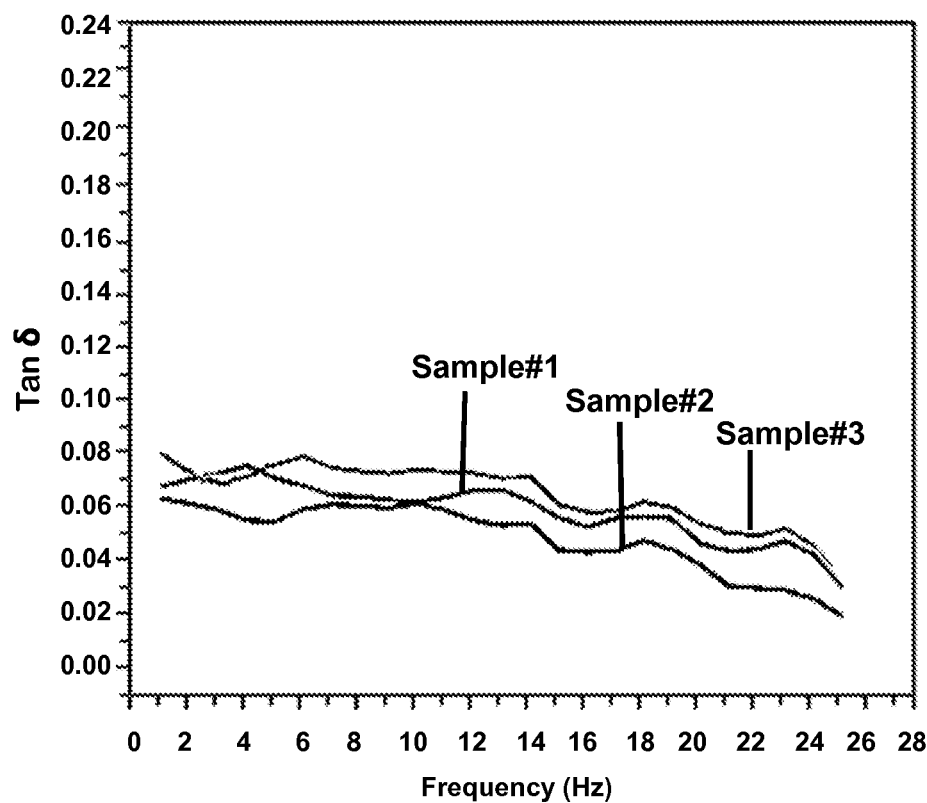

Dynamic frequency sweep test results in different thermal conditions of three samples. FIG. 54A at 25° C.; FIG. 54B at 50° C.; FIG. 54C at 75° C.; FIG. 54D at 100° C.

Figure 55:
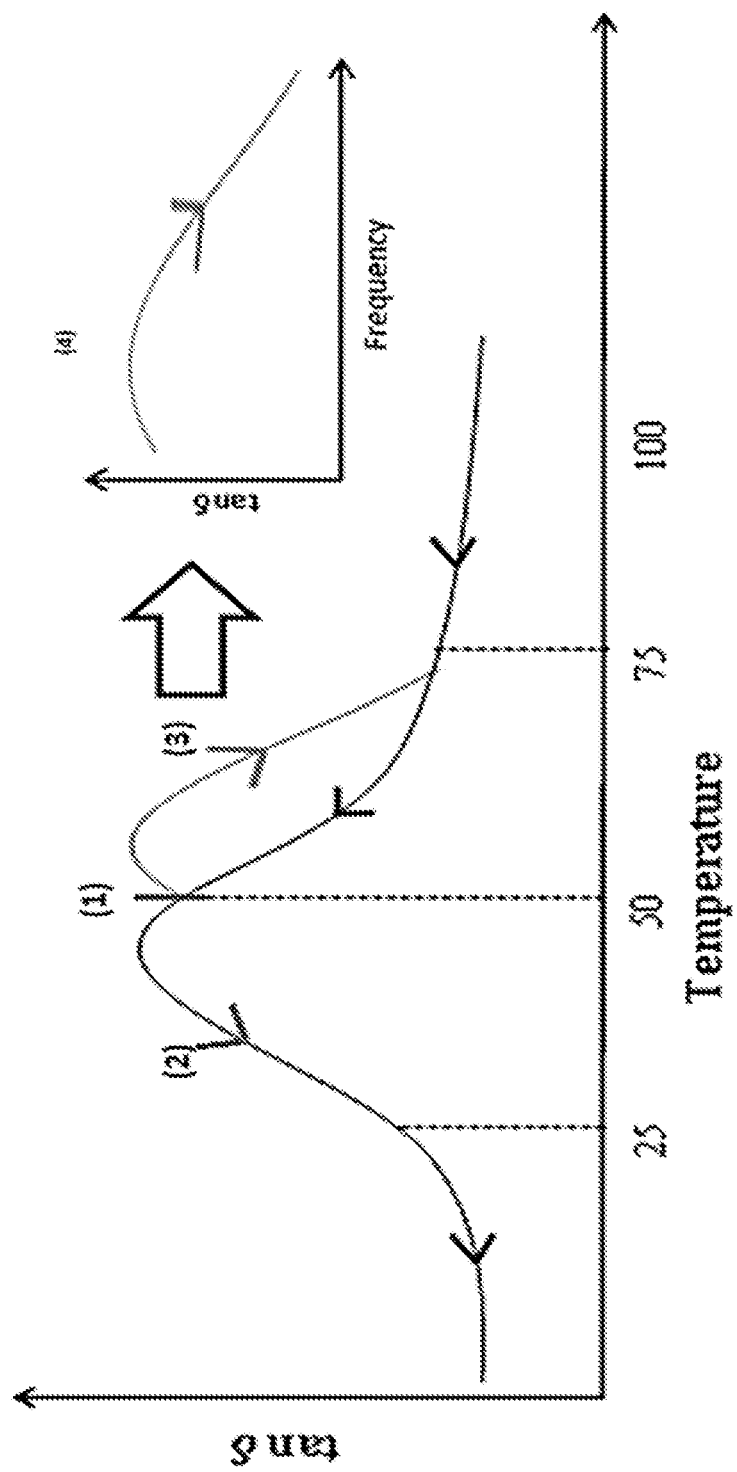

FIG. 55: Illustration of the steps on how to obtain a tan δ vs. frequency curve from tan δ vs. temperature curve.

Schematic explanation for the differences of the three samples in loss tangent-frequency relation. FIGS. 56A-C Tan δ vs. temperature diagrams for the three samples. The differences caused by programming history have been simplified and exaggerated: the vertical solid line represents the $T_g$ of Sample #1 (FIG. 56A), and is set to be a reference line. Peaks of Sample #2 (FIG. 56B) and Sample #3 (FIG. 56C) curves were moved to the left and right of the reference line, respectively. The horizontal solid line represents the datum line of Sample #1. The datum line of Sample #2 was moved down (the bottom dash line) and that of Sample #3 was moved up (the top dash line) with respect to the Sample #1 datum line. All the movements are translational, that is, without rotation and deformation. Following the four steps in FIG. 50, we obtained Tan δ vs. Frequency diagrams for the three samples at 25° C., 50° C., 75° C. and 100° C. A comparison of these figure panels with FIG. 54, shows good data agreement.

DETAILED DESCRIPTION OF THE INVENTION

In certain embodiments set forth herein, a sequential two-step process for healing conventional thermoset polymers is disclosed; this healing process mimics biological healing processed such as human skin. This healing process for polymers is referred to herein as close then heal (CTH). In CTH, the structural scale crack will be first sealed or closed by a certain mechanism before molecular scale self-healing mechanisms such as molten thermoplastic particles can take effect. Thermally activated shape memory polymers (SMPs), if properly programmed or educated, can recover its original shape upon heating above its glass transition temperature ($T_g$), due to its autonomous, conformational entropy driven shape recovery mechanism. As set forth herein, the shape recovery functionality can be utilized to achieve the self-closing purposes in CTH.

For any pair of semicrystalline SMP fiber and thermoplastic, the CTH process with the following key aspects are presently preferred:

In accordance with the present invention, partial miscibility between the SMPFs/matrix and thermoplastic particles/matrix is called for. In addition, the following temperature relationships are generally important: $T_c < T_t < T_b < T_m < T_f$. These symbols $T_c$, $T_t$, $T_b$, $T_m$, and $T_f$ are respectively: the curing temperature of the matrix ($T_a$), shape recovery temperature of the SMPFs ($T_t$), bonding temperature of the thermoplastic particles ($T_b$), melting temperature of the SMPFs ($T_m$), and temperature for the matrix to catch fire ($T_f$).

According to the biomimetic CTH mechanism of the present invention, the ability for the SMPFs to close wide-opened crack depends on the recovery force applied to the two sides of the crack. Usually, as-spun SMPFs, which have very limited molecule alignment during the manufacturing process, have very small recovery stress (less than 2 MPa), which may not be sufficient to close wide-opened cracks. It has been found that strain hardening through cold-drawing programming can increase the recovery stress of thermoplastic SMP. Therefore, strain hardening through cold-drawing programming of thermoplastic SMPFs is a preferred approach to enhance the healing efficiency of the present invention.

EXAMPLES

Example 1

The following Example 1 is based on studies and data also set forth in: Guoqiang Li and Amir Shojaei, "A Viscoplastic Theory of Shape Memory Polymer Fibers With Application To Self-Healing Materials", Proc. R. Soc. A (2012) 468, 2319-2346; this document is fully incorporated by reference herein.

In order to repeatedly and molecularly heal macroscopic cracks in conventional thermoset polymers, we here set forth a new bio-mimetic scheme that involves use of strain hardened, cold drawn SMP fibers that are used to create a z-pinned grid. Within the grid is placed conventional thermoset material. Thus, in this embodiment a SMP fiber z-pinned, continuous SMP fiber reinforced polymer grid skeleton that is filled in with conventional thermosetting polymer which comprises dispersed thermoplastic particles; see a unit cell representation in FIG. 1. This proposed composite will work similar to the two-step healing of human skin: close then heal (CTH), i.e., close the wound by bleeding and clotting or surgery (suture or sew the skin together) before new cells gradually grow. In this embodiment the constrained shape recovery of SMP ribs and z-pins is used for the purpose of narrowing/closing the macroscopic crack (similar to suture in stitching skin) (Step 1) and molten thermoplastic particles are used for healing molecularly (similar to clotting components and new connective tissue cells) (Step 2). In one embodiment, the SMP fibers are strain hardened through cold-drawing programming before fabrication.

It is envisioned in use that when an impact is identified (by surface indentation, portable non-destructive testing such as ultrasound, etc.), localized heating surrounding the impact damaged bay(s) or cell(s) will be conducted using contact or non-contact heating such as infrared light. Once the local temperature in the SMP ribs and z-pins are higher than the transition temperature, the SMP ribs and z-pins surrounding the damaged bay(s) remember their original shape and shrink. Due to the constraints by the neighboring "cold" bays (which have high stiffness), the shrinkage of the SMP ribs and z-pins are not free. Although in accordance with the invention it will be seen that external confinement is not needed, it is acceptable if it is provided, such as in this embodiment where constraint is naturally provided by the surrounding cold materials. A 3-D compressive force will be applied to the boundary of the damaged bay(s), leading to narrowing or closing of the cracks with wide openings. This is the Step 1 of the bio-mimetic scheme. Further heating leads to melting of the embedded thermoplastic particles, and the molten thermoplastic will be sucked into the narrowed crack through capillary force and diffused into the fractured thermoset polymer matrix due to concentration gradient and recovery compressive force. When cooling down, the thermoplastic hardens and glues the crack molecularly. This diffusion and subsequent hardening of thermoplastic completes one molecular damage-healing cycle.

It is noted that the wide-opened crack must be first narrowed or closed by the shape recovery of the embedded SMP fibers in order for the capillary force to take effect; also, the thermoplastic must be miscible with the thermosetting matrix in order for diffusion to occur. It is also noted that one potential problem of using thermoplastic particles is that the molten thermoplastic may diffuse onto the surface during the healing process. It is found that by ensuring a certain chemical miscibility between the thermoplastic particles and the thermosetting polymer matrix, which can be evaluated through a dynamic mechanical analysis (DMA) test, this problem can be minimized (Nji and Li, 2010, A biomimic shape memory polymer based self-healing particulate composite. Polymer, 51, 6021-6029).

As indicated by Li and Uppu (Li, G. and Uppu, N., 2010. Shape memory polymer based self-healing syntactic foam: 3-d confined thermomechanical characterization. Composites Science and Technology, 70, 1419-1427), each constrained shape recovery process also represents a new training cycle to the SMP ribs and z-pins, suggesting that SMP fibers only need to be programmed one time before fabrication. Subsequent programming will be autonomous by coupling with shape recovery (healing) of the composite. Together with the fact that the thermoplastic particles can also be repeatedly melted and hardened, the damage-healing cycle is repeatable.

Figures 1A, 1B, 1C, 1D:
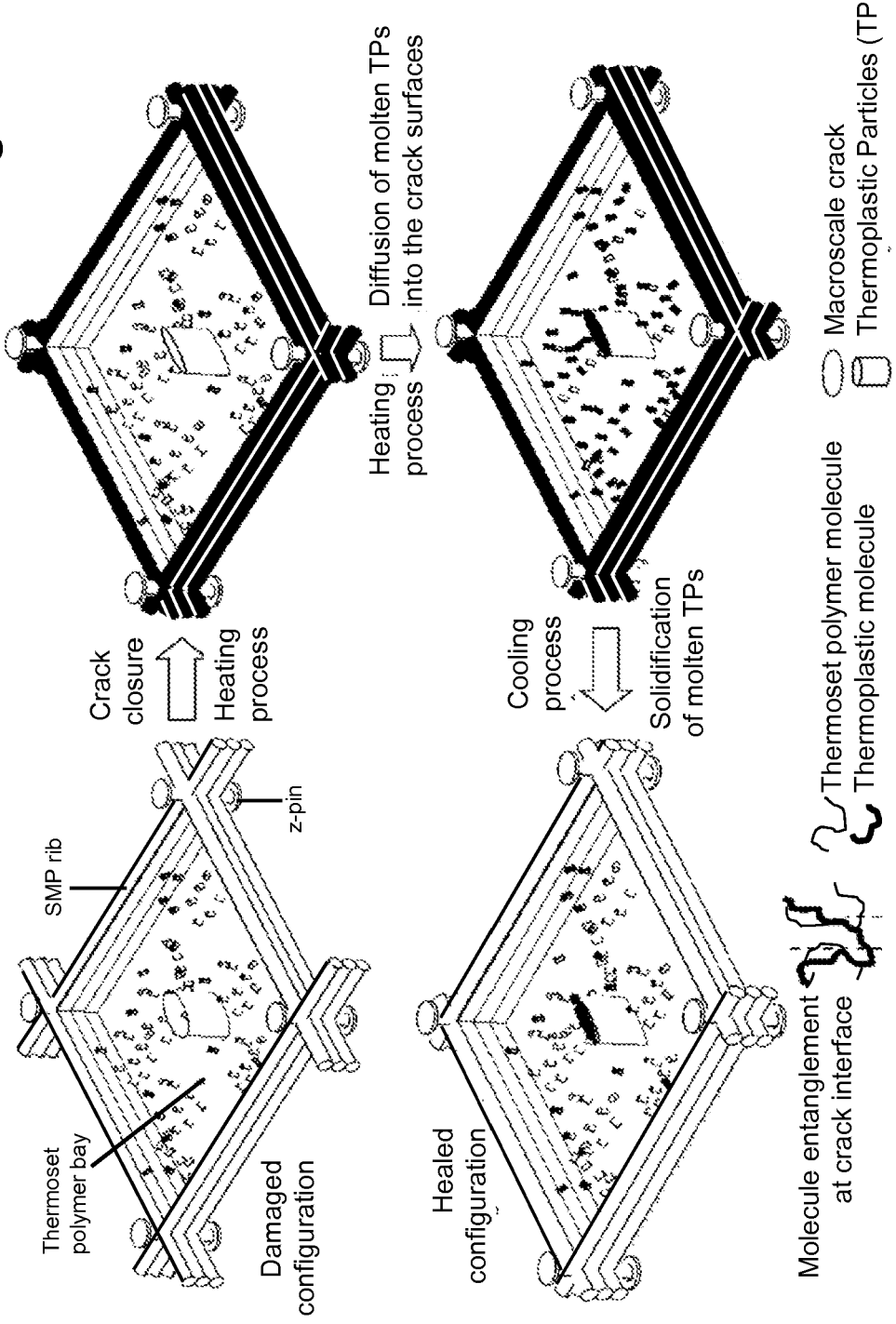
FIG. 1A: is a schematic of the bio-inspired healing process of the invention (3-D view) in with a unit cell (bay) of SMP grid (ribs and z-pins) stiffened conventional thermoset polymer dispersed with thermoplastic particles. A macroscopic crack is introduced in the unit cell, which can be identified by visual or non-destructive inspections (T<Tg); the crack is designated by an oval in middle of a bay.
In FIG. 1B crack closure process is seen through recovery of the SMP fiber ribs and z-pins, when local heating is applied (T>Tg).
In FIG. 1C further temperature increase melts the thermoplastic particles which flow into the crack by capillary force and diffuse into the fractured surface by concentration gradient (T>Tm).
In FIG. 1D cooling down to below the glass transition temperature, a solid wedge can be formed and molecular entanglement can be established (T<Tg). A magnified view depicts the molecular entanglement of thermoplastic and thermoset molecules at the crack interface.

The working principle can be visualized by FIG. 1. It is noted that while the bio-inspired healing scheme is cited as two steps, it actually just needs one step in practice—heating up all the way to the melting temperature of the thermoplastic particles; the SMP ribs and z-pins will shrink during the course of heating. In FIG. 1, $T_g$ denotes the glass transition temperature of the SMP fiber; $T_m$ represents the melting temperature of thermoplastic particles (TPs); $T_{gp}$ indicates the glass transition temperature of the thermoset polymer matrix; and $T_g$ denotes the curing temperature of the thermoset polymer matrix. The basic requirement for the designed healing system is: $T_{gp}>T_m>T_g>T_c$.

In order to validate the healing scheme in FIG. 1, a finite element analysis was conducted on a SMP orthogrid stiffened thermoset polymer composite in which a central bay contains a macroscale crack which is an ellipsoidal hole with major diameter of 20 mm, minor diameter of 5 mm, and height of 5 mm. Heating is conducted locally on the central bay and its surrounding four ribs. The following parameters were assumed: the SMP fiber reinforced rib has a modulus of 600 MPa and maximum recovery stress of 10 MPa, and the polymer composite in the bay has a modulus of 1,000 MPa. It is understood that, through localized heating, the elastic modulus of the thermosetting matrix is reduced. Concomitantly, upon heating the programmed SMP fiber exhibits excellent thermal stability. As shown below, the elastic modulus of the SMP fiber does not vary significantly within the temperature range investigated. Hence, the macrocrack in the softened thermosetting matrix can be narrowed or closed by the shrinkage of the SMP fiber at the healing temperature.

Solid Tetrahedral elements with 10 nodes are used. Once the localized recovery stresses overcome the stiffness of the bay the walls of the crack is collapsed together. Also the displacement field in Y direction confirmed that the walls of the crack march towards each other due to the applied localized stresses from the SMP ribs.

It is noted that, as compared to the previous bio-mimetic healing scheme proposed by Li and Uppu (Li, G. and Uppu, N., 2010. Shape memory polymer based self-healing syntactic foam: 3-d confined thermomechanical characterization. Composites Science and Technology, 70, 1419-1427), the scheme illustrated in FIG. 1 has fundamental differences and certain advantages. In the previous studies, the purpose is to heal macrocracks in the SMP matrix through confined shape recovery of the SMP matrix (Li and Uppu, 2010 supra; Nji, J. and Li, G., 2010. A biomimic shape memory polymer based self-healing particulate composite. Polymer, 51, 6021-6029; Xu, W. and Li, G., 2010. Constitutive modeling of shape memory polymer based self-healing syntactic foam. International Journal of Solids and Structures, 47, 1306-1316). However, in practice, conventional thermosetting polymers such as epoxy, vinyl ester, polyester, etc., which do not have shape memory capability, are usually used as matrix in load-bearing structures, such as in fiber reinforced polymer composite structures. Therefore, it is more desired to endow conventional thermosetting polymer matrix with self-healing capability so that a large variety of engineering structures can be benefitted. In this example, we use a relatively small amount of SMP fibers to bestow conventional thermosetting polymer matrix with self-healing capability, which can close macrocracks in the polymer matrix through constrained shape recovery (shrinkage) of the embedded drawn SMP fibers, as discussed in FIG. 1. Therefore, this study opens up new opportunities to heal conventional thermosetting polymer composite structures by using the novel two-step bio-mimetic self-healing scheme. Comparisons of the present SMP fiber based self-healing scheme with the previous SMP matrix based self-sealing scheme are summarized in Table 1.

Currently, SMP fibers are primarily made of thermoplastic SMPs, particularly polyurethane for non-structural applications (Meng, Q. H. and Hu, J. L., 2008. The influence of heat treatment on properties of shape memory fibers: I. Crystallinity, hydrogen bonding and shape memory effect. Journal of Applied Polymer Science, 109, 2616-2623). The polyurethane semicrystalline SMP fibers are constituted from the crystalline hard phase and amorphous soft phase and they show excellent solution ability, melting, diffusion, processability, and repeatability of the Shape Memory (SM) cycle (Ping, P., Wang, W., Chen, X. and Jing, X., 2005. Poly(ε-caprolactone) polyurethane and its shape-memory property. Biomacromolecules, 6, 587-592). Soft segment may consist of the amorphous (e.g. polyester and polyether) or the semi-crystalline (e.g. poly(ε-caprolactone) (PCL)) structures while the hard segments (e.g. diisocyanate (TDI), aromatic urethane or aramid) may be dispersed over the soft segment to form thermally stable chemical or physical cross links. Existence of the distinguishable hard phases in the polyurethane elastomers provides the physical basis for a micromechanics approach toward the multiscale analysis of these materials. The stress induced crystallization process in the semicrystalline polymers has been well studied in the literature. Accordingly during this process, the spherulite morphology is changed upon stretching and the crystalline molecular chains orient in the direction of the applied macroscopic loads. In the case of polyurethane SMP fibers, this process results in the enhanced mechanical properties along the fiber direction.

TABLE 1

Fundamental difference between the previous approaches and the current invention

| Aspect for comparison | Previous bio-mimetic scheme proposed by Li, G. and Uppu, N., 2010. Composites Science and Technology, 70, 1419-1427 | The current study |
| --- | --- | --- |
| Matrix | SMP. | Conventional thermosetting polymer. |
| Fiber | No. | Yes. Continuous SMP fiber. |
| Programming | Volume reduction by compression. | Strain hardening by cold-tension. |
| Mechanism for crack closing | Confined shape recovery by resisting free expansion of the SMP matrix (need external confinement). | Constrained shape recovery by resisting free shrinking of SMP grid skeleton (does not need external confinement). |
| Cost | High. Large volume fraction of SMP as the continuous phase. | Low. Small volume fraction of SMP fibers as the dispersed phase. |

In this Example, we experimentally investigate the strain hardening of polyurethane fibers through cold-drawing programming, in order to achieve the required recovery stress. We also investigate the thermomechanical cycle (programming and shape recovery) of the strain-hardened SMP fibers. Microstructure change and anisotropic behavior due to programming will be examined by Polarized Optical Microscope (POM), Fourier Transform Infrared Spectroscopy (FTIR), Small Angle X-ray Scattering (SAXS), and Dynamic Mechanical Analysis (DMA). After that, a Representative Volume Element (RVE) is utilized to correlate the microstructure of the SMP fiber to the macroscopic loading conditions. The soft and hard segments are assumed to follow respectively the amorphous and crystalline constitutive relations. The well established micromechanics averaging techniques are then incorporated to average the micro-stress and micro-strain fields in these sub-phases and the macroscale mechanical response of the SMP fiber is then estimated. This approach was proposed formerly by Eshelby and later it has been developed to the Mori-Tanaka and self-consistent methods (Eshelby, J. D., 1957. The determination of the elastic field of an ellipsoidal inclusion, and related problems. Proceedings of the Royal Society of London. Series A. Mathematical and Physical Sciences, 241, 376-396; Nemat-Nasser, S. and Hori, M., 1993. Micromechanics: Overall properties of heterogeneous materials. Amsterdam, Elsevier). The local-global relations between the applied macroscale and the resulting microscale mechanical fields can be established analytically when the medium behaves elastically. Once the non-linearity is introduced in one of the sub-phases a history dependent solution algorithm should be enforced in order to update these relations. Shojaei and Li discussed in detail the solution algorithm for such a multiscale analysis incrementally (A. Shojaei and G. Li. Viscoplasticity Analysis of Semicrystalline Polymers: A Multiscale Approach within Micromechanics Framework. *International Journal of Plasticity*, Vol. 42, pp. 31-49, (March 2013)). Additionally, in section 2 experimental characterizations of the SMP fibers are discussed. In section 3 the constitutive relations for the amorphous and crystalline phases together with the texture updates are elaborated. Furthermore, the constitutive relations for the stress recovery and the stress induced crystallization process are proposed. In section 4 the kinematics of the finite deformation together with the required numerical algorithms are elaborated. In section 5 simulation results are presented.

Overview of Example 1, in this Example a bio-inspired "bio-mimetic" healing scheme is set forth through architectural design of a composite structure, which is constructed by SMP fiber z-pinned, continuous SMP fiber grid reinforced thermoset polymer embedded with thermoplastic particles. It is to be noted that the z-pinned grid is but one embodiment of a composition or structure in accordance with the invention. In this Example, the present invention is demonstrated through experimental testing and finite element modeling.

It is found that the polyurethane thermoplastic fibers, upon strain hardening by cold-drawing programming, can achieve the required recovery stress to close macroscopic cracks. Further, the microstructure changes due to the cold-drawing programming are characterized by instrumented microstructural analysis, which provides fundamental understanding and parameters for the constitutive modeling. Due to the fact that the polyurethane SMP fibers are categorized in the class of the semicrystalline polymers, the enhanced mechanical responses of the cold drawn fibers are correlated to the stress induced crystallization process and the morphological texture changes in the amorphous and crystalline phases in this work. A micromechanical multi-scale viscoplastic theory is developed to link the microscale mechanical responses of the amorphous and crystalline sub-phases to the macroscale mechanical behaviors of the SMP fibers including the cyclic hardening, and stress recovery responses. The proposed theory takes into account the stress induced crystallization process and the initial morphological texture while the polymeric texture is updated based on the applied stresses. The cyclic loading and the thermomechanical responses of the SMP fibers are experimentally investigated in which the proposed theory is utilized to capture these phenomena. The proposed viscoplastic theory together with the material characterizations of the SMP fibers allow designers to predict the strength, stress recovery and life of the self-healing structures made from the semicrystalline SMP fibers. The data of this Example open up new opportunities for the application of SMP fibers in load-bearing and self-healing composite structures. In this Example, polyurethane was synthesized from poly(butylene adipate)-600 (Mn) (PBA), 4'4-diphenylmethane diisocyanate (MDI) and 1,4-butanediol (BDO). On average, the molar ratio of (MDI+BDO):PBA=3:1. The average formula weight ratio of (MDI+BDO):PBA=1021:650. The hard segment, soft segment, and their contents were selected to prepare polyurethane with amorphous soft segment phase and crystalline hard segment phase. The polyurethane fiber was spun by melt spinning The fiber passed three pairs of rollers with the same rotation speed before being wound up. In this work two types of single SMP fibers (filaments) are characterized in which their microstructure changes upon cold drawing process are evaluated.

Optical microscopy was used to visualize a single SMP fiber with an initial diameter of 0.04 mm, which is called sample #1 hereinafter. In the non-stretched SMP fiber #1 the microstructure of the fiber is almost random; when the fiber is highly stretched, the microstructure aligns along the fiber (loading) direction. Optical microscopy was also used to visualize an SMP fiber with an initial diameter of 0.002 mm, which is denoted as sample #2 hereinafter. The oriented microstructures along the fiber direction are obvious when the sample #2 fiber was cold drawn. The samples #1 and #2 were cyclically stretched by cold drawing up to 350% and 200% level of strains, for sample #1 and sample #2 respectively.

Using an MTS Alliance RT/5 machine, which is usually used for fiber tension tests, the SMP fiber #1 and fiber #2 are cyclically stretched and the results are shown in FIG. 2(*a*) and FIG. 2(*b*), respectively. The elastic stiffness of the SMP fiber is increased gradually while the strength of the fiber is increased significantly. Obviously, cyclic cold-drawing leads to strain hardening of the SMP fibers. The reason for this is the alignment of the amorphous phase and crystalline phase along the loading direction up on cold-tension, as evidenced by microscopy.

The fully constrained (zero strain) stress recovery response of these fibers with respect to time is depicted in FIG. 3. In this process the programmed fiber is gripped by the fixture while the heating process is controlled by a digital furnace. An initial stretch within the elastic region, e.g., s=10% (epsilon=10%), is applied to ensure that the fibers remain zero strain before the shape recovery process starts, which needs a temperature rising process and causes thermal expansion and thus looseness of the fiber between the grips. It is worthwhile to note that this pre-stretch is determined in a trial-and-error process in which the stress recovery is set to start from almost zero stress. In fact both of these fibers show a sudden stress relaxation before activation of the shape recovery process. In other words, the pre-tension is fully consumed by the stress relaxation and thermal expansion before the stress recovery starts. Therefore, the pre-stretch does not affect the stress recovery. In this study, the heating rate is 0.35° C./sec and the final temperature is set to be 90° C. in the digital furnace. From FIG. 3, the pre-tension stress is relaxed to zero at about 20 s. Because the starting temperature of the fiber is about 23° C., the temperature becomes 30° C. after 20 s of heating. As shown in FIG. 4, this is the temperature when the glass transition starts. Therefore, as expected, the 10% pre-tension is fully used up by stress relaxation and thermal expansion of the fiber before stress recovery starts. The pre-stretch is a technique to compensate for the inability for the machine to measure the stress when the fiber is loose. From FIG. 3, the stabilized recovery stress is about 16 MPa. Based on closing of the macroscopic crack due to shape recovery of the SMP grid skeleton through localized heating data, it was seen that the fiber after cyclic cold-drawing programming was able to provide the required recovery stress (e.g., 10 MPa in the data generated) for close the macroscopic crack. We also tested the stress recovery of non-stretched (as received) SMP fiber using the same procedure. The stress recovery is almost zero.

FIG. 4 shows the DMA experiments (with heating rate of 5° C./min and frequency of 1 Hz) in which both the non-stretched and cold-drawn SMP fibers #1 are tested to investigate the changes in their glass transition temperature, $T_g$, upon work hardening process. From FIG. 4 (a), the cold-drawn SMP fiber shows a small shift in its $T_g$ towards higher temperature. The glass transition starts at about 30° C., which echoes the information in FIG. 3. From FIG. 4 (b), it is clear that the storage modulus of the strain hardened SMP fibers is much higher than that of the as received counterparts, and plateaus in a wide range of temperature, suggesting significant increase in stiffness and thermal stability.

In order to better understand the shape memory mechanism due to strain hardening by cold-drawing, the change in the microstructure of the SMP fiber is further investigated. Using TENSOR 27, the Fourier Transform Infrared Spectroscopy (FTIR) test is implemented on two samples to check the microstructural changes during cold stretching process of SMP fibers. FIG. 5 shows the FTIR test results for the sample #2 in which the blue line shows the non-stretched SMP fiber #2 and the red line represents the SMP fiber #2 which is stretched up to 180% strain level prior to the FTIR test. The synchronized peaks confirm that the chemical compositions of the two fibers are the same and there are no new chemical bonds upon cold drawing. The change in the intensity after strain hardening by cold-drawing programming may indicate the change in density and molecular alignment.

Using Small Angle X-ray Scattering (SAXS) facilities in the Center for Advanced Microstructures and Devices (CAMD) at Louisiana State University the microstructure of the non-stretched and stretched SMP fibers (sample #1) is investigated. A SAXS image for the non-stretched fiber showed a non-oriented microstructure while in the case of the stretched fiber, whereas the SAXS imaging showed orientational changes in the microstructure.

The crystallization process in polymers may occur during the cooling down process from the melting point along the direction of the largest temperature gradient or may occur by external loading which is called stress induced crystallization (SIC). In many cases, the crystallization process does not develop fully and consequently the resulting microstructure contains dispersed crystalline phases within an amorphous matrix, leading to a polymeric system that is called "semicrystalline."

Based on the above test results and microstructural examination, it is evident that both the soft segments and hard segments in the semicrystalline SMP fiber align along the loading direction after cyclic cold-drawing programming, which also leads to considerable increase in stress recovery. This suggests that the polyurethane fibers, after strain hardening through cold-drawing programming, may be used in load-bearing structural applications, particularly in the biomimetic healing scheme proposed in FIG. 1. However, an in-depth understanding of the thermomechanical behavior of the semicrystalline polyurethane fiber needs constitutive modeling.

Recoverable Stresses

One of the vital parameters in designing the bio-inspired Close-Then-Heal healing systems is the available amount of the crack closure force which is necessary to close the macroscale cracks. As shown in FIG. 3, the SMP fibers show considerable recovery stresses which are in general dependent on the amount of the induced strain hardening during the cold-drawing process. Basically upon the cold-drawing process, the crystalline phase of the semicrystalline polyurethane SMP fibers undergoes the stress induced crystallization process, and it stores the applied deformations through the entropy changes in the crystalline network. Once the temperature exceeds the glass transition temperature of the semicrystalline polymer, the viscosity of the polymeric network drops and the frozen crystalline network is allowed to release the stored energy and achieve its minimum energy level. In other words upon heating, the stored energy in the crystalline phase is released and the polymeric network returns to its minimum level of internal energy. As shown in FIG. 3 after a few cold-drawing cycles the amount of the recoverable stresses is considerably aggrandized. Then one may relate the amount of the recoverable stresses to the loading history and stress induced crystallization process. In this study, the recoverable stress is assumed to be a function of the stress induced crystallization process and the accumulated inelastic strains in the amorphous phase. Basically a portion of these induced inelastic entropic and energetic changes in the SMP molecular network is recoverable upon heating where the viscosity of the frozen network drops and the recoverable inelastic strains are restored. Then the proposed evolution law for the stress recovery takes into account the history of the loading, including the inelastic strains in the sub-phases. The kinematic and isotropic hardening relations in the classical continuum plasticity context provide a suitable governing equation form to explain the stress recovery process (Chaboche, J. L., 1991. On some modifications of kinematic hardening to improve the description of ratchetting effects. International Journal of Plasticity, 7, 661-678; Shojaei, A., Eslami, M. and Mahbadi, H., 2010. Cyclic loading of beams based on the chaboche model. International Journal of Mechanics and Materials in Design, 6, 217-228; Voyiadjis, G. Z., Shojaei, A. and Li, G., 2012. A generalized coupled viscoplastic-viscodamage-viscohealing theory for glassy polymers. International Journal of Plasticity, 28, 21-45). The stress recovery evolution relation is then proposed as follows:

$$\sigma^{rec}=R(1-\exp(-\eta(T-T_{0room}))) \qquad \text{(Eq. 1)}$$

where $\eta$ is a material constant that controls the rate of saturation of the recovery stress to its final value which is R, and T and $T_{room}$ are respectively elevated and room temperatures. Parameter R takes into account the history of the loading which includes the inelastic deformation, texture updates and residual stresses due to the cyclic hardening. Taking time derivative of Eq. (1) results in the following incremental relation for the stress recovery computations:

$$\dot{\sigma}^{rec} = \dot{T}R\eta\exp(-\eta(T-T_{room})) \quad \text{(Eq. 2)}$$

where $\dot{T}$ shows the rate of the heating process. As shown in FIG. 3 the maximum stress recovery is achieved after reaching $T_a$ and the rate of heating controls this peak time. The heating process is controlled by time integration of the heating rate as: $T = \int \dot{T} dt + T_{room}$, and once the temperature reaches its final value during the simulation, the heating rate is set to zero. The saturation limit, R, for the stress recovery is related to the loading history and the amount of the plastic strain by the following expression:

$$\dot{R} = \omega(N-R)|\dot{\in}^p| \quad \text{(Eq. 3)}$$

where $\omega$ and $N$ are two material parameters for controlling the saturation parameter, R, and $|\dot{\in}^p| = \sqrt{2/3 \dot{\in}_{ij}^{p(c)} \dot{\in}_{ij}^{p(c)}}$ is the equivalent plastic strain rate. Then during each of the cyclic loadings the 3 a!

magnitude of P is updated incrementally and its final value is introduced in Eq. (1) for the stress recovery computation. Eq. (3) represents a monotonically increasing value for the parameter R up to a certain saturation limit which is enforced by N. The underlying physics for Eqs. (1) and (3) is that the recoverable stress in a SMP fiber is a function of the recoverable microstructural changes during the cold drawing process and this stress recovery should saturates to a certain limit due to the limit in reversibility in these microstructural changes. In other words certain amounts of the microstructural changes are reversible in an SMP fiber and after certain limit these microstructural changes may results in failure of the polymeric networks and produce non-reversible defects. In this study, it is assumed that the recovery stress saturates to a certain limit as a function of the microstructural changes through Eqs. (1) and (3) and the physical parameter to control these changes is the accumulated inelastic strain and its rate.

Example 2

The following Example 2 is based on studies and data also set forth in: Amir Shojaei, Guoqiang Li, George Z. Voyiadjis; "Cyclic Viscoplastic-Viscodamage Analysis of Shape Memory Polymers Fibers with Application to Self-Healing Smart Materials", Journal of Applied Mechanics (January 2013), Vol. 80, 011014-1 through 011014-15; this document is fully incorporated by reference herein.

Cold-drawn programmed Shape Memory Polymer (SMP) fibers show excellent stress recovery property, which promotes their application as mechanical actuators in smart material systems. A full understanding of the thermomechanical-damage responses of these fibers is useful in order to minimize the trial-and-error manufacturing processes of these material systems. In this Example, a multiscale viscoplastic-viscodamage theory is developed to predict the cyclic mechanical responses of SMP fibers. The viscoplastic theory set forth is based on the governing relations for each of the individual micro-constituents and establishes the microscale state of the stress and strain in each of the sub-phases. These microscale fields are then averaged through the micromechanics framework to demonstrate the macroscale constitutive mechanical behavior. The cyclic loss in the functionality of the SMP fibers is interpreted as the damage process herein and this cyclic loss of stress recovery property is calibrated to identify the state of the damage. The Continuum Damage Mechanics (CDM) together with a thermodynamic consistent viscodamage theory is incorporated to simulate the damage process.

The developed coupled viscoplastic-viscodamage theory provides an excellent correlation between the experimental and simulation results. The cyclic loading-damage analysis in this work relies on the underlying physical facts and accounts for the microstructural changes in each of the micro constituents. The established framework provides a well-structured method to capture the cyclic responses of the SMP fibers which is of utmost importance for designing the SMP fiber based smart material systems.

The ability to close macroscopic crack through localized heating has been demonstrated (see Example 1 herein; Guoqiang Li and Amir Shojaei, "A Viscoplastic Theory of Shape Memory Polymer Fibers with Application to Self-Healing Materials", Proc. R. Soc. A (2012) 468, 2319-2346). In this work, instead of the SMP fiber grid skeleton, we envision that uniformly distributed short SMP fibers, which are programmed through cold-drawn programming, may have the same capability to close structural-length scale crack in the thermosetting polymer matrix. As discussed in Example 1 (see also, Guoqiang Li and Amir Shojaei, "A Viscoplastic Theory of Shape Memory Polymer Fibers with Application to Self-Healing Materials", Proc. R. Soc. A (2012) 468, 2319-2346) the key advantage of this newly proposed approach is (1) it closes macroscopic crack with a small amount of SMP material; and (2) the SMP fibers can function repeatedly because each constrained recovery leads to a new round of tension programming (Li, G. and N. Uppu (2010). "Shape memory polymer based self-healing syntactic foam: 3-D confined thermomechanical characterization." Composites Science and Technology 70(9): 1419-1427). FIG. 6 presents a schematic view of the proposed self-healing scheme with distributed short SMP fibers (also see FIG. 15 and FIG. 35, and respective related text), where short SMP fibers are shown with rods and Thermoplastic Particles (TPs) are shown as particles. FIG. 6(a) illustrates a Representative Volume Element (RVE) of the material system with a macroscale crack. FIG. 6(b) shows the crack is closed due to the stress recovery process of these cold-drawn programmed fibers upon the heating process. In FIG. 6(c) the TPs are molten due to further heating and they diffuse into the cracked surfaces. In FIG. 6(d) the room temperature configuration is shown in which the molten TPs solidifies and provides a microscale healed configuration. In order to better design this self-healing system, understanding of the mechanical responses of SMP fibers subjected to cyclic loading condition is important because the healing process of the invention encompasses the possibility that the healing be achieved repeatedly.

SMP fibers are mainly manufactured from thermoplastic SMPs, particularly polyurethane (Meng and Hu 2008). In polyurethane SMP elastomers the hard segment can undergo phase separation and form distinguishable domains (Clough, S. B. and N. S. Schneider (1968). "Structural studies on urethane elastomers." Journal of Macromolecular Science, Part B 2(4): 553-566; Clough, S. B., N. S. Schneider and A. O. King (1968). "Small-angle X-Ray scattering from polyurethane elastomers." Journal of Macromolecular Science, Part B 2(4): 641-648). Appearance of these distinctive micro-phase segregations depends on the degree of the compatibility between the soft segment molecular chains and the hard segment blocks (Ferguson, J., D. J. Hourston, R. Meredith and D. Patsavoudis (1972). "Mechanical relaxations in a series of polyurethanes with varying hard to soft segment ratio." European Polymer Journal 8(3): 369-383; Ferguson, J. and D. Patsavoudis (1972). "Chemical structure-physical property relationships in polyurethane elastomeric fibers; property variations in polymers containing high hard segment concentrations." European Polymer Journal 8(3): 385-396). This segregated structure may motivate designers to incorporate a micromechanical approach for characterization of the semicrystalline polymer-based material systems. We aim at developing a multiscale approach because it provides correlation between micro-constituent governing behavior and macroscale mechanical responses. In this work two well-established viscoplastic theories for the amorphous and crystalline polymers are utilized. These theories are based on certain physical description of the viscoplastic deformation mechanisms in each of these sub-phases and the material constants are related to certain physical properties such as microstructural properties. These two constitutive relations are linked within the micromechanics framework to build the macroscale mechanical responses. The averaging micromechanics techniques are utilized herein and certain numerical approaches are adopted to take care of non-linearity, e.g. plasticity and damage, in each of the sub-phase (See, e.g., for citations to relevant art techniques: Amir Shojaei, Guoqiang Li, George Z. Voyiadjis; "Cyclic Viscoplastic-Viscodamage Analysis of Shape Memory Polymers Fibers with Application to Self-Healing Smart Materials", Journal of Applied Mechanics (January 2013), Vol. 80, 011014-1 through 011014-15).

The performance of the proposed self-healing scheme is examined in FIG. 7. FIG. 7(a) shows Optical Microscopy (OM) image of an induced macroscale crack in a polymer matrix composite system which is reinforced with continuous SMP fibers. Upon heating the macroscale crack is sealed, as shown in FIG. 7(b). The crack interface in FIG. 7(b) is magnified in FIG. 7(c) in which the SEM image of the interface is depicted. Upon further heating the molten TPs are diffused into the crack surfaces and provide a molecular level of entanglement at the interface, as shown in FIG. 7(d).

Application of SMP fibers as mechanical actuators in smart material systems is evaluated herein. A new bio-inspired self-healing material system is set forth in which the stress recovery of the SMP fibers provides the required crack closure force. The present self-healing system can be constituted from thermosetting polymer matrix together with dispersed short SMP fibers and embedded thermoplastic particles. It is found that the polyurethane thermoplastic fibers are strain hardened upon cold-drawing programming and they can achieve the required recovery stress to close macroscopic cracks (see e.g., Example 1; Guoqiang Li and Amir Shojaei, "A Viscoplastic Theory of Shape Memory Polymer Fibers With Application To Self-Healing Materials", Proc. R. Soc. A (2012) 468, 2319-2346). Furthermore, the strain hardened SMP fibers show excellent mechanical properties in which a new application field is opened for these fibers to be deployed in SMP fiber reinforced composite structures.

The enhanced mechanical responses of the cold-drawn semicrystalline polyurethane SMP fibers are correlated to the stress induced crystallization process and the texture updates in the amorphous and crystalline phases in Amir Shojaei, and Guoqiang Li, George Z. Voyiadjis; "Cyclic Viscoplastic-Viscodamage Analysis of Shape Memory Polymers Fibers with Application to Self-Healing Smart Materials", Journal of Applied Mechanics (January 2013), Vol. 80, 011014-1 through 011014-15). A micromechanical multiscale viscoplastic theory is developed to link the microscale mechanical responses of the amorphous and crystalline sub-phases to the macroscale mechanical behavior of the SMP fibers including cyclic hardening, and stress recovery responses. The cyclic loading and cyclic damage responses of the SMP fibers are experimentally investigated in which the proposed theory is utilized to capture these phenomena. A new damage parameter is proposed based on the loss of functionality of SMP fibers and a thermodynamic consistent viscodamage theory is developed to accurately predict the damage process. The proposed viscoplastic-viscodamage theory together with the SMP fibers characterizations provide designers with the ability to predict the cyclic strength, stress recovery and life of smart structures made from the semicrystalline SMP fibers.

Example 3

The following Example 3 is based on studies and data also set forth in: Guoqiang Li, Harper Meng and Jinlian Hu, "Healable Thermoset Polymer Composite Embedded With Stimuli-Responsive Fibers", J. R. Soc. Interface (2012) 9, 3279-3287; this document is fully incorporated by reference herein.

In this Example, a thermal-responsive fiber (e.g., stimuli-responsive fiber 'SRF' or SMP fiber) with outstanding mechanical properties and super contraction capability was fabricated for the purpose of healing macroscopic damages in thermoset polymer compositions. The SMP fibers and thermoplastic particles were incorporated into regular thermosetting epoxy for repeatedly healing macroscopic damages. The system works by mimicking self-healing of biological systems such as human skin, where a wound us first closed (e.g., by a stitch) thereafter the wound is healed. In the present context of thermoset polymer composites of the invention, a damage is closed through the thermal-induced super-contraction of the SMP fibers, and bonding of the closed crack through melting and diffusing of thermoplastic particles at the crack interface. The healing efficiency determined using tapered double-cantilever beam specimens was 94%. The self-healing process was reasonably repeatable.

Previously, a two-step self-healing approach CTH (close-then-heal) for macroscopic damages using shape memory polymers [Li G, Uppu N. Shape Memory Polymer Based Self-healing Syntactic Foam: 3-D Confined Thermomechanical Characterization. Composites Science and Technology 2010; 70:1419-1427; Li G, Xu W. Thermomechanical Behavior of Thermoset Shape Memory Polymer Programmed by Cold-compression: Testing and Constitutive Modeling. Journal of the Mechanics and Physics of Solids 2011; 59:1231-1250] was set forth. In the first step, the macro-cracks were closed as a result of the constrained shape recovery of the shape memory polymer matrix. In the second step, thermoplastic particles (TPs) which were pre-embedded in the shape memory polymer matrix melted, diffused, and bonded the closed cracks through molecular entanglement. However, as indicated in Example 1 (see, e.g., Li G, Shojaei A. A Viscoplastic Theory of Shape Memory Polymer Fibers with Application to Self-Healing Materials, Proceedings of the Royal Society A 2012, 468: 2319-2346), this system required a shape memory polymer as the matrix. However, in engineered structures, conventionally-used thermosetting polymers do not have shape memory capability. In order to address this, regular thermosetting polymer composite structures which can be healed by embedding shape memory polymer fibers are set forth herein (also see Li G, Shojaei A. A Viscoplastic Theory of Shape Memory Polymer Fibers with Application to Self-Healing Materials, Proceedings of the Royal Society A 2012, 468: 2319-2346).

It is noted that Kirkby et al [Kirkby E L, Rule J D, Michaud V J, Sottos N R, White S R, Manson J-AE. Embedded Shape-Memory Alloy Wires for Improved Performance of Self-Healing Polymers. Advanced Functional Materials 2008; 18:2253-2260; Kirkby E L, Michaud V J, Mason J A E, Sottos N R, White S R. Performance of Self-healing Epoxy with Microencapsulated Healing Agent and Shape Memory Alloy Wires. Polymer 2009; 50: 5533-5538] embedded shape memory alloy wires in epoxy matrix to narrow down cracks (about 150 μm) by taking advantage of the shape recovery of the shape memory alloy wires. Limitations of the Kirkby system are: (1) because of the low recoverable strain of shape memory alloy wires, which is below 8%, the capability for shape memory alloy wires to close macro-cracks in polymer composites is limited; and, (2) shape memory alloy wires do not mechanically match the polymer matrix, particularly at the high recovery temperature. At the high recovery temperature, the shape memory alloy wire is very stiff while the polymer matrix becomes soft, limiting the load transfer capability and crack closing efficiency.

Therefore, the stimuli-responsive shape changing polymeric fibers with outstanding mechanical properties set forth herein are a viable alternative for the purpose of automatically closing macro-cracks. (See, e.g., Example 1 and Li and Shojaei [Li G, Shojaei A. A Viscoplastic Theory of Shape Memory Polymer Fibers with Application to Self-Healing Materials. Proceedings of the Royal Society A 2012, 468: 2319-2346.]). In developing these synthetic fibers, we analogized from the natural biology. Spider silks possess humidity-responsive super-contraction, in addition to outstanding mechanical properties [Harmer A M T, Blackledge T A, Madin J S, Herberstein M E. High-performance Spider Webs: Integrating Biomechanics, Ecology and Behaviour. Journal of the Royal Society-Interface 2011; 8:457-471; Eisoldt L, Smith A, Scheibel T. Decoding the Secrets of Spider Silk. Materials Today 2011; 14:80-86; Buehler M J, Keten S, Ackbarow T. Theoretical and Computational Hierarchical Nanomechanics of Protein Materials: Deformation and Fracture. Progress in Materials Science 2008; 53:1101-1241; Wu X, Liu X Y, Du N, Xu G, Li B. Unraveled Mechanism in Silk Engineering: Fast Reeling Induced Silk Toughening. Applied Physics Letters 2009; 95:093703]. Unfortunately, natural spider silks cannot be obtained in a large scale because spiders cannot be farmed. Though much effort has been made to fabricate artificial spider silks, not much success has been achieved as a result of the extreme difficulty of replicating spider silk proteins and mimicking the exact spinning process of spider silks [Zhou G, Shao Z, Knight D P, Yan J, Chen X. Silk Fibers Extruded Artificially from Aqueous Solutions of Regenerated Bombyx Mori Silk Fibroin Are Tougher Than Their Natural Counterparts. Advanced Materials 2009; 21:366-370; Bosia F, Buehler M J, Pugno N M. Hierarchical Simulations for the Design of Supertough Nanofibers Inspired by Spider Silk. Physical Review E 2010; 82:056103].

In this Example, we set forth a spider-silk-like stimuli-responsive fiber (SRF, or "SMP fiber") by synthesizing a non-protein polymer with a similar molecular structure to silk fibroin protein, and fabricating the fiber from the polymer using a conventional spinning process. The main difference between the SMP fiber and natural spider silk is that the SMP fiber is thermal-responsive (supercontraction when heated) while spider silk is humidity-responsive (supercontraction when wetted) [Agnarsson I, Boutry C, Wong S C, Baji A, Dhinojwala A, Sensenig A T, et al. Supercontraction forces in spider dragline silk depend on hydration rate. Zoology 2009; 112:325-331; Boutry C, Blackledge T. Evolution of Supercontraction in Spider Silk: Structure-function Relationship from Tarantulas to Orb-weavers. Journal of Experimental Biolgoy 2010; 213:3505-3514.]. In this Example, we will first evaluate the outstanding mechanical properties of the SMP fiber, then address the use of the SMP fibers and TPs to heal macro-cracks in regular thermosetting epoxy composite.

Sample Preparation

The SMP fiber was prepared from a segmented polyurethane with relatively short polyols as the scarce soft segment, diisocyantes and small molecular extenders as the rich hard segment. The novel polyurethane was synthesized using poly(butylene adipate) (PBA) (Sigma-Aldrich, USA), 4'4-diphenylmethane diisocyanate (MDI) (Sigma-Aldrich, USA) and 1,4-butanediol (BDO) (Sigma-Aldrich, USA). Dibutyltin dilaurate was used as catalyst with a content of 0.02 wt %. The average formula weight ratio was (MDI+ BDO):PBA=1021: 300. BDO was dehydrated with 4 Å molecular sieves for one day in advance. All the chemicals were de-moisturized prior to use in a vacuum oven. Molten MDI was filtered to remove the precipitate dimmers and any impurities before use. The reaction was conducted in a high speed mixer at room temperature. The obtained polyurethane was further cured in a vacuum oven at 110° C. for 12 hours. Before spinning, the polymer was dried in a vacuum oven at 80° C. for 6 hours. The SMP fibers with a diameter of 50 μm were spun by melt spinning. A customer made screw was used because of the high shear viscosity of the polymer. The laminar air temperature was 22° C. Extruder head pressure was 5.00 MPa. The fiber passed three pairs of rollers before being wound up.

SMP fiber/TP/epoxy composites were fabricated according to the following series for fabricating orthogrid SMP fiber grid skeleton/TP/epoxy composites: (a) First, pins were nailed down on a plywood board along the perimeter. A polytetrafluoroethylene sheet was laid on the board for easy de-molding. (b) The SMP fiber was dry wound around the pins. No resin was applied to the fibers during the weaving process. (c) TP/epoxy mixture was poured into the bay areas of the woven SMP fiber grid skeleton. The composite was degassed and cured. (d) The sample was de-molded.

Polycaprolactone was chosen as the thermoplastic healing agent because it was reported that it could diffuse and rebond cracked epoxy surfaces with a healing efficiency of about 100% [Rodriguez E D, Luo X, Mather P T. Linear/Network Poly(ε-caprolactone) Blends Exhibiting Shape Memory Assisted Self-Healing (SMASH). ACS Applied Materials and Interfaces 2011; 3:152-161; Luo X, Ou R, Eberly D E, Singhal A, Viratyaporn W, Mather P T. A Thermoplastic/ Thermoset Blend Exhibiting Thermal Mending and Reversible Adhesion. ACS Applied Materials and Interfaces 2009; 1(3):612-620]. The polycaprolactone (Mn 45,000, Sigma-Aldrich, USA) had a melting temperature at around 60° C. and density of 1.145 g/cm$^3$. The composites were prepared by a dry weaving process per the pin-guided filament winding process [Li G, Muthyala V. Impact Characterization of Sandwich Structures with an Integrated Orthogrid Stiffened Syntactic Foam Core. Composite Science and Technology 2008; 68:2078-2084]. The spacing between the fiber bundles (ribs) was 13 mm. Epoxy was prepared using bisphenol A diglycidyl ether (The Dow Chemical Company, USA) and triethylenetetramine (The Dow Chemical Company, USA). Bisphenol A diglycidyl ether was melt in advance and mixed with TPs by vigorous stirring for one hour before triethylenetetramine was added. The volume fractions of the TPs and SMP fiber were 12% and 7%, respectively. The mixture was poured into the bay areas of the SMP fiber woven grid skeleton. The composite mixture was degassed in a vacuum oven for 20 minutes and cured at ambient temperature (22° C.) for 40 hours. The glass transition temperature of the epoxy matrix was around 75° C.

3. Materials Characterization 3.1 Characterization of SMP

The molecular structure of the SMP fiber was investigated using Fourier Transform Infrared Spectroscopy (FT-IR, Nicholet 6700, Thermo Scientific, USA) equipped with a Smart iTR universal sample holder in the region of 700-4000 cm$^{-1}$ at room temperature. The thermal properties of the SMP fibers were investigated using a Differential Scanning calorimeter (PerkinElmer DSC 4000, USA). The sample was cooled from room temperature to −50° C. at a speed of 10° C./min. Then the sample was scanned from −50° C. to 240° C. at a heating rate of 10° C./min. The phase separation morphology of the polymer was investigated using an Atomic Force Microscope (AFM, SPA-300HV, Seiko Instruments Inc.) in the tapping-mode under an ambient environment (22±2° C., 45±5% RH). In phase images, a higher modulus material induces a higher phase offset and it appears lighter as opposed to a softer phase which appears darker. SAXS (small angle x-ray scattering) tests of the fiber were conducted on a Nanostar SAXS machine (Bruker, USA). The x-ray source was Cu Kα and the wavelength was about 0.154 nm. Samples were scanned in the range of 0.5° ~3.0° (2θ) at a scanning rate of 0.05° min$^{-1}$. The detector was a Bruker AXS HI-STAR position sensitive area detector. The SAXS was conducted for 1 hour on every sample. The model and calculation equations used to calculate the domain structure can be seen in reference [Ji F. Study on the Shape Memory Mechanism of SMPUs and Development of High-performance SMPUs. Kowloon: Hong Kong; 2009]. The orientation function of the SMP fiber amorphous phase and crystalline phase was determined by IR dichroism using a Perkin-Elmer microscopy (Perkin-Elmer Inc, USA) equipped with a diamond cryogenic Micro-ATR unit and an IR polarizer [Siesler H W, Holland-Moritz K. Infrared and Raman Spectroscopy of Polymers, Marcel Dekker Inc., New York; 1980; Estes G M, Seymour R W, Cooper S L. Infrared Studies of Segmented Polyurethane Elastomers. II. Infrared Dichroism. Macromolecules 1971; 4:452-457]. The calculation methods of the soft and hard segment orientation can be found in references [Lee H S, Ko J H, Song K S, Choi K H. Segmental and Chain Orientational Behavior of Spandex Fibers. Journal of Polymer Science Part B: Polymer Physics 1997; 35:1821-1832; Seymour R W, Jr. AEA, Cooper S L. Segmental Orientation Studies of Block Polymers. I. Hydrogen-Bonded Polyurethanes. Macromolecules 1973; 6:896-902].

The tensile properties of the SMP fibers were tested using MTS (Alliance RT/5, MTS Inc, USA) equipped with a 250 N load cell. Sample clamps specified for fibers were used. The crosshead speed was 80 mm/min and the gage length was 38.1 mm (1.5 inch). 10 specimens were tested. The cross-section area of the SMP fiber was obtained using a Scanning Electron Microscope (SEM, JSM-6390, JEOL Ltd, Japan). The fibers were coated with gold before observation. The damping property tests were conducted using the same MTS (Alliance RT/5, MTS Inc, USA). One end of the fiber was fixed in the upper clamps of the MTS. The other end of the fiber was hooked with a mass (222.2 g). The initial force exerted by the mass was set to be zero. A 1-N force was applied to the fiber and then released to record the damping properties of the fibers. The elastic fiber was an XLA elastomeric fiber made of crosslinking polyolefin from Aquafil Group, Italy. The supercontraction of the fiber was evaluated by measuring the shrinkage percentage of the free fiber with increasing temperature. The supercontraction ratio of the SMP fiber was determined by the following equation: Supercontraction ratio[(L−l)/L]×100%, where L is the original fiber length; l is the length after shrinkage. The supercontraction stress of the SMP fiber was tested using MTS (Qtest/150, MTS Inc, USA) equipment with a thermal chamber (10-162, Thermodynamic Engineering Inc. USA). To determine the thermal-induced supercontraction stress, the fully restrained SMP fiber was heated up from the ambient temperature (25° C.) to 170° C. at a heating rate of 5° C./min. The contraction stress of the SMP fiber was recorded. To improve the contraction stress, the second set of samples was cold-drawn with a strain of 150%. The samples were held for 30 minutes at the strain to partially fix the deformation. Then the strain-hardened fibers were heated up to test the contraction stress. The experiments were repeated 5 times.

The cyclic thermomechanical behavior of the SMP fiber under tension was determined by Instron MTS (Instron Inc, USA). First, the SMP fiber was stretched to 50% elongation ratio at the ambient temperature at a drawing speed of 10 mm/min. Second, the strain was maintained for 15 minutes. Third, the upper clamp was returned and the SMP fiber was heated up to 80° C. for contraction. Forth, the SMP fiber was cooled down to ambient temperature. After the cycle was completed, a second cycle began. To study the interface between the SMP fiber and the polymer matrix, the prepared composite was broken in liquid nitrogen to create fracture surface. The interface between the SMP fiber and the polymer was observed using SEM (SEM, JSM-6390, JEOL Ltd, Japan). The fracture surface was coated with gold before SEM observation. Shape memory alloy wires/TP/epoxy composites were also prepared to study the compatibility in comparison with that of SMP fiber/TP/epoxy composite.

3.2 Characterization of the Self-Healing Composite

To demonstrate the self-closure of macro-cracks upon heating, specimens of 8×15×80 mm$^3$ were cut from the composite panel. A macro-crack was first created on the specimen using the MTS (Qtest 150, MTS Inc, USA) by tension. The crosshead speed was 10 mm/min. The specimen with the macro-crack was put on a hot plate (CORNG 6795-420D, USA) to trigger the supercontraction of the programmed SMP fiber. A high resolution CCD camera (Sony XCD-CR90, Sony Inc. Japan) with a resolution of 3.7×3.7 μm/pixel was used to record the closure of the macro-crack. TDCB (tapered double-cantilever beam specimens) were used to determine the healing efficiency and repeatability of the healing. The healing efficiency was evaluated by tensile test using a MTS Qtest150 machine (MTS Inc, USA) with lab-made sample holders. The protocol for evaluating the self-healing efficiency using the TDCB sample can be seen in reference [Rule J D, Sottos N R, White S R. Effect of Microcapsule Size on the Performance of Self-healing Polymers. Polymer 2007; 48:3520-3529]. The self-healing of the TDCB sample was achieved simply by keeping the cracked TDCB samples in a preheated oven (Gruenberg Model L34HV104 from Lunaire Limited, USA) for 15 minutes at 80° C. (>$T_g$ of the SMP fibers and $T_m$ of the TPs). The oven was power off after 15 minutes and the mechanical property tests on the healed samples were conducted after 24 hours. The healing efficiency $h_n$ was calculated using the equation:

$$h_n = [(F_0 - f_n)/F_0] \times 100\%,$$

where $F_o$ is the maximum loading of the original sample; $f_n$ is the maximum loading of the sample after the $n^{th}$ time of self healing.

4. Results and Discussion

4.1. Molecular Structure and Aggregate Structure of the SMP Fiber

The molecular and aggregate structures of the SMP fiber were studied using DSC, AFM, SAXS, and FTIR dichroism. The similarity between SMP fiber and natural spider silks in the primary and aggregate structure is shown in FIG. 8. Spider silk molecules are sequence of different long chain amino acids mainly consisting of highly repetitive alanine and glycine blocks [Lee S M, Pippel E, Gosele U, Dresbach C, Qin Y, Chandran C V, et al. Greatly Increased Toughness of Infiltrated Spider Silk. Science 2009; 324:488-492; Gatesy J, Hayashi C, Motriuk D, Woods J, Lewis R. Extreme Diversity, Conservation, and Convergence of Spider Silk Fibroin Sequences. Science 2001; 291:2603-2605]. The alanine mainly forms the crystalline domains with a dimension of about 2×5×7 nm. The Glycine with larger side groups forms most of the amorphous phase [Gatesy J, Hayashi C, Motriuk D, Woods J, Lewis R. Extreme Diversity, Conservation, and Convergence of Spider Silk Fibroin Sequences. Science 2001; 291:2603-2605]. The crystalline domains are embedded in the amorphous phase (see FIG. 8(c) which shows the aggregate phase structure of SMP fiber and spider silk). The soft segment and hard segment form the amorphous soft phase and crystalline hard phase, respectively. Abundant hydrogen bonding forms between amino group and carbonyl group in the crystalline hard phase. The amorphous phase and crystalline phase are partially oriented. The segment assembling into crystalline rigid beta sheet domains can be regarded as the hard segment. The segment forming helical and beta turn amorphous phase can be regarded as the soft segment. The interplay between the crystalline hard region and the soft amorphous region endows spider silks with the extraordinary toughness and strength. The hydrogen bond in spider silks is one of the basic chemical bonds that play a vital role in the mechanical properties of spider silk as demonstrated by Buehler's research [see, e.g., Qin Z, Buehler M J. Cooperative Deformation of Hydrogen Bonds in Beta-strands and Beta-sheet Nanocrystals. Physical Review E 2010, 82:061906]. In the spider silk, the hard segment and soft segment are partially orientated.

As shown in FIG. 9, the SMP fiber has an amorphous soft phase and a crystalline hard phase. The broad glass transition of the soft phase locates around ambient temperature in the range of 0~50° C., and melting transition of the crystalline hard phase locates at around 120~190° C. Like spider silk, the SRP undergoes microphase separation into crystalline phase and amorphous phase as demonstrated by the DSC results in FIG. 9. This is because of the low compatibility of the rich hard segment and the scarce soft segment. The hard segment phase forms crystalline domains which can act as reinforcing nanofillers, stiffening and strengthening the SMP fiber [Ji F L, Hu J L, Li T C, Wong Y W. Morphology and Shape Memory Effect of Segmented Polyurethanes. Part I: With crystalline Reversible Phase. Polymer 2007; 48:5133-5145]. The phase separation structure of the polymer was observed using AFM. in which darker areas are indicative of soft segment phase and lighter areas may represent hard segment phase [see, e.g., Garrett J T, Siedlecki C A, Runt J. Microdomain Morphology of Poly (urethane urea) Multiblock Copolymers. Macromolecules 2001; 34:7066-7070]. The phase image indicated the phase separation of the polymer with lighter hard segment phase regions and darker soft segment phase regions. The SAXS profile of the SMP fiber with a scattering shoulder (data not shown) also indicated that the SMP fiber is phase separated. The calculated interdomain spacing based on the Bragg's law is 7.95 nm.

The abundant hydrogen bonding in the SMP fiber was demonstrated by FTIR. (see FIG. 10). The FTIR spectrum of the SMP fiber and the raw chemicals is shown in the ranges of: FIG. 10 Panel (a) 4000-3200 $cm^{-1}$ and FIG. 10 Panel (b) 1800-1600 $cm^{-1}$. In FIG. 10 Panel (a), because of the hydrogen bonding of N—H.C═O, the stretching vibration of (N—H) shifts to 3320 $cm^{-1}$. (free ν(N—H) locates at around 3440 cm 1) [Sun H. Ab initio Characterizations of Molecular Structures, Conformation Energies, and Hydrogen-bonding Properties for Polyurethane Hard Segments. Macromolecules 1993; 26:5921-5936; Seymour R, Estes G, Cooper S. Infrared Studies of Segmented Polyurethane Elastomers. I. Hydrogen bonding. Macromolecules 1970; 3:579-583; Yilgör E, Yilgör S, Yurtsever E. Hydrogen Bonding and Polyurethane Morphology. I. Quantum Mechanical Calculations of Hydrogen Bond Energies and Vibrational Spectroscopy of Model Compounds. Polymer 2002; 43:6551-6559;] As shown in FIG. 10 Panel (b), because of the hydrogen bonding N—H.C═O, most of the stretching vibration of (C═O) shifts from 1730 cm-1 to 1700 cm-1. Both the shift of the N—H and C═O stretching vibration to low wave numbers indicates significant hydrogen bonding in the SMP fiber. Because of the complexity of the hydrogen bonding in this SMP fiber, the hydrogen bonding degree was not calculated based on the FTIR spectra.

The shift of the stretching vibration of N—H from high wave number to low wave number indicates the hydrogen bonding between the N—H.O═C. The "bifurcated" C═O stretching vibration suggests that the C═O groups are mostly hydrogen bonded [Lin C K, Kuo J F, Chen C Y, Fang J J. Investigation of Bifurcated Hydrogen Bonds within the Thermotropic Liquid Crystalline Polyurethanes. Polymer 2012; 53:254-258]. Both the shift of the N—H and C═O stretching vibration to low wave numbers indicates abundant hydrogen bonding in the SMP fiber.

The soft segment and hard segment orientation of the SMP fiber was determined using IR dichroism as shown in FIG. 11. The significant differences between the two profiles $A_{\parallel}$ and $A_{\perp}$ suggest the orientation of the macromolecules in the SMP fiber. The soft segment orientation function was calculated to be 0.19; and the hard segment orientation function was calculated to be 0.56 according to the equations from references [Siesler H W, Holland-Moritz K. Infrared and Raman Spectroscopy of Polymers, Marcel Dekker Inc., New York; 1980; Estes G M, Seymour R W, Cooper S L. Infrared Studies of Segmented Polyurethane Elastomers. II. Infrared Dichroism. Macromolecules 1971; 4:452-457].

4.2. Mechanical Properties of the SMP Fiber

Spider silks in particular dragline silk, exhibit a unique combination of high tensile strength and extensibility. This enables the unbeatable toughness (area under a stress-strain curve) of spider dragline silks [Lee S M, Pippel E, Gosele U, Dresbach C, Qin Y, Chandran C V, et al. Greatly Increased Toughness of Infiltrated Spider Silk. Science 2009; 324:488-492; Lazaris A, Arcidiacono S, Huang Y, Zhou J-F, Duguay F, Chretien N, et al. Spider Silk Fibers Spun from Soluble Recombinant Silk Produced in Mammalian Cells. Science 2002; 295:472-476]. However, because of the difficulty of replicating spider silk proteins and mimicking the exact spinning process of spider silks, the research on fabricating artificial spider dragline silk is not very successful. One of the best achievements to fabricate artificial spider silk is to use recombinant spidroin-like protein to prepare fiber through wet spinning Elices et al. [Elices M, Guinea G V, Plaza G R, Karatzas C, C. Riekel, Agullo-Rueda F, et al. Bioinspired Fibers Follow the Track of Natural Spider Silk. Macromolecules 2011; 44:1166-1176] prepared artificial spider silk recombinant spidroin-1 and spidroin-2 (dragline spider silk) in the major ampullate gland of the spider *Nephila clavipes*. The maximum mechanical strength of the recombinant spider dragline silks achieved was only ⅕ of natural spider dragline silk [Elices M, Guinea G V, Plaza G R, Karatzas C, C. Riekel, Agullo-Rueda F, et al. Bioinspired Fibers Follow the Track of Natural Spider Silk. Macromolecules 2011; 44:1166-1176; Plaza G R, Corsini P, Marsano E, Perez-Rigueiro J, Biancotto L, Elices M, et al. Old Silks Endowed with New Properties. Macromolecules 2009; 42:8977-89821.

FIG. 12(*a*) shows the tensile properties of the SMP fiber (designated D) in comparison with natural spider dragline silk (designated B) [Omenetto & Kaplan, Science, 2010; 329:528], recombinant dragline silk (collectively designated D)) (Elices M, Guinea G V, Plaza G R, Karatzas C, C. Riekel, Agullo-Rueda F, et al. Bioinspired Fibers Follow the Track of Natural Spider Silk. Macromolecules 2011; 44:1166-1176]), other high performance fibers (collectively shown within oval at uppermost arrow and designated A) (ACI Committee 440, [440 AC. ACI Committee 440, "State-of-the-Art Report on Fiber Reinforced Plastic Reinforcement for Concrete Structures" American Concrete Institute, Farmington Hills, Mich., 153. In; 1996. p. 627-628]), and steel bar (designated B) (standard tensile specimen, STFC18, cold rolled steel, USA). The tensile strength of the SMP fiber is approaching though it is still lower than that of the spider dragline silk. The tensile strength of the SMP fiber is 3 times of that of the recombinant fibers. Both the tensile strength of the spider dragline silk and SMP fiber is much higher than that of steel bar.

Spider silk is the toughest fiber of all the silks and synthetic fibers in existence. Kevlar™ fiber (aromatic fiber) is the toughest synthetic fiber which has been widely used for ballistic rated body armor fabric and ballistic composites. FIG. 12(*b*) shows the toughness of the SMP fiber in comparison with spider dragline silk, Kevlar fiber, recombinant dragline silk, other high performance fibers, and steel bar [Omenetto F G, Kaplan D L. New Opportunities for an Ancient Material. Science 2010; 329:528-531; Gosline J M, Guerette P A, Ortlepp C S, Savage K N. The Mechanical Design of Spider Silk: From Fiberoin Sequence to Mechanical Function. The Journal of Experimental Biology 1999; 202:3295-3303]. The SMP fiber has a toughness value of 245 MJ/m$^3$ which is much higher than natural spider dragline silk, and Kevlar fiber; it is 1.4 times of that spider dragline silk, 4 times of that of the recombinant fiber, 5 times of that Kevlar fiber (Intermediate modulus, IM), 5 times of that of Steel bar (Cold drawn Ferritic Steel 18#, STFC18), 6 times of that of Glass fiber (E-glass, E), 11 times of that of Carbon fiber (High strength, HS), and 30 times of that of Carbon fiber (High modulus, HM).

Experiments mimicking prey striking fibers were conducted wherein a 5 pound mass was dropped from 0.7 m height above the fibers to strike the SMP fibers and carbon fibers. The mass was regarded as a prey to strike fibers.

A series of SMP fiber and carbon fiber bundles with different numbers of fibers were tested. The total cross-section area of the fibers was obtained by multiplying the cross-section area of a single fiber with the number of the fibers in the bundle. The cross-section area of the single SMP fiber and carbon fiber was obtained from their SEM images. The SMP fiber bundles with the total cross-section areas of 0.1 mm$^2$, 0.2 mm$^2$, 0.3 mm$^2$, 0.4 mm$^2$, and 0.5 mm$^2$ were tested. Carbon fiber bundles with the total cross-section areas of 0.6 mm$^2$, 1.2 mm$^2$, 1.8 mm$^2$, 2.4 mm$^2$, and 3.0 mm$^2$ were tested. The experiments were repeated three times for consistency.

It was found that with increasing the total cross-section area, the SMP fiber bunches with the total cross-section areas of 0.1 mm$^2$ and 0.2 mm$^2$ were broken; while the SMP fiber bunches with the total cross-section areas of 0.3 mm$^2$, 0.4 mm$^2$, and 0.5 mm$^2$ were not broken after the impact tests. For carbon fiber bundles, with increasing total cross-section area, the carbon fiber bundles with the total cross-section areas of 0.6 mm$^2$ and 1.2 mm$^2$ were completely broken after the impact; while the carbon fiber bundles of 1.8 mm$^2$ total cross-section area was almost broken completely and the carbon fiber bundles with the 2.4 mm$^2$, and 3.0 mm$^2$ total cross-section areas were not broken after the impact.

The carbon fiber bundle with a cross-sectional area of 1.8 mm$^2$ was severely damaged; while no damage was found on the SMP fiber bundle with a cross-sectional area of 0.3 mm$^2$. The results showed that the SMP fiber is much tougher than carbon fiber. Thus, this data demonstrated the outstanding toughness of the SMP fiber.

In addition to the outstanding toughness, another crucial issue for spider dragline silk is damping properties which represent how the energy is absorbed if it is impacted. FIG. 13 shows the remarkable damping properties of the SMP fiber as compared with spider dragline silk and elastomeric fiber. Visual observation showed the outstanding damping property of SMP fiber as compared with elastomeric fiber. The oscillation amplitude of a mass attached to the SMP fibers reduced quickly with no obvious twisting and swinging. The oscillation of the mass attached to the elastomeric lasted a long time period with obvious twisting and swinging of the string. (Also see Supplementary Video 1 to Guoqiang Li, Harper Meng and Jinlian Hu, "Healable Thermoset Polymer Composite Embedded With Stimuli-Responsive Fibers", J. R. Soc. Interface (2012) 9, 3279-3287) FIG. 13 compares the damping properties of the SMP fiber, spider dragline silk ([440 AC. ACI Committee 440, "State-of-the-Art Report on Fiber Reinforced Plastic Reinforcement for Concrete Structures" American Concrete Institute, Farmington Hills, Mich., 153. In; 1996. p. 627-628]), and elastic fiber. Similar to dragline silk, the SMP fiber has outstanding damping properties. The dragline silk and SMP fiber can become stabilized in a much shorter time. The decay speed of the SMP fiber is even higher than that of dragline silk. This suggests that the SMP fiber through molecular friction can effectively transform the impact energy into heat thereby dissipating the energy. Just like the dragline silk acts as a safety line, the SMP fiber can also stop the twisting and swinging of an object hung at the end as a result of the good damping properties.

4.3. Thermal-Responsive Supercontraction of the SMP Fiber

A free spider dragline silk shrinks up to 50% in length when wetted. The mechanism is the plasticizing effect of water and disruption of hydrogen bonds in spider silk, leading to the formation of less organized silk protein [Boutry C, Blackledge T A. Evolution of Supercontraction in Spider Silk: Structure-function Relationship from Tarantulas to Orb-weavers. The Journal of Experimental Biology 2010; 213:3505-3514]. No obvious water-induced supercontraction was observed on the SMP fiber because the SMP fiber is not as hydrophilic as spider silk. The SMP fiber showed thermal-induced supercontraction as a result of its special two-phase structure. During the spinning process, at a temperature above the melting temperature of the crystalline hard segment phase, the fiber is extruded from spinneret. Upon cooling to ambient temperature, the fiber is wound up. The molecules of SMP fiber are slightly oriented resulting from the spinning process. When the SMP fiber is heated up, the soft segments in the amorphous phase have enough mobility. The hydrogen bonded crystalline hard segment phase has a tendency to contract the fiber which leads to shrinkage of the fiber. Cold-drawing leads to more alignment of the amorphous phase and thus more supercontraction. Further increasing the temperature leads to the melting of the hard segment phase, which results in the further shrinkage of the SMP fiber.

FIG. 14(a) presents the thermal-induced free supercontraction ratios of the SMP fibers at different temperatures. FIG. 14(b) shows the contraction stress curves of the restrained SMP fiber. The SMP fiber has a contraction stress of 1.8 MPa. The contraction stress of the SMP fibers can be improved by strain-hardening through cold-drawing; as shown in FIG. 14(c), after a one-time of 100% strain-hardening by cold-drawing, the contraction stress of the SMP fiber reaches 7.8 MPa.

4.4. Cyclic Thermo-Mechanical Tensile Test

Cyclic thermo-mechanical tensile testing curves of the SMP fiber were generated (data not shown). If a crack is created in a composite embedded with the SMP fibers, the fiber will be deformed by stretching (similar to cold-drawing programming). Upon heating, the contraction of the SMP fibers closes cracks in the composite by recovering the strain to 0. Furthermore, because the SMP fiber with the supercontraction has a tendency to shrink further, the fiber may exert a compressive force on the closed crack interfaces. The cyclic thermo-mechanical cycles were repeatable; therefore, the capability of the SMP fiber to heal macroscopic damages is repeatable.

4.5. Thermal-Induced Self-Healing of the SMP Fiber Composite

It is expected that the SRFs with the outstanding mechanical properties and thermal-induced supercontraction can close macroscopic cracks if they are embedded in composites. The SMP fiber and TPs were incorporated into a regular epoxy for the self-healing of macroscopic damages. The interface between the SMP fiber and polymer matrix was compared with that of shape memory alloy wire and the polymer matrix. Microscopic data found that the interface between the SMP fiber and the matrix is not clear; while the interface between the shape memory alloy wire and the polymer matrix was clear indicating a lack of compatibility. Consequently, the shape memory alloy wire is pulled out of the matrix. In comparison with shape memory alloy wire, the SMP fiber has better compatibility with the polymer matrix.

FIG. 15(a) shows the schematic self-healing process of the SMP fiber/TP/epoxy composite with a macro-crack (also see, FIG. 6 and FIG. 35, and respective related text). The healing process consists of two-steps. In the first-step, the damaged sample is heated to a temperature ($T_i$) above the glass transition temperature of the SMP fiber to trigger the thermal-induced supercontraction of the SMP fibers. The supercontraction of the SMP fibers closes the macro-crack. In the second step, the composite is further heated up to the bonding temperature (T2) of the TPs. The molten TPs flows into the narrowed crack by capillary force, diffuses into the fractured epoxy matrix by concentration gradient, and forms physical entanglement and solid wedge when the sample is cooled down.

Actual self-healing of the composite was performed. In Step 1, the damaged sample was put on a hot plate. A macro-crack (3 mm wide) closed within 2 minutes as a result of the thermal-induced contraction of the SMP fiber (Also see Supplementary Video 2 to Guoqiang Li, Harper Meng and Jinlian Hu, "Healable Thermoset Polymer Composite Embedded With Stimuli-Responsive Fibers", J. R. Soc. Interface (2012) 9, 3279-3287). Visual observation showed that heating the damaged sample triggered the thermal-induced supercontraction of the SMP fibers to close the macro-crack. The damaged sample is put on a preheated hot plate. The crack is about 3 mm in width (rising of the sample was because of the uneven heating of hot plate). In Step 2, the composite with the closed/narrowed crack was maintained in an oven preheated to 80° C. for 15 minutes. The molten TPs diffused into the cracked matrix and bridged the crack plane. In addition to direct heating, in future research, conducting fillers or magnetic fillers may be filled into the composites so that the self-healing can be achieved by electric field, alternating magnetic field, or infrared light [Jung Y C, Yoo H J, Kim Y A, Cho J W, Endo M. Electroactive Shape Memory Performance of Polyurethane Composite Having Homogeneously Dispersed and Covalently Crosslinked Carbon Nanotubes. Carbon 2010; 48:1598-1603; Liu Y, Lv H, Lan X, Leng J, Du S. Review of Electro-Active Shape-Memory Polymer Composite. Composites Science and Technology 2009; 69:2064-2068].

The healing efficiency of the composite was investigated using TDCB (tapered double cantilever beam) specimens as suggested by Rule J D, Sottos N R, White S R. Effect of Microcapsule Size on the Performance of Self-healing Polymers. Polymer 2007, 48:3520-3529. FIG. 16(a) shows the typical load-deflection curves of the original and healed TDCB samples after different fracture/healing cycles; and FIG. 16(b) presents the maximum loading of the original and healed TDCB samples after different fracture/healing cycles. According to FIG. 16(b), after the first two-step healing process, 94% of the strength of the sample was recovered. After four rounds of cracking/healing cycles, the healing efficiency can reach 80%. The healing process is reasonably repeatable. "To conduct more precise healing efficiency evaluation, the healing efficiency can be further calculated following energy based approach for proposed by Rule J D, Brown E N, Sottos N R, White S R, Moore J S. Wax-protected Catalyst Microspheres for Efficient Self-healing Materials. Advanced Materials 2005; 72:205-208.

5. Discussion

SMP fibers with superior mechanical properties and thermal-responsive supercontraction were fabricated for the purpose of healing macroscopic damages in composites. The SMP fiber has superior toughness which is 1.4 times of spider dragline silk, 5 times of that Kevlar fiber (IM), 6 times of that of Glass fiber (E), 11 times of that of Carbon fiber (HS), and 30 times of that of Carbon fiber (HM). SMP fiber grid stiffened epoxy composite with embedded thermoplastic particles was fabricated for healing macroscopic cracks in regular epoxy. Following the two-step biomimetic self-healing scheme, the SMP fibers and TPs healed macroscopic crack in epoxy with a healing efficiency of over 90%. The healing process was also repeatable. The SMP fiber composites provide a new way to repeatedly, efficiently, and molecularly heal macroscopic damages in regular thermosetting polymer composites.

Example 4

The following Example 4 is based on studies and data also set forth in: Guoqiang Li, Oludayo Ajisafe, Harper Meng; "Effect of Strain Hardening of Shape Memory Polymer Fibers On Healing Efficiency Of Thermosetting Polymer Composites" Polymer 54 (2013) 920-928; this document is fully incorporated by reference herein.

This Example shows the effect of cold-drawing programming of SMPFs on the healing efficiency of conventional thermosetting polymer composites and the ability to heal wide-opened cracks by localized heating. To achieve the objective, continuous SMPF strand reinforced conventional epoxy composite beam specimens, which were dispersed with thermoplastic particles, were prepared. The SMPF strands were cold-drawn to various pre-strain levels before casting the polymer matrix. Repeated fracture/healing test was conducted by uniaxial tension. It was found that the composites were able to repeatedly heal macroscopic cracks. Strain-hardening by cold-drawing increased the healing efficiency considerably. It was also demonstrated that healing can be achieved by heating locally surrounding the cracked region. The mechanism for the enhanced recovery stress was due to cold-drawing induced molecular alignment and formation of some perfect crystals in the hard segment domain of the SMPF.

As set forth herein, the CTH concept has been applied to healing damage in conventional thermosetting polymer composites [Li G, Shojaei A. A viscoplastic theory of shape memory polymer fibers with application to self-healing materials. Proceedings of the Royal Society A-Mathematical Physical and Engineering Sciences 2012; 468:2319-2346; Li G, Meng H, Hu J. Healable thermoset polymer composite embedded with stimuli-responsive fibers. Journal of the Royal Society Interface 2012; 9:3279-3287]. This mimics the healing of human skin, i.e., for a wide or deep cut, the skin needs to be first closed by stitch before new cells grow. In this idea, SMPF grid skeleton is embedded into conventional thermosetting polymer matrix as built-in suture to close crack; thermoplastic particles/structures are dispersed in the thermosetting polymer matrix and these function like "new cells" to heal crack molecularly. For example, when a wide-opened crack is created, heating leads to constrained shrinkage of the SMPFs, resulting in closure of the crack. Further heating leads to melting of the embedded thermoplastic particles. The molten thermoplastic is sucked into the narrowed crack through capillary force, diffused into the fractured thermosetting polymer matrix by concentration gradient, and glues the fractured surfaces molecularly when the thermoplastic wedge is solidified by cooling below the melting temperature of the thermoplastic particles.

In accordance with the present invention, partial miscibility between the SMPFs/matrix and thermoplastic particles/matrix is called for. In addition, the following temperature relationships are generally important: $T_c < T_t < T_b < T_m < T_f$. These symbols $T_c$, $T_t$, $T_b$, $T_m$, and $T_f$ are respectively: the curing temperature of the matrix ($T_c$), shape recovery temperature of the SMPFs ($T_t$), bonding temperature of the thermoplastic particles ($T_b$), melting temperature of the SMPFs ($T_m$), and temperature for the matrix to catch fire ($T_f$).

According to the biomimetic CTH mechanism of the present invention, the ability for the SMPFs to close wide-opened crack depends on the recovery force applied to the two sides of the crack. Usually, as-spun SMPFs, which have very limited molecule alignment during the manufacturing process, have very small recovery stress (less than 2 MPa) [Meng Q H, Hu J L. Study on Poly(ε-caprolactone)-based shape memory copolymer fiber prepared by bulk polymerization and melt spinning Polymers for Advanced Technologies 2008; 19:131-136], which may not be sufficient to close wide-opened cracks. It has been found that strain hardening through cold-drawing programming can increase the recovery stress of thermoplastic SMPs [Ping P, Wang W, Chen X, Jing X. Poly(ε-caprolactone) polyurethane and its shape-memory property. Biomacromolecules 2005; 6:587-592; Wang W, Jin Y, Ping P, Chen X, X. Jing, Su Z. Structure evolution in segmented poly(ester urethane) in shape-memory process. Macromolecules 2010; 43:2942-2947; Zotzmann J, Behl M, Feng Y, Lendlein A. Copolymer networks based on poly(ω-pentadecalactone) and poly(ε-caprolactone) segments as a versatile triple-shape polymer system. Advanced Functional Materials 2010; 20:3583-3594]. Therefore, strain hardening through cold-drawing programming of thermoplastic SMPFs is a preferred approach to enhance the healing efficiency of the present invention.

It is impractical to heat an entire structure with large size in order to activate the constrained shape recovery of the embedded SMPFs and to heal a crack somewhere within the structure, for instance a crack in the fuselage of an aircraft. Ideally, heating should be localized and surround the cracked region, i.e., "hot" in the cracked region and "cold" in the remaining of the structure. In Example 3, [Li G, Meng H, Hu J. Healable thermoset polymer composite embedded with stimuli-responsive fibers. Journal of the Royal Society Interface 2012; 9:3279-3287] the entire panel was heated in thus this Example evaluates (1) the level of cold-drawing on the healing efficiency of a thermosetting polymer composite embedded with thermoplastic SMPFs and thermoplastic particles and (2) the ability of healing wide opened crack by localized heating surrounding the cracked region.

2. Studies 2.1 Raw Materials

EPON™ Resin 828, an undiluted clear difunctional bisphenol A/epichlorohydrin derived liquid epoxy resin, and D.E.H. 24 curing agent by Dow Chemical were used to prepare the thermosetting polymer matrix. This is a low temperature curing polymer which can avoid shape recovery of the embedded SMPFs during the curing process. According to the manufacturer, the cured epoxy has a tensile strength of 69 MPa and modulus of elasticity of 2,750 MPa.

CAPA 6506 by Perstorp U K Limited, a high molecular weight linear polyester derived from caprolactone monomer, was used as the thermoplastic healing agent. It is a white powder with a molecular weight of 50,000. The density of the particle is 1.1 g/cm³, the melting temperature is 58-60° C., and 98% of the powders have a particle size of less than 0.6 mm.

The same SMPFs used by Li et al. [Li G, Meng H, Hu J. Healable thermoset polymer composite embedded with stimuli-responsive fibers. Journal of the Royal Society Interface 2012; 9:3279-3287] were used in this study. They were polyurethane fibers manufactured by a melt spinning process. The polyurethane was synthesized using poly(butylene adipate) (PBA) (Sigma-Aldrich, USA), 4'4-diphenylmethane diisocyanate (MDI) (Sigma-Aldrich, USA) and 1,4-butanediol (BDO) (Sigma-Aldrich, USA) with PBA as the soft segment phase and (MDI+BDO) as the hard segment phase. Dibutyltin dilaurate was used as catalyst with a content of 0.02 wt %. The molecular weight of PBA is about $M_n = 650$. The average formula weight ratio was (MDI+BDO):PBA=1021: 300. Based on the formula weight ratio, the segmented SMPFs have about 77% by weight of hard segment domain and about 23% by weight of soft segment domain.

2.2 Determination of Fiber Volume Fraction

In order to evaluate the effect of fiber strain hardening on the healing efficiency, it is required that the embedded fiber be able to close a crack with given width. Obviously, this depends on both fiber volume fraction and recovery stress. To this purpose, beam specimens with an artificial crack were prepared. A beam specimen embedded with SMPF bundles is schematically shown in FIG. 17(a). At the center of the beam, there exists a through-thickness crack with width of 2 w. The pre-cracked beam is clamped at both ends during healing process. The reason of using clamped boundary condition is to simulate localized heating of the cracked beam specimens. In this condition, the heated beam represents "hot" region in a large structure and the clamped boundary condition simulates the constrained by the remaining "cold" portion of the entire structure. The fiber volume fraction required for SMPFs without strain hardening (which has limited molecule alignment during manufacturing) to close the central crack can be found by simple stress analysis.

Based on a rudimentary stress analysis, the half crack width is related to the recovery force of the fiber strands as given below:

$$w = \int_0^l \frac{F_r}{abE(x)} dx \quad \text{(Eq. 4)}$$

where $F_r$ is the recovery force by the fiber bundles, which is equal to $nA\sigma_r$, in which n is the number of fibers, A is the cross-sectional area of each fiber, and $\sigma_r$ is the recovery stress of the fiber. E(x) is the modulus of elasticity of the polymer matrix at the fiber recovery temperature. l, a and b are the half length, width and thickness of the beam, respectively.

Assuming E(x) is a constant (uniform temperature along the beam) and $\sigma_r$ is also a constant, the above equation can be rewritten as:

$$w = \frac{nA\sigma_r l}{abE} \quad \text{(Eq. 5)}$$

For the polyurethane SMP fibers used in this study, the recovery stress of the as-spun SMPF is about 2.0 MPa [Li G, Meng H, Hu J. Healable thermoset polymer composite embedded with stimuli-responsive fibers. Journal of the Royal Society Interface 2012; 9:3279-3287]. The modulus of the EPON 828 epoxy at 80° C., which is the proposed healing temperature in this study, is about 200 MPa. The diameter of the fiber as seen from SEM microscopy was about 0.05 mm. If the beam specimen to be used during healing efficiency tests has a gauge length of 152.4 mm, width of 12.7 mm and thickness of 5 mm, it is estimated that, with 9.9% fiber volume fraction, the crack width that can be closed by SMPFs without pre-tension is about 2 w≈0.15 mm. For this fiber volume fraction, the number of fibers that can be seen in the cross sectional area is about 3,200.

2.3 Strain Hardening by Cold-Drawing Programming of the SMPFs

The SMPFs were cold-drawn to various pre-strain levels in order to increase their recovery stress. The cold-drawing process was coupled with the specimen preparation of the composite beams. The SMP filament from a spool was first wound by an improvised fiber winder into fiber strand or bundle, with each strand consisting of 200 filaments (fibers). Steel nails (guiding pins) were driven into the two ends of a wood board based on the designed length and spacing between fiber strands for winding the fiber strands and providing pre-tension. The fiber strand was respectively stretched to 50% or 100% strain around the pins and continued winding and stretching until the designed volume fraction (9.9%) of the fibers was achieved. Fiber strand without stretching was also used as control. A schematic of a fiber strand being stretched to 100% pre-strain is shown in FIG. 17(b).

2.4 Beam Specimen Preparation and Crack Creation

Once the fiber strands were placed into the bottom wood board, four other pieces of wood boards were attached to the bottom board by nails to form a wood mould. The mould has a length of 177.8 mm, width of 38.1 mm, and height of 5.0 mm. Therefore, the panel from this mould will yield three beam specimens with a length of 177.8 mm, width of 12.7 mm, and thickness (height) of 5.0 mm. In the top view in FIG. 17(a), each beam specimen has four parallel SMP strands in one layer. Because each strand has 200 fibers and a total of 3,200 fibers are needed to have a fiber volume fraction of 9.9%, there are 4 layers of fiber strands through the thickness for the strands without pre-tension.

In order to investigate the healing efficiency in a controlled way, artificial cracks were needed. To create the artificial crack with an opening of 0.15 mm, an aluminum foil with thickness of 0.15 mm was cut and placed at the centre of the mould. The foil was machined into a comb shape so that it perfectly mated with the 12 fiber bundles. Releasing agent was sprayed on to the foil so that it could be easily pulled out after curing, creating a pre-crack in each beam specimen with SMPF strands bridging over the crack.

The thermoplastic particles (CAPA 6506) were then added to the EPON 828 resin while stirring by a mechanical mixer. The volume fraction of the thermoplastic particles was 7%. After about 10 minutes of stirring, the D.E.H. 24 hardener was added to the mixture at a volume ratio of 9:1 of resin:hardener. Stirring continued for another 10 minutes. The mixture was then powered into the wood mould until the designed thickness of 5.0 mm was achieved. The mould was then left to cure at room temperature for 4 days. After that, the panel was de-moulded and beam specimens with a length of 175.0 mm, width of 12.7 mm, and height of 5.0 mm were cut by a water jet machine for tensile testing.

2.5 Repeated Fracture/Healing Test on Beam Specimens

For the prepared beam specimens with pre-crack, they were brought to MTS Q-TEST 150 machine for healing test. The specimen was tightly clamped to the tensile fixture which was extended into an oven. About 12.7 mm at each end of the specimens was clamped, which suggests the gauge length of the specimens was about 152.4 mm. Thermocouples were installed into the oven to monitor the temperature. Tensile mode was set up but the loading rate of the MTS was 0 mm/min so that the recovery force can be recorded. The chamber was heated up from room temperature (about 20° C.) at a rate of 2.67° C./min until 80° C. The temperature was then held at 80° C. for 20 minutes. This allowed the shape recovery of the SMPFs and melting, diffusion, and bonding of the thermoplastic particles. After that, the specimen was removed from the chamber and allowed to cool down to room temperature. The healed specimens were then non-destructively examined by optical microscope and C-Scan to validate the healing at microlength scale as will be discussed later. Once the specimens were non-destructively inspected, they were brought back to the MTS Q-TEST 150 machine at room temperature for tensile testing until fracture. The loading rate was 12 mm/min per ASTM D638-10 standard. After fracture, the specimen was put into the chamber and healed again following the same procedure as the first healing. This fracture/healing cycle continued until 7 cycles to evaluate the repeatability of the healing.

2.6 Non-Destructive Testing

In this study, both microscopic observation and C-Scan were conducted on the prepared specimens and healed specimens. Ultrasonic inspection was performed on the specimens before and after each healing cycle using a 5 MHz transducer for the specimen. An UltraPac inspection machine from Physical Acoustics Laboratory was used in conjunction with UltraWin software to acquire the C-Scan images and identify damage and healing. The same transducer and setting were used for each specimen to view it before and after recovery for comparisons. An Amscope Optical Microscope was also used to visualize the crack healing at macro-length scale and JEOL JSM-6390 Scanning Electron Microscope (SEM) was used to visualize the crack healing at micro-length scale.

2.7 Tensile Test on SMPFs

In order to understand the stress-strain behavior of the SMPFs and strain-hardening during the cold-drawing process, MTS (Alliance RT/5, MTS Inc, USA) equipped with a 250 N load cell was used to test the fibers by tension at room temperature. The loading rate was 20 mm/min per ASTM D76/D76M standard. The fiber was stretched until failure to determine the maximum tensile strength.

2.8 Differential Scanning Calorimetry (DSC) Test

The thermal properties of the original SMPFs and the SMPFs after cold-drawing were investigated using a differential scanning calorimeter (Perkin-Elmer Diamond-4000) with nitrogen as the purge gas. Indium and zinc were used for calibration. The following steps were followed: (1) The fiber sample was first cooled from ambient temperature to −50° C.; (2) the sample was heated to 240° C.; (3) the sample was quenched to −50° C.; and (4) the sample was scanned from −50 to 240° C. The result from the second heating scanning was used to analysis the thermal properties. The heating and cooling rate in each step was the same, which was 10° C./min.

3. Results and Discussion 3.1 Tensile Test Results of SMPFs

FIG. 18 shows the tensile test results of the SMPFs without pre-tension, with 50% pre-tension, and with 100% pre-tension, respectively. It is clear that pre-tension increases the stiffness (slope of the stress-strain curve) and strength (peak stress) of the SMPFs. Of course, like strain hardening by cold-working on metals, the increase in strength and stiffness is as a result of reduction in ductility. Therefore, a balance or optimal strain-hardening needs to be found which provides both the required recovery stress for healing and sufficient strength, stiffness, and ductility for carrying structural load. This will be a topic in future studies.

It is noted that strain hardening by cold-drawing not only increases the strength and stiffness at room temperature as shown in FIG. 18, but also enhances the recovery stress of the SMPFs at the healing temperature (as will be shown later in FIG. 20), which is a key for the biomimetic self-healing scheme. As discussed in [Li G, Shojaei A. A viscoplastic theory of shape memory polymer fibers with application to self-healing materials. Proceedings of the Royal Society A-Mathematical Physical and Engineering Sciences 2012; 468:2319-2346; Li G, Meng H, Hu J. Healable thermoset polymer composite embedded with stimuli-responsive fibers. Journal of the Royal Society Interface 2012; 9:3279-3287] and Eq. (4) and Eq. (5), increase in recovery stress can enhance the healing efficiency because the wide-opened crack can be brought together tightly and also help diffusion of the molten thermoplastic molecules into the fractured epoxy matrix (pressure assisted diffusion). The reason for the enhancement in recovery stress is due to the increase in stiffness of the clod-drawn SMPFs at the healing temperature (here 80° C.). A direct evidence of the increase in stiffness after cold-drawing programming comes from the Dynamic Mechanical Analysis (DMA) test result. Li and Shojaei [Li G, Shojaei A. A viscoplastic theory of shape memory polymer fibers with application to self-healing materials. Proceedings of the Royal Society A-Mathematical Physical and Engineering Sciences 2012; 468:2319-2346] conducted a DMA test for the as-spun SMPF and SMPF after cold-drawing for three cycles to 250% strain. It is clear that the storage modulus of the cold-drawn SMPF is about an order higher than that of the as-spun SMPF at the healing temperature of 80° C. Because the constrained recovery stress is in direct proportion to the stiffness of the SMPFs, the increase in stiffness leads to the increase in the constrained recovery stress of the cold-drawn SMPFs.

The mechanisms for the increase in stiffness of the cold-drawn SMPFs can be understood from the following:

(i) As shown in the Small Angle X-Ray Scattering (SMAX) test result in [Li G, Shojaei A. A viscoplastic theory of shape memory polymer fibers with application to self-healing materials. Proceedings of the Royal Society A-Mathematical Physical and Engineering Sciences 2012; 468:2319-2346], after cold-drawing to 350%, the SMPF transformed from a primarily amorphous morphology or a morphology with a few less perfect crystals to a new morphology with more crystals, and some of them may be perfect crystals. It is noted that the molecular weight of the soft segment is about $M_n$=650, which is difficult to form crystal structure even under strain hardening condition [Ping P, Wang W, Chen X, Jing X. Poly(ε-caprolactone) polyurethane and its shape-memory property. Biomacromolecules 2005; 6:587-592]. Therefore, the crystallization after cold-drawing programming is most likely in the hard segment domain. [Li G, Shojaei A. A viscoplastic theory of shape memory polymer fibers with application to self-healing materials. Proceedings of the Royal Society A-Mathematical Physical and Engineering Sciences 2012; 468:2319-2346] As a result, the hard segment becomes stiffer.

(ii) FIG. 19 shows the DSC test result of the as-spun SMPF and the same SMPF cold-drawn to 100%. From FIG. 19, The DSC curve of the original SMPF shows a melt transition peak at about 167.9° C., which can be ascribed to the melting transition of the hard segment phase. After 100% cold drawing, the DSC curve of the SMPF shows dual peaks at about 168.4° C. and 188.4° C., respectively. The dual peaks indicate that two types of crystallites in the cold-drawing fibers are formed, i.e., type I crystallites with a melting temperature at around 168.4° C. and type II crystallites with a melting temperature at around 188.4° C. The type II crystallite corresponds to more perfect crystal structures or larger crystal size, while type I crystallite corresponds to less perfect crystal structures or smaller crystal size. Obviously, the original SMPF only has type I crystallites. Cold-drawing partially transforms type I crystallites to type II crystallites, which indicates a more stable hard segment phase is formed and higher stiffness is obtained. The molecular alignment in the soft segment domain, while enhances the stiffness of the cold-drawn SMPFs at room temperature, does not affect the recovery stress because the recovery temperature (80° C.) is higher than the glass transition temperature of the soft segment domain (about 8.5° C.) and all the molecules in the soft segment domain recover to their original shape (coiled).

3.2 First Healing Test Results

The recovered stress and temperature with time for the first cycle of healing are shown in FIG. 20 for specimens with different pre-tensions in SMPFs. From FIG. 20, the recovery stress-time curves can be divided into three regions. In the first region, the specimen is heated up until about 43° C. As a result of thermal expansion, the beam specimen tends to expand. Due to the clamped boundary conditions, however, free expansion is not allowed, leading to compression stress (negative stress). It is noted that the peak compressive stress of the three different specimens are different. The peak compressive stress reduces as the pre-strain level in the SMPFs increases. This can be explained by the difference of coefficient of thermal expansion (CTE) and stiffness between the matrix and fiber. CTE tests show that the CTE of polyurethane is $3\times10^{-5}$~$7\times10^{-5}/°$ C. [Nieuwenhuyse Ev. Thermal Insulation materials made of rigid polyurethane foam, Report No. 1 (October 2006). Brussels-Belgium: Foundation of European rigid polyurethane foam associations; 2006], while the CTE of EPON 828 is about $13.6\times10'1°$ C. [Miskioglu L, Burger G P. Material properties in thermal-stress analysis. N & O Journal 1985:27-32]. Therefore, the matrix expands more than the fibers, or in other words, the embedded fibers resist the expansion of the specimen, which leads to reduction in peak compressive stress. Because the 100% pre-strained fiber has the highest stiffness (. 18), which provides the highest resistance to matrix expansion, it yields the least peak compressive stress. It is noted that, while the shape recovery temperature of the three types of specimens is roughly 43° C., a careful examination of FIG. 20 shows that the peak compressive stress of the specimen with 100% pre-stretched SMPFs occurs at a temperature slightly lower than that of the specimen having SMPFs with 50% pre-tension, and the highest temperature occurs for the specimen having SMPFs without pre-tension. This result echoes the test result in FIG. 19. The fibers with cold-drawing programming recover at slightly lower temperature because of the slightly lowered glass transition temperature (about 8.5° C. for 100% cold-drawn SMPF and about 10.9° C. for as-spun SMPF, which can be estimated in FIG. 19).

In region 2, the temperature is sufficient to activate the shape recovery of the embedded SMPFs. The SMPFs tend to shrink. However, the shrinkage is not free due to the constraint by the surrounding matrix, leading to compression of the specimen. Again, owing to the clamped boundary condition, the shrinkage of the embedded SMPFs first reduces the compressive stress until zero. Further shrinking leads to a tendency of reduction in specimen length. This constrained shorting leads to the development of tensile stress, until peak tensile stress is achieved, which is at about 60° C. This is the end of region 2. It is noted that for the specimen with 0% pre-tensioned SMPFs, no any tensile stress is developed due to the limited recovery ability of as-spun SMPFs. Taking the recovery stress as the difference between the peak tensile stress and the peak compressive stress, the specimens with 0% pre-strained fibers has the least recovery stress of 2.05±0.06 MPa, the 50% pre-strained fibers has the recovery stress of 3.70±0.03 MPa and the 100% pre-strained fiber has the highest recovery stress of 4.86±0.03 MPa. With further heating to and soaking at 80° C. for 20 minutes, the matrix becomes softer, and the embedded thermoplastic particles melt and diffuse into the fractured matrix to complete the molecular-length scale healing. Because of the softening of the matrix, the peak tensile stress reduces until stabilized, which shows that the specimen has a constant stiffness at the fixed healing temperature of 80° C. and the recovery stress of the SMPFs is stabilized. This is the end of region 3.

After the first healing, the specimens were fractured again using tensile test. The results are shown in FIG. 21. The control specimen in FIG. 21 is the specimen without pre-cracking and embedded with SMPFs without pre-tension (virgin specimen). From FIG. 21, the beam specimen with the 100% pre-strained fibers has the highest residual tensile strength, while the specimen with 0% pre-strained fibers has the least. Defining the ratio of the peak residual tensile strength and the tensile strength of the original un-cracked specimens, the healing efficiency for the first healing is 0.53±0.37, 0.44±0.10, and 0.23±0.10, for specimens with 100% pres-strained fibers, 50% pre-strained fibers, and 0% pre-strained fibers, respectively. It is noted that the residual tensile strength depends primarily on the tensile strength of the thermoplastic particles. Higher tensile strength thermoplastics need to be found in order to further increase the residual tensile strength and healing efficiency.

3.3 Repeated Healing Test Results

After the first tensile test (re-fracture of the healed specimen), the specimen was put back into the oven to heal, following the same procedure as the first healing. The specimens healed for the second time were tensile fractured again. This healing/fracture cycles proceeded until 7 cycles.

The tensile stress-tensile strain curves for each re-fracture cycle are shown in FIG. 22 (*a*)-(*g*). From FIG. 22, the healing is quite repeatable. There is little difference between each re-fracture cycle. The reason is that both the SMPFs and thermoplastic particles experience only physical changes during the healing and refracture cycle. Because the healing temperature of 80° C. is lower than the melting temperature of the hard segment phase of the SMPFs, which is 168.4° C. as shown in FIG. 19, the only change during each healing cycle is the physical phase change of the soft segment phase (glassy→rubbery→glassy). For the thermoplastic particles, the only change during each healing cycle is also physical phase change (glassy→liquid→glassy). No chemical damage is involved in the healing and re-fracturing process. Therefore, the healing is repeatable.

3.4 Non-Destructive Inspection Results

C-Scan images of the specimens after fabrication and after the first healing were generated (data not shown), the corresponding optical microscopic images, and SEM observations were also obtained (data not shown).

In the pulse-echo C-scan images, red color represents an excess of 80% of the signal returning to the receiver, whereas blue color indicates that 50-80% of the signal is being received. The green color represents a complete alteration of the ultrasound signal or 0% of signal received. This could mean a cracked region. It was clear from C-scan data that a pre-crack has been created at the center of the specimens through the fabrication process. After the first healing, the pre-crack for the specimen with 0% pre-strained fibers is poorly healed as the color in the cracked region changes from green to blue; for the specimen with 100% pre-strained fibers, it is healed quite well as the color in the cracked region changes from green to red. This result is in agreement with the healing efficiency test results. The optical microscope test results and SEM results echo the C-Scan test results. It is seen in the SEM images that the crack in the specimen with 100% pre-strained fibers is closed to about 20

μm, while the crack in the specimen with 0% pre-strained fibers is closed to about 60 μm, demonstrating the increase in the crack-closure ability for SMPFs with strain-hardening.

4. Discussion

Based on the comprehensive manufacturing, testing, and characterization, the following conclusions are obtained:

The ability for the SMPFs to close a wide opened crack depends on the recovery stress. With the same fiber volume fraction, the higher the recovery stress, the higher the capability to close the crack, and the higher the healing efficiency.

The increase in healing efficiency is not in direct proportional to the pre-strain level. While the healing efficiency almost doubles with 50% pre-strained fibers as compared to fibers without pre-strain, further pre-straining to 100% does not increase the efficiency in the same rate, probably due to the saturated contribution of closing the crack on healing efficiency.

The ability for healing macroscopic cracks also depends on the area of heating; as demonstrated in Eq. (4) and Eq. (5). The result in this study confirms that healing can be achieved by heating locally within a certain area surrounding the cracked region, which is very important for application in large structures because heating an entire structure is impractical.

It is found that the mechanism for the increase in the constrained recovery stress and enhanced healing efficiency of the cold-drawn SMPFs is due to the increase in stiffness of the hard segment domain at the healing temperature. Cold-drawing leads to molecular alignment and formation of some perfect crystals (stress induced crystallization) in the hard segment domain.

Based on the bio-mimetic CTH scheme, further increasing the healing efficiency depends on finding a stronger healing agent—thermoplastic particles with high bonding strength.

Example 5: Structural Relaxation Behavior of Strain Hardened Shape Memory Polymer Fibers for Self-Healing Applications The following Example 5 is based on studies and data also set forth in: Pengfei Zhang and Guoqiang Li "Structural Relaxation Behavior of Strain Hardened Shape Memory Polymer Fibers for Self-Healing Applications" J. Polym. Sci., Part B: Polym. Phys. 2013, 51, 966-977; this document is fully incorporated by reference herein.

In this Example, shape-memory polyurethane (SMPU) fibers were strain hardened by cold-drawing programming (CDP) process. The programmed fibers are experimentally studied for their physical and thermomechanical properties. Structural relaxation, which determines shape memory capability of the SMP fibers, is quantified by conformational entropy change. Based on the entanglement tube theory and reptation theory, the entropic force is derived as a "bridge" to link the stress relaxation and structural relaxation, whereby structural relaxation can be evaluated by stress relaxation. Accordingly, it is found that the cold-drawn programmed SMPU fibers still have good crack-closing capability after 13 years of hibernation in polymer matrix composite.

As set forth above, e.g., in Example 4, the self-healing ability of SMPU fibers is seen to be effective even after cyclic damages. Such data were conducted in a relatively short-time scale such as within several days of cold-drawing programming. Prior to the present application, self-healing ability in long-term time scale, such as over many years was unknown. This example explores self-healing ability in long-term time scale, such as over ten of years. Long-term healing is an important question because engineering structures are usually designed to last tens of years. It is desirable to know if the shape-memory polyurethane (SMPU) fibers still possess crack-closure capability after hibernation in the polymer matrix for many years.

For SMPU fibers, the CDP process enables them to obtain high inner stress (i.e., back stress). [P. Ping, W. Wang, X. Chen, X. Jing, Biomacromolecules, 2005, 6, 587-592]. The molecular chain alignment and segmental reorientation during the CDP process reduce the conformational entropy and store back stress. Because the back stress is a growing function of energy input during programming, it was envisioned that the recovery stress, which is a portion of the back stress, depends on the way that the programming is conducted. In the case of self-healing application, the SMPU fiber is embedded in a polymer matrix, and its temporary shape is fixed by the surrounding matrix. The stored back stress undergoes stress relaxation analogous to the stress relaxation behavior with a fixed strain under lab condition. [Example 4; G. Li, D. Ajisafe, H. Meng, Polymer, 2013, 54, 920-928] Upon heating, the increase in conformational entropy provides the driving force (i.e., released back stress) for recovering the permanent shape of the SMPU fiber, thus facilitating crack-closing effect for matrix materials.

Most engineering structures are designed to last for tens of years. Therefore, the embedded SMPU fibers are required to be responsible for closing cracks anytime during service, i.e., to have long-term shape memory functionality. Because long-term shape memory is determined by structural relaxation, the Adam-Gibbs equation has been used in the analysis of structural relaxation. [G. W. Scherer, J. Am. Ceram. Soc., 1984, 67, 504-511] In the expression of Adam-Gibbs equation, the structural relaxation time is a function of conformational entropy. Based on this theoretical statement, the evolution of structure is highly related to the conformational entropy change. The microstructure of programmed SMPU fibers relaxes from ordered state to disordered state, associated with increase in conformational entropy and structural relaxation accompanies the conformational entropy change. Therefore, the structural relaxation could be linked with stress relaxation by a factor of conformational entropy change.

In this Example, a new model is set forth to link the structural relaxation with stress relaxation. The shape memory or crack-closing capability after years of hibernation is defined. Experimental investigation on cold-drawn programmed SMPU fibers was conducted, including mechanical behaviors, thermomechanical behavior, thermal properties by differential scanning calorimetry (DSC) and dynamic mechanical analysis (DMA), and molecular structures by Fourier transform infrared spectroscopy (FT-IR). Stress relaxation behavior of the SMPU fibers was studied experimentally at a series of temperatures, 8° C., 25° C., 44° C., 65° C., and 85° C. The long-term stress relaxation behavior is predicted by time-temperature superposition principal (TTSP) on such short-term stress relaxation.

Materials Used

Polyurethane was synthesized by using poly(butylene adipate) (PBA, $M_n$=650) as soft segments, 4'4-diphenylmethane diisocyanate (MDI) and 1,4-butanediol (BDO) as hard segment. The average formula weight ratio was (MDI+BDO):PBA=1021: 300. All the chemicals were de-moisturized prior to use. The reaction was conducted in a high-speed mixer at room temperature with nitrogen protection. The obtained polyurethane was further cured in a vacuum oven at 110° C. for 12 hours. Then SMPU fiber was prepared using a modified OneShot Extrusion Machine with a spinning speed of 40 m/min. The spinning temperature is 180° C. The non-programmed SMPU fibers have a diameter 0.038 mm.

Cold-Drawing Programming

The SMPU fibers were cyclically loaded at room temperature by using MTS (RT/5, MTS Inc., USA) equipped with a 250 N load cell. Fibers were gripped by aluminum fixtures with a gauge length of 20 mm, and stretched with a displacement rate of 400 mm min$^{-1}$. Fiber bundle was cold-drawn for five loading cycles and followed by holding at a strain of 80% for half of an hour. In each cycle, the fiber bundle was stretched to 80% of strain and unloaded. In the sixth cycle, the bundle was stretched to 80% of tensile strain and held for 30 minutes (stress relaxation), and then stretched all the way to fracture, in order to determine the tensile strength of the fiber. To ensure the repeatability of the tensile test of programmed PU fibers, five fiber samples were programmed and stretched to its elongation-at-break. Here repeated cold-drawing was used instead of one-time drawing in order to ensure that the fibers have a longer time for structural relaxation so that the shape fixity can be increased. The programmed fiber has a diameter of 0.028 mm. Based on the known transverse dimension and fiber length, the Poisson's ratio can be determined as 0.33 at room temperature, which is in good agreement with reported data in the literature. [P. J. Stedry, R. F. Landel, H. T. Shelton, Volume changes and Poisson's ratio of polyurethane propellants under tensile deformations. JPL Technical Report No. 32-168, 1961]

Characterization

Differential scanning calorimetry (PerkinElmer DSC 4000, USA) test was conducted to investigate the thermal properties of the programmed and non-programmed fibers. Fiber samples were knotted and placed in aluminum sample pan. The samples were cooled from 30° C. to −70° C. at a speed of 20° C. min$^{-1}$ and scanned from −70° C. to 200° C. at a ramping rate of 5° C. min$^{-1}$. The purging rate of Nitrogen is 30 ml min$^{-1}$. Three cooling and heating cycles were conducted on each sample.

It was found that after the first heating cycle the thermal properties of the fiber samples became stabilized.

The heat flow plot was derived from the second heating cycle to determine the glass transition temperature ($T_g$) and other thermal properties. Fourier transform infrared spectroscopy (FT-IR, Nicholet 6700, Thermo Scientific, USA) technique was employed to study the molecular structures of SMPU fibers. Fibers before and after CDP process were investigated to determine whether this physical process created any chemical change.

A bundle of fibers was prepared as a specimen with a length of 30 mm for dynamic mechanical analysis (DMA) test (carried out by RSA III LN2, USA). Air was used as a purging medium. Initial and final temperatures were set as 21° C. and 120° C., respectively. Heating rate was 1° C. min$^{-1}$, and frequency was 1.0 Hz.

Results and Discussion

Mechanical Behavior of Programmed SMPU Fiber

FIG. 23 shows the typical stress-strain curve of the 6$^{th}$ cycle of cold drawing process. From this figure, it is easy to observe that the strength of the programmed fibers has been enhanced considerably, with some sacrifice in elongation. The yield point was determined from a trial-and-error method. The fiber sample was stretched towards a designed stretch ratio and then unloaded to its initial position. In the fiber elastic region, the loading curve would match the unloading curve, whereas in the fiber plastic region the loading curve would mismatch the unloading curve. For the non-programmed fiber, the fiber was stretched to a ratio starting from 1% and unloaded back to the initial position. The second stretching was up to the ratio 1.1% (i.e., strain increment 0.1%) and unloaded.

This loading and unloading process was repeated until mismatch of the load-unloading curves. Then the maximum corresponding tensile stress was determined as yield stress for the non-programmed fibers. For the programmed fibers, it started from 81% then 81.1%, and so on. And the yield stress was obtained in the same way. The non-programmed fiber has a Young's modulus (or stiffness) of 147 MPa and a yield stress of 5 MPa, whereas in the case of the programmed fiber, it has a Young's modulus of 700 MPa and a corresponding yield stress of 130 MPa. As for the tensile strength, the non-programmed fiber is about 340 MPa, while the strength of the programmed fibers is as high as 618 MPa. This result is in agreement with [Example 1; G. Li, A. Shojaei, Proc. R. Soc. London, Ser. A, 2012, 468, 2319-2346]

It is noted that the cold-drawn programmed SMPU fiber is very ductile. As shown in FIG. 23, it will not fracture until the tensile strain is about 400%. Also, low velocity impact test (supplementary FIG. 6 in G. Li, H. Meng, J. Hu, J. R. Soc. Interface, 2012, 9, 3279-3287) shows that the SMPU fiber is very tough. Under the same impact energy, the SMPU fiber bundle with a cross sectional area of 0.3 mm$^2$ did not fracture, while the carbon fiber bundle with a cross sectional area of 2.4 mm$^2$ fractured. Therefore, the SMPU fibers embedded in thermosetting polymer matrix for closing macro crack would continue to function after the matrix has cracked.

A schematic explanation on microstructure changes during cold-drawing programming are shown in FIG. 24. Hard segment is surrounded by soft segment as matrix, undergoing microphase separation and contributing to the thermodynamic incompatibility. This model for microstructure morphology encompasses that intermolecular sliding and segment orientation change may occur under the monotonic tension. The activated intermolecular slides result in dissipation of energy during the CDP process. Meanwhile, the alignment of the switching segments (i.e., soft segments) and reorientation of the hard segments, within the period of programming process, result in increase in the initial modulus and subsequent tensile strength. [M. G. Northolt, P. den Decker, S. J. Picken, J. J. M. Baltussen, R. Schlatmann, Adv Polym Sci., 2005, 178, 1-108; M. Behl, U. Ridder, Y. Feng, S. Kelch, A. Lendlein, Soft Matter, 2009, 5, 676-684] During the CDP process, SMPU fibers were cyclically loaded and unloaded for 5 cycles, as shown in FIG. 25. Certain observations were made:

(1) The fibers are strain hardened as evidenced by increase in stress and stiffness corresponding to the same strain. However, the rate of enhancement decreases as the loading cycles increase. This suggests that the strain hardening effect tends to saturate as loading cycles increase. The reason is that the enhancement in mechanical properties is due to the alignment of the molecules in segregated segments and strain induced crystallization, which saturate when they are aligned along the loading direction. Strain-induced crystallization after cold-drawing programming has been validated by small-angle X-ray scattering (SAXS) test [Example 1; G. Li, A. Shojaei, Proc. R. Soc. London, Ser. A, 2012, 468, 2319-2346]), which showed transformation of some hard segment domains to crystals, and by DSC test result [Example 4);] G. Li, D. Ajisafe, H. Meng, Polymer, 2013, 54, 920-928, which also showed stress induced crystallization in the hard segment domain.

(2) The hysteresis loop in each loading-unloading cycle suggests visco-elastic and visco-plastic behavior of the fibers. The portion of energy stored in the fiber during each cyclic loading becomes back stress which will be partially recovered during the shape recovery process.

For shape-memory materials, shape fixity is a significant parameter.[16] It is given by $$R_f = \frac{\varepsilon_i}{\varepsilon_p} \times 100 \quad \text{(Eq. 6)}$$

where $R_f$ is the shape fixity ratio; $\varepsilon_p$ is the pre-deformation strain, which is the strain at the end of the short-term relaxation (i.e., 30 min) after cyclic loading; $\varepsilon_i$ is the instantaneous strain after the applied load is removed. FIG. 26 shows that the shape fixity ratio is a function of time due to the viscoelastic response of the cold-drawing programmed fibers after removal of the external load. The stabilized shape fixity for the one-time cold-stretched SMPU fibers is 23%, whereas in the case of cyclically cold-drawing programmed fibers, it was increased and maintained at 33%; for this reason we used cyclic cold-drawing in this example, instead of one-time cold drawing programming. From the shape fixity result, it is easy to detect the effects of structural reorganization.

Thermal Properties

FIG. 27 shows that the non-programmed fibers have a glass transition temperature ($T_g$) of 12.5° C. and hard segment melting temperature ($T_m$) of 185° C. It is worth noting that the dominant component of this SMPU fiber is the crystalline hard segment phase with some less perfect or small sized crystals.

The cyclic loading process (i.e., cyclic CDP process) narrows the glass transition region and shifts the $T_g$ to a higher temperature. After five loading cycles, the programmed fiber exhibits a higher $T_g$ at 28° C. Moreover, the DSC trace showed a stabilized melting temperature at 185° C. for the hard segment domain.

Microstructural Properties

Microstructure was assessed to address the possibility that the high stress involved during the CDP might cause some changes in chemical bonds such as breaking of a certain chemical bonds. FIG. 28 presents the infrared spectrum for the non-programmed and programmed fibers which was recorded from 600 cm$^{-1}$ to 4000 cm$^{-1}$. The overall results shown in FIG. 28(a) are divided into three groups in FIG. 28 panels (b)-(d) to have a better view. Regarding FIG. 28 (a), the absorbances for both fiber samples are mainly observed in the range from 600 cm$^{-1}$ to 1600 cm$^{-1}$, which is similar to the spectra of the PCL. [T. Elzein, M. Nasser-Eddine, C. Delaite, S. Bistac, P. Dumas, J. Colloid Interf. Sci., 2004, 273, 381-387] According to FIGS. 28(b) and (d), no changes in the ranges of 600 cm$^{-1}$ to 1700 cm$^{-1}$ and 2700 cm$^{-1}$ to 4000 cm$^{-1}$. It suggests that the bonds of C—O—C and C=O are stabilized or fixed in their conformational configuration after the CDP process as well as groups of urethane, CH$_2$, and aromatics. [F. C. Wang, M. Feve, T. M. Lam, J. P. Pascault, J. Polym. Sci., Part B: Polym. Phys., 1994, 32, 1305-1313; E. M. Christenson, J. M. Anderson, A. Hiltner, E. Baer, Polymer, 2005, 46, 11744-11754; Y. Zhu, J. Hu, K. Yeung, Acta Biomater., 2009, 5, 3346-3357] However, some peaks for the programmed fibers disappear as compared to those for non-programmed fibers, as shown in FIG. 28(c), and some new peaks form after the CDP process. As suggested by Wang et al., supra, the peaks disappeared and/or created are results of NCO group vibration and carbon dioxide vibration. Therefore, this data shows that the CDP is a physical process; no chemical changes are involved.

Thermomechanical Behavior of Programmed SMPU Fiber

Stress recovery behavior of the programmed fibers was studied after a short-term stress relaxation process (30 min). Prior to starting the stress recovery testing, the applied load by the load cell during programming was removed, allowing the fixture head back to its original position. In order to compensate for the thermal expansion of fibers during heating process, a pre-strain on fibers was provided, ensuring that they had zero stress immediately before the stress recovery process starts. The pre-strain was determined by a trial-and-error method. [Example 4; G. Li, A. Shojaei, Proc. R. Soc. London, Ser. A, 2012, 468, 2319-2346] The fiber was gripped by the fixture and maintained the strain constant. Then the fibers were heated from 25° C. to 150° C. at a rate of 0.35° C. min$^{-1}$ and the system recorded the force recovered.

It is noted that the linear coefficient of thermal expansion (CTE) of the grip (i.e., aluminum) is 23.86×10$^{-6}$° C.$^{-1}$. As compared with the CTE of the SMPU fiber, which is about 11.8×10$^{-5}$° C.$^{-1}$ [I. S. Gunes, F. Cao, S. C. Jana, J. Polym. Sci., Part B: Polym. Phys., 2008, 46, 1437-1449] the dimension change of the grip is considerably small. Therefore, the effect of thermal expansion of the grip can be ignored.

During stress recovery test, the fiber bundle was fixed by the grips in the MTS machine, and free shrinkage is not allowed. Consequently, stress develops, which is the recovery stress. As shown in FIG. 29(a), a maximum recovered stress of 11.6 MPa was obtained after a stress relaxation time of 30 minutes when temperatures are increased from 25° C. to 150° C.

The stress recovery rate is distinguished at different temperatures. Technically, the stress recovery is divided into three regions based on their stress recovery rate as shown in FIG. 29(b). Based on the thermal properties of the programmed SMPU fibers the glass transition temperature of the fiber (after five loading cycles) is 28° C. Thus SMPU fibers exhibit stress recovery behavior even at room temperature. FIG. 29(b) shows that the recovery rate reduces with time in stages I, and becomes stable in stage II followed by a stabilized stress recovery in stage III with almost zero stress recovery rate. The instantaneous stress recovery rate (Sr) is defined as the time derivative of stress. [T. Xie, Polymer, 2011, 52, 4985-5000] It indicates that the stress recovery rate does not stabilize in the glass transition region, and the stabilized recovery rate is obtained above the glass transition region. It is noted that the stress recovery rate does not necessarily mean the shape recovery rate. The reason is that the stress recovery rate is also dependent on the stiffness of the fiber at each particular temperature.

The ability for SMPU fibers to store energy elastically and dissipate energy was determined. The fibers in stage I have higher storage modulus and the modulus reduces gradually as temperature increases. This higher modulus leads to a higher stress recovery rate. When the temperature is about 65° C., the storage modulus stabilizes, corresponding to the stabilization of the stress recovery rate in stage II.

Viscoelastic Behavior of SMPU Fiber

SMPU fibers were prepared to investigate the stress relaxation at various temperatures. Stress relaxation testing was carried out on programmed fibers under a series of temperatures: 8° C., 25° C., 44° C., 65° C., and 85° C. The individual relaxation test time was two hours. FIG. 30 shows the stress relaxation behavior at five different temperatures.

In order to understand long-term structural relaxation behavior of the SMPU fibers, the long-term stress relaxation behavior is needed. The long-term stress relaxation was obtained by a practical and validated time-temperature superposition principle (TTSP). [M. L. Williams, R. F. Landel, J. D. Ferry, J. Amer. Chem. Soc., 1955, 77, 3701-3706; R. L. Morgan, D. F. Farrar, J. Rose, Forster, H., I. Morgan, J. Mater. Sci.-Mater. Med. 2003, 14, 321-325; J. Zhao, W. G. Knauss, G. Ravichandran, Mech. Time-Depend. Mater., 2007, 11 289-308]

Basically for a viscoelastic material with respect to a reference temperature, the stress relaxation is only dependent on time. Data obtained from a reference temperature can be superimposed on other data taken at different temperatures by shifting along the vertical and/or horizontal axis. [J. D. Ferry, Viscoelastic properties of polymers; Wiley: New York, 1980] It allows shifting data, obtained over short-term stress relaxation process but at different temperatures, to achieve a master curve representing a long-term stress relaxation behavior at the reference temperature. The logarithm of cur (i.e., the horizontal shift factor) is determined by the WLF equation $$\log(\alpha_T) = \frac{C_1(T - T_0)}{C_2 + T - T_0} \quad \text{(Eq. 7)}$$

where $C_1$ and $C_2$ are constants, $T_0$ is the reference temperature (i.e., $T_0 - T_g = 50°$ C.), and T is the testing temperature. [M. L. Williams, R. F. Landel, J. D. Ferry, J. Amer. Chem. Soc., 1955, 77, 43701-3706] In order to obtain a smooth master curve, the constants of $C_1$ and $C_2$ may be varied based on the experimental data at different temperatures.

Arridge discussed the consequent deduction of shift factors in the simple use of time-temperature superposition (TTS). [R. G. C. Arridge, Mechanics of Polymers; Clarendon Press: Oxford, 1975] By using the theory of rubber elasticity, it assumed that the vertical shift factor is expressed in the form $$\beta_T = C_T \frac{T_0}{T} \quad \text{(Eq. 8)}$$

here $C_T = (d + \alpha_g T)^2 / d^2$ is a constant corresponding to the thermal properties (d is the diameter of SMPU fiber at the reference temperature $T_0$). In the above equation, it indicates that the relaxed stress at temperature T is related to that at a reference temperature.

The stress relaxation behavior at various temperatures was generated, elucidating that the stress begins relaxation after fixed at a constant stretch strain of 80%. By shifting the stress relaxation curves along vertical axis firstly and then horizontal axis (shift parameters are given in Table 2), the master curves are derived in FIG. 31, although they tend to superimpose in the figure. Significantly, the figure shows that the stress could be relaxed over a long-term scale in thousands of days (i.e., 4800 days, which is over 13 years).

After the long-term relaxation, the remained stress is 25% of the maximum stress (i.e., 51 MPa/203 MPa), which indicates that 25 percent of stored strain energy is still maintained in the SMPU fibers as a potential driving force for shape recovery after 13 years. (Which data confirms that long-term stress relaxation prediction can be done by the master curve. (see, e.g., P. P. Simon, H. J. Ploehn, J. Rheol., 1997, 41, 641-670)

Structural Relaxation Results and Discussion

To demonstrate structural relaxation, the conformational entropy change is theoretically derived corresponding to the stress relaxation behavior. The experimental stress relaxation is stated in FIG. 31, and based on the experimental data, the conformational entropy change is calculated, shown in FIG. 32. The necessary material parameters for deriving the time-dependent entropy change are shown in Table 3.

The result shows that the entropy change is negative at the initial stage of stress relaxation, which results in decreasing conformational entropy of fibers, as shown in FIG. 32(c). The decrease in conformational entropy is associated with the reorientation and alignment of polymer chains or strain-induced crystallization (SIC), [D. J. A. Senden, J. A. W. Van Dommelen, L. E. Govaert, J. Polym. Sci., Part B: Polym. Phys., 2010, 48, 1483-1494] which may be induced by applied uniaxial stress (inertial effect). When the minimum of entropy is achieved, it indicates that the highest degree of order of polymer chains is achieved. As the applied stress relaxes, the entropy starts to increase from the minimum value but the entropy change is still negative. This process indicates that the microstructure of SMPU fibers begins to relax from the non-equilibrium state (corresponding to the minimum entropy value, i.e., less disordered state) to high disordered state.

The negative entropy change occurs within one hour. After that, the entropy change becomes positive, indicating conformational entropy increases accompanied with microstructure relaxation from a temporary non-equilibrium state. The evolution of the entropy change in a time-scale of tens of year shows that it is still positive and keeping propagating even after 13 years (shown in FIGS. 32(a) and (b)), indicating that the microstructure of the programmed SMPU fibers will still be in non-equilibrium state and still in the relaxation process. This result is qualitatively in agreement with the principle that, at a given temperature, the relaxation time is finite for structure relaxing towards equilibrium. As discussed above, the non-equilibrium configuration provides the programmed SMPU fibers a driving force for shape recovering. Thus, the obtained results elucidate that the programmed fiber will still have the ability to recover its permanent shape after 13 years of relaxation.

TABLE 2

Vertical and horizontal shift parameters for TTS master curves.

| | $\beta_T$ | | | | | |
|---|---|---|---|---|---|---|
| Factors | 25° C. | 44° C. | 65° C. | 85° C. | $C_1$ | $C_2$ |
| Values | 4.99 | 6.97 | 9.25 | 11.45 | 8.86 | 66 |

TABLE 3

Material parameters for determining entropy change corresponding to stress relaxation.

| Parameters | Symbol | Value |
|---|---|---|
| Temperature | T | 25° C. |
| Boltzmann constant | $k_B$ | $1.38 \times 10^{-23}$ m$^2$ kg s$^{-2}$ K$^{-1}$ |

TABLE 3-continued

Material parameters for determining entropy change corresponding to stress relaxation.

| Parameters | Symbol | Value |
|---|---|---|
| Diffusion coefficient of the "defect" along the chain at 25° C. | D | $10.24 \times 10^{-8}$ cm² s⁻¹ |
| Characteristic ratio | $C_\infty$ | 5~10 |
| Expansion coefficient of PU | $\alpha_g$ | $11.8 \times 10^{-5}$ °C.⁻¹ |
| Free volume fraction at 0K | $f_{v0}$ | 0 |
| Characteristic frictional coefficient | $\zeta_0$ | $2.0 \times 10^{-19}$ kg s⁻¹ |
| Length of the chain | R | 6 nm |
| Gas constant | R | 8.314 J mol⁻¹ K⁻¹ |
| Density of the polymer at 25° C. | ρ | 1.05 g cm⁻³ |
| Avogadro number | $N_A$ | $6.022 \times 10^{23}$ mol⁻¹ |
| Number of strands in chain | N | 3 |
| Monomer per strand | N | 6 |
| Plateau modulus | $G_N$ | $0.6 \times 10^8$ Pa |
| Average mass of main chain chemical bonds | m | 5100 g mol⁻¹ |
| Distance between monomers | A | 0.76 nm |

Due to an extension ratio λ during cold-drawing programming, the SMPU fiber transforms from equilibrium configuration to non-equilibrium configuration, accompanied with entropy reduction. The entropy at the end of the programming is the entropy at the start of relaxation. For a long-term relaxation, the conformational entropy increases as the configuration relaxes towards equilibrium. This dynamic entropy change represents the structural relaxation behavior along with time.

It was calculated (data not shown) that the reduced entropy due to programming is only relaxed about 0.1% after 13 years of structural relaxation, indicating that the configuration is far away from equilibrium. This indicates that the SMPU fiber still possesses the shape memory capability.

The cold-drawing programmed fiber has a maximum programming stress of about 88 MPa at room temperature (25° C.) (as seen in FIG. 25), it is estimated that after almost a thirteen-year hibernation in a polymer matrix at room temperature, about 22 MPa (i.e., remained stress 88×25%=22 MPa) stress can be stored as back stress for future shape memory behavior.

For the self-healing application, the programmed fibers are embedded in matrix, undergoing a free stress state. As set forth above, the maximum recovered stress for SMPU fibers is 11.6 MPa once activated by thermal stimulus after 30-minute relaxation. From the above entropy calculation and FIG. 32, it is seen that the entropy of the fibers after 13 years of hibernation is only increased by about 0.1%, which is negligibly small. Therefore, it is estimated that the entropy of the fiber after 13 years of relaxation is very close to that after 30 minute of relaxation. Because the recovery stress after 30 minutes of relaxation is 11.6 MPs, it is confident to predict that the recovery stress after 13 years of relaxation is still about 11.6 MPa, simply because entropy is the driving force for shape recovery. In other words, it is estimated that the SMPU fibers, after 13 years of relaxation, still possess the shape memory capability and are able to heal millimeter scale crack.

Conclusions

SMPU fibers are studied in this Example with regard to self-healing applications. After being programmed, the physical/mechanical and thermomechanical properties were investigated experimentally. Then a theoretical analysis was performed on the conformational entropy change to analyze long-term structural relaxation behavior in terms of stress relaxation test results. Based on the results, the following conclusions were derived:

(1) The CDP process is a completely physical process for SMPU fibers, such as molecular chain alignment and segments re-orientation along the loading axis. This physical process may induce formation of some crystals within the hard segment domain of the programmed fibers. The cyclic loads during the CDP process, moreover, leads to an increase in shape fixity of the programmed fibers.

(2) The strength and stiffness of the programmed fibers have been improved after the CDP process. The increase in Young's modulus of the programmed fibers is almost five times of the non-programmed fibers, the yield stress has been improved almost twenty-six times after the CDP process, and the tensile strength has doubled after the CDP process.

(3) After the CDP process, the programmed fibers have a good crack-closing capability with a maximum recovered stress of 11.6 MPa and exhibit a good stress recovery behavior at the temperatures within the range of 65° C.~140° C.

(4) After structural relaxation in the time scale of 13 years, the programmed SMPU fibers, which are "stress free" or hibernate in a polymer matrix, can still provide some recovery force to close millimeter scale cracks in the self-healing system when triggered by thermal stimulus.

Example 6: A Self-Healing Particulate Composite Reinforced with Strain Hardened Short Shape Memory Polymer Fibers The following Example 6 is based on studies and data also set forth in: Guoqiang Li, Pengfei Zhang "A self-healing particulate composite reinforced with strain hardened short shape memory polymer fibers" Polymer 54 (2013) 5075-5086; this document is fully incorporated by reference herein.

In this Example, a particulate composite dispersed with thermoplastic particles and strain hardened short shape memory polymer fibers was prepared to evaluate its ability to repeatedly heal wide-opened cracks per the close-then-heal (CTH) self-healing scheme. A coating was used to enhance the shape fixity and workability of the cold-drawn programmed short polyurethane fibers. In order to avoid any chemical compromise of the shape memory polymer fibers, a two-step coating approach was used. The relationship between recovery-stress and recovery-strain was experimentally determined by partially constrained shape recovery test. Notched beam specimens were prepared and fracture-healing was conducted up to five cycles.

As shown in more detail below, it was found that the composite was able to heal the wide-opened crack repeatedly with considerable healing efficiency. It was also found that the healing efficiency increases as the fiber length increases, but in a reduced increasing rate. The recovery stress-recovery strain of the strain hardened shape memory polymer fiber behaves nonlinearly. Also, the coated fiber is more effective than the uncoated fiber in closing wide-opened cracks when the recovery strain is within a certain range.

Fibers perpendicular to the crack surface have the highest crack closing efficiency. Therefore, in the forgoing Examples 1-5, all the fibers were aligned in the direction perpendicular to an artificially created crack. In actual structures, however, an impact loading is unknown or unpredictable. Consequently, the crack location and orientation are also not known during the manufacturing process. For such random cracks, aligning fibers in one direction only is not ideal. It is better to align fibers in three dimensions (3-D). In addition to 3-D woven fabric, free fibers are also a choice, and a random 3-D orientation of fibers is easiest to achieve by use of short fibers. The minimum fiber length should be equal to the calculated critical fiber length. In alternative embodiments, the fibers are at least 2-, 3-, 4-, or 5-times the critical fiber length, respectively +/−0.5 critical fiber length. In alternative embodiments, the fibers are at least the critical fiber length and less than 2-, 3-, 4-, 5-, 6-, 7, 8-9- or 10-times the critical fiber length, respectively +/−0.5 critical fiber length. As used herein for polymer composites, "short fibers" have a fiber length in mm scale such as of lengths of essentially 2, 3, 4, 5, 6, 7, 8, 9, 10, 11, 12, 13, 14, 15, 16, 17, 18, 19 or 20 mm in length, respectively +/−0.5 mm; or mixtures of such fibers of dimensions, e.g., mixtures with fibers in lengths between 4-10 mm or 5-15 mm or 5-20 mm or 7-25 mm. A focus of this Example is on short SMPU fibers for self-healing.

There are certain challenges when using short SMPU fibers during composite manufacture. One challenge is the low shape fixity of cold-drawn SMPU fibers. In Example 5 it was shown that, the shape fixity of cold-drawing programmed SMPU fibers was 33%. Accordingly, in order to achieve higher shape fixity, set forth in this Example is a method of coating programmed SMPU fiber with "fixing agents" As used herein, the term "fixing agent" is intended to designate all coating layer(s); in an embodiment set forth herein the fixing agent was comprised of two layers. Another challenge with use of short SMPU fibers occurs during the process of fabricating a composite comprising programmed short SMPU fibers. Without a fixing agent coating, short SMPU fibers tend to cluster and entangle together. In yet another aspect, coating by a fixing agent is useful.

With the close-then-heal self-healing approach, during the crack closing process, the recovery stress reduces as the recovery strain increases. Because the recovery stress is the driving force to close the crack, it is desired to know the change of the recovery stress with recovery strain. If the recovery force reduces to a value lower than the required force for narrowing a crack and maintaining the narrowed crack width, the programmed SMPU fiber will not be able to achieve the crack closing purpose. Accordingly, addressed herein is cold-drawing programmed SMPU fibers coated with fixing agent.

Also, for short fiber reinforced composite, fiber length plays an important role in mechanical properties [Cottrell A H. Strong solids. Proceeding of the Royal Society, A282:2-9, (1964); Takao Y, Taya M. The effect of variable fiber aspect ratio on the stiffness and thermal expansion coefficients of a short fiber composite. Journal of Composite Materials, 21:140-156, (1987); Mulligan D R, Ogin S L, Smith P A, Wells G M, Worrall C M. Fiber-bundling in a short-fiber composite: 1. Review of literature and development of a method for controlling the degree of bundling. Composites Science and Technology, 63:715-725, (2003)]. However, prior to the present data it was not clear how fiber length affected self-healing efficiency.

Thus, this Example investigated (1) proper coating agents to enhance the shape fixity and mixing ability of strain hardened SMPU fibers; (2) the relationship between recovery stress and recovery strain for cold-drawing programmed SMPU fibers; (3) the ability for strain hardened SMPU fibers to repeatedly heal wide-opened cracks; and (4) the effect of fiber length on the healing efficiency.

2. Materials and Methods
2.1. Preparation, Programming, and Coating of SMPU Fibers Shape memory polyurethane was synthesized by using poly(butylene adipate) (PBA, $M_n$=650) as soft segments, 4'4-diphenylmethane diisocyanate (MDI) and 1,4-butanediol (BDO) as hard segment. The average formula weight ratio was (MDI+BDO):PBA=1021: 300. (these chemicals obtained from Sigma-Aldrich, USA) All the chemicals were de-moisturized prior to use. The reaction was conducted in a high-speed mixer at room temperature with nitrogen protection. The obtained polyurethane was further cured in a vacuum oven at 110° C. for 12 hours. Then SMPU fiber was prepared using a modified OneShot Extrusion Machine (Alex James Associates Inc. Greenville, S C) with a spinning speed of 40 m/min. The spinning temperature was 180° C.

SMPU fiber bundles were programmed and stretched to a ratio 100% at room temperature by the MTS machine (RT/5, MTS Inc., USA) equipped with a 250 N load cell. A half hour structural relaxation followed.

Then one or more coatings were applied to the fibers to create the "fixing agent. The fiber coatings were applied as follows. A two-step fiber coating method was developed to improve the shape fixity of the programmed SMPU fiber. The programmed fiber was first coated by an acrylic "conformal coating" or "protective coating", and then by an epoxy "supportive coating", e.g., epoxy, in a subsequent coating step. The reason the epoxy coating was not used alone is that the curing agent for epoxy is also an organic solvent for polyurethane fiber; absent the conformational coating the curing agent for the epoxy would decompensate the programmed fiber.

The acrylic protective coating was sprayed on the programmed fibers, allowing 24-hour curing of the coating agent. The thickness of the protective coating is much smaller than the diameter of the fiber; such a thin layer of coating could not hold the programmed fiber and thus improve its shape fixity. As noted above, the acrylic protective/conformal coating was first used to protect SMPU fibers against the organic solvent used as curing agent for the epoxy supportive coating.

In this example the acrylic conformal coating was: 35-40% 1,1,1,2,2,3,4,5,5,5-Decafluoropentane (HFC-43-10mee), 35-40% Trans 1,2-dichloroethylene, and 18-22% Toluene (Miller-Stephenson Chemical, Danbury Conn. USA). Other coatings such as cyanoacrylate can also be used. The protective coating should prevent the fiber damage by any aspect of the second layer of coating that could compromise the SMP fibers. The conformal/protective coating cannot compromise the structure of the SMP fiber. Then, a difunctional bisphenol A/epichlorohydrin derived liquid epoxy resin (the epoxy EPON™ Resin 828 (Momentive Specialty Chemicals Inc., Columbus, Ohio, USA)) was sprayed after 24-hour curing of the acrylic conformal coating. Once the two-step coating was completed, one week was allowed for the curing of the epoxy. For use as controls, some programmed SMPU fibers did not have the coating layer. Any polymer coating which does not affect the mechanical properties of the fiber can be used. Examples include acrylic type glue and cyanoacrylate type glue. The coating polymer needs to form a solid coating in a short time on the fiber; as discussed above if any component involved in application of a supportive coating would decompensate the SMPU a conformational coating should first be used in order to protect the SMPU fibers. In preferred embodiments, the supportive coating layer ideally serves several purposes (1) make the short fiber stiff so that fibers will not entangle together during mixing; (2) it should not damage the fiber in a harmful way such as dissolve the fiber; (3) it should be miscible with the polymer matrix. As appreciated by those in the art, any chemicals that can fulfill these requirements are suitable for use in accordance with the invention.

2.2. Partially and Fully Constrained Stress Recovery Test and Free Shape Recovery Test In order to determine the recovery stress—recovery strain relationship, partially constrained stress recovery test was conducted on both coated and uncoated SMPU fibers which were cold-drawing programmed by 100% prestrain. In this test, one end of the fiber was clamped and the other end was loaded by a certain load, on which the stress in the fiber was based and calculated. Then the loaded fiber was heated to 80° C. at 5° C./min and held for 30 minutes, and the recovered strain was recorded. By changing the load to different values and conducting the partially constrained recovery test again, a set of data points in the recovery stress-strain curve was obtained.

In addition to the partially constrained stress recovery test, fully constrained stress recovery test (zero recovery strain; it was zero recovery strain because the material was fixed at both ends; it could not recover to its original length because it was constrained.) and fully free shape recovery test (zero recovery stress; it was zero recovery stress because the material was not constrained and was free to move in three dimensions) were conducted to obtain the two limiting data points in the recovery stress-recovery strain curve.

In the fully constrained stress recovery test, both ends of the fiber were clamped by the grip of the MTS machine. During the stress recovery test, the programmed fiber became loose in the initial stage of heating, due to the thermal expansion effect. In this study, a prestrain was used in order to compensate for the thermal expansion of fibers (this is enough strain so that fiber no longer loose due to thermal expansion. This strain is equal to the strain due to thermal expansion), ensuring that they had zero stress immediately before the stress recovery process starts. The prestrain was determined by a trial-and-error method [Zhang P, Li G. Structural relaxation behavior of strain hardened shape memory polymer fibers for self-healing applications. Journal of Polymer Science Part B: Polymer Physics, 51:966-977, (2013)]. For the free shape recovery test, the programmed fiber was put in the heating chamber without applying any load. For both fully constrained and fully free recovery test, the same heating profile as the partially constrained recovery test was used.

2.3. Material System and Composite Fabrication

In this study, the EPON™ Resin 828 (Momentive Specialty Chemicals Inc., Columbus, Ohio, USA) was used as the composite matrix, and the diethylenetriamine by Sigma-Aldrich (Sigma-Aldrich, USA) was used to cure the epoxy for three days at 25° C. This particular epoxy was selected due to its room temperature curing property. A curing temperature lower than the $T_g$ of the programmed SMPU is preferred, high temperature curing would recover the programmed SMPU fibers or speed up structural relaxation, which could result in a total or partial loss of the recovery stress [Li G, Xu W. Thermomechanical Behavior of Thermoset Shape Memory Polymer Programmed by Cold-Compression: Testing and Constitutive Modeling. Journal of the Mechanics and Physics of Solids, 59:1231-1250, (2011); Nguyen T D, Qi H J, Castro F, Long K N. A thermoviscoleastic model for amorphous shape memory polymers: Incorporating structural and stress relaxation. Journal of Mechanics and Physics of Solids, 56:2792-2814, (2008)] and the crack closing ability. According to the supplier, the cured epoxy has an ultimate tensile strength of 28 MPa and modulus of 3700 MPa.

Additionally, CAPA6506™ powder (Perstorp U K Ltd.), a high molecular weight linear polyester derived from caprolactone monomer (i.e., polycaprolactone), was used as the thermoplastic healing agent. The powder particles had a density 1.1 g/cm³ at 25° C., melting temperature 58-60° C., and 98% of the size smaller than 0.6 mm.

When preparing the composite, the resin and 10% by volume of thermoplastic particles (CAPA 6506) were mixed firstly for ten minutes. Secondly 13% by weight of curing agent (Sigma-Aldrich, USA) Diethylenetriamine Reagent-Plus™, 99% was mixed with the mixture for two minutes. Thereafter, 5% by volume of short SMPU fibers were added to the mixture and mixed for three minutes. In this study, the coated-programmed SMPU fibers were cut into short fibers with lengths of 4 mm, 7 mm, and 10 mm, for respective composites. The well-mixed mixture was poured into an aluminum mold. After that, the mold was kept in a chamber at 4° C. for 24 hours.

A thermocouple was located at the top surface center of the mold and a Yokogawa Model DC-100 (Yokogawa Electrical Corporation, Musashino, TKY, Japan) was used to monitor the temperature of the mixture during the curing process. The first day of low temperature (4° C.) curing was to ensure that the curing heat was removed so that the embedded programmed SMPU fibers would not be recovered. The mold was then exposed to room temperature and cured for three days prior to machining into beam specimens for testing. Composite beams without short SMPU fibers were also fabricated for comparison.

For sake of convenience, the polyurethane fiber reinforced composites (PUFRC) were denoted as Non-PUFRC and PUFRC, suggesting specimens without SMPU fiber and with SMPU fiber, respectively. Depending on the fiber length, the PUFRC was further divided into three groups, 4-PUFRC, 7-PUFRC, and 10-PUFRC, indicating specimens with 4-mm SMPU fiber, 7-mm SMPU fiber, and 10-mm SMPU fiber, respectively.

The lengths for SMPU fibers were addressed as follows: As used herein "critical fiber length" is the shortest fiber length that is needed to transfer the load from the matrix to the fiber. The critical fiber length ($L_c$) of programmed short-SMPU fibers is an important parameter. From an empirical theory, the critical fiber length is determined by the formula:

$$L_c = \frac{\sigma_u^f d^f}{2\tau_m} \quad \text{(Eq. 9)}$$

here $\sigma_u^f$ is the ultimate tensile strength of the programmed SMPU fibers, $d^f$ is the programmed fiber diameter, and $\tau_m$ is shear yield strength of the matrix [Agarwal B D, Broutman U, and Chandrashekhara K. Analysis and Performance of Fiber Composites (3rd Ed.). John Wiley & Sons, Inc, Hoboken, N.J., 2006]. As shown in FIG. 33, the programmed SMPU fiber at 100% prestrain has an ultimate strength of 690 MPa. After programming, the diameter of the fiber is 0.028 mm. As provided by the manufacturer, the shear yield strength of the acrylic coating agent is 6.35 MPa. Therefore, the critical fiber length ($L_c$) calculated based on Eq. (9), which is 1.52 mm.

Because the fiber needs to bridge over the crack in order to close the crack, the minimum fiber length (L) is determined by $L=\lambda L_c$, where $\lambda$ is a length factor and $\lambda>1$. The reason we need much longer fiber than critical fiber length $L_c$ is that Eq. (9) is the minimum fiber length for shear stress transfer with the fibers aligned only along the axial loading direction. For this example, the fibers are randomly distributed three dimensionally in space, e.g., with most of them inclined with respect to the loading direction. Therefore, much longer fiber length is required. In this study, the coated-programmed SMPU fibers were cut into short fibers with lengths of 4 mm, 7 mm, and 10 mm, respectively.

2.4. Differential Scanning Calorimetry (DSC) Test

Differential scanning calorimetry (PerkinElmer DSC 4000, USA) test was carried out to investigate the thermal properties of the short SMPU fiber reinforced polymer composite and also its components including thermoplastic particles, coated programmed SMPU fiber, and Epon matrix. Samples were first cooled from 30° C. to −70° C. at a rate of 20° C./min and scanned from −70° C. to 275° C. at a ramping rate of 5° C./min. The purging rate of Nitrogen was 30 ml/min. Three effective samples were tested under the same conditions. Two cooling and heating cycles were conducted on each sample, and the second heating cycle was used to determine the glass transition temperature ($T_g$) and other thermal properties in order to eliminate the thermal history.

2.5. Three-Point Bending Test of Notched-Beam Specimens

Notched beam specimens with dimensions of 90 mm×10 mm×20 mm were fabricated per ASTM D 5045 standard, and the notch was machined by bandsaw as schematically shown in FIG. 34. The reason of using single edge notched beam (SENB) specimens was to create structural scale crack. The three-point bending tests were carried out by the MTS (RT/5, MTS Inc., USA) system at a loading rate of 10 mm/min. The schematic setup of the test is shown in FIG. 34. The beam specimens were fractured completely into two halves at room temperature. The process of the bending test (i.e., crack initiation and propagation) was captured by a high resolution CCD camera (Sony XCD-CR90), which is equipped with a light source and a digital interface which interlinks the computer and the camera. The CCD camera used in this test has a resolution of 3.7×3.7 μm/pixel. Fire-i data acquisition software was used to store the image data from the camera during testing.

2.6. Close-then-Heal (CTH) Self-Healing

Unlike using an external confinement in the two-step self-healing process [Li G, Uppu N. Shape memory polymer based self-healing syntactic foam: 3-D confined thermomechanical characterization. Composites Science and Technology, 70:1419-1427, (2010)] or clamped ends in the CTH process (such as in Example 4; [Li G, Ajisafe O, Meng H. Effect of strain hardening of shape memory polymer fibers on healing efficiency of thermosetting polymer composites. Polymer, 54:920-928, (2013)]), the fractured specimens in the experiment underwent free recovery under thermal stimulus.

The scheme of the close-then-heal program is elucidated in FIG. 35 (also see FIG. 6 and FIG. 15, and respective related text). It is seen that, while complete fracture of the notched beam might cause fiber pull-out, fibers bridging over the crack were not fractured because of the high ductility of the SMPU fibers, which were the fibers leading to closure of the crack per the CTH scheme.

The completely fractured beam specimen was transferred into an oven. For the control beam without the programmed short SMPU fibers, the separated two half beams were put together manually, fitting along the crack. The oven chamber was heated up from room temperature (about 21° C.) to 80° C. at a rate of 5° C./min. The specimen was held inside the chamber at 80° C. for 30 minutes. At this temperature, the shape recovery effect of the programmed short SMPU fibers was activated thus closing the crack automatically to microscale. Because of the melting and diffusion of the polyester CAPA, the thermoplastic particles filled the narrowed crack and diffused into the fractured Epon matrix. Cooling leads to hardening of the diffused thermoplastic film and healing of the fractured beam. This completed the first fracture-healing cycle.

This fracture-healing continued until five cycles to evaluate the ability for repeatedly healing wide-opened cracks. During the fracture testing, the peak bending load was recorded, which was used to calculate the healing efficiency. At least three effective specimens were tested for each group of samples.

2.7. Non-Destructive Testing

The crack was measured by UNICO zoom stereo microscope (UNICO, New Jersey, USA), equipped with an optional digital camera (AmScope MD35, United Scopes, LLC, Irvine, Calif. USA). Also, the healed crack was investigated by an optical microscope (VanGuard, Malvern, Pa. USA) equipped with a camera (XLI, XL Imaging Ltd., UK). The advantage of the non-destructive testing is to ensure that the damaged cracks and/or healed cracks have no interruption from some unknown factors.

2.8. SEM Fractography

The fractured surfaces of specimens before healing and after healing were characterized by scanning electron microscope (SEM), Quanta 3D FEG field-emission electron microscope (Hillsboro, Oreg., USA). This is to investigate crack interface, where a bonding layer was formed by melted and diffused thermoplastic particles as an adhesive for bonding the two fractured surfaces.

3. Results and Discussion 3.1. Coated Programmed SMPU Fiber Properties

Shape fixity (i.e., strain fixity) ratio is an important parameter to help describe shape-memory effect, indicating the ability to fix a temporary shape [Example 5; Zhang P, Li G. Structural relaxation behavior of strain hardened shape memory polymer fibers for self-healing applications. Journal of Polymer Science Part B: Polymer Physics, 51:966-977, (2013)]). It is determined by $$R_f = \frac{\varepsilon_i}{\varepsilon_p} \times 100\% \qquad \text{(Eq. 10)}$$

here $R_f$ is the shape fixity ratio, $\varepsilon_i$ is the instantaneous strain (here calculated after about 30 minutes to accomodate relaxation) of the programmed SMPU fibers after removal of the applied load, and $\varepsilon_p$ is the predeformation strain at the end of the programming process (i.e., 100% in this case).

As shown in FIG. 36, the shape fixity of the programmed SMPU fibers has been significantly improved by the coating agent with fixity increasing from 30% to 66%. It also shows that the shape fixity of uncoated programmed SMPU fiber relaxes fast at the first three minutes and becomes stabilized within five minutes. This is due to the fast structural relaxation at the early stage after the removal of the stretching load. However, in the case of coated programmed SMPU fiber, it keeps relaxing and is still un-stabilized even after 30 minutes. This can be explained as follows. The removal of the stretching load leads to large springback instantly and thereafter a viscoelastic rebound over the first few minutes.

However, due to the layer of coated fixing agent, free springback of the fiber is not allowed, leading to slower structural relaxation of the fiber. Based on the shape fixity information, the coated programmed SMPU fibers were cut into short fibers and mixed with resin after at least 30 minutes of the removal of the programming stretching load The linear coefficient of thermal expansion (CTE) of the aluminum grip device is $23.86 \times 10^{-6}/°$ C., while the CTE of the SMPU fiber is $11.8 \times 10^{-5}/°$ C. Obviously, the dimension change of the grip due to heating to 80° C. is considerably small as compared with that of the fiber. Thus, the effect of thermal expansion of the grip is ignored in this study.

In addition, the stress recovery behavior of the coated-programmed and uncoated-programmed SMPU fibers was investigated, as shown in FIG. 37. It was soaked at 80° C. for three hours to obtain stabilized recovery stress. As shown in FIG. 37, the stabilized recovery stress for coated-programmed SMPU fiber is 25 MPa; while in the case of uncoated-programmed SMPU fiber, the recovery stress is 13.2 MPa. The difference between the recovery stresses for coated- and uncoated programmed SMPU fibers is due to their different shape fixity ratios. The higher shape fixity ratio of the coated fiber leads to a larger conformational entropy change and a better alignment of the molecules along the fiber direction [Example 5, Zhang P, Li G. Structural relaxation behavior of strain hardened shape memory polymer fibers for self-healing applications. Journal of Polymer Science Part B: Polymer Physics, 51:966-977, (2013); Strobl, G. 2007 The physics of polymers: Concepts for understanding their structures and behavior. Berlin: Springer]. Such a change would lead to a higher potential driving force for shape recovery under thermal stimulus and thus a higher recovery stress.

3.2. Partially Constrained Shape Recovery Behavior

Based on the maximum recovery stress observed (see FIG. 37), the maximum recovery load for a bundle of twenty-four (24) individual SMPU fibers is 0.4 N. In this study, five groups of fiber bundles were used to perform the partially constrained shape recovery test. The first group was heated to 80° C. at a stress-free condition (i.e., without clamping at any end or zero stress). The second group was recovered with one end clamped and the other end loaded by 0.1 N load. The third and fourth groups were recovered under 0.2 N and 0.3 N loads, respectively. For groups 1 to 4, the stabilized fiber bundle length was measured to determine the stabilized recovery strain. For the fifth group, both ends were clamped (i.e., fully constrained test or zero recovery strain, as compared with the terminology of partially constrained test).

The results were averaged out from three bundles in each group. This yields five points in the recovery stress and recovery strain curves, as shown in FIG. 38. From FIG. 38, it is seen that the recovery stress reduces as the recovery strain increases. This suggests that, with regard to self-healing composites, the recovery force of the SMPU fibers will decrease as the crack narrows.

From FIG. 38, the coated programmed fiber exhibits a maximum recovery strain of 52%, which means 48% of its deformation is permanent at the temperature 80° C. The reason for this is due to the epoxy-coated SMPU fibers The glass transition temperature of the epoxy is above 100° C., indicating that the fixing agent is still in a glassy state at the recovery temperature of 80° C. and thereby resists free shape recovery of a coated SMPU fiber. Also, the recovery stress of the coated fiber reduces faster with recovery strain than that of uncoated fiber. In the case of uncoated programmed fiber, it shows an almost fully shape recovery, 98.6% recovery strain.

Using curve fitting, (to represent a set of test data with a smooth curve by maintaining the least deviation) the relationship between the recovery stress ($\sigma$) and recovery strain ($\varepsilon$) are obtained in FIG. 38. Based on the obtained $\sigma$-$\varepsilon$ expression, the recovery force could be calculated according to standard procedures (Once one knows the recovery strain that is needed, through the curve, you can calculate the stress) at a certain crack width. In comparison with uncoated SMPU fiber, the coated SMPU fiber has higher recovery stress when the recovery strain is smaller than 24%. Therefore, when the recovery strain is lower than 24%, the coated fiber has larger recovery force (force=stress×cross-sectional area of fiber) to close crack, i.e., higher crack-closing efficiency. When the recovery strain is higher than 24%, on the contrary, the uncoated fiber has larger recovery stress and should be more effective. In practice, however, due to the resistance to crack closing by the un-fractured matrix or by constrained boundary, very high recovery strain is unlikely because of the equilibrium requirement between the recovery force and resistance force. Of course, this also suggests that the crack width that can be closed by the SMPU fibers is limited. A general estimation between the recovery stress and crack width has been given in Example 4 [Li G, Ajisafe O, Meng H. Effect of strain hardening of shape memory polymer fibers on healing efficiency of thermosetting polymer composites. Polymer, 54: 920-928, (2013)].

3.3. Thermal Properties of SMPU Fiber Reinforced Composite

The thermal properties of the composite and its components were studied by differential scanning calorimetry (DSC). The DSC data in FIG. 39(*a*) shows a peak around 58° C. which is the melting point of the thermoplastic particles, and a step change around 103° C. which indicates the glass transition temperature ($T_g$) of the composite. The coated programmed SMPU fiber has a $T_g$ of 45° C., as shown in FIG. 39(*b*). The $T_g$ of uncoated fibers is about 25° C. [see, e.g., G. Li, O. Ajisafe, H. Meng. Effect of Strain Hardening of Shape Memory Polymer Fibers on Healing Efficiency of Thermosetting Polymer Composites. Polymer, Vol. 54, No. 2, pp. 920-928, (January, 2013)] The substantial increase in $T_g$ in the coated SMPU fiber after cold-drawing programming is due to the higher shape fixity achieved by the coating layer. The molecular alignment in the amorphous soft segment domain due to cold-drawing has been largely fixed in the coated SMPU fiber. As a result, its $T_g$ has been increased considerably.

The heat flux released by the programmed fiber, shown in FIG. 39(*b*), is not clearly shown in FIG. 39(*a*). The reason for this is that only 5% by volume of SMPU fibers were incorporated in the composite, which is a small amount as compared with the other components in the test composite sample. As shown in FIG. 39(*c*) and FIG. 39(*d*), the pure thermoplastic particle has a melting temperature of 58° C., and the composite matrix (i.e., Epon resin) exhibits a glass transition temperature of 103° C. Clearly, the transition temperatures of the composite in FIG. 39(*a*) are good reflections of the two components—epoxy matrix and thermoplastic particles. Accordingly, the data indicated that programming-related changes to the SMPU were not chemical modifications during preparation.

3.4. Temperature Evolution During Curing of the Composite

As discussed in section 2.4 of this Example, a special approach was used to fabricate the composite in order to avoid overheating. Since the chemical reaction between the resin and the curing agent releases a large amount of heat during the curing process of the composite, the SMPU fibers would likely heated to above the glass transition temperature, if the heat were not removed effectively. The programmed SMPU fiber has a $T_g$ of 45° C., indicating that any temperature higher than 45° C. will activate its shape recovery ability, and thereby sacrifice crack closing ability. In order to address this challenge, the solution was to put the mold in a chamber at a temperature under 4° C. for 24 hours.

As shown in FIG. 40, the composite started fast curing after two hours of adding the curing agent, and slowed down in two and half hours. The maximum recorded temperature was 26° C., whereupon the reinforced SMPU fibers were not recovered in the matrix. Once stimulated by thermal energy, the fibers will still be able to recover their shape thus closing cracks.

3.5. Three-Point Bending Test Results

Typical load-deflection curves of the different groups (i.e., 10-PUFRC notched beam, Non-PUFRC notched beam, healed 10-PUFRC beam, and healed Non-PUFRC beam) are shown in FIG. 41. It is seen that the PUFRC notched beam has higher toughness and strength than the Non-PUFRC notched beam; furthermore healed 10-PUFRC beam has good toughness and strength properties even after being fractured. However, the healed Non-PUFRC beam exhibited a very small peak load (inset at different scale in the upper-right corner of FIG. 41). In other words, the healing efficiency of the notched beam without SMPU fibers is so minimal that it can be neglected. Improvement in toughness and strength is due to advantages of the programmed short SMPU fiber reinforcement [see, e.g., which address alternative and uncoated fibers: Sato N, Kurauchi T, Sato S, Kamigaito O. Reinforcing mechanism by small diameter fiber in short fiber composite. Journal of Composite Materials, 22:850-873, (1988); Carling M J. Fiber length distribution effects on the fracture of short-fiber composites. Polymer Composites, 11:307-313, (1990); Li V, Leung C. Steady-state and multiple cracking of short random fiber composites. Journal of Engineering Mechanics, 118:2246-2264, (1992); Fu S, Wu P, Han Z. Tensile strength and rupture energy of hybrid poly(methylvinylsiloxane) composites reinforced with short PET fibers and wollastonite whiskers. Composites Science and Technology, 62:3-8, (2002)].

The difference between the healed beams without and with the SMPU fibers is exemplified in FIG. 42. Without SMPU fibers, the healing agent (i.e., thermoplastic particles) melted and flowed into the wide-opened crack at 80° C., leaving porous interface when cooled to room temperature, which resulted in a weak bonding interface, as shown in FIG. 42(a). As a result, the Non-PUFRC beam has poor crack healing ability even though the crack was closed manually.

Figure 42B:
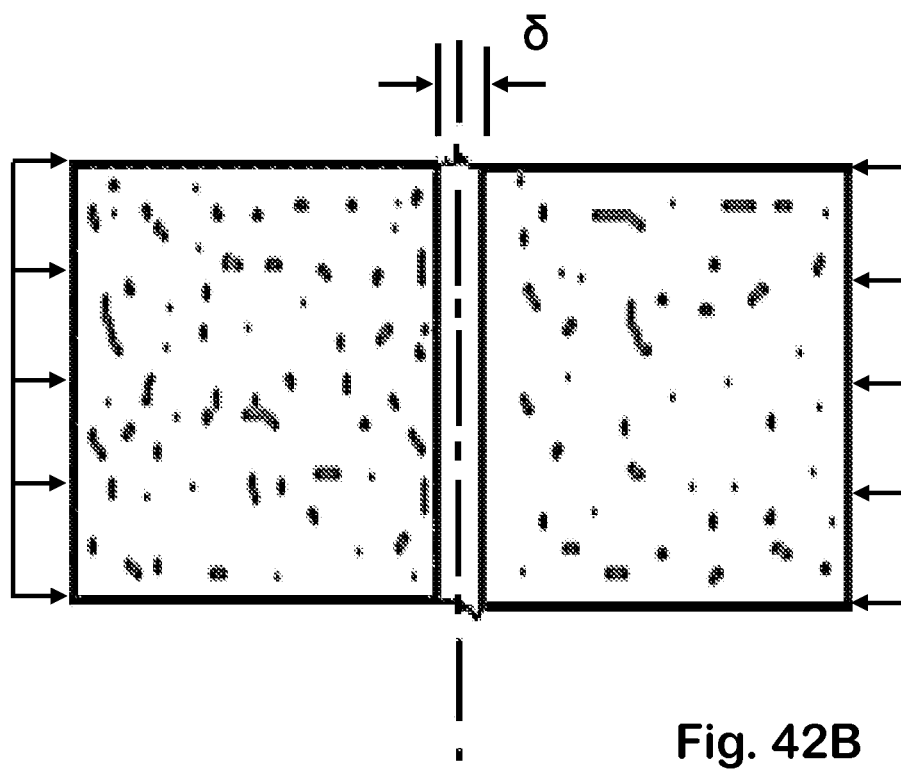

However, for the PUFRC beam with SMPU fibers, the shape memory effect of the reinforcing SMPU fibers was activated when heated, and the constrained shrinkage of the SMPU fibers bridging over the crack narrowed the crack. As shown in FIG. 37, the maximum recovery stress is 25 MPa, indicating that the crack could be continuously narrowed until an equilibrium between the force exerted by the fiber and resistance to crack closing (such as by the uneven fractured surface) was achieved. It is noted that as the crack narrows, the force exerted by the fiber reduces. Therefore, the crack cannot be fully closed unless the resistance to crack closing is negligible. For example, a recent study by Okoro indicates that the healing efficiency increases when the fractured surfaces become smoother [Okoro I. The Effects of Surface Roughness on the Efficiency of Self-Healing Polymers. Master Thesis, Louisiana State University, 2013]. Meanwhile, the healing agent melted, flowed into the narrowing crack, and diffused into the fractured matrix. Under the exertion of the sustained recovery force by the SMPU fibers, the healing agent ideally becomes a thin film. The ability for a thin film to resist crack initiation and propagation increases as the film thickness (crack width) reduces Pi G, Ouyang Z, Li G, Ibekwe S, Pang S S. Effects of adhesive thickness on global and local Mode-I interfacial fracture of bonded joints. International Journal of Solids and Structures, 47:2445-2458, (2010)], leading to higher healing efficiency. Also, with the sustained recovery force, there are fewer defects in the film, as schematically shown in FIG. 42(b).

The ability to repeatedly heal cracks was evaluated by cyclic fracture-healing testing per the three-point bending approach. As shown in FIG. 43, the self-healing ability of the PUFRC beams with various fiber lengths was investigated for up to five fracture/healing cycles. The data showed that the close-then-heal ability is repeatable for programmed short SMPU fiber reinforced composite. FIG. 43 also shows that the peak bending loads for all three groups decreased with fracture-healing cycles. In other words, the healing efficiency reduced as the fracture-healing cycle increased.

From analysis of the peak load, fibers with longer lengths led to higher peak load value. Without being bound by theory, a reason for this might be that the critical fiber length as determined by Eq. (9) is the shortest fiber length required for effective shear force transfer. However, because of the 3-D dispersion of the fibers in the present composite, even for those fibers that bridge over the crack, the fiber length within one side of the fractured matrix may be smaller than that required for the shear-force transfer, although the other side might be sufficient. Therefore, the actual fiber length required for effective stress transfer may be much longer than the critical fiber length. Although, the peak load increased as fiber length increased, it is believed that this increase will gradually approach that by continuous fibers such as in Example 4 [Li G, Ajisafe O, Meng H. Effect of strain hardening of shape memory polymer fibers on healing efficiency of thermosetting polymer composites. Polymer, 54:920-928, (2013)]. This appears to be consistent with Takao and Taya [Takao Y, Taya M. The effect of variable fiber aspect ratio on the stiffness and thermal expansion coefficients of a short fiber composite. Journal of Composite Materials, 21:140-156, (1987)] and Sato et al [Sato N, Kurauchi T, Sato S, Kamigaito O. Reinforcing mechanism by small diameter fiber in short fiber composite. Journal of Composite Materials, 22:850-873, (1988)], which indicated that the increase in short-fiber length within a certain range would improve the stress distribution along the interface between fiber and matrix. Overall, the fibers with longer length exert larger recovery force to the cracked matrix and led to thinner thermoplastic film and thus higher bending load.

Generally, the preferred fiber length will vary depending on characteristics of the composite panel of which they are a part. The theoretical length of fibers in the composite panel is calculated by the following equation (Eq. 11):

$$L_c = \frac{\sigma_u^f d^f}{2\tau_m} \quad \text{(Eq. 11)}$$

here $\sigma_u^f$ is the ultimate tensile strength of the programmed SMPU fibers, $d^f$ is the programmed fiber diameter, and $\tau_m$ is shear yield strength of the matrix. Accordingly, the preferred fiber length is determined by several factors (1) the fiber diameter; (2) the ultimate tensile strength of the fiber; (3) the shear strength between the fiber and polymer matrix. Therefore, as discussed in our paper, as long as the fiber length is greater than the critical fiber length (the smallest fiber length which can ensure that the normal stress in the fiber is equal to the tensile strength of the fiber), the fiber is fine.

The healing efficiency ($\eta$) is defined as the ratio of the peak load ($P_h$) of the healed PUFRC beam over the peak load ($P_{non}$) of the original Non-PUFRC beam. It is given by $$\eta = \frac{P_h}{P_{non}} \times 100\% \qquad \text{(Eq. 12)}$$

Using Eq. (12), the healing efficiencies after five fracture-healing cycles for the 4-PUFRC, 7-PUFRC, 10-PUFRC are 42%, 52%, and 61%, respectively. Accordingly, the two-step CTH healing is both effective and repeatable for programmed short SMPU fiber reinforced particulate composite.

3.6. Non-Destructive Observation Results

With the help of the high resolution optical microscope, the bending crack and the effect of CTH was assessed. The use of optical microscopy rather than electron microscopy is that optical microscopy allows the scanned sample to remain intact without additional damage. Accordingly, the results keep consistent and repeatable.

The bending crack width was 1.8 mm at the peak bending load (essentially identical crack dimensions for each of the 4-PUFRC, 7-PUFRC, 10-PUFRC composites), and because of springback of the SMPU fibers, the crack was narrowed to 0.7 mm, 0.6 mm, and 0.32 mm in the 4-PUFRC, 7-PUFRC, and 10-PUFRC beams, respectively, after the removal of bending loads at room temperature. Thus, the crack was narrowed by 1.1 mm, 1.2 mm, and 1.48 mm in the 4-PUFRC, 7-PUFRC, and 10-PUFRC beams, respectively. Therefore, initial closure of a crack under the two-step CTH scheme occurs by the springback of the programmed short SMPU fibers.

It is interesting to consider why springback occurred at all, since the springback due to programming was allowed before fabricating the specimens. However, the ability for additional springback occurs because crack opening during bending is itself a cold-drawing process for fibers bridging over the crack. For longer fibers, they have longer length embedded in the matrix, and the 3-D space distribution of such fibers allows more chances to form U-shape or V-shape, which may lead to more fibers located in the crack interface. In addition, longer fibers may form better anchorage in the matrix, which improves the stress transferring between the fiber and the matrix. Once the bending load is removed, the longer fibers springback more and lead to a narrower crack.

Data showed that the shape recovery of the SMPU fibers further reduced the crack width by 0.663 mm, 0.569 mm, and 0.294 mm in the 4-PUFRC, 7-PUFRC, and 10-PUFRC beams, respectively. Accordingly, the bending-damaged PUFRC beams were healed effectively by the two-step CM. Owing to the combination of springback and shape memory recovery of the SMPU fibers, the crack width was finally narrowed to 0.037 mm, 0.031 mm, and 0.026 mm in the 4-PUFRC, 7-PUFRC, and 10-PUFRC beams, respectively. Accordingly, since the damage each started as 1.8 mm cracks, the results were that the combination of springback and shape recovery of the SMPU fibers reduced the crack width by 1.763 mm, 1.769 mm, and 1.774 mm in the 4-PUFRC, 7-PUFRC, and 10-PUFRC beams, respectively.

Overall, the final crack width after the springback and shape recovery is the narrowest for the 10-PUFRC beam, followed by the 7-PUFRC beam, and is the widest for the 4-PUFRC beam, which is in agreement with the healing efficiency test results.

Although both springback and shape recovery narrowed the crack, they worked in a sequence, i.e., springback took effect immediately after removal of the bending load while shape recovery did not take effect until external heating was applied. Also, as the crack narrows, the resistance to crack narrowing becomes stronger. Therefore, although it may appear that the springback narrowed more than the shape recovery, it cannot directly tell which of the two mechanisms is most efficient.

The healed crack interface was also investigated, and microscopy analysis showed that the narrowed cracks are filled in with thermoplastic healing agent.

3.7. SEM Observation Results

The fractography of three-point bending induced crack surface was investigated by field-emission SEM. FIG. 44 shows a beam crack surface fractured after the first fracture (A, at 80× magnification) and (B at 80× magnification) and the fifth fracture (C)-(F). From (C) to (F), the microscope focused on the same area but in an increasing magnification: with (C) at 80× magnification, (D) at 500× magnification, (E) at 1000× magnification, and (F), at 2500× magnification.

In FIGS. 44(A) and (B), the spherical objects observed are thermoplastic particles. It is also seen that the coating layer on the fibers were broken during the crack opening process in the bending test. This is because the SMPU fibers are ductile while the coating epoxy is brittle. The large strain on the fiber during crack opening fractured the coating layer, but not the fibers. This is in agreement with the above discussion that the bridging fibers springback once the bending load is removed and narrow the crack to a certain level. In addition, the fibers on the crack surface are in multiple orientations, consistent with 3-D dispersion of the coated SMPU short fibers. Notably, the SMPU fibers can close crack in any orientation, not limited to the notched direction in this study. This is the major advantage of using 3-D orientated short fibers as reinforcement.

After the fifth fracture, a layer of bonding interface was observed on the fractured surface as shown in FIG. 44 (C) to (F). With increasing magnification, the flowing traces and branching of the flow of the molten thermoplastic are clearly seen, an indication of rough fractured surface.

4. Conclusions

Based on the present Example with cold drawing-programmed short SMPU fiber reinforced composite, in which the fibers were coated by two layered coating agents, the following was found:

(1) The two-step coating method effectively improves the shape fixity ratio of the programmed SMPU fiber from 30% to 66%. While at the same time the coated fibers have good shape memory effect (i.e., higher recovery stress).

(2) The recovery stress reduces nonlinearly with recovery strain. Consequently, the crack closing force applied to the cracked matrix reduces as the crack narrows. The coated fiber is more effective in closing cracks than the uncoated fiber when the recovery strain is lower than 24%, the coated fiber has larger recovery force.

(3) Healing of the composite is repeatable.

(4) Furthermore, the healing efficiency increases as the fiber length increases for the three fiber lengths investigated due to the need of certain embedded fiber length for shear force transfer.

(5) The crack opening process is also a process of cold-drawing programming for fibers bridging over the crack; this programming leads to springback and some initial closure of the crack when the external load is removed; viscoelastic effects although important conceptually can be neglected because the fibers are constrained by the matrix.

The fabrication method set forth herein is able to avoid the loss of shape memory effect of the programmed short SMPU fibers by subjecting the composite at low temperature in the first 24 hours of curing.

Example 7: Spider-Silk-Like Shape Memory Polymer Fiber for Vibration Damping

1. Introduction

Advanced lightweight composite structures have found widespread applications in various industries. As compared to heavy-weight structures, however, light-weight structures can be vibrated easily. Due to the need for structural stability, position control, durability, performance, and noise reduction, vibrations are undesirable for structures [Chung, D., Review: Materials for vibration damping. Journal of Materials Science, 2001. 36(24): p. 5733-5737]. Therefore, vibration damping in lightweight structures is highly desired.

Mechanical vibrations can be reduced in many ways, for instance, by using external dampers. Such kind of damping strategies can be seen everywhere in our daily life: shock absorbers are used in vehicles to smooth out impulse and dissipate kinetic energy; a shock bridge damper is a tuned mass damper used to suppress wind-induced vibrations on taut cables, including overhead power lines. Usually, external dampers exhibit higher damping efficiency for structures with higher inertial mass. For lightweight structures, however, solely damping by external damper is very challenging. Therefore, seeking materials with combined features of high strength, light weight, low cost and especially high damping capacity has remained an unmet need even after work during decades.

Spider silk is an example of an extraordinary natural material. Within different types of spider silks, the spider dragline silk, which is produced in the major ampullate gland of a spider and is used for the frame and radii of an orb web, is the most investigated one [Eisoldt, L., A. Smith and T. Scheibel, Decoding the secrets of spider silk. Materials Today, 2011. 14(3): p. 80-86]. As the frame of the orb web, dragline silk must be extremely strong and tough to absorb the tremendous kinetic energy of insect prey. Therefore, most spider silks have an unusual combination of strength and extensibility, which leads to toughness values seldom attained in synthetic materials. At the same time, webs must also minimize the return of the kinetic energy of the prey to prevent insects from bouncing out of oscillating webs. Furthermore, unlike a bungee jumper who vibrates drastically, a spider that drops with its silk thread hardly ever oscillates [Eisoldt, L., A. Smith and T. Scheibel, Decoding the secrets of spider silk. Materials Today, 2011. 14(3): p. 80-86; Kelly, S. P., A. Sensenig, K. A. Lorentz and T. A. Blackledge, Damping capacity is evolutionarily conserved in the radial silk of orb-weaving spiders. Zoology, 2011. 114(4): p. 233-238; Termonia, Y., Molecular modeling of spider silk elasticity. Macromolecules, 1994. 27(25): p. 7378-73811. These observations indicate that energy dissipation in the spider silk is efficient, namely, it has a high damping capacity. In addition to the aforementioned outstanding mechanical and dynamic properties, spider silk also possesses super-contraction upon exposure to humidity. This contraction stress may maintain tension in webs under the added weight of rain or dew [Eisoldt, L., A. Smith and T. Scheibel, Decoding the secrets of spider silk. Materials Today, 2011. 14(3): p. 80-86; Harmer, A. M., T. A. Blackledge, J. S. Madin and M. E. Herberstein, High-performance spider webs: integrating biomechanics, ecology and behaviour. Journal of The Royal Society Interface, 2011. 8(57): p. 457-471; Buehler, M. J., S. Keten and T. Ackbarow, Theoretical and computational hierarchical nanomechanics of protein materials: Deformation and fracture. Progress in Materials Science, 2008. 53(8): p. 1101-1241; Wu, X., X.-Y. Liu, N. Du, G. Xu and B. Li, Unraveled mechanism in silk engineering: Fast reeling induced silk toughening. Applied Physics Letters, 2009. 95(9): p. 093703-093703-093703]; accordingly a synthetic material with such properties could be used in industry for robotics, sensor technology, and other applications.

The extraordinary properties of spider dragline are determined by its unique molecular structure. It is now well accepted that spider dragline is a semicrystalline material made of amorphous flexible chains reinforced by strong and stiff crystals. It is a balance between the high stiffness of crystalline and the high ductility of the amorphous phase that gives the spider silk excellent mechanical properties [Termonia, Y., Molecular modeling of spider silk elasticity. Macromolecules, 1994. 27(25): p. 7378-7381; Hsia, Y., E. Gnesa, F. Jeffery, S. Tang and C. Vierra, Spider silk composites and applications. Metal, ceramic and polymeric composites for various uses. InTech, Rijeka, 2011].

Although the molecular structure of the spider silk has been well studied in the literature, there are no commercially available spider silks. Harvesting silks from spiders directly is complex, as spiders cannot be housed in high densities due to their aggressive nature and overall small yield of silk. Silks have been cloned and expressed in a variety of heterologous hosts, from bacteria and fungi to plants and mammals, as well as via transgenic silk-worms, and yet the material properties of these cloned silks are inferior to the native materials [Omenetto, F. G. and D. L. Kaplan, New opportunities for an ancient material. Science, 2010. 329 (5991): p. 528-531]. Therefore, synthesis of polymeric fibers with similar mechanical properties, such as stiffness and damping capabilities are highly desired and as yet unmet need.

Shape memory polyurethane (SMPU) fiber has been manufactured and intensively studied for years [Lendlein, A. and R. Langer, Biodegradable, elastic shape-memory polymers for potential biomedical applications. Science, 2002. 296(5573): p. 1673-1676; Zhu, Y., J. Hu, L.-Y. Yeung, Y. Liu, F. Ji and K.-w. Yeung, Development of shape memory polyurethane fiber with complete shape recoverability. Smart materials and structures, 2006. 15(5): p. 1385; Meng, Q. and J. Hu, Influence of heat treatment on the properties of shape memory fibers. I. Crystallinity, hydrogen bonding, and shape memory effect. Journal of applied polymer science, 2008. 109(4): p. 2616-2623; Ji, F. L., J. L. Hu, T. C. Li and Y. W. Wong, Morphology and shape memory effect of segmented polyurethanes. Part I: With crystalline reversible phase. Polymer, 2007. 48(17): p. 5133-5145]. Due to its shape memory functionality, it has been demonstrated that constrained shape recovery (shrinkage) of cold-drawing programmed SMPU fiber, which is embedded in a conventional thermosetting polymer matrix, can repeatedly close wide-opened (millimeter scale) cracks in the matrix [Li, G., H. Meng and J. Hu, Healable thermoset polymer composite embedded with stimuli-responsive fibers. Journal of The Royal Society Interface, 2012. 9(77): p. 3279-3287; Li, G., O. Ajisafe and H. Meng, Effect of strain hardening of shape memory polymer fibers on healing efficiency of thermosetting polymer composites. Polymer, 2012; Li, G. and P. Zhang, A self-healing particulate composite reinforced with strain hardened short shape memory polymer fibers. Polymer, 2013; Zhang, P. and G. Li, Structural relaxation behavior of strain hardened shape memory polymer fibers for self-healing applications. Journal of Polymer Science Part B: Polymer Physics, 2013]. It is well known that the stiff hard segments and flexible soft segments in segmented polyurethanes tend to separate into hard-segment and soft-segment micro-phases due to their thermodynamic incompatibility. Considering the superficial similarity in microstructures, as set forth herein SMPU fiber can be designed and used to have a damping capacity comparable to spider silk and at the same time keep a relatively high stiffness and strength. In Example 3 [also see, Li, G., H. Meng and J. Hu, Healable thermoset polymer composite embedded with stimuli-responsive fibers. Journal of The Royal Society Interface, 2012. 9(77): p. 3279-3287] several qualitative experiments, indicate the remarkable damping properties and impact tolerance of such kind of polymeric fibers as compared to other synthetic fibers, such as carbon fibers.

This Example investigates the effect of programming on the mechanical and damping properties of SMPU fibers. The morphology of the SMPU fiber is assessed based on DSC results. Then, the thermomechanical properties of the SMPU fiber with both cold and hot tension programming are addressed. As-spun SMPU fiber, which is the manufactured fiber without further thermal and mechanical treatments, is used as control sample. Damping capacity which depends on temperature, frequency and programming procedures is assessed. Comparisons of SMPU with spider dragline silk in various aspects are set forth.

2. Experimental Protocols 2.1 Materials

In this study, the polyurethane was synthesized using poly(butylene adipate) (PBA) as soft segments, 4'4-diphenylmethane diisocyanate (MDI) and 1,4-butanediol (BDO) as hard segment as set forth in the Examples above (this is the same composition as in previous Examples). The average formula weight ratio of (MDI+BDO):PBA=1021:650. The glass transition temperature of pure amorphous poly(butylene adipate) (PBA) was reported in the ATHAS database Advanced Thermal Analysis System Data Bank (ATHAS-DB) [Pyda, M. ATHAS database on thermal properties of Poly(n-butyl acrylate) (PBA). 2013; Available on the world wide web from: www.springermaterials.com/docs/athas/info/], and was as low as −55° C. For the hard segments, the glass transition temperature of pure amorphous sample was detected around 110° C. [Chen, T. K., J. Y. Chui and T. S. Shieh, Glass transition behaviors of a polyurethane hard segment based on 4, 4'-diisocyanatodiphenylmethane and 1, 4-butanediol and the calculation of microdomain composition. Macromolecules, 1997. 30(17): p. 5068-5074][and the crystalline melting transition was above 200° C. [Saiani, A., W. Daunch, H. Verbeke, J.-W. Leenslag and J. Higgins, Origin of multiple melting endotherms in a high hard block content polyurethane. 1. Thermodynamic investigation. Macromolecules, 2001. 34(26): p. 9059-9068].

Polyurethane was prepared by the pre-polymerization technique and polyurethane fiber was prepared from the polyurethane using a melt spinning method by the One Shot spinning machine at a spinning speed of 40 m/min. The spinning temperature is 190° C. For more information about the copolymer and the spinning technique, please refer to [Zhu, Y., J. Hu, L.-Y. Yeung, Y. Liu, F. Ji and K.-w. Yeung, Development of shape memory polyurethane fiber with complete shape recoverability. Smart materials and structures, 2006. 15(5): p. 1385; Hu, J., Adaptive and functional polymers, textiles and their applications. 2011: World Scientific; Meng, Q., J. Hu, Y. Zhu, J. Lu and Y. Liu, Morphology, phase separation, thermal and mechanical property differences of shape memory fibers prepared by different spinning methods. Smart materials and structures, 2007. 16(4): p. 1192].

2.2 Programming of SMPU Fiber

When studying shape memory polymers, "programming", i.e., thermomechanical treatments, is the key process to give the material "memory". In this Example an MTS (Alliance RT/5, MTS Inc., USA) equipped with a temperature regulated oven was used to program the samples. In the tests, a 250N load cell and a pair of clamps specified for polymer fibers (Manual Bollard Grips, MTS Inc.) were used. Two different programming temperatures were used and the fibers were divided into three groups based on their programming history. The non-programmed fiber, denoted as Sample #1, was kept at room temperature and was not stretched. This sample was used as the control sample. Sample #2 was programmed by stretching the fiber bundle (100 filaments) to 100% at temperature of 100° C., holding it at 100° C. for 1 hour, cooling down to the room temperature while maintaining the strain constant, and finally removing the load. 100° C. was chosen because it is above the soft phase transition temperature, while below the hard phase transition of Sample #1 (See the DSC results in FIG. 48). This procedure represents classical "hot drawing programming." Sample #3 was programmed at ambient temperature (20° C.), which was close to or even below the soft phase transition temperature of Sample #1 (See DSC results in FIG. 48). It started by stretching the fiber bundle to 100%, holding it at room temperature for 1 hour, and then unloading. This represents typical "cold-drawing programming." After programming, each sample was relaxed at room temperature for 24 hours.

2.3 DSC Analysis

In order to determine the transition behavior and the morphologies of the samples, a PerkinElmer DSC4000 power compensated dynamic scanning calorimeter (DSC) was used to measure the heat flow of the material as a function of temperature. Based on the well-known DSC testing procedure [Schick, C., Differential scanning calorimetry (DSC) of semicrystalline polymers. Analytical and bioanalytical chemistry, 2009. 395(6): p. 1589-1611; Foreman, J., S. Sauerbrunn and C. Marcozzi, Exploring the sensitivity of thermal analysis techniques to the glass transition. TA Instruments: Thermal Analysis & Rheology, 2006], the heat flow can be used to determine the transition temperatures. In each test, 4 to 6 mg chopped fibers (about 2 mm long) was quenched to −60° C., and then heated up to 250° C., which is above the reported pure hard segment melting temperature. After melting at high temperature for 1 min, this cooling-heating cycle was repeated one more time. The cooling rate was set to be 20° C./min and the heating rate was 10° C./min. FIG. 45 summarizes DSC protocol. All the data were normalized by the weight of the testing samples and each type of sample was tested at least three times.

2.4 SEM Observation

The cross-sectional diameters of all the three samples were obtained using a scanning electron microscope (SEM, FEI Quanta 200). The fibers were coated with platinum before observation. Three pictures were taken and the average values were used for determining the diameter of each sample.

2.5 Mechanical Properties

In order to measure the mechanical properties of each sample, uniaxial tensile tests were performed for all three samples at room temperature on the mechanical testing system described in Section 2.2. Only one filament was used in each test for the sake of accuracy. The gauge length was set to be 10 mm and the cross head speed was 200 mm/min. Load verses engineering strain curves were recorded. For each sample, four specimens were tested.

2.6 Shape Memory Properties

Fully constrained stress recovery tests (recover while maintaining strain zero) were performed for the programmed samples (Sample #2 and Sample #3) on the MTS system described in Section 2.2, and recovery stresses were used to quantify the shape memory property of the samples. One hundred filaments as a bundle were gripped and fixed by the fixture. Each sample was heated up from room temperature to 150° C. with a heating rate of 5° C./min, and then it was kept at the high temperature for 10 hours until the recovery force was stabilized. This recovery temperature was chosen so that both soft and hard phase can take part in the recovery process. For both sample, the tests were repeated three times.

2.7 Damping Properties

In order to characterize the damping properties of the samples, isothermal strain controlled frequency sweep tests were performed for all three samples on a DMA 2980 tester from TA instruments. Before the test, the fiber bundle, contained one hundred filaments was straightened but with zero external tensile force. Gauge length was set to be 15 mm and the applied dynamic strain was 1%, which is within the linear viscoelastic region of the samples. The isothermal test temperatures were set to be 25° C., 50° C., 75° C. and 100° C., respectively and the frequency range was 1 Hz to 25 Hz with an increment of 1 Hz. For each sample, the tests were repeated for at least three times.

3. Results and Discussion

3.1 DSC Analysis and Programming Effects

3.1.1 General Description of Morphology Based on DSC Results

In the second cycle of DSC tests, the mechanical and thermal history during fabrication and programming have been erased, hence, the same curves were obtained in the second cycle DSC scan for all samples. A typical second cycle DSC curve is presented in FIG. 46. The morphology of the material can be divided into two phases based on its thermal transition behaviors: the soft phase, contains soft segments with some short hard segments incorporated within it and is represented by transitions between 0° C. and 100° C.; the hard phase, consists of hard segments with long range order, is represented by transitions from 120° C. to 200° C. [Saiani, A., W. Daunch, H. Verbeke, J.-W. Leenslag and J. Higgins, Origin of multiple melting endotherms in a high hard block content polyurethane. 1. Thermodynamic investigation. Macromolecules, 2001. 34(26): p. 9059-9068].

The morphology of the segmented polyurethane copolymer has been extensively studied [see, e.g., Saiani, A., W. Daunch, H. Verbeke, J.-W. Leenslag and J. Higgins, Origin of multiple melting endotherms in a high hard block content polyurethane. 1. Thermodynamic investigation. Macromolecules, 2001. 34(26): p. 9059-9068; Fragiadakis, D. and J. Runt, Molecular Dynamics of Segmented Polyurethane Copolymers: Influence of Soft Segment Composition. Macromolecules, 2013; Peebles Jr, L., Hard block length distribution in segmented block copolymers. Macromolecules, 1976. 9(1): p. 58-61; Koberstein, J. T. and T. P. Russell, Simultaneous SAXS-DSC study of multiple endothermic behavior in polyether-based polyurethane block copolymers. Macromolecules, 1986. 19(3): p. 714-720; Chen, T. K., T. S. Shieh and J. Y. Chui, Studies on the first DSC endotherm of polyurethane hard segment based on 4, 4'-diphenylmethane diisocyanate and 1, 4-butanediol. Macromolecules, 1998. 31(4): p. 1312-1320; Saiani, A., C. Rochas, G. Eeckhaut, W. Daunch, J.-W. Leenslag and J. Higgins, Origin of multiple melting endotherms in a high hard block content polyurethane. 2. Structural investigation. Macromolecules, 2004. 37(4): p. 1411-1421; Saiani, A., A. Novak, L. Rodier, G. Eeckhaut, J.-W. Leenslag and J. Higgins, Origin of multiple melting endotherms in a high hard block content polyurethane: effect of annealing temperature. Macromolecules, 2007. 40(20): p. 7252-7262; Cipriani, E., M. Zanetti, V. Brunella, L. Costa and P. Bracco, Thermoplastic polyurethanes with polycarbonate soft phase: Effect of thermal treatment on phase morphology. Polymer Degradation and Stability, 2012. 97(9): p. 1794-1800; Li, C., J. Liu, J. Li, Q. Huang and H. Xu, Studies of 4, 4'-diphenylmethane diisocyanate (MDI)/1, 4-butanediol (BDO) based TPUs by in situ and moving-window two-dimensional correlation infrared spectroscopy: Understanding of multiple DSC endotherms from intermolecular interactions and motions level. Polymer, 2012].

Here, we summarize the thermal transitions and morphological changes taking place from low to high temperature briefly: (1) glass transition of the soft phase, which is determined by soft and hard segments together, is characterized by the step around $T_{gSP}$ (24.61±0.78° C.); (2) Phase separation (or phase de-mixing), during which short hard segments segregate from soft phase and aggregate into micro-hard phase. This transition is characterized by the exothermic peak at $T_{DMX}$ (70.34±1.52° C.); (4) phase mixing, driven by the thermodynamic force (entropy), during which hard segments dissolve into soft phase again and is characterized by the endothermic peak at $T_{MX}$ (166.97±1.29° C.).

3.1.2 Programming Effects

In order to clarify the complete procedure of the programming-recovery cycle, stress-strain-time 3-D plots for both Sample #2 and Sample #3 are shown in FIGS. 47(a) and (b), respectively (See the 2-D plots in FIG. 49 and FIG. 50 for more details). As described before, the fibers were stretched and then held at a constant strain (100%) during programming. Molecular chains were then forced to rotate, extend and even slide against each other, and rearranged into a new microstructural configuration. This microstructural evolution was reflected in the macro-scale as stress relaxation (Step 2 and 3 in FIG. 47(a) and Step 2 in FIG. 46), which resulted in the formation of "temporary shape" and storage of stress. During the fully constrained recovery processes, the tendency of the molecular chains returning to the original configuration leads to releasing of "stored stress". (Step 6 in FIG. 47(a) and Step 5 in FIG. 47(b)) [Nguyen, T. D., H. Jerry Qi, F. Castro and K. N. Long, A thermoviscoelastic model for amorphous shape memory polymers: incorporating structural and stress relaxation. Journal of the Mechanics and Physics of Solids, 2008. 56(9): p. 2792-2814; Li, G. and W. Xu, Thermomechanical behavior of thermoset shape memory polymer programmed by cold-compression: testing and constitutive modeling. Journal of the Mechanics and Physics of Solids, 2011. 59(6): p. 1231-1250]. To investigate the influence of different programming methods on the morphology, typical the first cycle DSC curves of all three samples are presented in FIG. 48. As a control sample, Sample #1 has been stored at room temperature for over 6 months after fabrication. Similar to the second cycle, thermal transitions of Sample #1 includes: glass transition at $T_{gSP}$ (23.80±0.44° C.), phase de-mixing at $T_{DMX}$ (82.42±0.88° C.), hard phase disorder procedure around $T_M$ (145.72±0.77° C.) and finally, phase mixing around $T_{MX}$ (166.27±1.35° C.).

For Sample #2, according to the first DSC cycle of Sample #1 in FIG. 48, the programming temperature (100° C.) is above the phase de-mixing temperature $T_{DMX}$. It has been proved in the literature that upon heat treatment, the hydrogen bond between soft segments and hard segments decreases and the "purity" of soft phase increases. As a result, without the strong restriction of the hard segments, without being bound by theory it is understood that the soft segments could possess a greater mobility and their stiffness become extremely low. Therefore, stretching at this temperature can easily orient and elongate the soft segments. This understanding is validated by the changes in DSC curve in the soft phase: phase separation leads to a lower onset point of glass transition and the disappearance of phase de-mixing peak ($T_{DMX}$); higher orientation in soft phase results in a broader glass transition step; and the glass transition temperature has been shifted to $T_{gSP}$ (19.28±0.65° C.).

Regarding Sample #3, which was programmed at room temperature, the soft segments are more rigid with less mobility. It has been observed before that, cold drawing first introduce orientation to amorphous soft segments, followed by the orientation or even breaking of the crystalline soft segment, and finally, the hard segments can also be partially oriented. [Wang, W., Y. Jin, P. Ping, X. Chen, X. Jing and Z. Su, Structure evolution in segmented poly (ester urethane) in shape-memory process. Macromolecules, 2010. 43(6): p. 2942-2947] Similarly, in the programming procedure of Sample #3, the soft segments are forced to orient first, then, a certain amount of hard segments are stretched. As a result, different from Sample #2, in which the soft segments contribute mostly to the macroscopic extension, the overall deformation of Sample #3 is ascribed to both soft and hard segments. This orientation gives rise to the internal resistance among molecules and thus, the increased glass transition temperature of the soft phase $T_{gSP}$ (27.45±0.52° C.).

3.2 Thermomechanical Properties
3.2.1 Mechanical Properties

Scanning electron microscopy (SEM) images of the three samples were determined (data not shown). According to the images and the scales, the cross sectional diameters of Sample #1 is 60 μm and Samples #2 and #3, after programming, are 50 μm and 55 μm, respectively.

FIG. 51 shows the tensile stress-strain response of the three samples at room temperature. It is clear that programming procedure increases the stiffness (slope of the stress-strain curve) and the strength (peak stress) of the materials. Further comparison of programmed samples (Sample #2 and Sample #3) shows that programming at higher temperature (Sample #2) results in higher stiffness and strength than programming at room temperature (Sample #3). However, the increase in strength and stiffness always comes as a result of reduction in extensibility.

It is known that molecular orientation can enhance stiffness of materials in the stretched direction. Also, because the molecular chains have already been highly extended during programming, it is easier to reach their extension limit by further stretching. Therefore, the programmed samples have higher stiffness and strength, but lower extensibility as compared to the non-programmed control sample (Sample #1). Now, comparing Sample #2 and Sample #3, as has been discussed in the previous section, the overall elongation of Sample #2 is attributed mostly to the soft segments, while in Sample #3, both soft and hard segments have been stretched during the programming procedure. Without being bound by theory it is believed that the difference in the mechanical properties between Sample #2 and Sample #3 is from the difference in the level of orientation in soft and hard segments.

3.2.2 Shape Memory Properties

Typical fully constrained stress recovery tests results are shown in FIG. 52(*a*). Based on observation, during the fully constrained stress recovery test, the overall stress recorded is determined by three effects: 1) thermal expansion; 2) releasing of the "stored stress"; and 3) stress relaxation. At the beginning of the test, since the temperature is not high enough to trigger the massive releasing of the "stored stress", the dominating effect is thermal expansion. As temperature increases, two competitive mechanisms begin to dominate the total stress: On one hand, driven by the entropic force, the molecular chains tend to recoil and return to the original configuration, i.e., shape recovery. Due to the fully constrained boundary condition, the shape recovery is not allowed, leading to buildup of tensile stress (e.g., as if a material had a negative thermal expansion coefficient), which is considered to be the releasing of the stored stress. This tensile stress increases as the recovery process proceeds. On the other hand, once the fibers are in tension, molecules tend to align along the loading direction, leading to stress relaxation. Because the constrained stress recovery test has the same test configuration as conventional stress relaxation test, it helps understand why stress relaxation is one of the major components in stress recovery test. The two mechanisms competed with each other until the microstructure reaches an equilibrium state and by that time, the recovery stress is stabilized.

The peak and final stresses for both the programmed samples are reported in FIG. 52(*b*). The results revealed that Sample #2 has a higher peak recovery stress, while Sample #3 has a higher stabilized recovery stress. The differences in the recovery behaviors of both samples can be explained by the difference in their microstructures we hypothesized before. It is understood that Sample #2 has higher amount of oriented soft segments and the soft segments have lower transition temperature, the recovery process of Sample #2 was thus triggered first. The slightly lower recovery temperature, together with the slightly higher stiffness of Sample #2, makes it have a higher peak stress than Sample #3 (see, e.g., FIG. 51). When comparing the stabilized stress, for Sample #2, most of the stabilized stress is sustained by the soft segments, while for Sample #3, some hard segments taking part in the recovery process leadings to higher stabilized stress. In the bio-inspired self-healing applications, a sustained force is needed to close the macroscopic crack (see e.g., Example 4 and Example 5) In other words, the stabilized recovery stress plays a more important role in self-healing process. Therefore, Sample #3 is generally more desired in self-healing embodiments.

3.3 Damping Properties

3.3.1 General Description of the Damping Property

The ability for polymers to damp vibration persists in their viscoelastic nature [Chung, D., Review: Materials for vibration damping. Journal of Materials Science, 2001. 36(24): p. 5733-5737; Ganeriwala, S. and H. Hartung, Fourier Transform Mechanical Analysis and Phenomenological Representation of Viscoelastic Material Behavior. 1989] This damping capability is maximized within the glass transition region. Within this region, when the material is forced to vibrate, some molecules exhibit viscous flow while others remain stiff Internal molecular friction thus increases, which results in heat buildup and dissipation of the input energy [Couchman, P. and F. Karasz, A classical thermodynamic discussion of the effect of composition on glass-transition temperatures. Macromolecules, 1978. 11(1): p. 117-119]. The dynamic properties of polymers can be characterized by storage modulus E', loss modulus E", and loss tangent tan δ. Theoretically, to obtain the best damping property, it is desired to maximize E". However, there is a limit. Maximizing E" results in lower elastic response and, therefore, poor physical and mechanical properties may result. Furthermore, both E' and E" are sensitive to geometry. Therefore, tan δ was used here as a quantitative representation of material ability to dissipate energy: higher value of tan δ means better damping properties. The temperature and frequency dependence of all these three parameters can be obtained by DMA.

In FIG. 53, each plot represents the isothermal dynamic frequency sweep test of a certain sample. Tan δ reaches its maximum at T=50° C. and minimum at T=100° C. for all three samples. This is because 50° C. is the test temperature that is closest to their corresponding glass transition temperatures (around 40° C., based on the DMA $T_g$ tests [See, e.g., Example 1, Example 3, Example 6]), whereas T=100° C. is farthest away from the corresponding $T_g$. The results also indicate that the loss tangent of the material has an order of 0.1, and can be as high as 0.35.

3.3.2 Dependence of Damping Property on Frequency

In FIG. 54, the tan δ vs. frequency curves were regrouped for the convenience of investigation and comparison. Each plot represents the results of all three samples at a certain temperature. The plots indicate that the loss tangent is controlled by temperature, frequency and programming process simultaneously. However, the dependence of the loss tangent on frequency has similar trends for all three samples at a certain temperature: at low temperature (T=25° C.), tan δ decreases monotonically with respect to frequencies; at intermediate temperature (T=50° C., 75° C.), tan δ first increases then flattens, and finally decreases; at high temperature (T=100° C.), the curve is more flattened at lower frequencies and is close to zero at higher frequencies.

This phenomenon can be explained by time-temperature equivalent principle, that is, higher frequency is equivalent to lower temperature and vice versa. According to the DMA $T_g$ tests, at T=25° C., the fiber is in glassy state or at the beginning of the glass transition zone [See, e.g., Example 1, Example 3, Example 6]. Increasing frequency is equivalent to decreasing temperature, which will result in lower loss tangent. Similarly, at the intermediate temperature, 50° C. and 75° C., the material is within the glass transition zone or at the end of the zone. Applying higher frequency load is equivalent to bringing the material back from the rubber elastic state to the glass transition zone, passing the glass transition region and finally entering the glassy state. Thus an upward trend of the loss tangent curve appeared at the beginning followed by a downward trend of loss tangent. At even higher temperature T=100° C., the amorphous phase of the polymer is in pure rubber elastic state. Loss tangent stays close to zero within this region.

For a description on how to relate the frequency dependence and temperature dependence of loss tangent, see FIG. 55. In order to utilize FIG. 55 the following steps can be employed: (1) Start from a certain test temperature, 50° C., for example. (2) Follow the direction of the arrow; this direction represents the decrease in temperature, and also represents the increase in frequency according to the time-temperature equivalence principle. (3) Select the curve between 50° C. and a reasonable ending temperature, 25° C., for example, make an axial symmetry with respect to the vertical dash line corresponding to 50° C. (4) A sketch of the tan δ vs. frequency is obtained; comparing with the experimental result in FIG. 53 [there was a typo here please verify that 53 is now the correct Fig.], they have the same trend. Thus, by starting from the tan δ vs. temperature sketch, following the above four steps with and corresponding steps in the FIG. 55, a schematic tan δ vs. frequency curve can be obtained. Accordingly, use of FIG. 55 in this way allows one to customize or design SMP programming.

Although all the samples obey similar patterns, different programming methods differentiate the loss tangent curves of the three samples from each other. As mentioned earlier, the source of damping in a polymer is mainly from the friction among molecular chains against relative motion [Bicerano, J. and J. K. Rieke, Internal friction in polymer systems. The Journal of the Acoustical Society of America, 1989. 86: p. S51; Hermida, É. B., F. Povolo and P. Porta, Internal friction and loss tangent of nonlinear viscoelastic materials: different concepts, different results. Journal of alloys and compounds, 2000. 310(1): p. 280-283]. Higher orientation can increase such resistance, while phase separation caused by heat treatment can decrease the restriction.

At lower temperature (25° C.), Sample #1 has the lowest value of tan δ, indicating that programming increases the damping capability of SMPU fibers, mostly due to higher orientation of the programmed samples. Meanwhile, since Sample #2 has the lowest glass transition temperature, at 25° C., Sample #2 is the closest to its glass transition region. Therefore, Sample #2 has the highest value of tan δ. At intermediate temperature (50° C. and 75° C.), cold-drawn SMPU fiber (Sample #3) exhibits the highest damping capability, followed by as-spun SMPU fiber (Sample #1), and the least by the hot-drawn SMPU fiber (Sample #2). This is because Sample #2 has been through the phase separation process, while Sample #3 has higher molecular orientation. At higher temperature (100° C.), although all the samples have entered the rubbery state, it is still clear that Sample #3 has slightly higher damping property.

According to the above analysis, the influence of the programming procedures on damping properties were embedded in two aspects: first, decrease (Sample #2) or increase (Sample #3) the overall value of loss tangent; second, shift the glass transition temperature to a lower (Sample #2) or higher (Sample #3) value. In FIG. 56, these two changes have been visualized in the tan δ vs. temperature curves, and the differences were explained schematically.

3.4 Comparison with Spider Silk

As stated above, it is set forth that SMPU fiber of the invention has similar properties to spider silk. In the following subsections, comparisons of SMPU fiber with spider silk in various aspects are set forth.

3.4.1 Mechanical Properties

The mechanical properties of dragline silk of several different species have been investigated in the literature. Most spider silks have an outstanding combination of strength and extensibility, which yields a very high toughness (the amount of energy absorbed per volume before breakage) that exceeds most natural or man-made fibers. A comparison in mechanical properties, including strength, extensibility and toughness of the SMPU fiber with spider dragline silk and other common structural materials are given in Table 4 below The strength of the SMPU fiber is close to, but still lower than that of the spider silk. However, due to its excellent extensibility, SMPU fiber has the highest toughness among these materials. In other words, it can absorb the highest amount of energy before fracture.

One thing which should be mentioned is the incredibly thin diameter of spider silk. The thickest silk fibers are only 5-10 μm in diameter and some can be as fine as 50 nm in diameter [53]. As is well known, smaller diameter means higher molecular orientation and less defects. Compared to our SMPU fiber, the small diameter of spider silk is thus one of the reasons for its high strength and stiffness.

TABLE 4

Approximate mechanical properties for some structural materials

| Materials | Strength (GPa) | Extensibility (%) | Toughness (MJ/m³) |
|---|---|---|---|
| SMPU (Sample#1) | 0.190 ± 0.013 | 264 ± 21 | 277 ± 25 |
| SMPU (Sample#2) | 0.280 ± 0.014 | 187 ± 4 | 290 ± 17 |
| SMPU (Sample#3) | 0.250 ± 0.015 | 212 ± 9 | 284 ± 27 |
| Spider dragline silk* | 1.1 | 27 | 160 |
| Nylon fiber* | 0.95 | 18 | 80 |
| Kevlar 49 fiber* | 3.6 | 2.7 | 50 |
| Glass fiber* | 2.4 | 3 | 35 |
| Carbon fiber* | 3.9 | 1.5 | 22 |
| High tensile steel* | 1.5 | 0.8 | 6 |

In Table 4, these data (*) are obtained from published literature; no standard deviation is available in the publications. [Hsia, Y., E. Gnesa, F. Jeffery, S. Tang and C. Vierra, Spider silk composites and applications. Metal, ceramic and polymeric composites for various uses. InTech, Rijeka, 2011; Li, G., H. Meng and J. Hu, Healable thermoset polymer composite embedded with stimuli-responsive fibers. Journal of The Royal Society Interface, 2012. 9(77): p. 3279-3287 Li, G., H. Meng and J. Hu, Healable thermoset polymer composite embedded with stimuli-responsive fibers. Journal of The Royal Society Interface, 2012. 9(77): p. 3279-3287; Fu, S.-Y., B. Lauke, E. Mader, C.-Y. Yue and X. Hu, Tensile properties of short-glass-fiber- and short-carbon-fiber-reinforced polypropylene composites. Composites Part A: Applied Science and Manufacturing, 2000. 31(10): p. 1117-1125]

3.4.2 Super-Contraction Forces

In Section 3.2.3, fully constrained stress recovery tests were used to characterize the shape memory properties of SMPU fibers. If the programmed fiber is kept at high temperature and allowed to deform freely, it will undergo super-contraction and shrink to about half of its original length. Spider dragline silks also possess similar feature: when the humidity is above 60%, unrestrained silk shrinks up to 50% of its original length while constrained fibers, such as in webs, generate substantial forces during super-contraction. In this invention, SMP fibers are used in polymer composite, i.e., here they are protected by polymer, so that water/moisture is not a problem. For the case of outdoor cables, One may simply add an art-accepted water-proof or water-resistance coating so that the fibers are protected. [Work, R. W., A comparative study of the supercontraction of major ampullate silk fibers of orb-web-building spiders (Araneae). Journal of Arachnology, 1981: p. 299-308; Guinea, G., M. Elices, J. Perez-Rigueiro and G. Plaza, Self-tightening of spider silk fibers induced by moisture. Polymer, 2003. 44(19): p. 5785-5788]. Water absorbed during super-contraction is hypothesized to plasticize silk fibers by disrupting hydrogen bonding between proteins, thus allowing an entropy-driven re-orientation and coiling of silk molecules [Jelinski, L. W., A. Blye, O. Liivak, C. Michal, G. LaVerde, A. Seidel, N. Shah and Z. Yang, Orientation, structure, wet-spinning, and molecular basis for supercontraction of spider dragline silk. International journal of biological macromolecules, 1999. 24(2): p. 197-201; Agnarsson, I., C. Boutry, S.-C. Wong, A. Baji, A. Dhinojwala, A. T. Sensenig and T. A. Blackledge, Supercontraction forces in spider dragline silk depend on hydration rate. Zoology, 2009. 112(5): p. 325-331; Savage, K. N., P. A. Guerette and J. M. Gosline, Supercontraction stress in spider webs. Biomacromolecules, 2004. 5(3): p. 675-679].

Compared to SMPU fiber, spider dragline silk can generate remarkably higher super-contraction stresses, ranging from 10 MPa to 140 MPa. The variation in the reported super-contraction stresses depends on the type of spiders, spinning conditions and environmental factors, such as, hydration rate [in addition to citations immediately above, also see: Guinea, G., M. Elices, J. Perez-Rigueiro and G. Plaza, Self-tightening of spider silk fibers induced by moisture. Polymer, 2003. 44(19): p. 5785-5788; Blackledge, T. A., C. Boutry, S.-C. Wong, A. Baji, A. Dhinojwala, V. Sahni and I. Agnarsson, How super is supercontraction? Persistent versus cyclic responses to humidity in spider dragline silk. Journal of Experimental Biology, 2009. 212(13): p. 1981-1989].

3.4.3 Damping Properties

Table 5 provides a damping property comparison of SMPU fiber with spider dragline silk, and some other representative materials. According to the data provided, SMPU fiber has a very high damping capability comparable to or even higher than that of spider silks and at the same time possesses a fairly high storage modulus. Moreover, as demonstrated above, the simple programming procedures can not only change the glass transition temperature and the mechanical properties, provide the material with shape memory function, but also improve the damping capability. All these features exemplify the utility and value of this material in commercial and academic applications.

TABLE 5

Dynamic mechanical properties of materials

| Material | tanδ | Storage modulus (GPa) |
|---|---|---|
| Spider dragline silk* | 0.15 | 10 |
| SMPU fibers | 0.1-0.35 | 2.5 |
| Cement paste (plain)* | 0.016 | 13.7 |
| Mortar with silica fume (treated)* | 0.021 | 13.11 |
| Aluminum (pure)* | 0.019 | 51 |
| Zn—Al* | 0.021 | 74 |
| Polycarbonate* | 0.008-0.013 | 2-3 |
| Neoprene rubber* | 0.67 | 0.0075 |

In Table 5, data designated (*) are obtained from published literature [Blackledge, T. A., J. E. Swindeman and C. Y. Hayashi, Quasistatic and continuous dynamic characterization of the mechanical properties of silk from the cobweb of the black widow spider *Latrodectus hesperus*. Journal of Experimental Biology, 2005. 208(10): p. 1937-1949; Chung, D., Review: Materials for vibration damping. Journal of Materials Science, 2001. 36(24): p. 5733-5737]. No standard deviation is available in the publications.

3.4.4 Microstructure

The above data show features shared between SMPU fiber and spider silk. These similarities between spider silk and SMPU fiber are determined by their resemblances in microstructure.

As stated above, spider dragline silk is a semicrystalline material made of amorphous flexible chains reinforced by strong and stiff crystals. In spider silk, the amorphous chains are also linked together through hydrogen bonds (see FIG. 8 above and related text). The crystals, made of hydrophobic polyalanine sequences arranged into hydrogen-bonded beta-pleats, produce thin regions of locally high modulus, leading to the enormous stiffness of the overall material. Due to its mechanical stability, the crystals also act as net-points to keep the permanent shape during the super contraction procedure. The highly entangled amorphous phase, made of kinetically free oligopeptide chains rich in glycine, provides the fiber with outstanding extensibility. Also, the friction and resistance among the entangled molecular chains can dissipate the input energy efficiently and thus give the material an extraordinary damping property. It is believed that water can prevent the formation of the hydrogen bonds between the molecular chains Hence, the H-bond can be interpreted as a switch that is responsible for the molecular mobility during the super contraction procedure. [see, e.g., Example 3; Li, G., H. Meng and J. Hu, Healable thermoset polymer composite embedded with stimuli-responsive fibers. Journal of The Royal Society Interface, 2012. 9(77): p. 3279-3287; Termonia, Y., Molecular modeling of spider silk elasticity. Macromolecules, 1994. 27(25): p. 7378-7381]

Microstructure of SMPU fiber is similar to that of spider silk [see e.g., FIG. 8 above and related text; Li, G., H. Meng and J. Hu, Healable thermoset polymer composite embedded with stimuli-responsive fibers. Journal of The Royal Society Interface, 2012. 9(77): p. 3279-3287]. The hard phase of the SMPU fiber ensures the high local stiffness and acts as the net-points to retain the stable permanent shape; after programming, the soft phase mainly contains soft segments and short hard segments, gives its outstanding extensibility. The restriction among entangled soft and hard segments and the highly oriented chains act as the source of damping. Heating up can increase the molecular mobility of the oriented molecular chains and makes them recoil and finally bring the fiber back to its original shape. Therefore, the fiber has the shape memory effect.

4. Conclusions

Based on this Example the following conclusions are made:

(1) Similar to spider silk, SMPU fiber of the invention possesses high damping ability, and at the same time has a fairly high strength and toughness. In addition, the polymer fiber has shape memory effect, and after tension programming, has super-contraction upon heating, similar to moisture triggered spider silk. These similarities between spider silk and SMPU fiber are determined by their commonalities in microstructure.

(2) Programming the SMPU fiber can alter its mechanical and thermal properties. After programming, stiffness and strength can be increased while extensibility is decreased. Programming at high temperature (Sample #2) lowers glass transition temperature and the overall damping ability. On the contrary, programming at low temperature (Sample #3) increases the glass transition temperature and increases damping ability.

(3) The shape memory property is characterized by the fully constrained recovery stress. Different programming procedures result in different recovery behaviors. The cold-drawn fiber (Sample #3) can generate higher stabilized stress, with is desirable in self-healing applications.

Considering the increased damping capability, which is useful in controlling vibration, and the increased stabilized recovery stress, which helps provide the sustained crack-closure force in self-healing applications, together with its time and energy efficiency process, cold-drawing programming of the SMPU fibers is used to great effect in structural applications.

All documents, including patents or published applications, cited or relied on for priority in this application are fully incorporated by reference herein.

What is claimed:

1. A composite comprising:
 a matrix of thermoset polymer;
 a programmed fibrous shape memory polymer which comprises the ability to contract when heated above its shape recovery temperature; and
 thermoplastic polymer for healing at a molecular scale, wherein said thermoplastic polymer is dispersed throughout said matrix;
 wherein said composite comprises a sandwich structure.

\* \* \* \* \*